Sept. 3, 1957 R. C. STILES 2,805,283

AUTOMATIC TELEGRAPH SWITCHING SYSTEM

Filed Dec. 10, 1951 45 Sheets-Sheet 1

INVENTOR.
Richard C. Stiles

BY

Smith, Olsen & Baird

Attys.

Sept. 3, 1957 R. C. STILES 2,805,283

AUTOMATIC TELEGRAPH SWITCHING SYSTEM

Filed Dec. 10, 1951 45 Sheets-Sheet 2

INVENTOR.
Richard C. Stiles
BY
Smith, Olsen + Baird
Attys.

Sept. 3, 1957 R. C. STILES 2,805,283

AUTOMATIC TELEGRAPH SWITCHING SYSTEM

Filed Dec. 10, 1951 45 Sheets-Sheet 3

INVENTOR.
Richard C. Stiles
BY
Smith, Olsen & Baird
Attys.

Sept. 3, 1957 R. C. STILES 2,805,283

AUTOMATIC TELEGRAPH SWITCHING SYSTEM

Filed Dec. 10, 1951 45 Sheets-Sheet 4

INC. LINE CIR. 400

INVENTOR.
Richard C. Stiles
BY
Smith, Olsen + Baird
Attys.

Sept. 3, 1957 R. C. STILES 2,805,283

AUTOMATIC TELEGRAPH SWITCHING SYSTEM

Filed Dec. 10, 1951 45 Sheets-Sheet 5

INC. LINE CIR. 400

INVENTOR.
Richard C. Stiles
BY
Smith, Olsen + Baird
Attys.

Sept. 3, 1957 R. C. STILES 2,805,283

AUTOMATIC TELEGRAPH SWITCHING SYSTEM

Filed Dec. 10, 1951 45 Sheets-Sheet 6

INVENTOR.
Richard C. Stiles
BY
Smith, Olsen + Baird
Attys.

INC. LINE CIR. 400

INVENTOR.
Richard C. Stiles
BY
Smith, Olsen + Baird
Attys.

INC. LINE CIR. 400

INVENTOR.
Richard C. Stiles
BY
Smith, Olsen + Baird
Attys.

Sept. 3, 1957 R. C. STILES 2,805,283

AUTOMATIC TELEGRAPH SWITCHING SYSTEM

Filed Dec. 10, 1951 45 Sheets-Sheet 9

INC. LINE CIR. 400

CHANNEL NUMBER COMPARATOR 900

INVENTOR.
Richard C. Stiles
BY
Smith, Olsen + Baird
Attys.

Sept. 3, 1957 R. C. STILES 2,805,283

AUTOMATIC TELEGRAPH SWITCHING SYSTEM

Filed Dec. 10, 1951 45 Sheets-Sheet 10

INVENTOR.
Richard C. Stiles

BY Smith, Olsen & Baird
Attys.

ADDRESS DETECTOR 1100

INVENTOR.
Richard C Stiles
BY Smith, Olsen & Baird
Attys.

AUTOMATIC TELEGRAPH SWITCHING SYSTEM

Filed Dec. 10, 1951 45 Sheets-Sheet 12

INVENTOR.
Richard C. Stiles
BY Smith, Olsen & Baird
Attys.

Sept. 3, 1957 R. C. STILES 2,805,283

AUTOMATIC TELEGRAPH SWITCHING SYSTEM

Filed Dec. 10, 1951 45 Sheets-Sheet 13

ADDRESS DETECTOR 1100

INVENTOR.
Richard C. Stiles
BY
Smith, Olsen + Baird
Attys.

Sept. 3, 1957 R. C. STILES 2,805,283

AUTOMATIC TELEGRAPH SWITCHING SYSTEM

Filed Dec. 10, 1951 45 Sheets-Sheet 14

INVENTOR.
Richard C. Stiles
BY
Smith, Olsen + Baird
Attys

Sept. 3, 1957 R. C. STILES 2,805,283

AUTOMATIC TELEGRAPH SWITCHING SYSTEM

Filed Dec. 10, 1951 45 Sheets-Sheet 15

INVENTOR.
Richard C. Stiles
BY
Smith, Olsen + Baird
Attys.

Sept. 3, 1957 R. C. STILES 2,805,283

AUTOMATIC TELEGRAPH SWITCHING SYSTEM

Filed Dec. 10, 1951 45 Sheets-Sheet 16

INVENTOR.
Richard C. Stiles
BY
Smith, Olsen + Baird
Attys.

INVENTOR.
Richard C. Stiles
BY
Smith, Olsen & Baird
Attys.

Sept. 3, 1957 R. C. STILES 2,805,283

AUTOMATIC TELEGRAPH SWITCHING SYSTEM

Filed Dec. 10, 1951 45 Sheets-Sheet 18

INVENTOR.
Richard C. Stiles
BY
Smith, Olsen + Baird
Attys.

INVENTOR.
Richard C. Stiles
BY
Smith, Olsen + Baird
Attys.

PRECEDENCE SENSING CIRCUIT 1900

INVENTOR.
Richard C. Stiles
BY
Smith, Olsen & Baird
Attys.

AUTOMATIC TELEGRAPH SWITCHING SYSTEM

Filed Dec. 10, 1951 45 Sheets-Sheet 21

PRECEDENCE SENSING CIRCUT 1900

INVENTOR.
Richard C. Stiles
BY
Smith, Olsen & Baird
Attys.

Sept. 3, 1957 R. C. STILES 2,805,283

AUTOMATIC TELEGRAPH SWITCHING SYSTEM

Filed Dec. 10, 1951 45 Sheets-Sheet 22

INVENTOR.
Richard C. Stiles
BY
Smith, Olsen & Baird
Attys.

PRECEDENCE DETECTOR 2300

INVENTOR.
Richard C. Stiles
BY
Smith, Olsen & Baird
Attys.

PRECEDENCE DETECTOR 2300

INVENTOR.
Richard C. Stiles
BY
Smith, Olsen + Baird
Attys.

INVENTOR.
Richard C. Stiles
BY
Smith, Olsen & Baird
Attys.

Sept. 3, 1957 R. C. STILES 2,805,283

AUTOMATIC TELEGRAPH SWITCHING SYSTEM

Filed Dec. 10, 1951 45 Sheets-Sheet 26

CROSS OFFICE SEL. SW. RELAY CONT. GROUP 2600

INVENTOR.
Richard C. Stiles
BY
Smith, Olsen & Baird
Attys.

CROSS OFFICE SEL. SW.
RELAY CONT. GROUP 2600

INVENTOR.
Richard C. Stiles
BY
Smith, Olsen & Baird
Attys.

Sept. 3, 1957 R. C. STILES 2,805,283

AUTOMATIC TELEGRAPH SWITCHING SYSTEM

Filed Dec. 10, 1951 45 Sheets-Sheet 28

INVENTOR.
Richard C. Stiles
BY Smith, Olsen & Baird
Attys

Sept. 3, 1957 R. C. STILES 2,805,283

AUTOMATIC TELEGRAPH SWITCHING SYSTEM

Filed Dec. 10, 1951 45 Sheets-Sheet 29

INVENTOR.
Richard C. Stiles
BY
Smith, Olsen + Baird
Attys.

Sept. 3, 1957 R. C. STILES 2,805,283

AUTOMATIC TELEGRAPH SWITCHING SYSTEM

Filed Dec. 10, 1951 45 Sheets-Sheet 30

INVENTOR.
Richard C. Stiles
BY
Smith, Olsen & Baird
Attys.

INVENTOR.
Richard C. Stiles
BY
Smith, Olsen + Baird
Attys.

Sept. 3, 1957 R. C. STILES 2,805,283

AUTOMATIC TELEGRAPH SWITCHING SYSTEM

Filed Dec. 10, 1951 45 Sheets-Sheet 32

INVENTOR.
Richard C. Stiles
BY
Smith, Olsen & Baird
Attys.

Sept. 3, 1957 R. C. STILES 2,805,283

AUTOMATIC TELEGRAPH SWITCHING SYSTEM

Filed Dec. 10, 1951 45 Sheets-Sheet 33

INVENTOR.
Richard C. Stiles
BY Smith, Olsen & Baird
Attys.

Sept. 3, 1957 R. C. STILES 2,805,283

AUTOMATIC TELEGRAPH SWITCHING SYSTEM

Filed Dec. 10, 1951 45 Sheets-Sheet 34

CROSS OFFICE UNIT 3400

INVENTOR.
Richard C. Stiles
BY
Smith, Olsen & Baird
Attys.

Sept. 3, 1957 R. C. STILES 2,805,283

AUTOMATIC TELEGRAPH SWITCHING SYSTEM

Filed Dec. 10, 1951 45 Sheets-Sheet 35

CROSS OFFICE UNIT 3400

INVENTOR.
Richard C. Stiles
BY Smith, Olsen + Baird
Attys.

Sept. 3, 1957 R. C. STILES 2,805,283

AUTOMATIC TELEGRAPH SWITCHING SYSTEM

Filed Dec. 10, 1951 45 Sheets-Sheet 36

INVENTOR.
Richard C. Stiles
BY
Smith, Olsen & Baird
Attys.

INVENTOR.
Richard C. Stiles
BY
Smith, Olsen + Baird
Attys.

INVENTOR.
Richard C. Stiles
BY
Smith, Olsen + Baird
Attys.

Sept. 3, 1957 R. C. STILES 2,805,283

AUTOMATIC TELEGRAPH SWITCHING SYSTEM

Filed Dec. 10, 1951 45 Sheets-Sheet 39

CROSS OFFICE UNIT 3400

INVENTOR.
Richard C. Stiles
BY
Smith, Olsen & Baird
Attys.

Sept. 3, 1957 R. C. STILES 2,805,283

AUTOMATIC TELEGRAPH SWITCHING SYSTEM

Filed Dec. 10, 1951 45 Sheets-Sheet 40

CROSS OFFICE UNIT 3400

INVENTOR.
Richard C. Stiles
BY
Smith, Olsen & Baird
Attys.

CROSS OFFICE UNIT
3400

INVENTOR.
Richard C. Stiles
BY
Smith, Olsen & Baird
Attys.

Sept. 3, 1957 R. C. STILES 2,805,283

AUTOMATIC TELEGRAPH SWITCHING SYSTEM

Filed Dec. 10, 1951 45 Sheets-Sheet 42

INVENTOR.
Richard C. Stiles
BY
Smith, Olsen & Baird
Attys.

Sept. 3, 1957 R. C. STILES 2,805,283

AUTOMATIC TELEGRAPH SWITCHING SYSTEM

Filed Dec. 10, 1951 45 Sheets-Sheet 43

INVENTOR.
Richard C. Stiles
BY
Smith, Olsen + Baird
Attys.

Sept. 3, 1957 R. C. STILES 2,805,283

AUTOMATIC TELEGRAPH SWITCHING SYSTEM

Filed Dec. 10, 1951 45 Sheets-Sheet 44

INVENTOR.
Richard C. Stiles
BY
Smith, Olsen + Baird
Attys.

AUTOMATIC TELEGRAPH SWITCHING SYSTEM

Filed Dec. 10, 1951 45 Sheets-Sheet 45

INVENTOR.
Richard C. Stiles
BY
Smith, Olsen & Baird
Attys.

United States Patent Office 2,805,283

Patented Sept. 3, 1957

2,805,283

AUTOMATIC TELEGRAPH SWITCHING SYSTEM

Richard C. Stiles, Brookfield, Ill., assignor to General Telephone Laboratories, Incorporated, a corporation of Delaware Application December 10, 1951, Serial No. 260,854

97 Claims. (Cl. 178—2)

Figure 1:
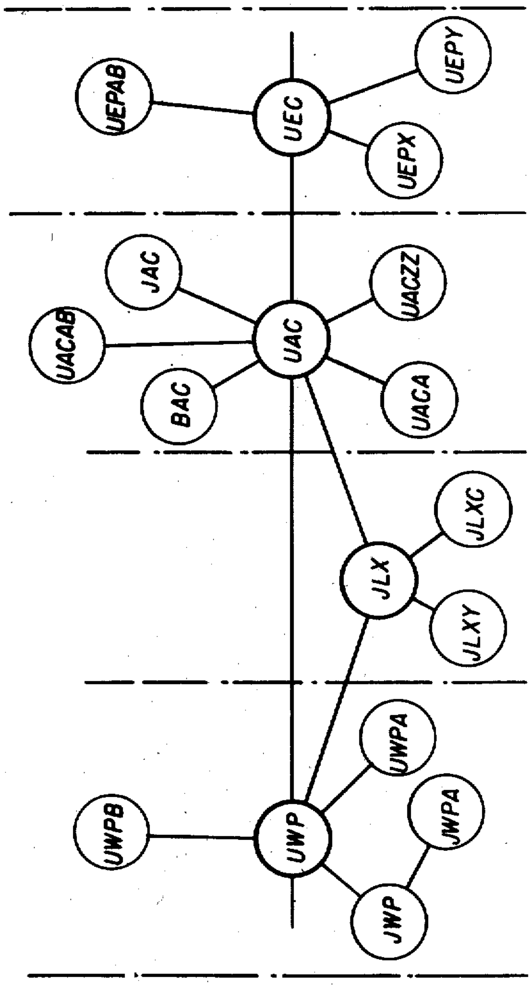

The present invention relates in general to telegraph communication systems and more particularly to automatic telegraph switching systems including switching apparatus for automatically routing telegraph messages received over incoming lines to appropriate outgoing lines extending to, or at least extending in the direction of, the called destination. Although systems of the above noted type are applicable for installation in commercial switching networks, the system of the present invention is arranged primarily to meet the requirements of the military services.

It is contemplated that the automatic telegraph switching system of the present invention will serve the entire world which may be divided, for example, into 17,576 geographical areas individually identified by three character or letter codes, in which each of the three characters may be any one of the 26 letters in the alphabet. Consequently, each of the geographical areas may be provided with a central exchange or relay switching center identified by an individual three letter code. Furthermore, it is contemplated that each of the above noted geographical areas served by a relay switching center may be further divided, for example, into 676 local zones, individually identified by the three character or letter code of the area and an additional two character or letter local code, in which each of the additional two characters of the local code may also be any one of the 26 letters of the alphabet. By employing a five character or letter code in the manner noted above, any local telegraph station of 11,881,376 stations located around the world may be individually identified. It will be apparent, of course, to those skilled in the art, that a third character or letter may be added to the local code if it is deemed necessary to increase the total number of individually identifiable stations in each of the areas served by the central exchanges or relay switching centers.

In a switching network arranged in the manner described above each telegraph message originating at any station in the network will be preceded by an address portion or routing indicator which will include the identity of the particular called station to which the message is to be transmitted. In the present invention these messages will be automatically switched through the various relay switching centers of the network until the message is automatically transmitted to the selected called station.

In certain systems, the switching operations required to direct telegraph messages from the calling station to the particular called stations are manual performed by operators provided at the different switching points of the network. Accordingly, an operator at the originating calling station transmits the message to the nearest manual switching center by means of a telegraph printing transmitter. At the manual switching center the message is received on a typing reperforator which simultaneously types the message and perforates a tape. The operator handling messages received over the particular incoming line then reads the address portion thereof to determine the ultimate destination of the received message. She then removes the tape from the reperforating mechanism and conveys it to an operator handling the particular outgoing line over which this message must be transmitted to reach the desired destination. The manner in which the message on the perforated tape is conveyed from the receiving operator to the transmitting operator is a matter of local practice and in some cases the messages are carried by the receiving operator and in other cases they are carried by a clerk to the particular transmitting operator's position. At the transmitting operator position, the perforated tape may be inserted into a tape transmitter which will automatically retransmit the particular message to the next manual switching center where the same manual procedure is followed to further extend the particular message toward its ultimate destination. In this type of manual operation, the entire message must be received and perforated on the tape before it can be processed in the manner noted. Consequently, there is considerable delay before the receiving operator can sever the tape and convey it to the proper transmitting operator for retransmission. Furthermore, with this type of operation the various lines in the manual switching office are not utilized in an efficient and economical manner since the available circuit time for each of the lines is not fully utilized. Furthermore, the number of operators required to handle messages at any manual switching center varies with the volume of traffic to be handled at any particular time. Obviously the amount of traffic is variable and difficult to predict or control and consequently, the number of operators on duty at any particular time may be inadequate to manually handle a sudden increase in the volume of traffic or there may be insufficient traffic to keep the operators on duty busy.

As previously noted, the present automatic telegraph switching system is arranged so that the received messages are automatically processed in accordance with the information included in the address portion of the message. It should be noted, however, that the switching operations performed by the switching apparatus at a switching center are controlled by the address portion of the message to automatically select a particular outgoing line over which the message is to be transmitted, during the time interval that the body portion of the particular message is still being received over the incoming line. Thus, in processing the address information, the automatic switching apparatus in the switching center determines and selects the proper outgoing line over which the received message is to be ultimately transmitted.

Also, the automatic switching apparatus controls a retransmitter mechanism associated with the incoming line so that the entire received message, including the address information thereon, may be transferred to and temporarily stored in a reperforator mechanism which is temporarily connected to the selected outgoing line. The last mentioned reperforator and transmitter cooperate to transmit the entire message, including the address information thereof, over the selected outgoing line. However, other messages received over incoming lines having address portions thereon indicating that they are also to be transmitted over the last mentioned outgoing line will also be stored in the reperforator associated with the previously noted outgoing line. With this arrangement, a plurality of separate messages received over different incoming lines and which are to be transmitted over a particular outgoing line may be temporarily stored in the same reperforator mechanism. Consequently, several messages will be transmitted one after another over the selected outgoing line until all of the stored messages have been retransmitted; and, thereafter, the particular reperforator is returned to a common pool where it may again be associated with any one of the outgoing lines for reperforating and retransmitting further messages.

Each relay switching center of the telegraph system is arranged to terminate incoming lines from individual local stations served by the associated relay center and to terminate incoming lines from other relay switching centers of the system. Furthermore, each relay center has access to outgoing lines extending to individual local stations served by the associated relay center and to outgoing lines extending to other relay centers of the system. Since it is not practical in the system of this kind to provide direct lines between all of the different relay centers of the relay system, each relay center is arranged so that it will automatically process the incoming messages to retransmit them to the local stations served by the relay center or to transmit them to the next relay center in the appropriate direction for extending the message toward the proper called area and station.

It is the principal object of the present invention to provide an automatic telegraph switching system which is arranged to automatically route received telegraph messages through the various relay switching centers of the system until each message is ultimately transmitted to its final called station or destination.

It is a further object of the invention to provide in each of a plurality of relay switching centers of an automatic telegraph switching system, novel switching apparatus which is selectively controllable by means of common control equipment to interconnect incoming lines to predetermined outgoing lines in accordance with the routing indicator or address portions of the messages and to automatically retransmit the received messages including the address portions thereof over the selected outgoing lines.

It is a still further object of the invention to provide at each relay switching center of an automatic telegraph switching system, a novel method and arrangement of identifying, registering, and checking a start-of-message indication which precedes each telegraph message received over each of the incoming lines terminating at the switching centers.

It is still another object of the invention to provide a novel method and arrangement of identifying a plurality of different predetermined characters indicative of a start-of-message indication by checking the sequence of the characters and by discarding a registration of any character which is not received in proper sequence and by registering a character even though it is not received in the proper sequence provided it is a character which may be used as the first character of a start-of-message indication.

It is still another object of the invention to provide at each relay switching center of an automatic telegraph switching system, a novel method and arrangement of identifying, registering, and checking the order of sequence in which each of the messages are received over each of the incoming lines terminating at the switching centers.

It is another object of the invention to provide a novel method and arrangement for identifying and registering a number identifying a message received over an incoming line and for comparing a predetermined preregistered number therewith to determine whether or not the received message number followed, in sequence, the number of the previous message received over the same incoming line.

It is a further object of the invention to provide a novel method and arrangement for retaining a preregistered number indicative of the last message of a sequence received over each incoming line and for advancing the preregistered number one digit after the receipt of each message received over the incoming line.

It is a further object of the invention to provide a novel arrangement for blocking the processing of a message and for notifying the switching center attendant whenever a message is received over an incoming line that does not include the message number identification that sequentially follows the number of the previous message received over the same incoming line.

It is a further object of the invention to provide a novel arrangement whereby the attendant may selectively unblock a blocked message so that it will be processed and automatically routed in the appropriate direction even though the message includes an improper number identification.

It is a further object of the invention to provide a novel method and arrangement for notifying the switching center attendant whenever a start-of-message indication is not received over an incoming line within a predetermined number of character steps after the receipt of the initial character of the start-of-message indication.

It is another object of the invention to provide in each switching center of the automatic telegraph switching system a novel method and arrangement for sensing the perforated tape containing a message, controlling the switching apparatus in accordance with the certain information preceding the body portion of the message to select an outgoing line, and utilizing the perforated tape to control the retransmission, over the selected outgoing line, of the entire message as received over the incoming line including certain of the information preceding the body portion of the message.

It is a further object of the invention to provide in each switching center of the automatic telegraph switching system a novel arrangement whereby a message, including a start-of-message indication, a plurality of routing or address characters and a body portion, received over an incoming line is perforated on a tape; whereby the start-of-message indication and address portions of the message control automatic switching apparatus in the switching center to select a particular outgoing line; whereby one of a plurality of available cross-office units including a perforator and a transmitter is connected to the selected outgoing line; whereby the switching apparatus is controlled to connect a transmitter associated with the incoming line with the perforator associated with the outgoing line so that the entire message, including the start-of-message indication and the address portion of the received message, perforated on the tape associated with the incoming line is transmitted to the perforator associated with the outgoing line; and, whereby, the perforator associated with the outgoing line thereafter controls the associated outgoing transmitter to retransmit over the outgoing line, the address portion and the body portion of the message received over the incoming lines.

It is a further object of the present invention to provide in each switching center of an automatic telegraph switching system a novel method and arrangement for sensing the routing or address portion of a message received over an incoming line and selecting an outgoing line in accordance with the sensed address portion comprising either a three-character, four-character or five-character address code.

It is a further object of the present invention to provide in each switching center of an automatic telegraph switching system a novel method and arrangement for scanning the address portions of messages received over an incoming line and selecting an outgoing line in accordance with the scanned address portions comprising variable multi-character codes identifying particular called stations.

It is a further object of the invention to provide in an automatic telegraph switching system a novel method and arrangement for transmitting telegraph messages from one relay switching center to another relay switching center of the system which comprises transmitting a multi-character start-of-message indication, a multi-character address portion, the body portion of the message, and a multi-character end-of-message indication from one switching center and scanning each message as it is received at a second switching center in order to control the switching apparatus thereat to select a particular one of a plurality of outgoing lines in accordance with the start-of-message indication and the address portion of the message, and thereafter transmitting another start-of-message indication, the address portion and the body portion of the message and an end-of-message indication over the selected outgoing line to the next switching center.

It is still another object of the present invention to provide in each switching center of an automatic telegraph switching system a novel method and arrangement for governing the retransmission of messages over selected out-going lines and for determining the sequence in which the messages are transmitted over the outgoing lines in accordance with a precedence indication contained in the routing or address portions of messages received over the incoming line.

It is still another object of the invention to provide in a relay switching center a novel method and arrangement for determining the class precedence of messages received over the incoming lines and for delaying the retransmission of a lower class precedence message until messages of higher class precedence have been transmitted over a selected outgoing line.

It is a further object of the invention to provide in a relay switching center a novel method and arrangement for interrupting a first low class precedence message being transmitted over a particular outgoing line when a received second message to be transmitted over the same line is of a higher class precedence than the class of the first message.

It is a further object of the invention to provide in each relay switching center a novel method and arrangement for automatically terminating the transmission of a low class precedence message being transmitted over an outgoing line in order to immediately transmit a high class precedence message over the same line and for signaling the attendant at the relay switching center to indicate that the transmission of the low class precedence message has been interrupted and that the attendant should recondition the apparatus so that it will again automatically transmit the entire low class precedence message which has been interrupted.

It is a further object of the invention to provide in a relay switching center novel apparatus for signaling the attendant that a message has been interrupted and that the transmitting apparatus should be reset so that the entire interrupted message will be retransmitted over the appropriate outgoing line as soon as all messages of higher class precedence have been transmitted.

It is still another object of the invention to provide in a relay switching center for an automatic telegraph switching system an improved method of operation whereby a plurality of devices are provided for transmitting telegraph messages over outgoing lines to any selected destination, connecting any one of the devices to any one of the outgoing lines in accordance with the routing or address portion of a message received over one of a plurality of incoming lines, and controlling the connected one of the devices to retrasmit the entire message including the address portion thereof over the particular selected outgoing line.

It is still another object of the invention to provide in a relay switching center of an automatic telegraph switching system an improved method of operation whereby one of a plurality of outgoing line selecting units is selected from the pool of available units, the selected unit is controlled to select and connect with a particular outgoing line which has been determined and marked for selection in accordance with the routing or address portion of a received message, the received message is stored in the selected unit, and the received message, including the address portion thereof, is then repeated over the selected outgoing line.

It is still another object of the invention to provide in a relay switching center a new method and arrangement for automatically routing messages requiring special handling to either a multiple call position or an intercept position in accordance with the message information.

*The general arrangement of the telegraph system*

Figure 46:
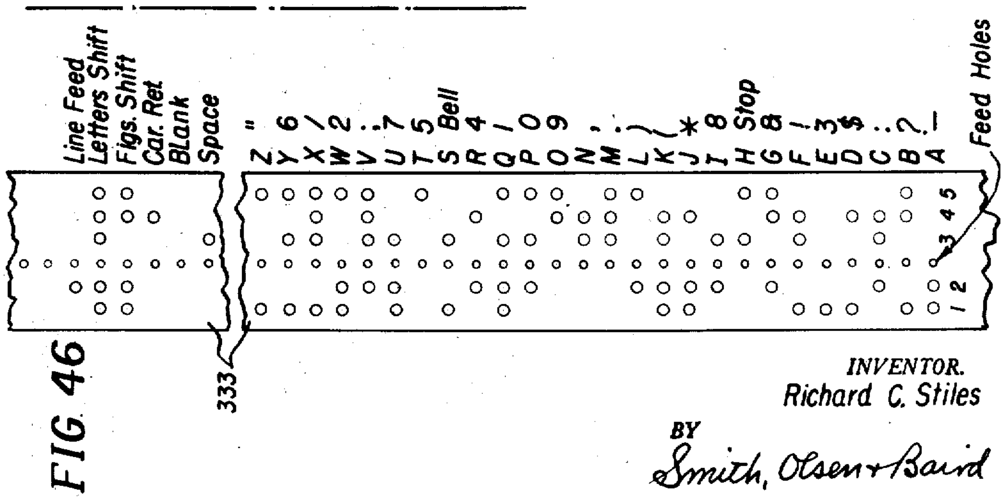
Figure 2:
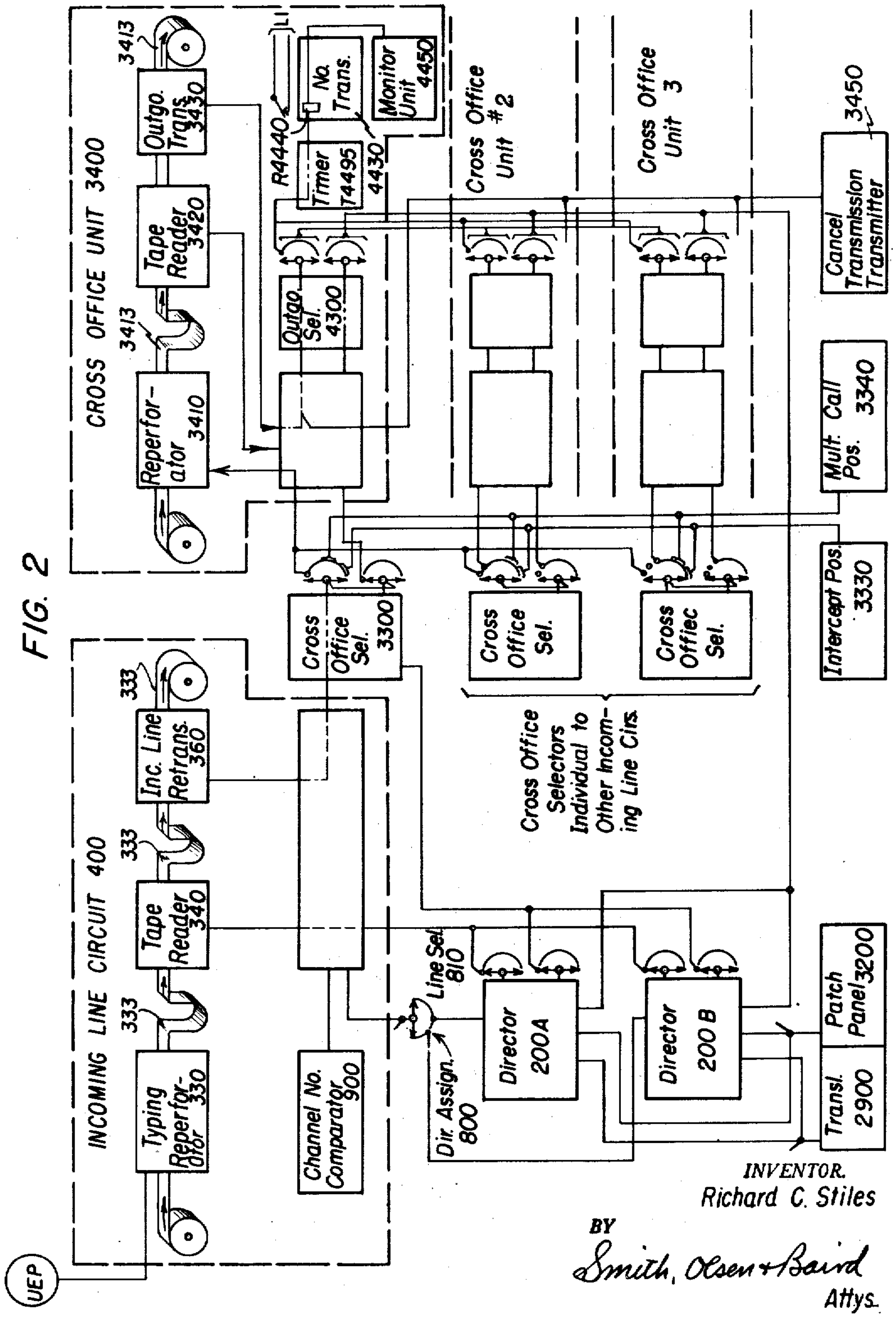
Figure 44:
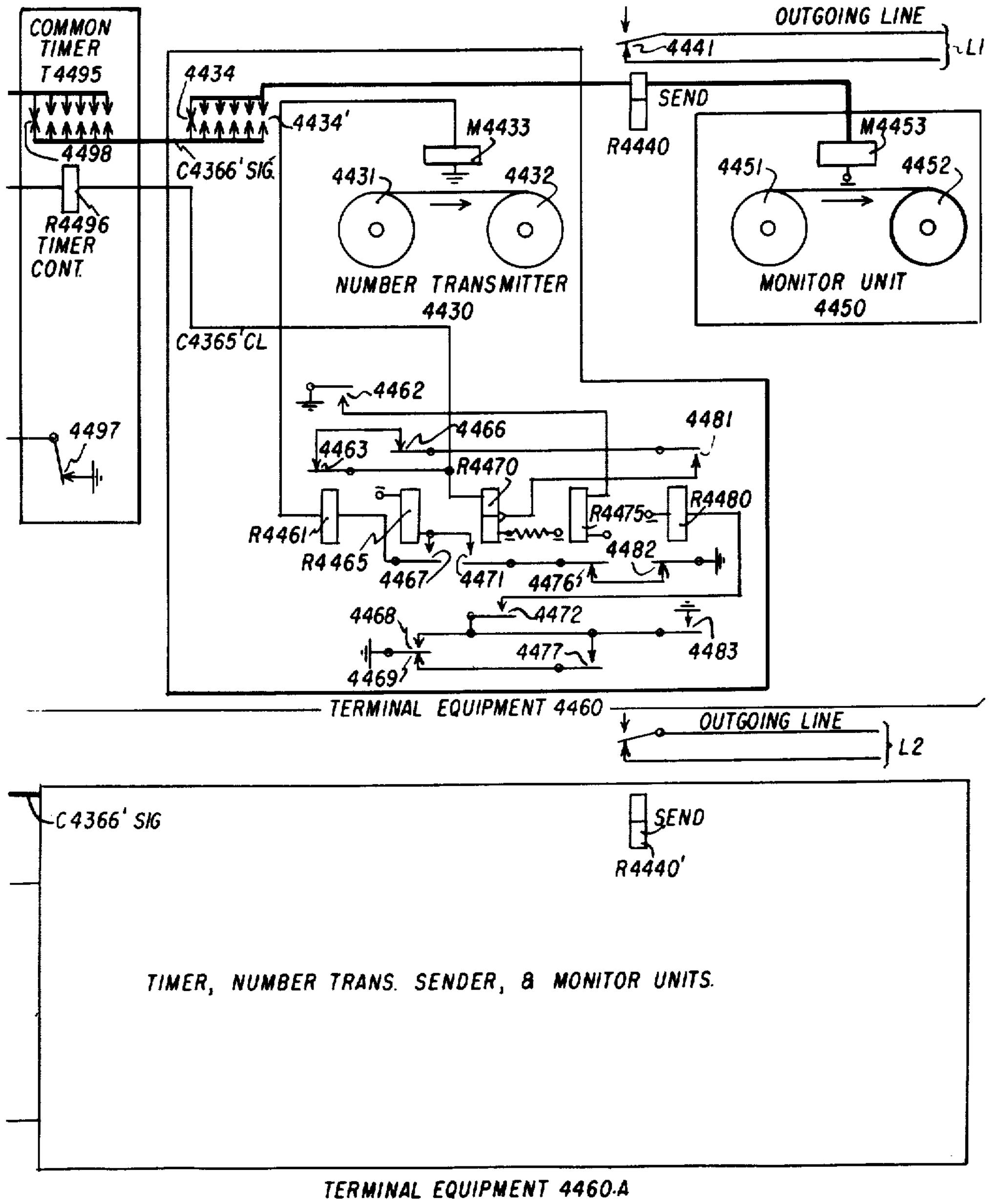
Figure 45:
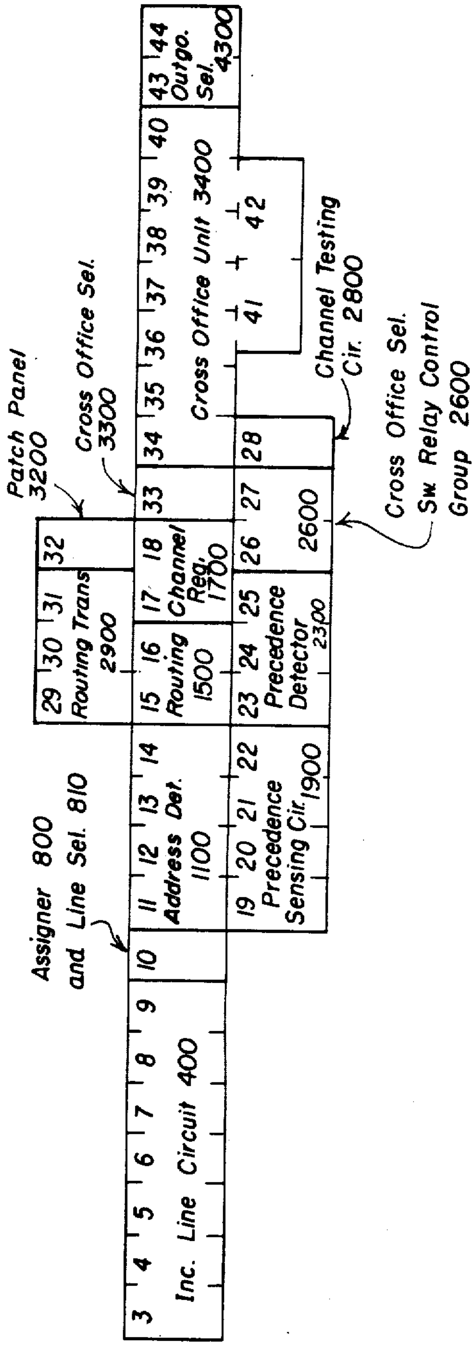

The invention, both as to its organization and method of operation, together with further objects and advantages thereof, will best be understood by reference to the following specification taken in conjunction with the accompanying drawings in which Fig. 1 is a schematic diagram of a portion of a national area served by an automatic telegraph switching system embodying the present invention; Fig. 2 illustrates the general trunking arrangement of the switching apparatus incorporated in the relay switching center UAC of the automatic telegraph switching system; Figs. 3 to 44, inclusive, taken together, illustrate the details of the apparatus included in the relay switching center UAC of the telegraph system, which apparatus has incorporated therein the features of the invention previously outlined above; Fig. 45 illustrates the mode of combining Figs. 3 to 44, inclusive, to form a unified switching system for the relay switching center UAC; and Fig. 46 illustrates a portion of a perforated tape bearing all of the code hole designations of a preselected combinational five-channel code.

Figure 9:
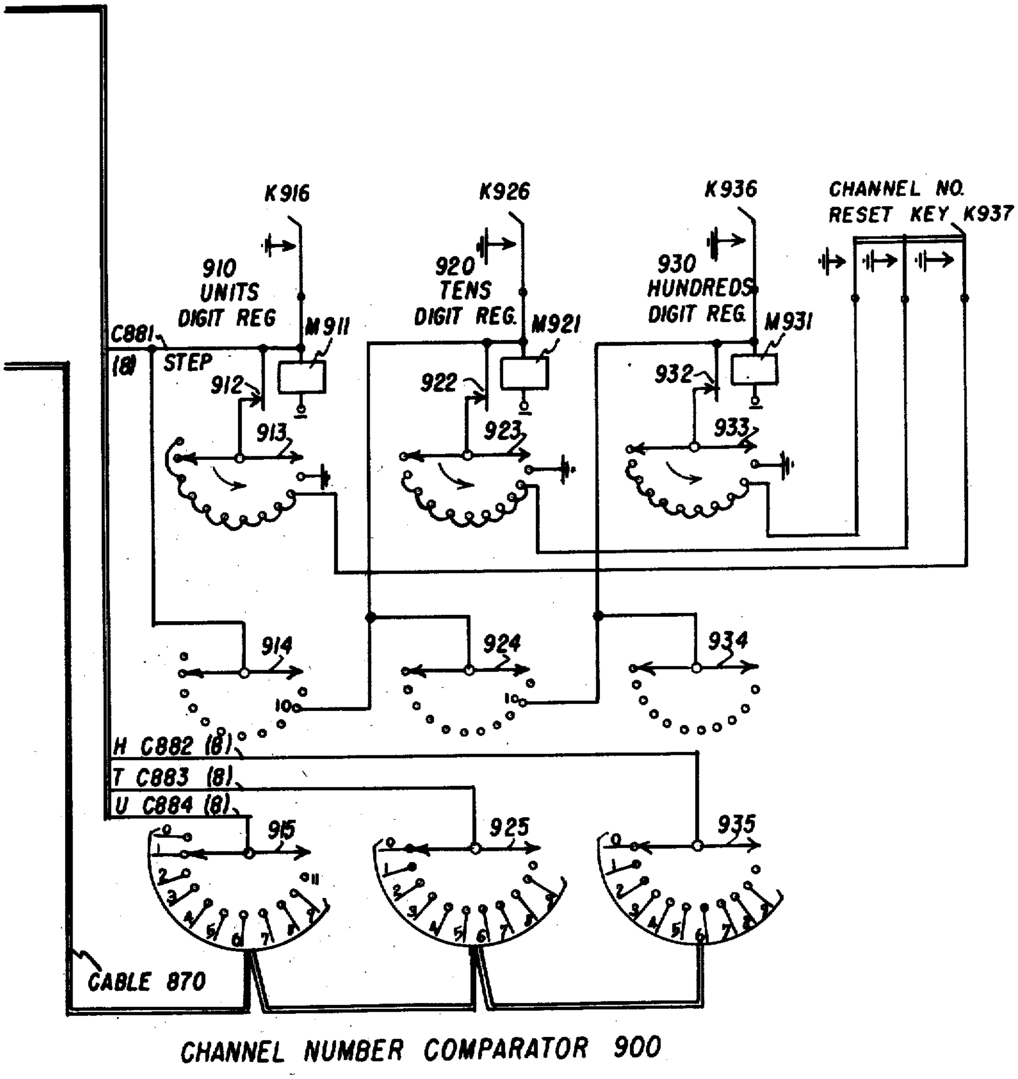
Figure 10:
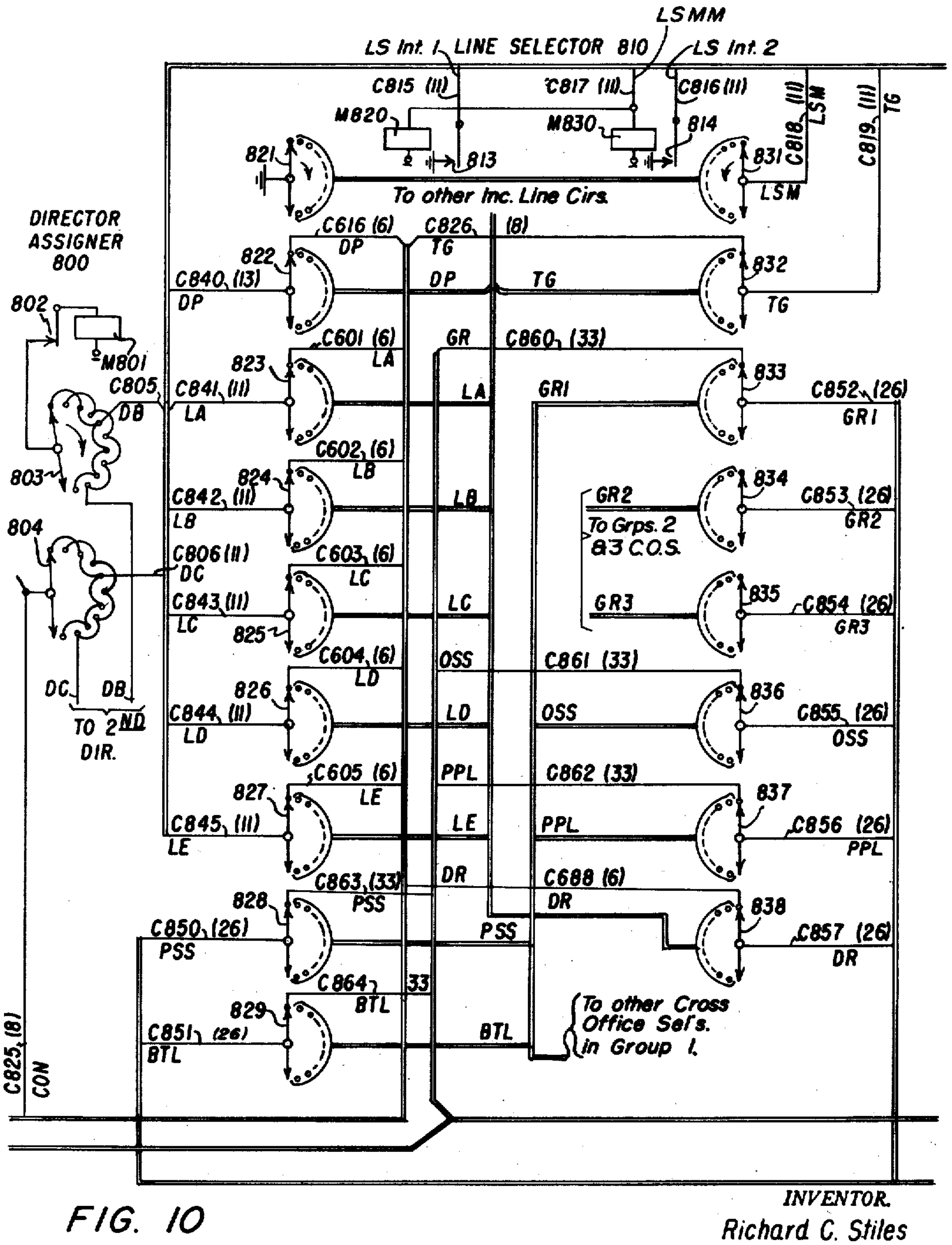
Figure 32:
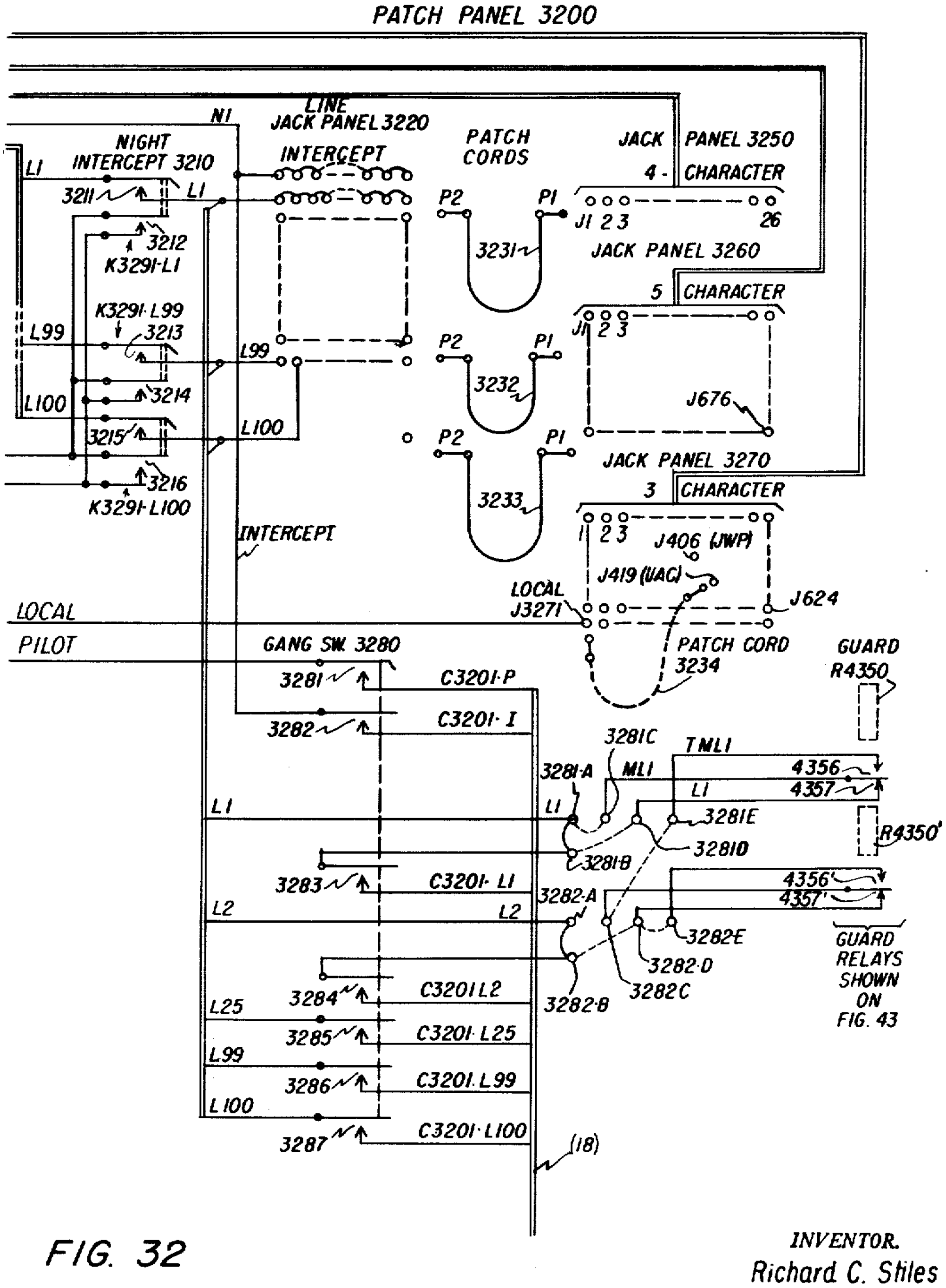
Figure 33:
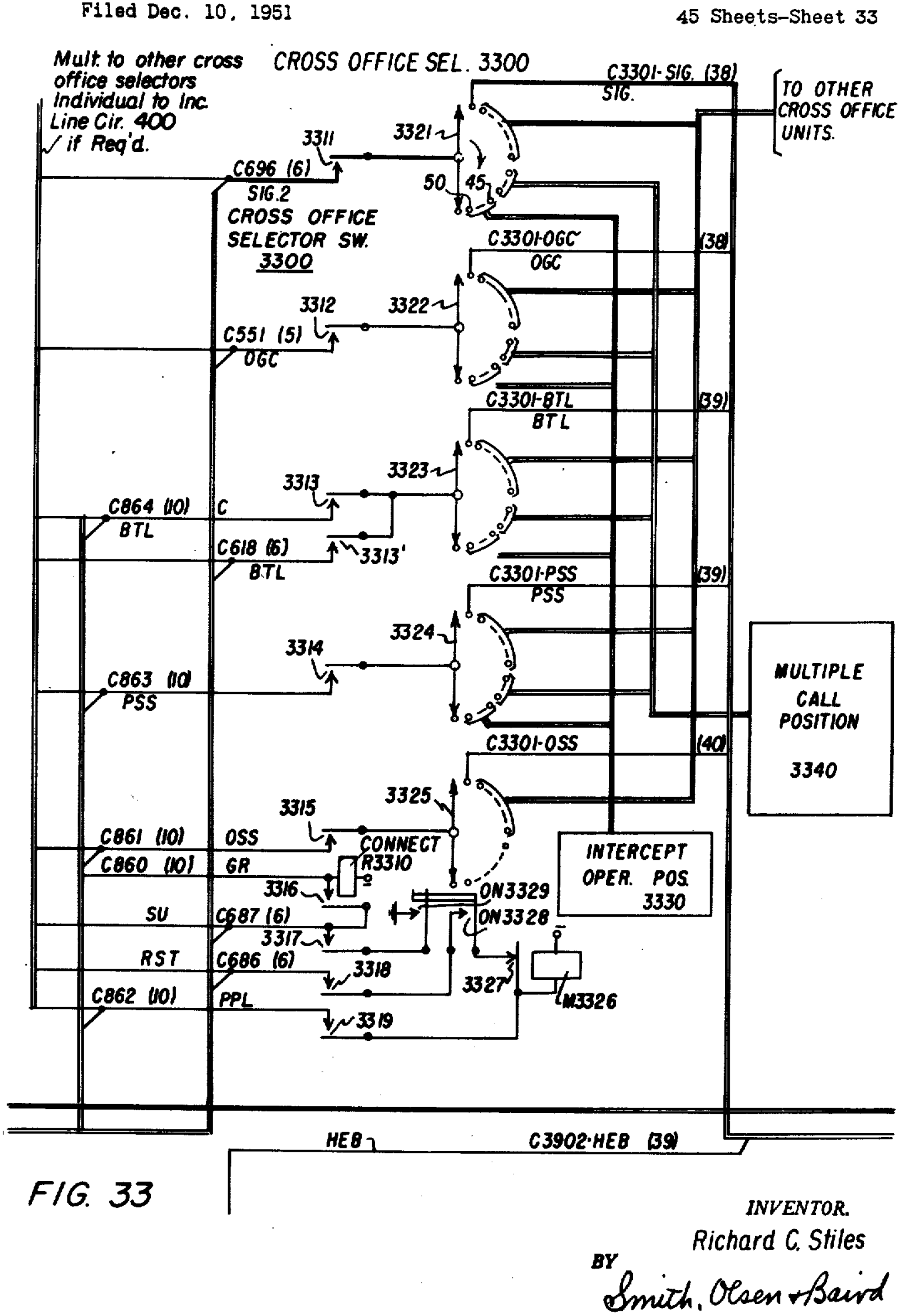

More specifically, Figs. 3 to 9, inclusive, illustrate the details of one of a plurality of incoming line circuits 400 provided at the relay switching center UAC; Fig. 10 illustrates the details of the director assigner 800 associated with the incoming line circuit 400, which is arranged to select one of a plurality of directors for use and it discloses a line selector 810 associated with one of the directors which is arranged to connect the selected director with any one of the incoming line circuits. Figs. 11 to 28, inclusive, illustrate the details of the director 200A provided in the relay switching center UAC which is automatically associated with a calling incoming line circuit 400 by means of the director assigner 800 and the associated line selector switch 810 and is controlled in accordance with the routing or address portion of a received message to control a common routing translator 2900 to connect the incoming line circuit 400 to an outgoing line over which the received message is to be automatically transmitted. Figs. 29 to 32, inclusive, illustrate the details of the common routing translator 2900 which is temporarily associated with a calling one of a plurality of directors and which is controlled in accordance with the routing or address portion of a message to register in the director the proper outgoing line over which the incoming message is to be transmitted. Fig. 33 discloses a cross-office selector switch 3300 which is individually associated with the incoming line circuit 400 and which is provided to select any one of a plurality of cross-office units 3400. Figs. 34 to 44, inclusive, disclose one of a plurality of cross-office units 3400 which is provided to connect with a selected outgoing line and to retransmit a received message thereover to the next switching center or called station.

Referring now more particularly to Fig. 1 of the drawings it will be observed that the automatic switching system serves a nation-wide area comprising a plurality of sub-areas each of which includes at least one relay switching center and one or more tributary stations. More specifically, the four-areas illustrated in Fig. 1 are respectively provided with the relay switching centers UEP, UAC, JLX and UWP. For the purpose of this description it may be assumed that the United States is divided into four areas; that the relay switching centers UEP and UWP, respectively, serve the east and west coast areas; That the relay switching center UAC serves the east-central portion; and that the relay switching center JLX serves the west central portion. In the east coast portion, the relay switching center UEP also serves three tributary stations UEPY, UEPX and UEPAB. In the east central portion, the relay switching center UAC also serves the three tributary stations UACA, UACZZ and UACAB and the relay switching center UAC is also interconnected with the relay switching centers BAC and JAC included in the east central area. The relay switching center JLX in the west central portion serves the tributary stations JLXY and JLXC. Finally, the west coast relay switching center UWP serves the tributary stations UWPA and UWPB. The switching center UWP also interconnects with the relay switching centers JWP having the tributary station JWPA. It should be noted that each of the relay switching centers UEP, UAC, JLX and UWP are interconnected by means of lines extending between certain of the switching centers, and it should be understood that each relay switching center is provided with switching apparatus of the type illustrated in Figs. 3 to 44, inclusive. It should also be understood that other relay switching centers may be provided in each of the areas and that the east and west coast relay switching centers may be connected by means of radio links or carrier switching apparatus with European countries and Asiatic countries, respectively. It should also be understood that each of the tributary stations is provided with the usual telegraph transmitting apparatus whereby the operators thereat may transmit, in coded form, all of the information necessary to route a message through the illustrated system to the desired destination. All of the information will be in coded form in accordance with the code illustrated in Fig. 46.

In the present automatic telegraph switching system, each of the relay switching centers is identified by a three letter code and each of the tributary stations in each of the relay switching centers is identified by either a four or a five letter code as is illustrated in Fig. 1. In the present system it is contemplated that the first letter of any switching center or station may be any one of the three letters B, J or U which respectively indicate the different military services, such as Navy, Air Corps and Army. However, as previously noted, the first letter of the code may be any one of the 26 letters of the alphabet. The second and third letters of the code identify the geographical location of the relay switching center. As previously pointed out, any one of the three letters of a three letter code identifying a relay switching center may be any one of the 26 letters of the alphabet. Finally, the last letter of a four letter code and the last two letters of a five letter code identify the tributary station in the particular geographical location of a selected relay switching center. Thus, it will be understood that the three, four and five characters or letters transmitted from any calling tributary station or calling relay switching center will automatically route a message by way of tandem rerelated relay switching centers or directly to the particular called relay center or called tributary station identified by the transmitted code.

*The apparatus incorporated in the relay switching center UAC*

Preferably each relay switching center in the telegraph relay switching system comprises automatic switching apparatus substantially identical to the switching apparatus provided in the relay switching center UAC. This switching apparatus, as is schematically illustrated in Fig. 2, includes the apparatus necessary to serve the incoming lines terminating at the relay switching center UAC and to route telegraph messages received over the incoming lines to the appropriate outgoing lines extending in the direction of called relay switching centers and tributary stations.

Referring now more particularly to Fig. 2 of the drawings, the telegraph switching apparatus there illustrated is provided at the relay switching center UAC, but it should be understood that similar switching apparatus is also provided at each of the other relay switching centers. This switching apparatus comprises a number of incoming line circuits individually associated with the incoming lines terminating thereat, the incoming line circuit 400 being individually associated with the incoming line from the relay switching center UEP. Furthermore, each incoming line circuit is individually associated with a cross-office selector which has access to all of the cross-office units, the multiple call position and the intercept operator position provided at the relay switching center. For example, the incoming line circuit 400 is individually associated with the cross-office selector 3300, which, in turn, has access to all of the cross-office units, such as the cross-office unit 3400, the multiple call position 3340 and the intercept operator position 3330.

Furthermore, the switching apparatus comprises a group of directors which are individually allotted for use by a director assigner and when allotted, the assigned director associates itself with a calling incoming line circuit and the cross-office selector individual therewith by means of its individual line selector. For example, the director assigner 800 is controllable by the incoming line circuit 400 to select an idle one of the directors 200A or 200B and if the director 200A is selected, it controls its line selector 810 to find and connect with the incoming line circuit 400 and its cross-office selector 3300.

Furthermore, the switching apparatus comprises a plurality of cross-office units which are accessible to all of the cross-office selectors and which are individually provided with an outgoing selector having access to each of the outgoing lines extending from the relay switching center UAC. For example, the cross-office unit 3400 is accessible to all of the cross-office selectors, such as the cross-office selector 3300, and it is individually associated with the outgoing selector 4300 which, in turn, has access to all of the outgoing lines, such as the L1 outgoing line.

Furthermore, each outgoing line extending from the relay switching center UAC comprises a timer, a number transmitter, a send relay and a monitor unit. For example, the L1 outgoing line comprises a timer T4495, a number transmitter 4430, a send relay R4440 and a monitor unit 4450. Finally, the switching apparatus includes a cancel transmission transmitter 3450 which is common to all of the cross-office units and which is provided to break and cancel the transmission of a low class precedence message over an outgoing line in order to permit the immediate transmission thereover of a high class precedence message.

Preferably, each of the incoming line circuits in the relay switching center UAC is identical to the incoming line circuit 400 illustrated in Figs. 3 to 9, inclusive, which includes a group of tape feed out relays 300, typing reperforator 330, a tape reader 340, an incoming line retransmitter 360, a group of sensing relays 401, a combination of start and end of message detector, a character counting switch 690A, tape feed out control relays, a tape reader cycle counter 701, a channel number sequence switch 800, a group of channel number sensing relays, a channel number comparator 900, and various alarm and control relays. The line alarm relay R305, connected in series with the incoming line, is normally retained in its operated position and, due to its slow-to-release characteristic, it will not restore to normal during the periods that the code signals of the message are being received. If the relay R305 restores as a result of a long break in the signals received over the incoming line, it completes circuits, at its contacts 306 and 307, in order to actuate a common audible alarm signal (not shown) over the conductor C337A and to illuminate the individual line-open alarm lamp L337. These signals will call the attendant's attention to the fact that the incoming line is in a faulty open-line condition and should be corrected.

The tape feed out relays 300, including the relays R310 and R320 are selectively controllable by the tape feed out control relays R720, R730, R740 and R750 whenever it becomes necessary to control the typing reperforator 330 to automatically feed out "blank" tape so that a message perforated thereon may be fed through the tape reader 340 and the incoming line retransmitter 360.

The typing reperforator 330 includes a perforator magnet M331 and conventional apparatus (not shown) for perforating the tape 333 in accordance with a five channel code of the type illustrated in Fig. 46. A typing reperforator of the type disclosed in the U. S. Patent No. 2,255,794, granted to R. A. Lake on September 16, 1941, may be used to perforate and type the incoming messages on the tape 333. This typing reperforator produces chadless perforations on the tape so that the symbols corresponding to the perforated codes may be simultaneously typed (printed) on the associated tape approximately six spaces (steps) behind each of the lateral code perforations therein. Each typing reperforator 330 is provided with a tape storage reel 332, supporting a supply of unperforated tape 333 and a tape supply testing mechanism 335 which is arranged to illuminate the tape alarm lamp L336 whenever the supply of tape on the reel 332 becomes inadequate.

The tape reader 340 includes a clutch magnet M344 and cam control contacts 350 which are closed each time that the tape reader 340 pulls the tape 333 an additional step equal to the longitudinal distance between the equally spaced small feed holes perforated in the central portion of the tape 333 by the reperforator 330. Also, cam control contacts 351 to 355, inclusive, are closed in predetermined code combinations as the tape reader senses or reads the character code perforations appearing in each lateral row on the tape. In the case of "blank" tape, these five contacts remain open during each sensing cycle of the tape reader but the contacts 350 are closed so that each cyclic step of the tape reader, in advancing the tape 333, may be counted and registered. Consequently, the contacts 350 are closed at the beginning of each sensing cycle and opened at the end of each sensing cycle, whereas, the contacts 351 to 355, inclusive, are arranged so that they are closed and reopened, in accordance with the code perforations, substantially simultaneously within the time interval the contacts 350 remain closed. A typical tape reader mechanism suitable for use with the circuits and apparatus of the present system for sensing or reading the code perforations on the tape 333 and for transmitting signals in accordance therewith is disclosed in the U. S. Patent No. 2,296,845 granted to N. T. Goetz on September 29, 1942.

The incoming line retransmitter 360 includes a clutch magnet M364 and cam control contacts 361 to 366, inclusive. This retransmitter is substantially the same as the tape reader 340 and it may also be of the type disclosed in the above noted Goetz patent. However, the retransmitter 360 is arranged so that it retransmits code signals corresponding to the code perforations on the tape 333 over a single signalling conductor C689 instead of over six separate conductors as is shown in connection with the tape reader 340. Consequently, the contacts 366 are normally closed and the contacts 361 to 365, inclusive, are normally open. At the beginning of a sensing or reading cycle the contacts 366 are first to open. Thereafter, the contacts 361 to 365, inclusive, are controlled in sequence in accordance with the code on the perforated tape so that only one of the five contacts are closed and reopened at a time in the predetermined sequence. Finally, the contacts 366 are reclosed to terminate the particular sensing cycle. This arrangement is well known and is utilized in conventional start-stop telegraph systems.

The sensing relays 401 and the combination start and end-of-message detector included in the incoming line circuit 400 are controlled in accordance with the tape perforations sensed by the tape reader 340 and they cooperate to detect or register a start-of-message indicator and an end-of-message indicator. Also, the sensing relays 401, the channel number sensing relays, the channel number sequence switch 800 and the channel number comparator 900 cooperate to detect and compare a received channel number indicator or message number with the channel number preregistered in the hundreds, tens and units digit registers 930, 920 and 910 of the channel number comparator 900.

Figure 15:
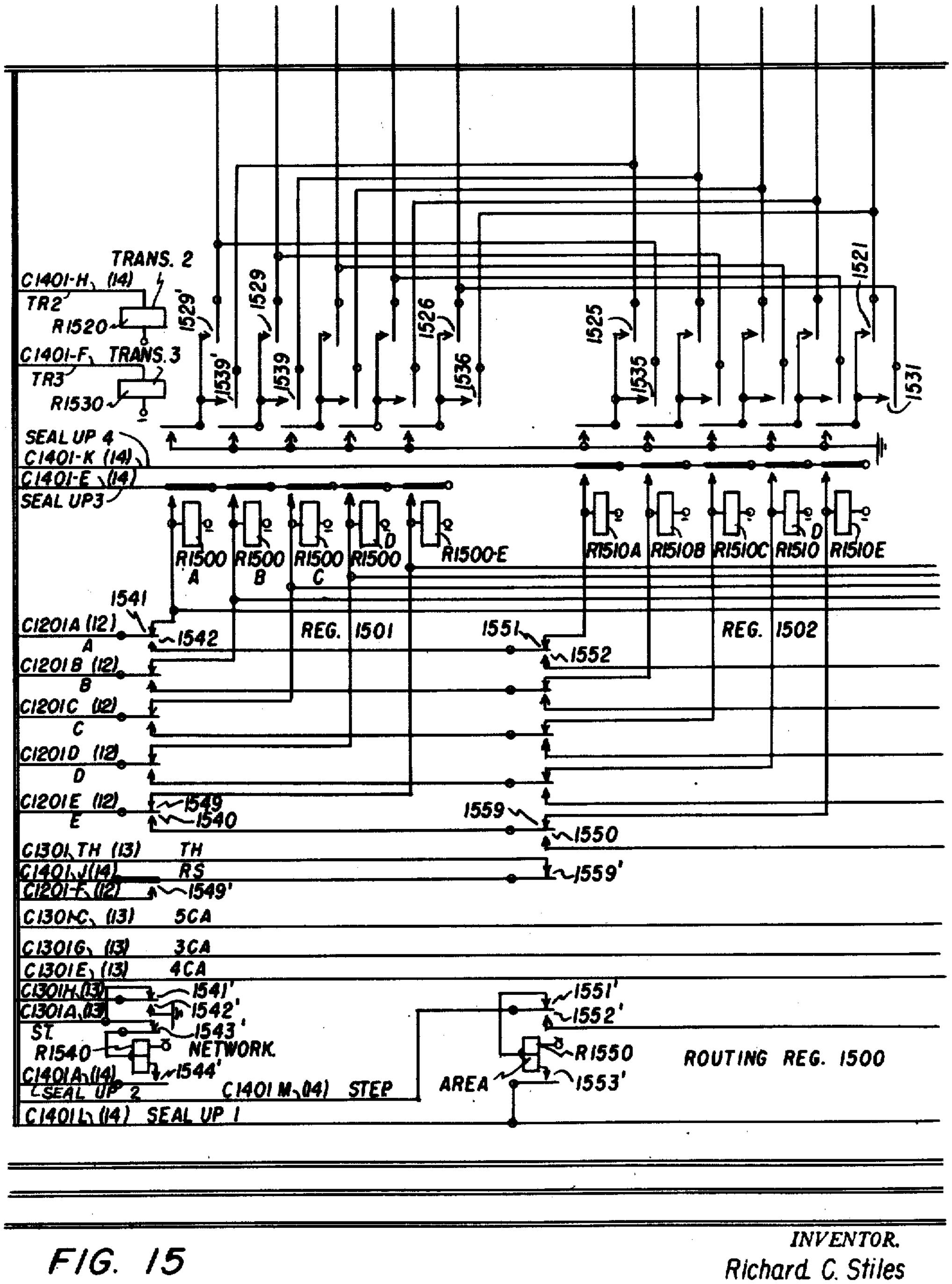
Figure 16:
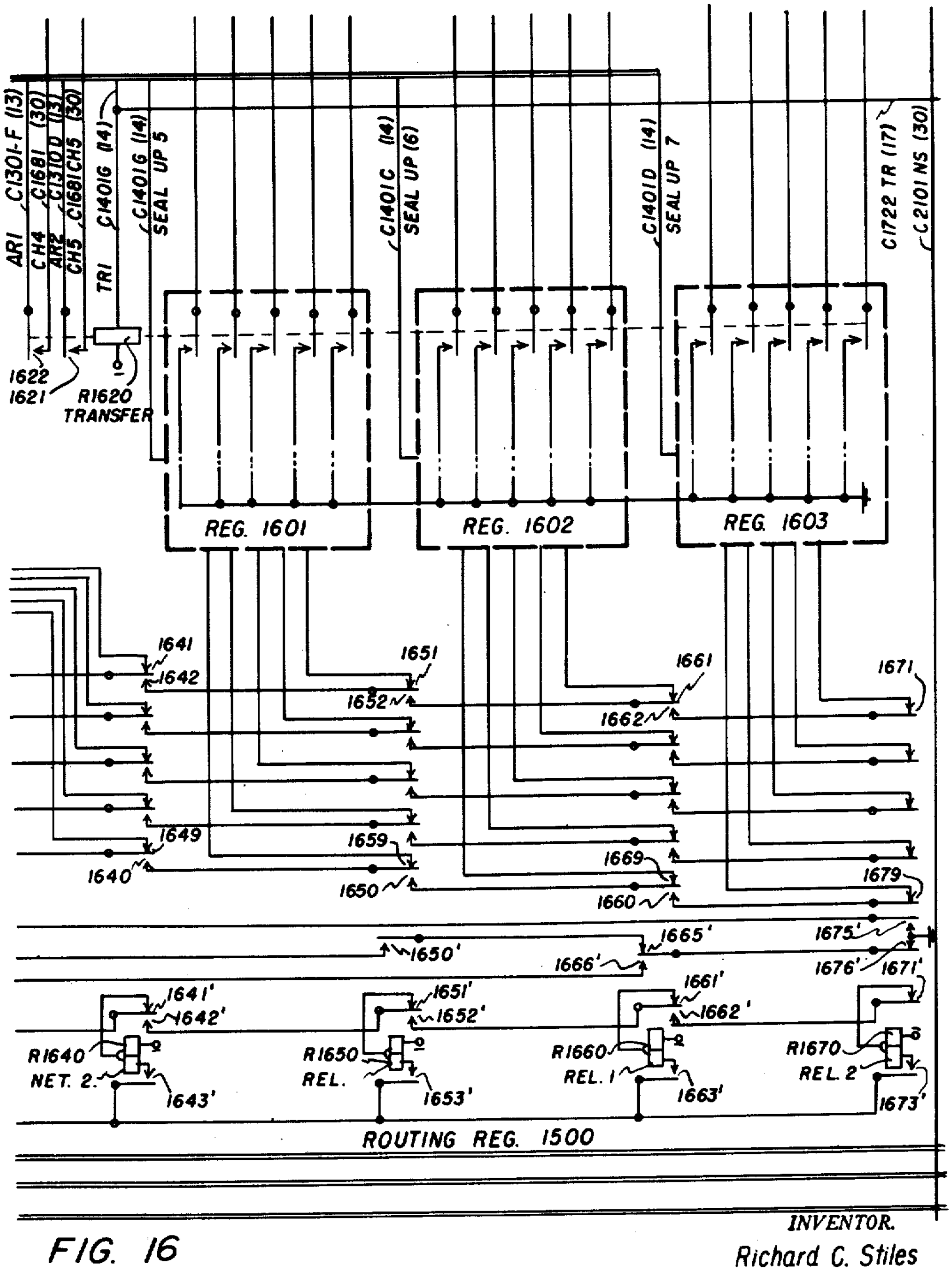
Figure 23:
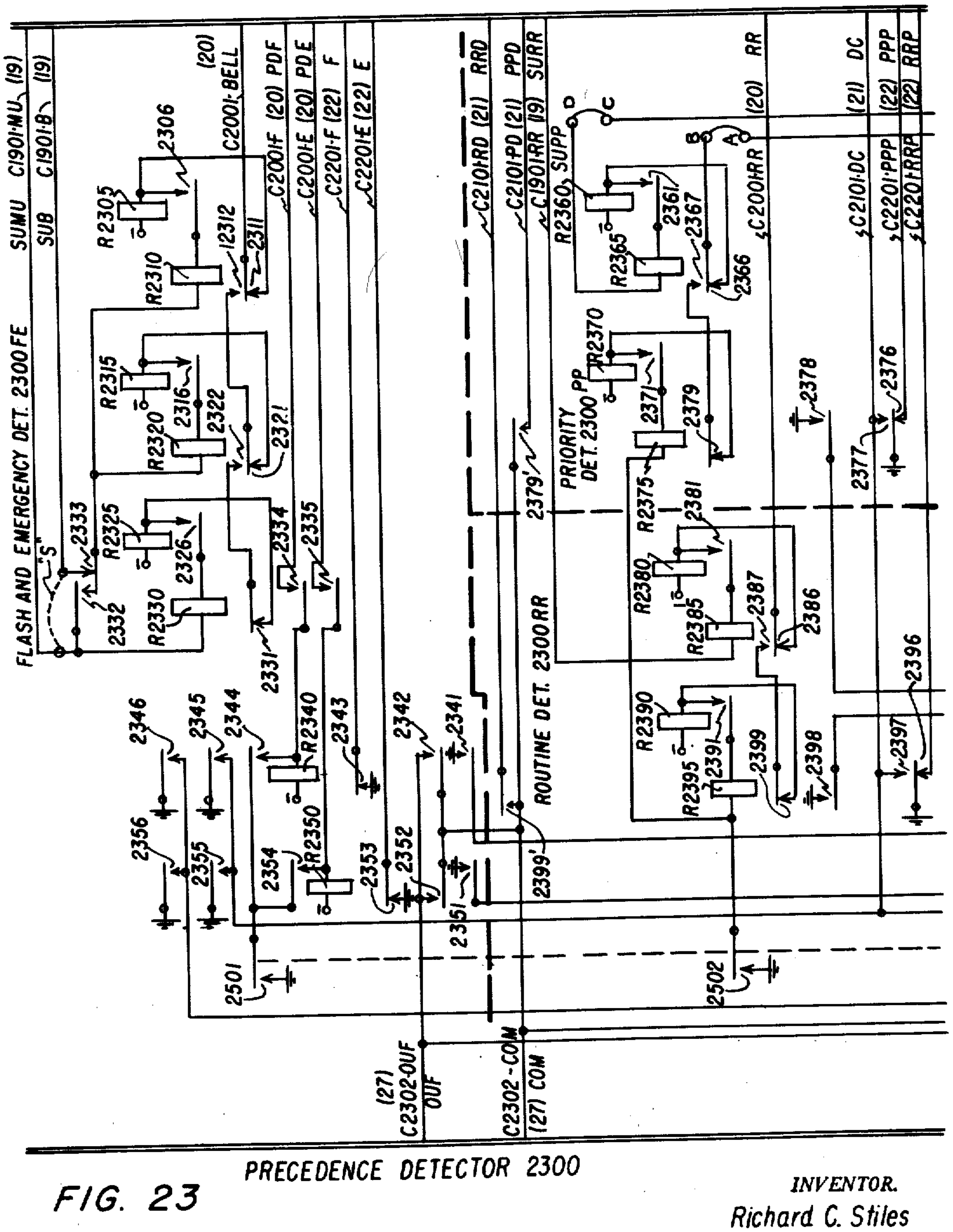
Figure 24:
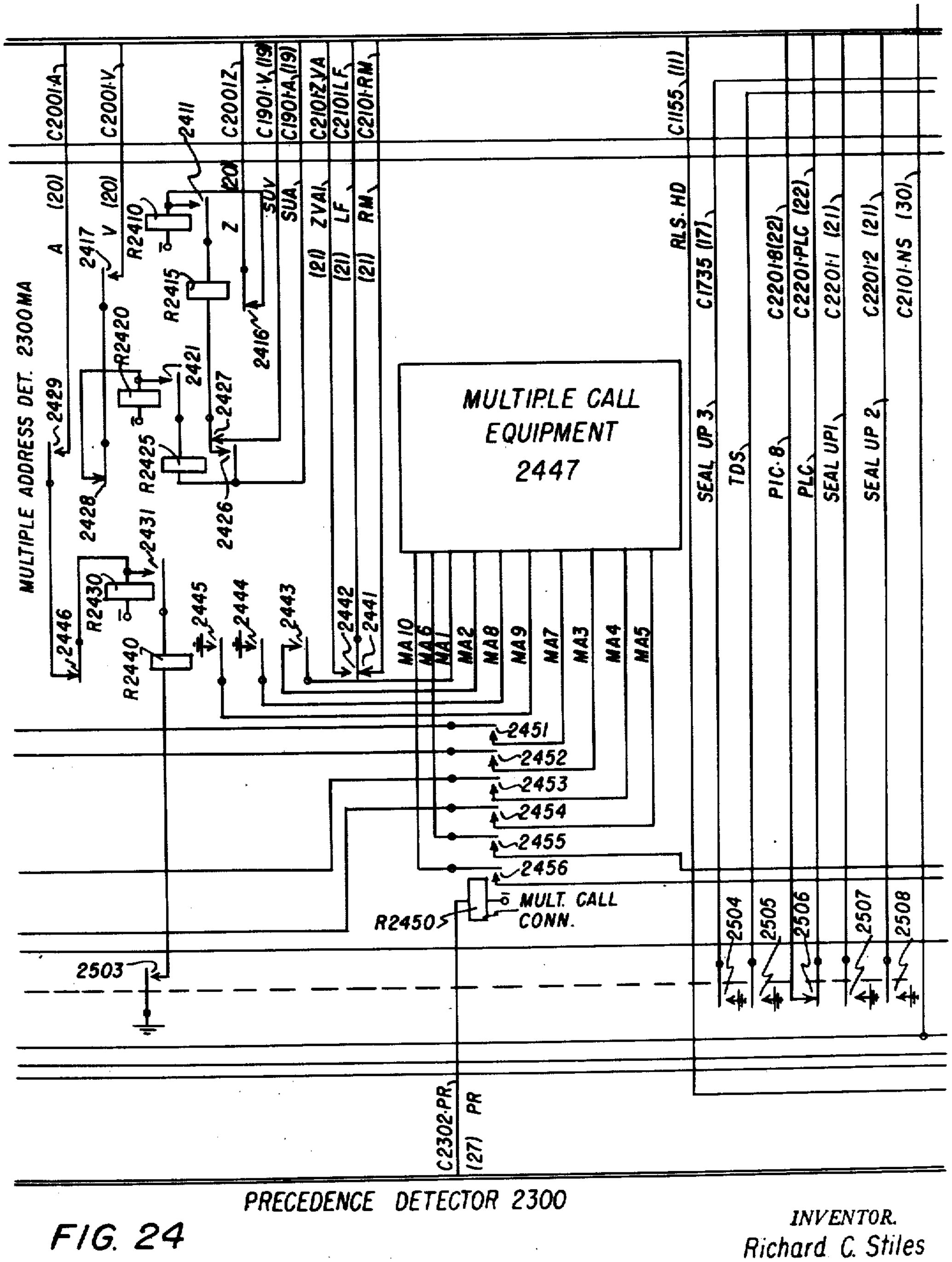
Figure 25:
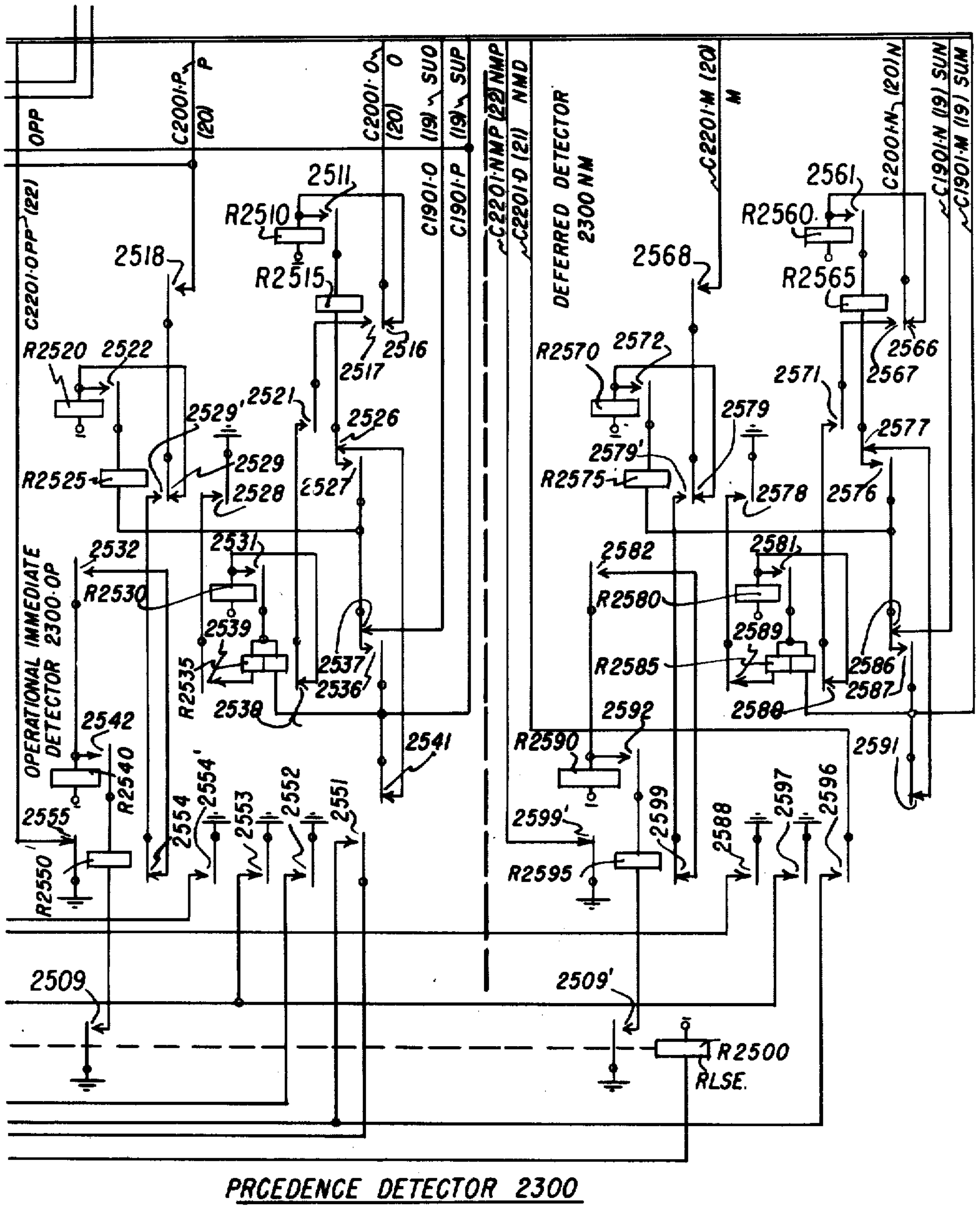

Preferably, each of the directors provided in the switching center UAC is identical to the director 200A which comprises, as is best illustrated in Figs. 11 to 28, inclusive, an address detector 1100 (Figs. 11 to 14, inclusive) for detecting and registering an address or routing indicator in the routing register 1500 (Figs. 15 and 16). The director 200A also includes a precedence sensing circuit 1900 (Figs. 19 to 22, inclusive) which is arranged to detect and register any one of six different class precedence indicators and, whenever required, a multiple call indicator in the precedence detector 2300 (Figs. 23 to 25, inclusive). The director 200A also includes a channel register 1700 (Figs. 17 and 18) for registering the identity of the particular outgoing line over which a message is to be routed as is determined by the routing translator 2900 (Figs. 29 to 31, inclusive) and the patch panel 3200 (Fig. 32). Finally, the director 200A includes a cross-office selector switch relay control group 2600 (Figs. 26 and 27) and a channel testing circuit 2800 (Fig. 28) which are provided to position the cross-office selector 3300 into engagement with a cross-office unit, such as the cross-office unit 3400, and which is also utilized to control the outgoing selector 4300 to select the particular outgoing line registered in the channel register 1700.

Preferably the routing translator 2900 and the patch panel 3200 are common to all of the directors in the relay switching center. The routing translator 2900 is provided to translate either a three-character, four-character or five-character address or routing indicator into a particular outgoing line designation and for registering this designation in the channel register 1700 of the director.

Preferably, the cross-office selectors, such as the cross-office selector 3300 which is individually associated with the incoming line circuit 400, are of the rotary switch type and they all have access to all of the cross-office units, such as the cross-office unit 3400. The cross-office selectors, as previously noted, also have access to the multiple call position 3340 and to the intercept operator position 3330.

Figure 34:
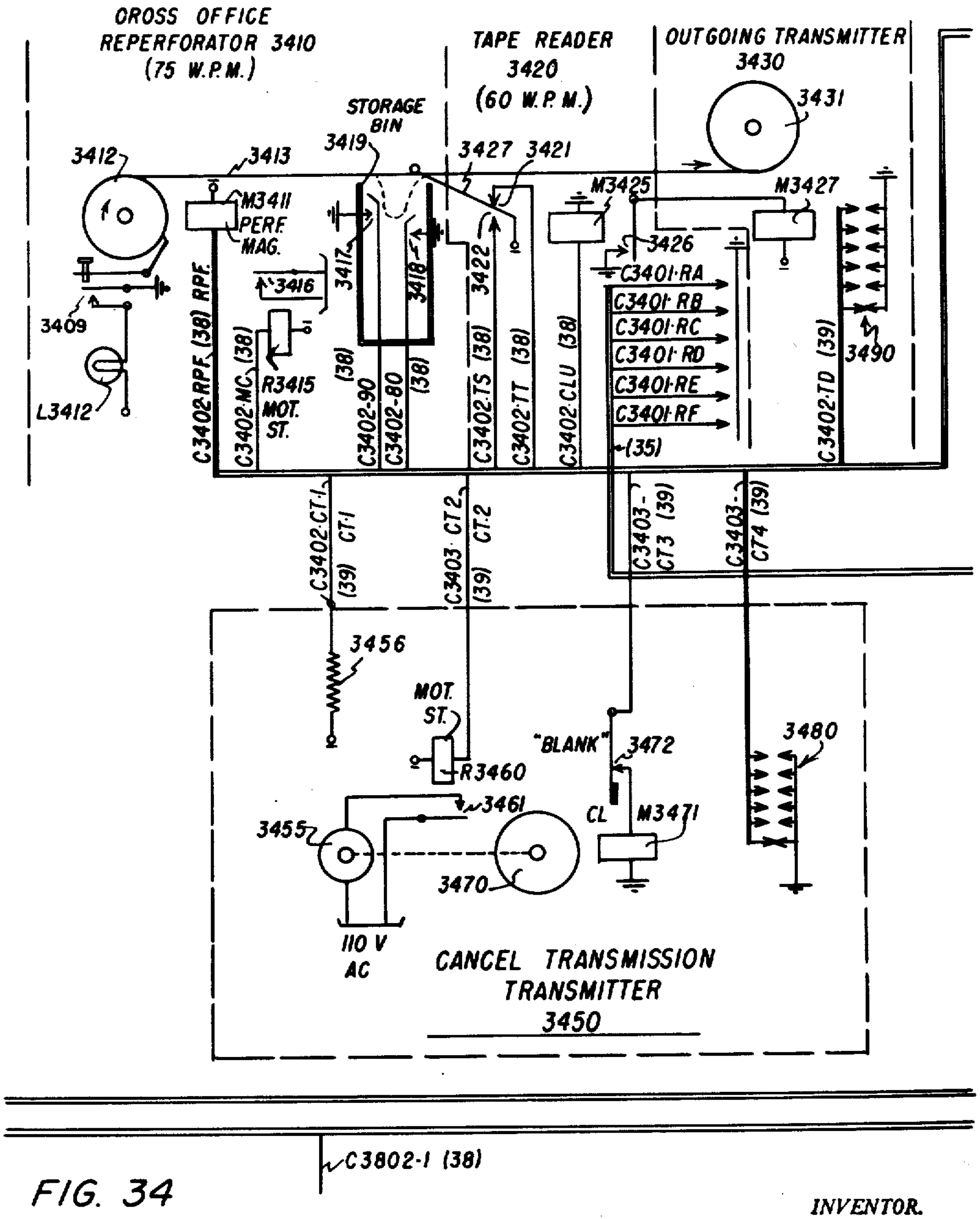
Figure 35:
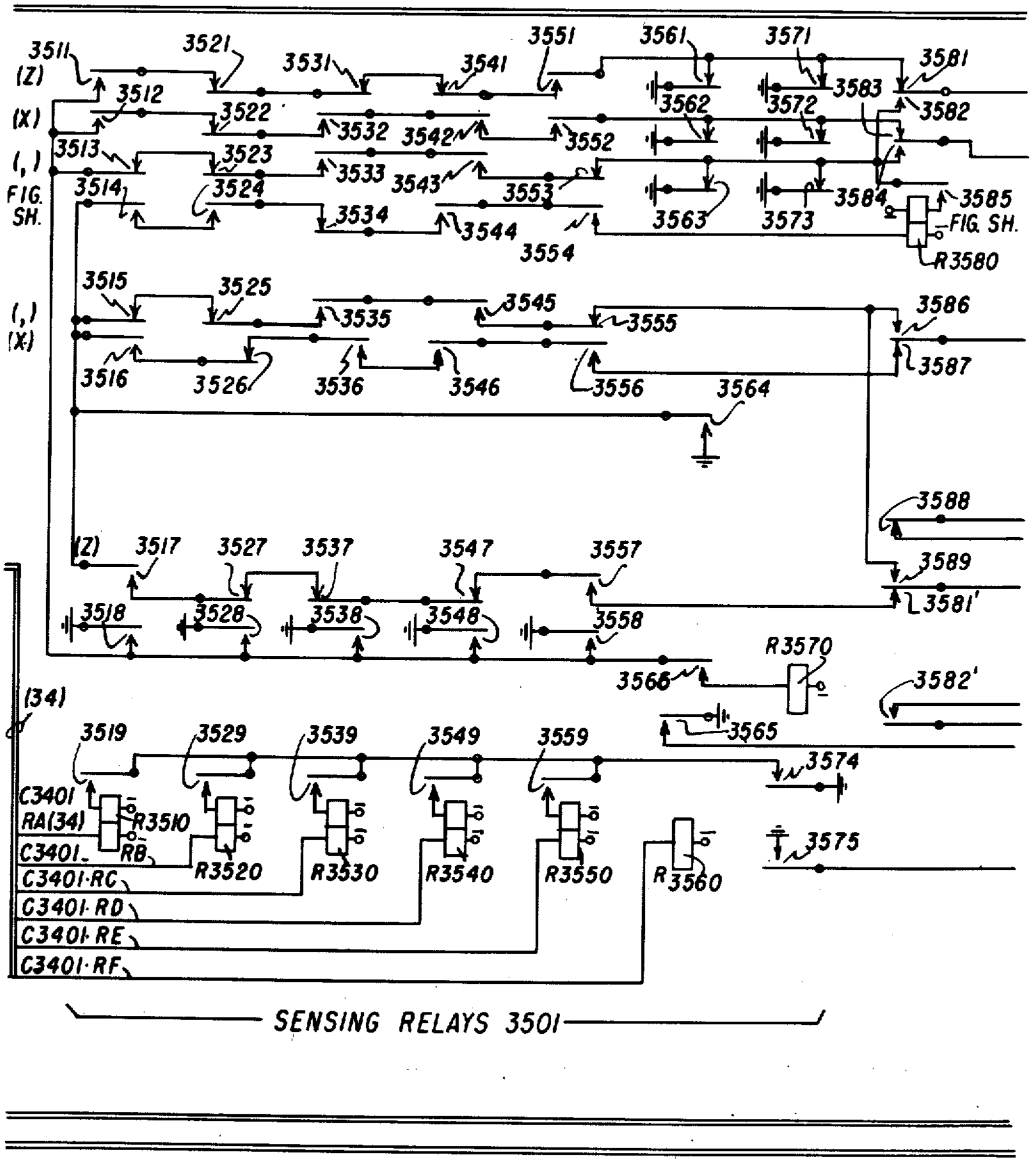
Figure 36:
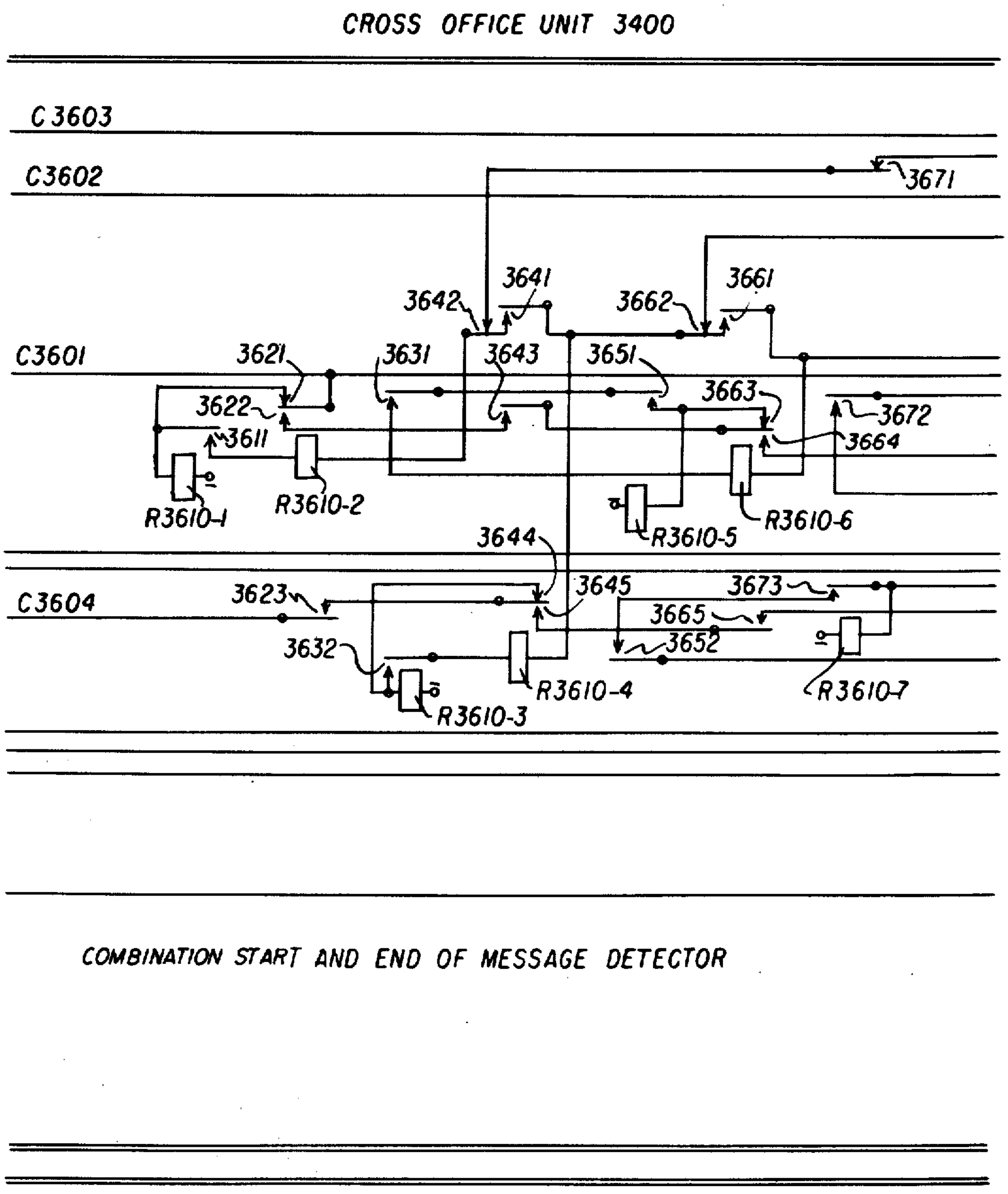
Figure 37:
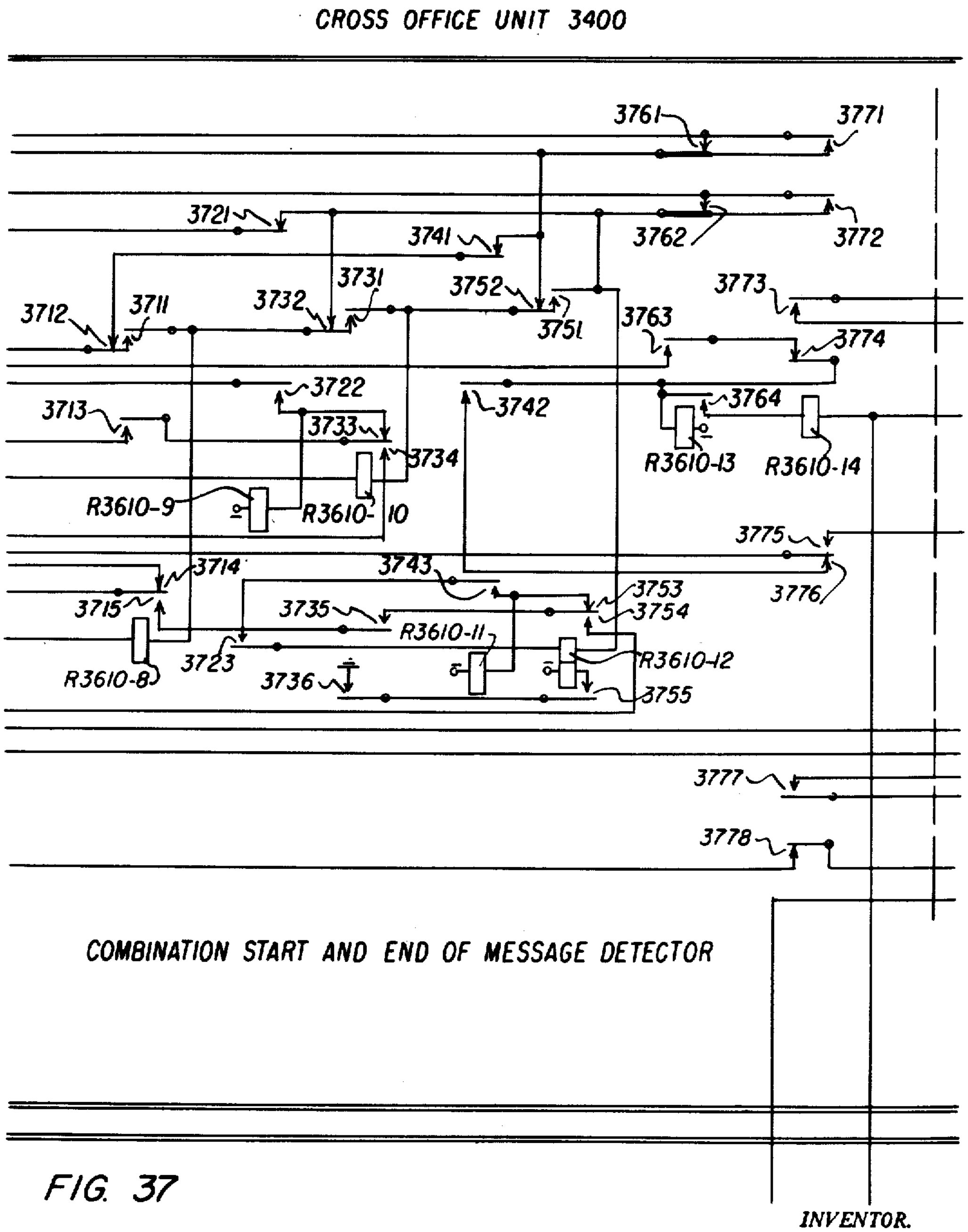
Figure 42:
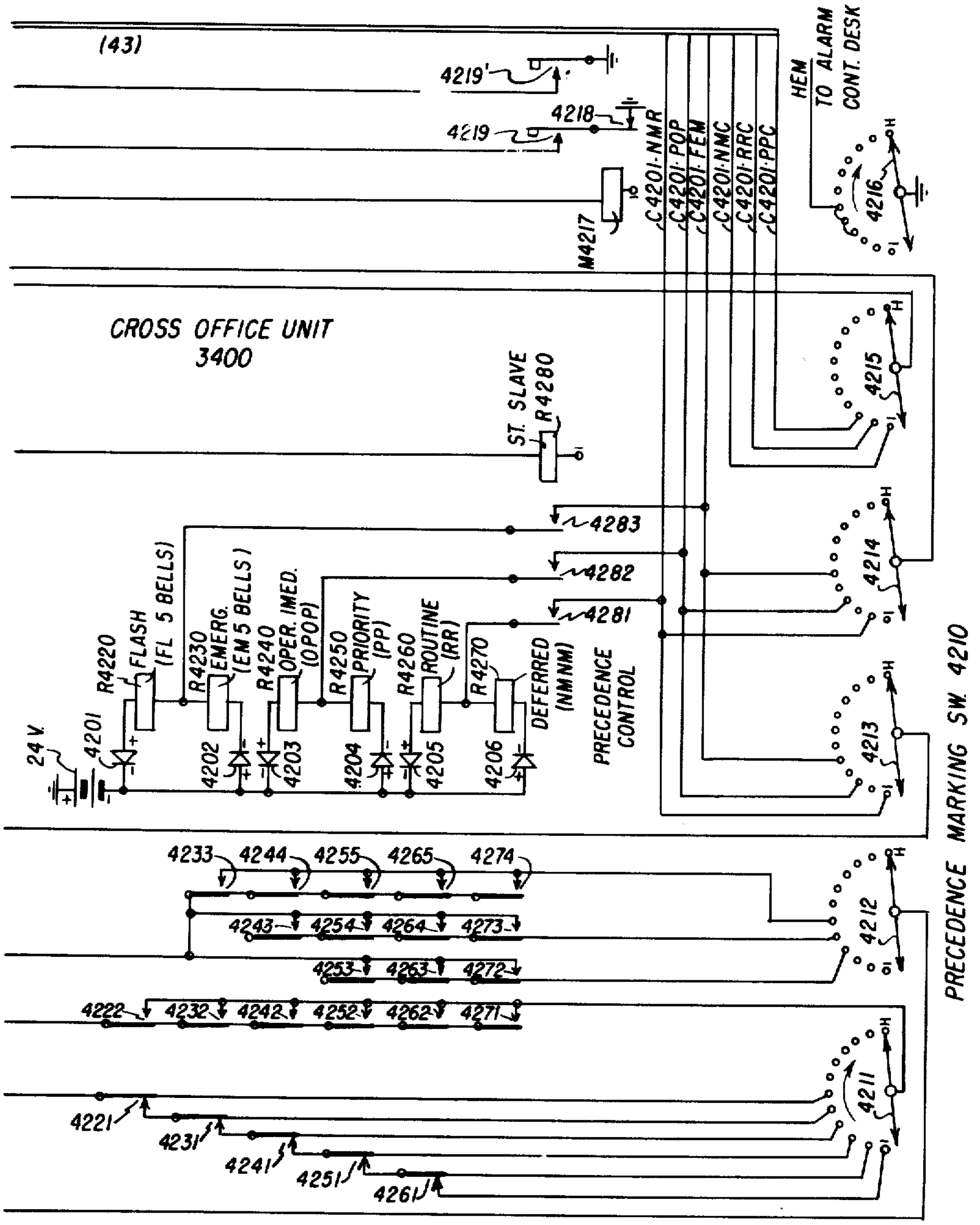
Figure 43:
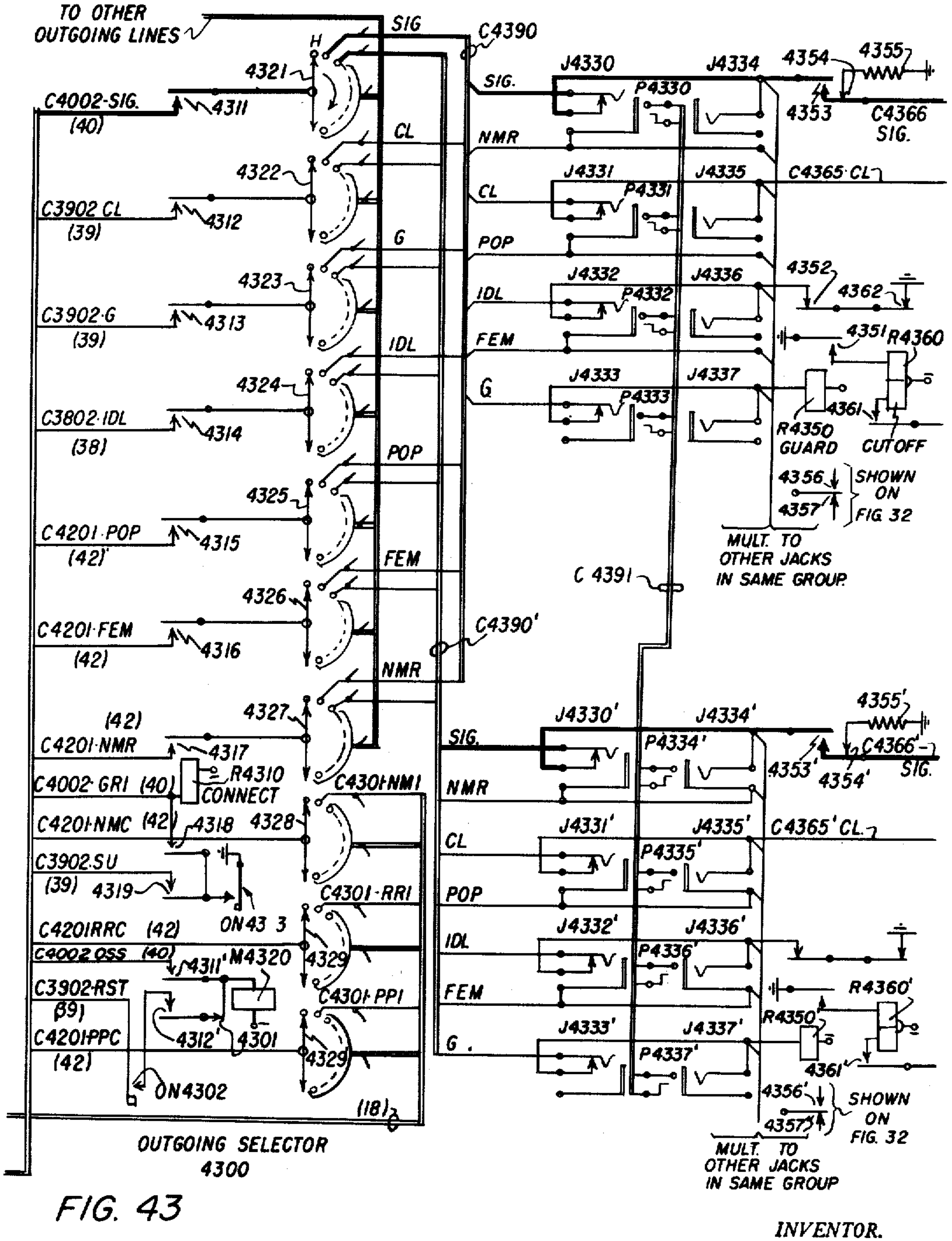

Preferably, each of the cross-office units in the relay switching center is identical to the cross-office unit 3400 illustrated in Figs. 34 to 43, inclusive. The cross-office unit 3400 includes a cross-office reperforator 3410, a tape reader 3420, an outgoing transmitter 3430, a group of sensing relays 3501, a combination start and end-of-message detector, a selector switch 4050, an end-of-message character counter 4110, a start-of-message character counter 4130, a precedence marking switch 4210, an outgoing selector 4300. The timer T4495, the number transmitter 4430, the send relay R4440, and the monitor unit 4450 illustrated in Figs. 43 and 44 are associated with the L1 outgoing line. Finally, the cancel transmission transmitter 3450 illustrated in Fig. 34 is common to all of the cross-office units.

The cross-office reperforator 3410 includes a perforating magnet M3411 and conventional apparatus (not shown) for perforating the tape 3413 in accordance with the five channel code illustrated in Fig. 46. This typing reperforator is substantially the same as the typing reperforator 330 included in the incoming line circuit 400 and may also be of the type disclosed in the U. S.

Patent No. 2,255,794, granted to R. A. Lake on September 15, 1941. Each cross-office reperforator 3410 is provided with a tape storage reel 3412, supporting a supply of unperforated tape 3413 and a tape supply testing mechanism 3409 which is arranged to illuminate the tape alarm lamp L3412 whenever the supply of tape on the reel 3412 becomes inadequate.

The tape reader 3420 and the outgoing transmitter 3430 of the cross-office unit 3400 are respectively identical to the tape reader 340 and the incoming line retransmitter 360 associated with the incoming line 400 and they also may be of the type disclosed in the U. S. Patent No. 2,296,845, granted to N. T. Goetz on September 29, 1942.

The sensing relays 3501, the combination start and end-of-message detector, the end-of-message character counter 4110 and the start-of-message character counter 4130 are controlled by the tape reader 3420 to detect and register the start of a message, the end of a message and to determine the number of operations of the tape reader 3420 after the detection of an end-of-message and after the detection of a start-of-message indicator.

The precedence marking switch 4210, included in the cross-office unit 3400, is provided to register any one of six different class precedence indicators and it controls other cross-office units engaging the same outgoing line to register therein the particular precedence of the message registered in the cross-office unit 3400. The cross-office unit 3400 is arranged so that it may store on the perforated tape 3413 a plurality of the same low class precedence messages to be transmitted over the same outgoing line or it may, under certain conditions, be selected from a pool of cross-office units to store and transmit a high class precedence message over a particular outgoing line. In this connection, it should also be noted that the cancel transmission transmitter 3450 (Fig. 34) is common to all of the cross-office units in the switching center UAC and may be utilized by any cross-office unit to break-in and cancel the transmission of a low class precedence message whenever a high class precedence message is to be transmitted over the same outgoing line.

A better understanding of the arrangement of the switching apparatus incorporated in the relay switching center UAC will be facilitated from a consideration of the detailed operation of the various pieces of apparatus incident to the operation of the typing reperforator 330 at the relay switching center UAC in accordance with a telegraph message received from the relay switching center UEP, as will appear hereinafter.

*Telegraph message received at the relay switching center UAC*

It will now be assumed that a telegraph message is received at the relay switching center UAC from the relay switching center UEP and that the received message is to be retransmitted to the tributary station JWPA of the relay switching center JWP.

Referring to the incoming line circuit 400 shown in Figs. 3 to 9, inclusive, it will be seen that the incoming line from the relay switching center UEP is bridged by the perforating magnet M331 of the typing reperforator 330 in the relay switching center UAC. In processing the message received over the incoming line, the perforator magnet M331 is normally controlled by the transmitting equipment provided at the distant switching center UEP. While a message is received over the incoming line, the perforator magnet M331 causes the tape 333 to be perforated, in code form, in accordance with various items of information, as the tape is fed from the tape storage reel 332. The tape 333 is normally held taught between the storage reel 332 and the take-up reel 366, but as the tape is perforated it becomes slack between the typing reperforator 330 and the tape reader 340. In order to detect the slack condition of the tape between the units 330 and 340, a tight tape switch is provided having a testing element 341 which is tensioned to rotate in a counterclockwise direction to engage the contacts 342 as soon as a slack tape condition is encountered. Since the tape reader 340 may not be immediately controlled by character perforations in the tape 333, a tape storage bin 343 is provided to store the accumulated tape between the typing reperforator 330 and the tape reader 340. It should be noted at this time that the tape storage bin 343 also provides the storage space for slack tape which may accumulate between the tape reader 340 and the incoming line retransmitter 360.

For the purpose of this description it will be assumed that all messages received over the incoming line include the following items of information:

1. A start-of-message indicator.
2. A channel number indicator which may also include a line identification code.
3. A precedence indicator.
4. A routing indicator.
5. A multiple message indicator (not always provided).
6. The body of the message.
7. An end-of-message indicator.

Each of the above metnioned items will now be explained in more detail.

Item 1 which is the start-of-message indicator will be referred to hereinafter as the SOM and in all cases the SOM comprises the seven characters XZXZXZX. Unless these seven characters precede each message received over the incoming line, an alarm signal will be transmitted to indicate that an improper SOM has been detected by the incoming line equipment.

Item 2 which is the channel number indicator comprises a "figures shift" character followed by three digits and is the second item appearing on the perforated tape. The first message of each twenty-four hour day transmitted over the illustrated incoming line from the switching center UEP to the switching center UAC is given a channel number indicator 001 and each succeeding incoming message is automatically given the next number. It may be well to mention that a line designation of two or three letters precedes the channel number indicator to identify the incoming line over which the message is received but this designation is disregarded in processing a message. In the present arrangement 999 messages may be transmitted in a twenty-four hour period between the above noted relay switching centers over the illustrated incoming line. Of course, it should be understood that if more than 999 messages are required to handle the traffic, a four-digit channel number indicator may be provided. At the beginning of each day, the attendants in the switching centers noted above, will cause the channel number indicator apparatus to be restored to normal so that the first message transmitted each day will be given the channel number indicator 001. By this arrangement, an automatic check is made to determine whether the number of the message received compares identically with the channel number stored in the channel number comparator 900 illustrated in Fig. 9. If a message is lost, the number received and the number registered in the channel number comparator 900 will not check and an alarm will be automatically transmitted to signal the attendant.

Item 3 which is the precedence indicator is the third item of the message and indicates the importance of the message. In the present system six degrees of precedence are provided which are indicated respectively in the following manner and order of precedence:

A. "Flash" precedence, which is the highest order, is indicated by five "bell" characters preceding the letters FL (bell bell bell bell bell FL). When the above highest precedence is indicated on the message, the relay switching center apparatus will automatically be controlled to interrupt or "bust" any message of lower precedence, if the lower precedence message interferes with or blocks the immediate transmission of the "flash" message.

B. "Emergency" precedence, which is the second highest order, is indicated by five "bell" characters preceding the letters EM (bell bell bell bell bell EM). When the above second highest precedence is indicated on the message the relay switching center apparatus will automatically be controlled to interrupt or "bust" any message of lower precedence if the lower precedence message interferes with or blocks the immediate transmission of the "emergency" message.

C. "Operational immediate" precedence, which is the third highest order, is indicated by the characters OPOP. When the third highest precedence is indicated on the message, the relay switching center apparatus will automatically be controlled to interrupt or "bust" any message of lower precedence if the lower precedence message interferes with or blocks the immediate transmission of the "operational immediate" message.

D. "Priority" precedence, which is the fourth highest order, is indicated by the characters PP. When the fourth highest precedence is indicated over messages of lower precedence are not interrupted or "busted" during transmission but the message having the "priority" precedence PP will be transmitted before another message of lower precedence is transmitted. In other words, if a message of lower precedence is being transmitted, that message will be completely transmitted and it will be immediately followed by the transmission of the "priority" precedence PP message even though other messages of lower precedence are awaiting retransmission over the same outgoing line.

E. "Routine" precedence, which is the fifth highest order, is indicated by the characters RR. When the above fifth highest precedence is indicated other messages of lower precedence are not interrupted or "busted" during transmission but the message having the "routine" precedence RR will be transmitted before another of the lowest "deferred" precedence messages is transmitted. In other words, if a "deferred" precedence message is being transmitted, this message will be completely transmitted and it will be immediately followed by the transmission of the "routine" precedence RR message even though other "deferred" messages are awaiting retransmission over the same outgoing line.

F. "Deferred" precedence, which is the lowest order of precedence, is indicated by the characters NMNM. Messages of "deferred" precedence will be transmitted as long as they do not interfere with the transmission of any message of higher precedence over the same outgoing line.

In order to detect the precedence of a received message, each director in the switching center is provided with one precedence detector circuit for each of the above noted six classes of precedence except in the case of the "flash" and "emergency" precedence which are detected by means of the same precedence detector. In other words, five precedence detectors are provided in each of the directors and depending upon the precedence of the message detected, the director will function to control the retransmission of the message in accordance with the above described arrangement.

Item 4, noted previously, which is the routing indicator comprises either three, four or five characters indicative of the called destination or called address of a received message. As previously described in connection with the trunking plan illustrated in Fig. 1, the routing indicator will identify the called relay switching center if it contains three characters and it will identify the called tributary station if it contains four or five characters. In the present system each director is provided with routing indicator registers which are controlled to register the routing indicator characters, and in accordance with the registered routing indicator characters, the director will automatically select an outgoing line in the direction of the destination of the message.

Item 5 which is the multiple message indicator comprises the three characters ZVA. These characters will always appear on the perforated tape following the routing indicator but only if more than one routing indicator is received. In other words, if the received message is to be transmitted to more than one called destination, each of the routing indicators of each of the called destinations will appear on the perforated tape preceded by the multiple message indicator ZVA. The characters ZVA are detected by the director in substantially the same manner as the precedence indicators previously noted. In the present system the switching apparatus is arranged to automatically route such messages to a multiple address storage unit so that an operator thereat may retransmit the particular message over appropriate outgoing lines to each of the destinations indicated by the routing indicators appearing after the multiple message indicator ZVA.

Item 6 which is the body-of-the-message, will be automatically transferred to a cross-office unit where it is again perforated on a tape for subsequentat transmission over a selected outgoing line.

Item 7 which is the end-of-message indicator will be referred to hereinafter as the EOM and in all cases the EOM comprises the figures shift character "Figs" followed by seven commas (,,,,,,,) and then followed by the letters shift character "Ltrs" (Figs ,,,,,,, Ltrs).

From the foregoing explanation of the various items 1 to 7, inclusive, it will be understood that each message received over the incoming line from the relay switching center UEP is preceded by a SOM indicator and is terminated by an EOM indicator. The various operations of the switching apparatus in response to the various items noted above will now be described.

Figure 3:
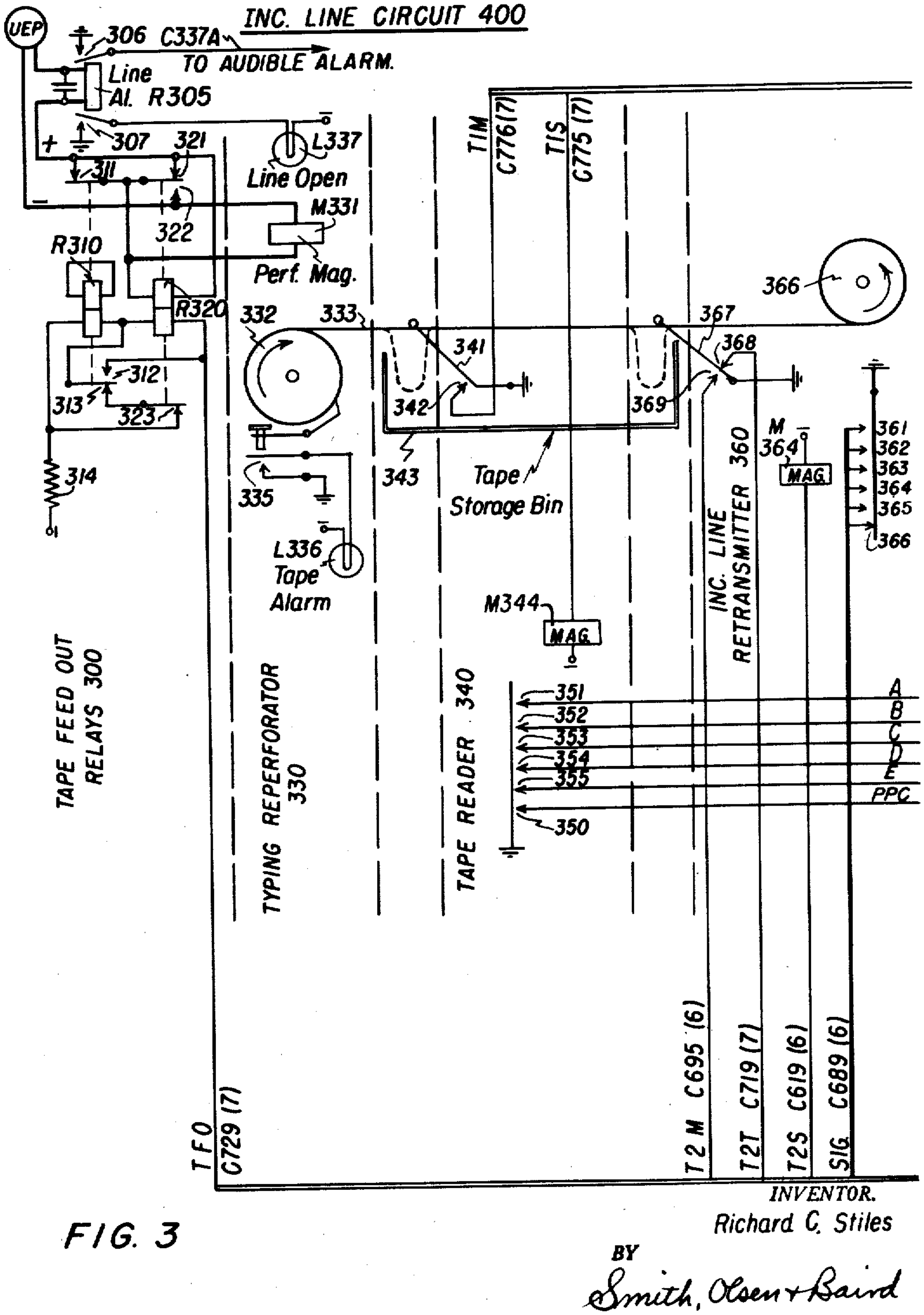
Figure 7:
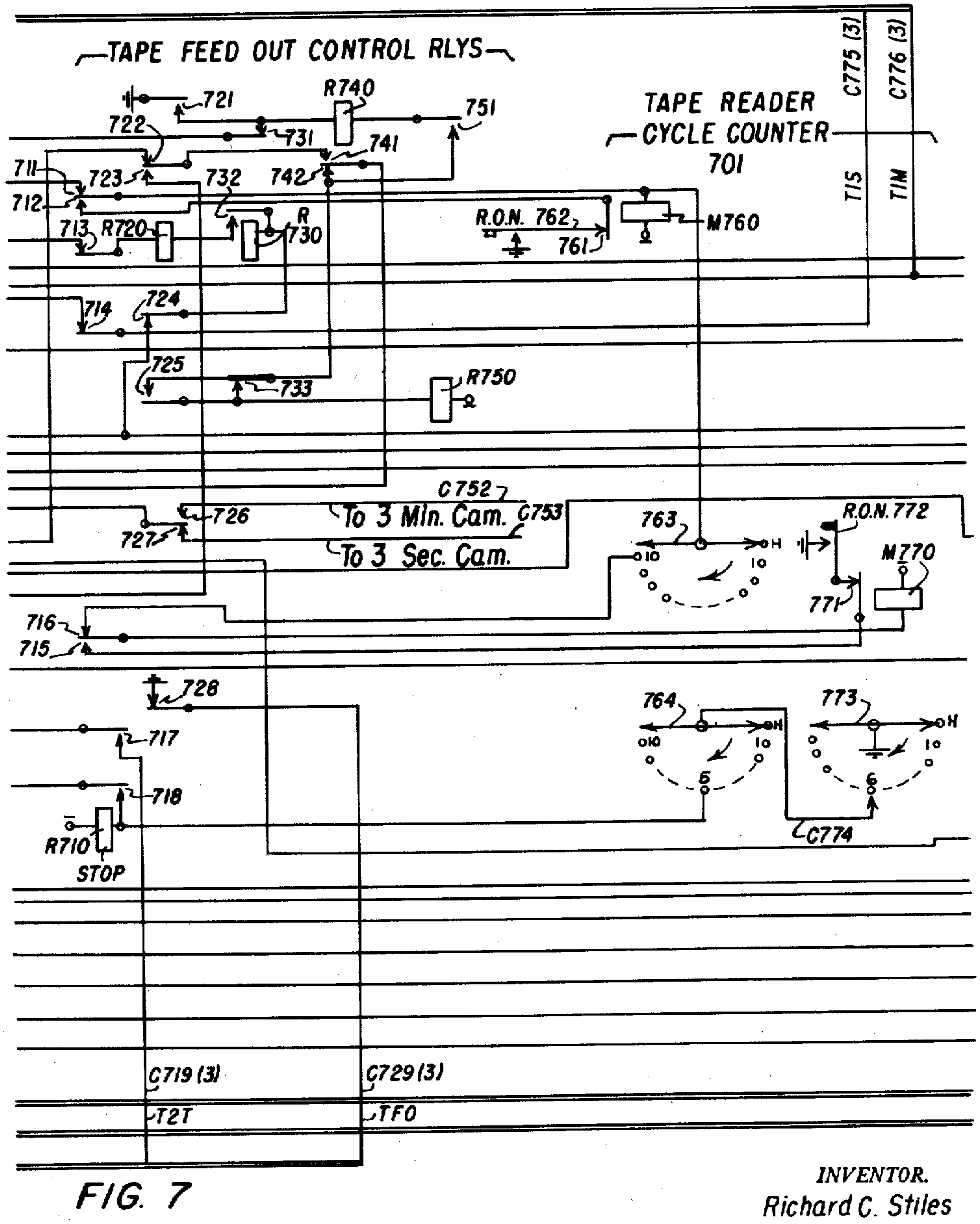
Figure 8:
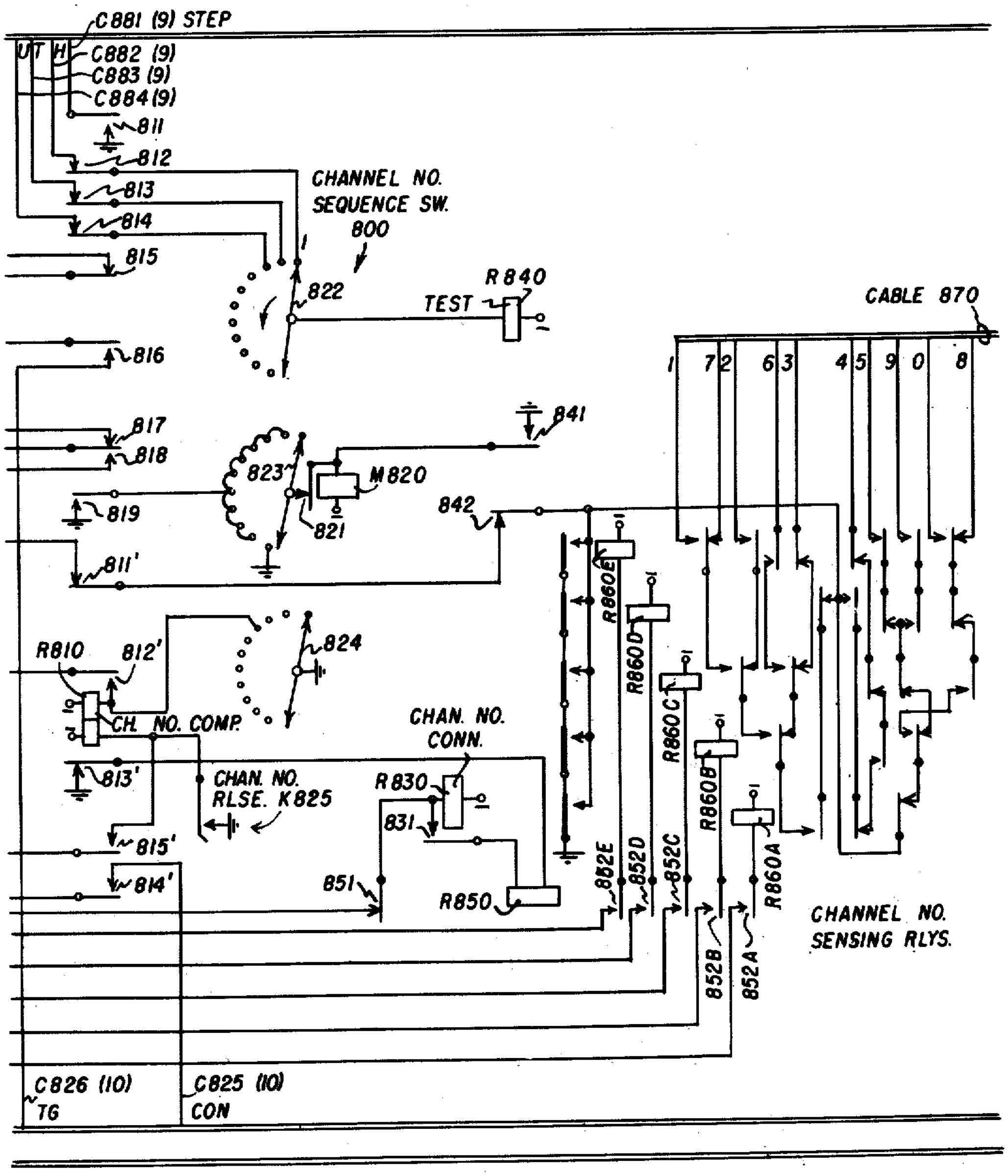

As previously noted, when the tape 333 becomes slack as a result of perforations being made therein in response to signals received over the incoming line, the slack tape switch 341 actuates to close its contacts 342 and thereby connects ground potential by way of the TIM conductor C776 extending to Fig. 7, contacts 815, 652, 642, and 714, TIS conductor C775 extending to Fig. 3 and the winding of the clutch magnet M344, to battery. As a result of the above traced circuit, the magnet M344 is operated to initiate the sensing operation of the tape reader 340. The contacts 350 to 355, inclusive, associated with the tape reader 340, are controlled by sensing pins in accordance with the character perforations appearing on the tape 333. Consequently, the five leads A to E, inclusive, will be grounded in code combinations by their respective contacts 351 to 355, inclusive, in the same order as the character perforations on the tape 333 and as indicated by the code illustrated in Fig. 46. The sixth lead PPC is grounded by the contacts 350 on the tape reader 340 during each operating cycle for each character sensed by the tape reader. In other words the lead PPC will be grounded during the reading of a character (letter or number) space, carriage return, line feed, figure shift, letters shift, or blank perforations sensed by the tape reader 340.

In view of the foregoing, it will be appreciated that the relay R470 will be operated from grounded contacts 350 before the remaining contacts 351 to 355 or any combination thereof may be closed in accordance with a sensed character and that the relay R740 will be restored to normal shortly after the character sensing operation is completed by the tape reader 340.

It may be well to mention at this time that the tape 333 is perforated in accordance with the five channel code, numbered 1 to 5, respectively, as shown on Fig. 46. These channels will control the contacts 351 to 355, respectively, and the corresponding sensing relays R410 to R450, respectively, in accordance with the characters of the perforated codes.

Each message received over the incoming line will first control the perforator magnet M331 to perforate five "space" characters, followed by two "carriage return" and one "line feed" characters. These perforations taken together provide the necessary controls for a page printer typewriter, but they are not of any significance as far as the relay switching center apparatus is concerned. The next item of information appearing on the perforated tape 333 will be the start-of-message indicator which comprises the seven characters XZXZXZX. The first SOM character X, sensed by the tape reader 340 will complete, at the contacts 350, the previously mentioned circuit, for operating the relay R740 and the contacts 351, 353, 354, and 355, will respectively apply ground potential to the A, C, D and E conductors in order to operate respectively the sensing relays R7410, R430, R440, and R450. As soon as the relay R470 operates it prepares, at its contacts 476, an operating circuit for the relay R640 and, at its contacts 477, it prepares a locking circuit for any of the operated relays R410 to R450, inclusive.

In the present example, the character X will cause the relays R410, R430, R440 and R450 to operate and lock in their operated positions by way of their upper windings and their contacts 411', 431', 441' and 451' to ground at contacts 477. Also, at the contacts 418, 438, 448 and 458, the above noted operated sensing relays complete multiple circuits for operating the relay R460. At the contacts 467, the relay R460 now completes a circuit for operating the first relay R490–1 of a series of counting relays which are designated R490–1 to R490–14, inclusive. More specifically, at the contacts 467, the relay R460 completes a circuit which may be traced by way of the contacts 416, 426, 436, 446, 456, the X conductor, contacts 487 and 494 and the winding of the relay R490–1, to battery. Upon operating the relay 940–1, at its contacts 491, prepares a locking circuit for itself which includes the winding of the relay R490–2, contacts 501, 511, 535, 481 and ground at contacts 473 and 463. The last mentioned locking circuit, however, will not be completed until the relay R470 restores to normal.

At the end of the sensing of the first character X, the tape reader 340 restores to normal and interrupts the previously described circuits including the contacts 350 to 355, inclusive. As a result of the foregoing, the relay R470 restores to normal and, at its contacts 477 it interrupts the locking circuits for the upper windings of the operated sensing relays R410, R430, R440 and R450, which also restore to normal.

In addition to the foregoing, at its contacts 476, the relay R470 interrupts the circuit for the relay R460 and the latter relay, upon restoring, completes the previously traced circuit, at its contacts 463, for operating the second counting relay R490–2 in series with the first counting relay R490–1. Consequently, at the end of the sensing operation of the character X the counting relay R490–1 and R490–2 will be locked in their operated positions.

The second SOM character is the character Z and when the tape reader 340 senses this character the contacts 350, 351 and 355 will be closed to cause the operation of the relays R470, R410 and R450. The last two mentioned relays, upon operating, will lock in their operated positions over the circuit including their upper windings and ground at contacts 477, and they will complete the previously described multiple circuits for operating the relay R460. At the contacts 418 and 458, the relays R410 and R450 also apply ground potential by the contacts 411, 421, 431, 441, 451 and 481 in order to retain the relays R490–1 and R490–2 operated, even though the relays R460 and R470 are now operated to remove the initial holding ground at contacts 463 and 473. At the contacts 467, the relay R460 now completes a circuit which includes contacts 417 of the operated relay R410, contacts 427, 437 and 447, contacts 457 of the operated relay R450, the Z conductor, contacts 489, 495 and 504 and the winding of the third counting relay R490–3, to battery. The relay R490–3 now operates and at its contacts 496, prepares a locking circuit for itself including the winding of the relay R490–4, the contacts 507, 518, 536, 483 and ground at contacts 474 and 465. This locking circuit will become effective as soon as the relays R460 or R470 restore to normal at the end of the sensing of the second character Z. At the end of the sensing of the second character Z the relay R470 restores to normal and interrupts the previously described circuits for the relays R460, R410 and R450. As soon as the relay R470 restores to normal it completes, at its contacts 474, a circuit including the contacts 483, 536, 518 and 507, the winding of relay R490–4, contacts 496 and the winding of the relay R490–3, to battery. In this circuit the relay R490–4 operates in series with the relay R490–3 and, at its contacts 501 and 502, it transfers the locking circuit for the relay R490–1 and R490–2 from the contacts 473 to the above traced circuit including the contacts 474. Consequently, the relays R490–1 and R490–2 are now held in their operated positions in multiple with the now operated relays R490–3 and R490–4.

The third SOM character X is now sensed by the tape reader 340 and, at its contacts 350 to 355, inclusive, it re-completes the previously traced circuits for operating the sensing relays R410, R430, R440 and R450 and R470. The relay R460 now reoperates, as previously noted, and, at its contacts 467, it completes a circuit for operating the fifth counting relay R490–5. This circuit includes the contacts 467, 416, 426, 436, 446 and 456, the X conductor, contacts 487, 493, 504' and 510, and the winding of the relay R490–5, to battery.

Since the sensing relays R410, R430, R440 and R450 are operated during the sensing of the X character, at their contacts 418, 438, 448 and 458, a holding ground potential is extended over a circuit including the contacts 412, 422, 432, 442, 452, 483, 536, 518 and 507 in order to retain the first four counting relays R490–1 to R490–4 in their operated positions. At the conclusion of the sensing of the third SOM character X, the above noted sensing relays restore to normal as soon as relay R470 interrupts their locking circuits. At this instant the fifth counting relays R490–5 locks itself in series with the sixth counting relay R490–6 over a circuit which includes the winding of relay R490–5, contacts 506 and 497, the winding of relay R490–6, contacts 514, 526, 535, 481 and 473, to ground. At its contacts 474, the relay R470 retains the holding ground potential on the previously traced locking circuit for the first four counting relays R490–1 to R490–4.

When the above traced circuit is completed in series with the sixth counting relay R490–6, the relay operates and, at its contacts 508, transfers the locking circuit for the first four counting relays R490–1 to R490–4 from the circuit including contacts 507, to the circuit including contacts 508, 514 etc. over which the fifth and sixth counting relay R490–5 and R490–6 are now operated. Thus, the first six counting relays are now retained operated over the locking circuit which includes ground at contacts 463 and 473 of the restored relays R460 and R470, respectively.

The fourth SOM character Z is now sensed by the tape reader 340 and causes the reoperation of the sensing relays R410, R450 and R470 in the manner previously described. During this sensing operation the relay R470 is operated, as previously noted, and it controls the operation of relay R460 over a circuit including contacts on the operated sensing relays R410 and R450. Since the relays R410 and R450 close contacts 411 and 418, 451 and 458, a locking circuit is still retained for holding the counting relays R490–1 to R490–6 in their operated positions by way of the contacts 451, 441, 431, 421, 411 and ground at both the contacts 418 and 458. As a further result of the operation of the relays R410 and R450, a circuit is completed from ground at contacts 467 by way of the contacts 417, 427, 437, 447, 457, Z conductor, contacts 489, 495, 503, 508' and 517 and the winding of the seventh counting relay R490–7, to battery. The relay R490–7 operates over this circuit and as soon as the initial operating circuit is interrupted at the end of the tape sensing operation for the fourth SOM character Z, the relay will lock itself over a circuit including the contacts 512, 505, the winding of the counting relay R490–8, contacts 521, 536 and 483 and ground at the contacts 465 and 474. As has been previously described, the relay R490–8 operates in series with the relay R490–7 and, at the contacts 514 and 515, the relay R490–8 transfers the locking circuit for the first six counting relays to the locking circuit for the seventh and eighth counting relays whereby the counting relays R490–1 to R490–8, inclusive, are locked in their operated positions to ground at the contacts 465 and 474 of the restored relays R460 and R470.

When the tape reader 340 senses the fifth SOM character X the sensing relays R410, R430, R440, R450, R460 and R470 will operate, in the manner previously described, and thus complete circuits for operating the ninth counting relay R490–9 while still retaining the first eight counting relays R490–1 to R490–8 in their operated positions. At the end of the sensing of the fifth SOM character X, the relay R490–9 locks itself in series with the tenth counting relay R490–10 and the latter relay, upon operating, retains the first eight counting relays in their operated position over a locking circuit which now includes the contacts 522 and 529 and grounded contacts 463 and 473.

As a result of the sensing of the sixth SOM character Z by the tape reader 340, the sensing relays will now cause the operation of the eleventh counting relay R490–11 and at the end of the sensing operation, the twelfth counting relay R490–12 operates in series with the eleventh counting relay. At its contacts 529 and 530, the relay R490–12 now completes a locking circuit whereby the first ten counting relays R490–1 to R490–10 are retained in their operated position. Although the relay R490–12 is locked in its operated position over a circuit including its upper winding and the winding of the eleventh counting relay R490–11, it should be noted that an additional locking circuit is completed which includes the lower winding of the relay R490–12, the contacts 531, and ground at contacts 523 of the operated tenth counting relay R490–10.

When the seventh SOM character X is sensed by the tape reader 340, the relays R410, R430, R440, R450, R460 and R470 will all operate in the manner previously described and complete a circuit for operating the thirteenth counting relay R490–13 which may be traced from ground at contacts 467 and then by way of contacts 416, 426, 436, 446 and 456, X conductor, contacts 487, 493, 504', 509, 517', 524, 481', 549 and 528 and the winding of relay R490–13, to battery. Relay R490–13 operates its "X" contacts 538 to lock itself in its operated position over a circuit which is independent of the contacts on the counting relays R490–1 to R490–10, inclusive. As a further result of the operation of relay R490–13, at its contacts 536, it interrupts the locking circuit for all of the counting relays R490–1 to R490–12, inclusive, which now restore to normal. It should be noted, however, that the relay R490–12 will be retained in its operated position over the locking circuit including its lower winding until the counting relay R490–10 restores to normal. Finally, when the relay R490–11 restores to normal it interrupts, at its contacts 528, a point in the initial energizing circuit for the thirteenth counting relay R490–13 and as a result thereof, the short circuit is removed from the counting relay R490–14 whereby the relays R490–13 and R490–14 energize in series to ground at contacts 597. It should be noted, however, that normally, the counting relay R490–11 will restore and interrupt the initial energizing circuit for relay R490–13 before the sensing relays R410 to R470, inclusive, restore to normal at the end of the sensing of the seventh SOM character X. However, if the above noted sensing relays restore to normal prior to the restoration of the counting relay R490–11, the initial energizing circuit for the relay R490–13 will be interrupted at any one of the contacts 416, 436, 446 or 456 incident to the restoration of the sensing relays R410, R430, R440 or R450.

The operation of the counting relay R490–14 in series with the counting relay R490–13 will only occur if the proper sequence of seven start-of-message characters XZXZXZX have been sensed by the tape reader 340. From the foregoing, it should be understood that the counting relay R490–14 upon operating indicates that a proper start-of-message indication has been received and detected by the sensing relays illustrated in Fig. 4. Various operations will now be performed incident to the operation of the counting relay R490–14 but before describing such operations, it is advisable to consider the sensing relays and the operation of the counting relays of the detector in the event that an incorrect sequence of characters in the SOM indicator are received.

*Receiving a false SOM*

Figure 4:
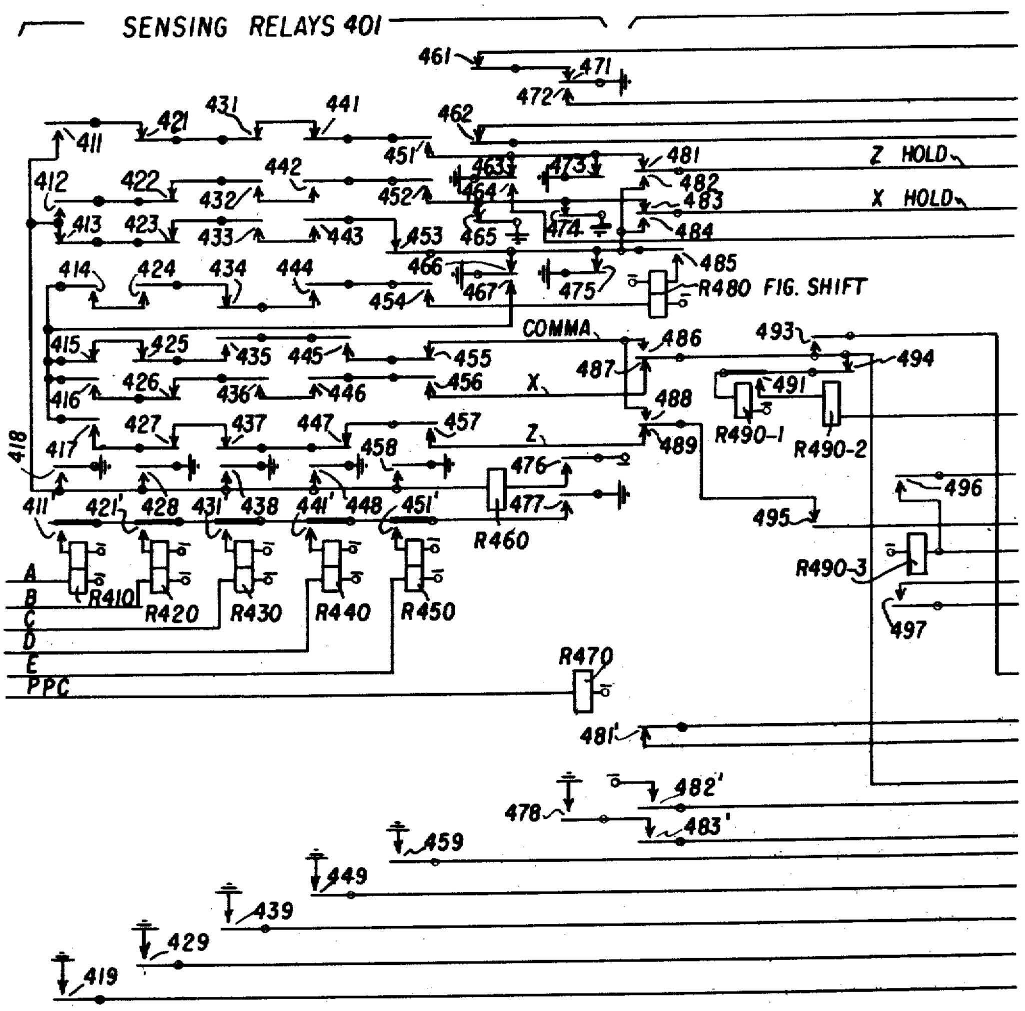
Figure 5:
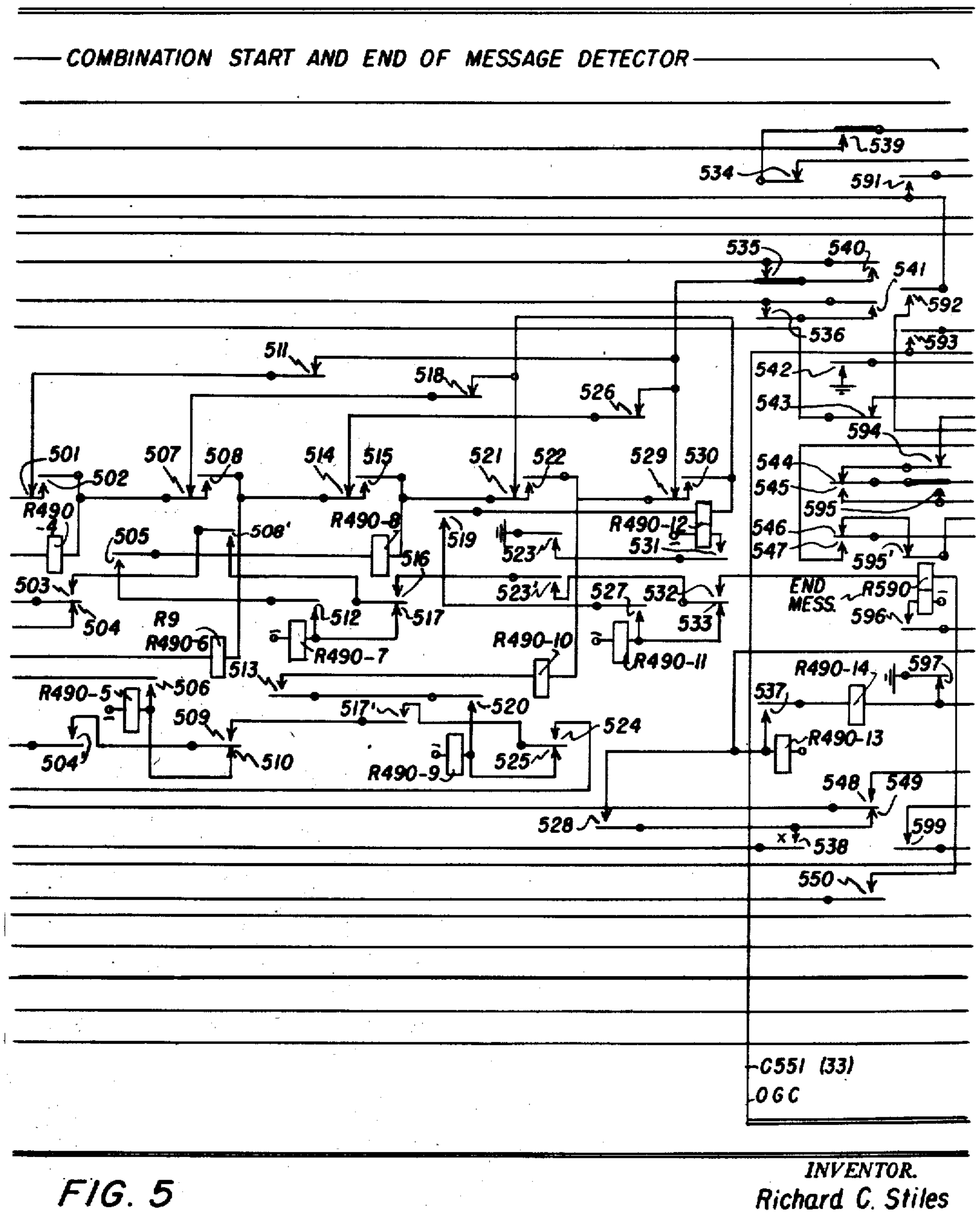

In the above described operation of the sensing relays 401 and the combination start and end message detector illustrated in Figs. 4 and 5 it has been assumed that the seven characters XZXZXZX of a start-of-message indication are received in proper sequence to cause the ultimate operation of the counting relay R490–14. If it is assumed, for the purpose of describing a false SOM indication, that the first and second characters X and Z have been properly received and detected by the operation of the first four counting relays R490–1 to R490–4, inclusive, the latter relays will be locked in their operated positions to ground at the contacts 465 and 474 of the restored relays R460 and R470. Thus, the ground potential at the contacts 465 and 474 will be connected by way of the contacts 483, the X hold conductor, contacts 536, 518 and 507 over a first branch including relay R490–4, contacts 496 and relay R490–3, to battery, and over a second branch including the contacts 502, the winding of the relay R490–2, contacts 491 and the winding of the relay R490–1, to battery. As previously noted, the next character, that is the third character of the SOM, is the character X provided a proper sequence of SOM characters is received. If the third character is any character other than X, the locking circuit for the counting relays R490–1, to R490–4 will be interrupted and the counting chain will be restored to normal. For example, if the character Z is sensed by the tape reader 340 as the third character of an SOM, the sensing relays R410, R450, R460 and R470 will be operated in the manner previously described. The relays R410 and R450 upon operating normally complete a holding circuit for the operated counting relays prior to the removal of the locking ground potential at the contacts 463 and 465. With the relays R410 and R450 operated by a Z character, ground at the contacts 418 and 458 will be extended by way of the contacts 411, 421, 431, 441, 451 and 481 to the Z hold conductor. Consequently, this ground potential would not complete the holding circuit over the X hold conductor to retain the four counting relays R490–1 to R490–4 operated and these relays will now restore to normal and reset the counting chain to its original starting position. In view of the foregoing, it should be understood that if any character other than X follows a Z character in a start-of-message indication, then the operated counting relays will always restore to normal. The same result also occurs in the event that any character other than Z follows an X character, in that the counting chain will also automatically restore to its original starting position.

There is one condition, however, where the first two counting relays will be restored and then reoperated, although all other counting relays will be restored to normal, in response to an improper sequence of SOM characters. For example, if the start-of-message characters XZX have been counted, respectively, by the counting relays R490–1 to R490–6, inclusive, the latter relays will be locked in their operated positions by way of the Z hold conductor and ground at contacts 463 and 473. If the next or fourth character of the SOM is another character X, the sensing relays will be operated in the manner previously described and, as a result thereof, ground will be removed from the Z hold conductor at both the contacts 463 and 473 thereby to restore the counting relays R490–1 to R490–6, inclusive, to normal. However, since the X character has been sensed by the tape reader 340, the corresponding sensing relays R410, R430, R440 and R450, R460 and R470 will be operated. As previously noted, the last received X character may be the first character of an SOM and, therefore, should be stored on the first set of counting relays R490–1 and R490–2 even through the previously stored XZX characters must be discarded. Thus, when the counting relays R490–1 to R490–6 are restored to normal a circuit will immediately be completed from ground of the contacts 467 by way of the contacts 416, 426, 436, 446 and 456, the X conductor, contacts 487 and 494 and the winding of the counting relay R490–1 to battery. At the end of the sensing operation of this X character, the sensing relays restore to normal and the relay R490–1 will lock itself in series with the relay R490–2 to ground at contacts 463 and 473 over the circuit previously described.

In view of the foregoing, it will be appreciated that if an X character, which is the first character of an SOM, is received out of its proper sequence during the detection of an SOM, all of the operated counting relays will be restored to normal in order to discard any stored characters, and the first two counting relays will be reoperated to again store the last received X character. In other words the combination start and end message detector will always discard an incorrect sequence of received characters and it will at the same time retain the last received character, provided the last character is an X, stored on the first two counting relays R490–1 and R490–2 since the last received X character may be the first character of a new sequence of SOM characters.

*SOM omitted*

As previously pointed out, the tape reader 340 is controlled in accordance with the various perforations on the tape 333 to control the contacts 350 to 355, inclusive, in accordance with the code appearing in Fig. 46. It was also pointed out that the relay R470 operated as a result of each sensing operation of the tape reader 340 and if any one of the sensing relays R410 to R450 is also operated, a circuit will also be completed for operating the relay R460. Thus, the relays R460 and R470 will be operated whenever the tape reader 340 senses any character (letter or number) space function, carriage return function, figures shift function, letters shift function, and line feed function, but the relay R460 will remain in its restored positions if a "blank" function appears on the associated tape 333. With this arrangement, the relay R460 is arranged so that it will operate count each of the above noted characters, except a "blank" function, by controlling the character counting switch 690A. The switch 690A includes the rotary stepping magnet M690 which, upon energization, will prepare the mechanism to rotate the wiper 693 in a counterclockwise direction and upon deenergization will advance the wiper one step. This switch may be provided with any number of bank contacts but for the purpose of this description it will be assumed that it is provided with 25 contacts and that the conductor C694 is connected to the 25th contact.

As each character is sensed by the tape reader 340, the above noted sensing relays will be operated and restored in the manner previously described. It should be understood, however, that these relays will operate in accordance with characters other than the start-of-message characters XZ etc., and each time the relay R460 operates, it completes a circuit which may be traced from ground at the contacts 464 and then by way of the contacts 543, 662 and 673, for operating the magnet M690. When the relay R460 restores to normal at the end of the sensing of each character, the magnet M690 restores to normal. Thus, the magnet M690 operates and restores a number of times corresponding to the number of characters sensed by the tape reader 340. Each time the magnet M690 restores to normal, it advances its wiper 693 one step in a counterclockwise direction and as soon as the wiper 693 is advanced from the home contact into engagement with the contact one, the rotary off-normal springs RON692 are closed in order to prepare an automatic self-interrupting circuit whereby the magnet M690 automatically advances the wiper 693 to the home contact position in a conventional manner.

If a complete start-of-message indication comprising the seven characters XZXZXZX is stored on the counting relays R490–1 to R490–14 before twenty-five characters have been counted by the character counting switch 690A, the latter switch will be automatically restored to its home contact position. More specifically, as soon as the relay R490–14 operates, it interrupts, at its contacts 543, the previously described circuit for controlling the counting operation of the magnet M690. Simultaneously, at its contacts 542, it completes a circuit including the off-normal springs RON692, the self-interrupting contacts 691 and the winding of the magnet M690. As soon as this circuit is completed the magnet M690 operates to interrupt its operating circuit, at the contacts 691, whereby the magnet is restored to normal to again complete the operating circuit at its contact 691. In this manner the magnet M690 is automatically operated and restored to advance its wiper 693 step-by-step at a high rate of speed over an associated bank contact until the wiper 693 again encounters the home contact position. In this position the off-normal springs RON692 are opened in order to interrupt the self-interrupting circuit for the magnet M690 and thus restore the character counting switch 690A to its normal position.

In the previous description of operation, it was assumed that an SOM was received and stored before twenty-five characters are counted by the character counting switch 690A. If, however, twenty-five characters are counted before the last counting relay R490–14 is operated, the wiper 693 will be advanced into engagement with the contact 25 and complete an obvious circuit for operating the stop-start alarm relay R650. Upon operating the relay R650, at its contacts 654, locks itself to ground at the alarm release key K668. Also, at its contacts 653, it completes a circuit including the off-normal springs RON692 for operating the magnet M690 so that the character counting switch 690A is restored to normal in the manner previously described. At its contacts 651, the relay R650 completes an obvious circuit for illuminating the stop-start alarm lamp L656 to indicate to the attendant at the relay switching center that no SOM was received in connection with the present message. Finally, at the contacts 652, the relay R650 interrupts a point in the previously traced circuit, including the conductors C775 and C776, in order to restore the magnet M344 in the tape reader 340. As a result of the restoration of the magnet M344, the taper reader is prevented from sensing additional tape.

After noting the stop-start alarm condition, the attendant may check the tape 333 and ascertain that the SOM has been omited from the received message and if the remaining information perforated on the tape is in proper order, the attendant may reset the tape on the tape reader 340 so that the next item of information, which is the channel number indicator, will be in a position beyond the tape reader 340. Having performed the above check, the attendant may then momentarily actuate the release key K668 and thereby interrupt the locking circuit for the stop-start relay R650 which immediately restores to normal. Simultaneously, with the actuation of the alarm release key K668, the attendant also operates the channel number release key K825, which completes an obvious circuit for operating the channel number complete relay R810 and, at its contacts 815', the relay R810 completes a circuit for operating the counting relay R490–13. The operation of relay R810 at this time simulates the condition that the channel number received has been compared and that the message may be processed in the normal manner to be described hereinafter. Since the attendant has operated the relay R810 by actuating the key K825 it is not necessary in the present assumed condition to compare the number of the channel perforated on tape 333 with the channel number stored in the channel number comparator 900 (Fig. 9). Furthermore, since the counting relay R490–13 has been operated, it will lock in series with R490–14 to simulate the condition that a proper SOM has been received. The operations which are performed after the operation of relay R810 and the counting relays R490–13 and R490–14 will be described hereinafter in connection with the normal processing of a received message.

Returning to the restoration of the stop-start relay R650 it will be noted that when the contacts 652 are again closed, the circuit will be recompleted for the magnet M344 so that the taper reader 340 may continue to sense the perforations on the tape 340.

*Detecting the channel number indicator*

In the previous description it was pointed out that when a proper SOM, comprising the seven characters XZXZXZX, is received and stored on the combination start and end of message detector, the counting relay R490–14 was operated in series with the counting relay R490–13. This relay, at its contacts 542 and 543, caused the character counting switch 690A to be restored to normal, as previously described. At its contacts 550, the relay R490–14 prepares a point in the circuit for operating the channel number connect relay R830 so that the channel number sensing relays (Fig. 8) may be connected to the contacts of the sensing relays R410 to R450, inclusive. In other words, the relay R490–14 now conditions the incoming line circuit shown in Figs. 3 to 8, inclusive, to analyze the information that appears on the perforated tape following the start-of-message indication.

A typical message being perforated on the tape 333 by the typing reperforator 330 is normally arranged so that it will control an automatic typewriting mechanism, such as a teletypewriter. Consequently, various typewriter functions may be perforated on the tape between the different items of information, such as "space," "carriage return," "line feed" and "letters shift" functions, to control such a typewriter mechanism. Accordingly, in the message being received at the present time, immediately following the seventh character X of a start-of-message indicator, the typing reperforator 330 is controlled to perforate the tape 333 with five "space" character functions, two "carriage return" character functions and one "line feed" character function in the order named so that an automatic typewriter of the type noted will be controlled to perform the corresponding functions. Immediately thereafter, the typing reperforator 330 is controlled to perforate characters identifying the incoming line over which the message is being received. Normally, the incoming line identifying characters comprise three letters of the alphabet. These characters, as well as the preceding automatic typewriter control functions, are all sensed by the tape reader 340 in the manner previously described but they perform no switching control over the apparatus in the relay switching center, although certain of the relays will operate and restore.

The next item of information perforated on the tape 333 is the channel number indicator which comprises a "figures shift" character function followed by three digit characters identifying the number of the message being received over the incoming line. For the purpose of this description it will be assumed that the present message is the first message received and, consequently, the perforated characters correspond to the digits 001.

In order to condition the incoming line equipment illustrated in Figs. 3 to 8, inclusive, to compare the above noted channel number indicator with the number preregistered in the channel number comparator 900 (Fig. 9) the channel number connecting relay R830 is operated as a result of the sensing of the "figures shift" character function by the tape reader 340. At the time the "figures shift" character is sensed by the tape reader 340 the counting relay R490–14 is in its operated position as previously noted. In accordance with the code illustrated in Fig. 46, the sensing of the "figures shift" character by the tape reader 340 closes the contacts 350, 351, 352, 354 and 355 thereby to operate respectively the relays R470, R410, R420, R440, R450 and R460 over circuits similar to those previously described. As soon as the above mentioned relays are operated a circuit is completed for operating the figures shift relay R480 over a circuit which may be traced from ground by way of the contacts 467, 414, 424, 434, 444 and 454 and the lower winding of relay R480, to battery. The relay R480 upon operating performs several circuit switching operations which are of no importance at the present time. However, at its contacts 483', the relay R480 completes a circuit for operating the channel number connecting relay R830 which may be traced from ground at contacts 478 of the operated relay R470 and then by way of the contacts 483', 550, 678 and 851 and the winding of the relay R830, to battery. Upon operating the relay R830, at its contacts 831, prepares a locking circuit for itself which includes the winding of relay R850 and ground at contacts 813' but the last-mentioned circuit is shunted until the relay R470 restores to normal at the end of the "figures shift" sensing cycle of the tape reader 340.

At the end of the "figure shift" sensing cycle, the relay R470 restores to normal and, at its contacts 475, it immediately completes a locking circuit including the contacts 485 and the upper winding of the relay R480 in order to retain the latter relay in its operated position. Immediately thereafter the remaining sensing relays R410, R420, R440, R450 and R460 also restore to normal in the manner previously described. As a further result of the restoration of the relay R470, at its contacts 478, it interrupts the initial energizing circuit for the relay R830 whereupon the latter relay locks itself in its operated position in series with the relay R850 and the latter relay also operates. As a result of the operation of the relay R850, at its contacts 852A to 852E, inclusive, it connects the channel number sensing relays R860A to R860E, inclusive, to the respective contacts 419, 429, 439, 449 and 459 on the sensing relays R410, R420, R430, R440 and R450. Accordingly the channel number sensing relays may now be controlled by the sensing relays 401 whereby the characters sensed by the tape reader 340 are repeated to the channel number sensing relays where they mark one of the ten conductors in the cable 870 in accordance with the digit of the character sensed by the tape reader 340. In other words the channel number sensing relays R860A to R860E, inclusive, function to decode the code characters corresponding to different digits as sensed by the tape reader 340 into numerical digits for the purpose of checking the numerical digits of the channel number indicator against the numerical digits preregistered in the channel number comparator 900.

Before describing the operations of the sensing relays (Fig. 4) in response to the sensing of the channel number indicator 001 by the tape reader 340 and the control of the channel number sensing relays (Fig. 8) a description will be given of the channel number comparator 900.

*Channel number comparator 900*

As previously indicated, each incoming line at a relay switching center UAC is provided with a channel number comparator, such as the channel number comparator 900 illustrated in Fig. 9. This unit is arranged to compare the "channel number indicator," that is the number of the message being received over the incoming line, with the number preregistered in the channel number comparator 900. More specifically, at the relay switching center UEP connected to the particular incoming line, automatic apparatus is provided for numbering each of the messages transmitted therefrom in sequence from 001 upward to 999. It is contemplated that at midnight, for example, the automatic numbering apparatus at the switching center UEP will be reset to transmit 001 and that each succeeding message transmitted during the twenty-four hours of the day will be numbered with the next higher sequence of three digits. The attendant at the relay switching center UAC also resets the channel number comparator 900, illustrated in Fig. 9, to 001 at midnight of each day in order to start the channel number comparator 900 in the relay switching center UAC at the same message number position as the message numbering apparatus at the relay switching center UEP.

When the first message is transmitted from the sending relay switching center UEP over the incoming line to the receiving relay switching center UAC, it will be identified as channel number indicator "001." If the hundreds, tens, and units digit registers 930, 920 and 910 of the channel number comparator 900 have been reset to register respectively the digits 001, a direct comparison must be made of the number received and the number registered to permit the received message to be processed further by the switching equipment in the relay switching center UAC. As a result of the comparison, the units digit register 910 in the comparator 900 will automatically operate to register the next digit 2 so that the message number 002 will be registered in the comparator 900. The next received message will be identified as channel number indicator 002 and, since this number compares with the number 002 now registered in the comparator 900, the second message will be processed in the manner to be explained hereinafter and the comparator 900 will be automatically controlled to register the next message number 003. Accordingly, if no messages are lost, a received channel number indicator, as read by the tape reader 340, will always agree with the number registered in the channel number comparator 900. When the numbers agree, the line circuit will automatically call for a director in the manner to be explained hereinafter.

If, however, the channel number indicator assigned to an incoming message fails to agree with the number registered in the comparator 900, the associated incoming line circuit equipment will function to illuminate the channel number alarm lamp L644 and it will function to terminate the operation of the tape reader. The illumination of the alarm lamp L644 will indicate to the attendant that a message received over an incoming line is not numbered in sequence with the previously received message and that steps must be taken to locate the missing message or messages.

In order to describe the operation whereby the units, tens, and hundreds digit registers 910, 920 and 930 of the comparator 900 are reset to register the number 001, it will be assumed that the wipers of the units, tens, and hundreds digit registers 910, 920 and 930 are in engagement with certain of the contacts in the associated contact banks to register a three digit number. The attendant now actuates the channel number reset key K937 in order to apply ground potential to all of the multiply connected bank contacts accessible to the wiper 913, 923 and 933 of the above noted registers. Referring first to the hundreds digit register 930, it will be noted that the ground potential is connected by way of the wiper 933, the self-interrupting contacts 932, and the winding of the magnet M931, to battery. The magnet now operates and interrupts its initial operating circuit, at its contacts 932, and, accordingly, restores to normal. The restoration of the magnet M931 causes the wipers 933, 934 and 935 to be advanced one step into engagement with the next set of contacts. If the wiper 933 again engages a grounded bank contact, the above described cycle of operation will be repeated in order to advance the wipers into engagement with the next set of contacts. Accordingly, the wipers of the hundreds digit register 930 will be advanced step-by-step over the associated bank contacts until the wiper 933 engages the ungrounded contact 1. At this time the self-interrupting stepping circuit of the magnet M931 will be terminated and the wiper 935 will be in engagement with the contact 1 terminating the "0" marking conductor in the cable 870. It may be well to mention that the contacts 2 to 10, inclusive, associated with the wiper 935 are respectively connected to the marking conductors "1" to "9," inclusive.

Each of the above noted conductors "0" and "1" to "9," inclusive, are respectively connected to the contacts 1 to 10, inclusive, accessible to the wipers 925 and 915 of the tens and units digit registers 920 and 910.

Referring now to the tens digit register 920, it will be noted that the ground potential applied to the contacts accessible to the wiper 923, by the key K937 will also complete a self-interrupting circuit for the magnet M921 whereby the wipers 923 to 925, inclusive, are advanced step-by-step until the wiper 923 engages the contact 1 in the associated contact bank. In this position, the self-interrupting circuit will be terminated and the wiper 925 will be connected to the "0" marking conductor terminating in contact 1.

Referring now to the units digit register 910, it will be seen that a similar self-interrupting circuit is completed for the magnet M911 whereby the wipers 913 to 915, inclusive, are advanced step-by-step until the wiper 913 thereof engages the ungrounded contact 2 in the associated contact bank. Particular attention is directed to the fact that the wipers of the units digit register 910 are reset to the contacts 2 in the associated contact banks instead of the contacts 1. In this position the wiper 925 engages the marking conductor "1" instead of the marking conductor "0." Accordingly, the hundreds, tens and units digit registers 930, 920 and 910 are now reset to register respectively the digits "001." Since the homing action of the above noted registers is extremely fast it is only necessary for the attendant to momentarily hold the reset key K937 in its closed position.

*Comparing the channel number indicator*

Referring again to the operation of the sensing relays in response to the sensing of the "figures shift" character of a channel number indicator by the tape reader 340, it will be recalled that the figures shift relay R480 and the channel number connecting relay R830 are operated. It will also be recalled that at the conclusion at the "figures shift" sensing operation the sensing relays R410, R420, R440, R450, R460 and R470 restored to normal thereby causing the operation of the relay R850 in series with the relay R830. In response to the operation of the relay R850, the channel number sensing relays R860A to R860E, inclusive, are connected respectively to the contacts of the corresponding sensing relays R410 to R450, inclusive. In this manner the channel number sensing relays are conditioned to be operated in accordance with the successive digits of the channel number indicator in order to compare the number with the number preregistered on the digit registers of the channel number comparator 900.

In view of the foregoing, it will now be assumed that the tape reader 340 senses the code of the digits 001 perforated on the tape 333. When the hundreds digit 0 is sensed by the tape reader 340, the contacts 350, 352, 353 and 355 are closed in the manner previously described thereby causing first the operation of the sensing relay R470, then the operation of the sensing relays R420, R430 and R450. As soon as the last-mentioned relays operate, the sensing relay R460 is also operated and, at its contacts 466, it interrupts the remaining locking circuit for the upper winding of relay R480, which restores to normal. At the contacts 429, 439, and 459, the relays R420, R440 and R450, respectively, complete obvious circuits for operating respectively the channel number sensing relays R860B, R860C and R860E. At this point it should be noted that the various contacts shown to the right of the sensing relays R860A to R860E, inclusive, are connected in pyramid form so that by operating the various relays individually or in certain combinations any one of the ten marking conductors 1 to 9, inclusive, and 0 may be marked in accordance with the operated condition of the channel number sensing relays. Since the pyramid construction of the contacts on these relays and the circuits therefore are well understood, it is not deemed necessary to explain the circuits therethrough in detail. In the present example, the operation of the channel number sensing relays R860B, R860C and R860E close circuits through the pyramid contacts noted whereby the ground potential supplied at the left-hand contacts of the three relays noted is extended through the pyramid contacts to ground the 0 marking conductor in the cable 870.

Referring now to Fig. 9, it will be seen that the 0 marking conductor is multiply connected to the first contact in the three contact banks accessible to the wipers 935, 925, and 915, respectively, of the hundreds, tens and units digit registers 930, 920 and 910. The ground potential applied to the 0 marking conductor is further extended by way of the wiper 935 in engagement with the contact 1, conductor C882 extending to Fig. 8, contacts 812, contact 1 in the contact bank of the channel number sequence switch 800 engaged by the wiper 822 and the winding of the test relay R840 to battery. In this circuit the test relay R840 is operated immediately after the operation of the channel number sensing relay if the marking conductor in the cable 870 corresponds to the hundreds digit preregistered in the register 930. In the present example, the 0 marking conductor has been grounded by the operation of the sensing relays R860B, R860C and R860E and since the wiper 935 of the hundreds digit register 930 is in engagement with the contact 1 terminating the 0 marking conductor and the channel number sequence switch 800 has its wiper 822 in engagement with the contact 1, the test relay R840 is operated to indicate that the hundreds digit of the channel number indicator corresponds with the hundreds digit preregistered in the channel number comparator 900.

As soon as the relay R840 operates, it interrupts at its contacts 842, a point in the circuit including the grounded left-hand contacts of the operated sequence relays, the contact 811′ and the winding of the slow-to-operate channel number failure relay R640.

In considering the last-mentioned circuit, it should be noted that if the channel number indicator comparison test fails, i. e., the relay R840 is not operated, the slow-to-operate relay R640, after a slight delay, will operate and lock itself in its operated position to the grounded alarm release key K668. Also, at its contacts 642, the relay R640 will interrupt the circuit including conductors C775 and C776 in order to terminate the further operation of the tape reader 340. Finally, at its contacts 641, the relay R640 completes an obvious circuit for illuminating the channel number failure alarm lamp L644 in order to indicate to the attendant that the received channel number indicator does not correspond to the channel number preregistered in the comparator 900.

As pointed out above, however, the test relay R840 operates, and, consequently, interrupts, at its contacts 842, the circuit for the channel number failure alarm relay R640 before the latter relay has had sufficient time to operate and lock. As a further result of the operation of relay R840, at its contacts 841, it completes an obvious circuit for operating the magnet M820 of the channel number sequence switch 800.

Since it has been assumed that a successful comparison has been made of the hundreds digit 0 of the channel number indicator 001, the tape reader 340, upon completion of its cycle of operation, causes the restoration of the various sensing relays R410 to R470, inclusive. As soon as the sensing relays R420, R430 and R450 restore to normal, they interrupt at their contacts 421, 439 and 459, the previously traced circuit for the channel number sensing relays R860B, R860C and R860E, in order to restore the last-mentioned relays. As soon as the channel number sensing relays restore to normal, ground potential is removed from the 0 marking conductor in the cable 870 thereby interrupting the circuit for the test relay R840, which relay upon restoring interrupts, at its contacts 841, the operating circuit for the magnet M820. The magnet M820 now restores to normal and in a conventional manner advances its wipers 822 to 824, inclusive, one step in a counterclockwise direction into engagement with the contacts 2. In this manner, the wiper 822 now connects the test relay R820 to the conductor C883 so that a test may now be made of the tens digit 0 of the channel number indicator 001.

Since the tens digit of the channel number indicator is also the digit 0, the tape reader 340, the sensing relays 401 (Fig. 4) and the channel numbers sensing relays (Fig. 8) are reoperated in the same manner as has been described above, in order to again ground the 0 marking conductor in the cable 870. The ground potential applied to the 0 marking conductor is now extended by way of the wiper 925 of the tens digit register 920 in engagement with the contact 1 and the winding of the test relay R840, to battery. The relay R840 again operates, first to interrupt the alarm relay control circuit, at its contacts 842, and second to complete the circuit for operating the magnet M820.

At the end of the sensing cycle of the tape reader 340, the various sensing relays are again restored to normal and as a result thereof, the relay R840 interrupts, at its contacts 841, the previously described circuit for the magnet M820. The magnet M820 upon restoring again advances its wipers one step into engagement with the contacts 3 thereby to prepare the testing circuit for the units digit of the channel number indicator 001.

The tape reader 340 now senses the units digit 1 perforated on the tape 333 and as a result thereof closes its contacts 350, 351, 352, 353 and 355 in order to operate the sensing relays R470, R410, R420, R430 and R450, as well as the relay R460. At the contacts 419, 429, 439 and 459, circuits are now completed for operating the channel number sensing relays R860A, R860B, R860C and R860E, whereupon, ground potential at the left-hand contacts of the operated relays is extended through the pyramid circuit to the marking conductor 1 in the cable 870. In the channel number comparator 900, the ground potential applied to the marking conductor 1 in the cable 870 is extended by way of the wiper 915 in engagement with the contact 2, conductor C884 extending to Fig. 8, contacts 814, wiper 822 in engagement with the bank contact 3 and the winding of the test relay R840, to battery. The test relay R840 again operates and completes the circuit for operating the magnet M820.

At the end of the sensing cycle of the tape reader 340, the various operated sensing relays R410 to R470 are again restored to normal together with the operated channel number sensing relays R860A, R860B, R860C and R860E. The restoration of the last-mentioned relays interrupt the circuit for the test relay R840 which also restores to normal and, in turn, at its contacts 841, causes the restoration of the magnet M820. Upon restoring, the magnet M820 now advances its wipers 822 to 824, inclusive, an additional step in a counterclockwise direction into engagement with the contacts 4. The wiper 824 in engagement with the contact 4 in the associated contact bank completes an obvious circuit for operating the channel number complete relay R810 over a circuit including its upper winding. The latter relay now operates and, at its contacts 812', locks itself to ground at contacts 674.

Since the channel number indicator 001 sensed or detected by the tape reader 340 is identical with the number 001 preregistered in the channel number comparator 900, the channel number sequence switch 800 has successively advanced its wipers over its associated bank contacts until it has completed the operating circuit for channel number complete relay R810. Thus, the operation of relay R810 indicates that the number of the message being received at the relay switching center UAC from the relay switching center UEP checks with the number preregistered in the comparator 900. As a further result of the operation of relay R810, at its contacts 819, it applies ground potential to the multiply connected contacts 2 to 10, accessible to the wiper 823 of the channel number sequence switch 800. Consequently, an obvious circuit is completed by way of the self-interrupting contacts 821 and the winding of the magnet M820, whereby the wipers of the switch 800 are automatically advanced step-by-step until the wiper 823 engages the contact 11. In this position, the wiper 823 completes an additional circuit for operating the magnet M820 and, at its contacts 821, the circuit is interrupted thereby advancing the wipers 822 to 824, inclusive, an additional step from the contacts 11 into engagement with the contacts 1.

As a further result of the operation of the relay R810, at its contacts 812 to 814, inclusive, it disconnects the test relay R840 from the hundreds, tens and units conductors C881, C882 and C883. Also, at its contacts 811, the relay R810 completes a circuit, including the conductor C881 extending to Fig. 9, and the winding of the magnet M911, whereby the magnet of the units digit register 910 is operated. Shortly after its operation, the relay R810 will be restored to normal, in the manner to be described hereinafter, in order to interrupt, at its contacts 811, the above traced circuit for the magnet M911. When this occurs, the magnet M911 restores to normal and in a conventional manner advances its wipers 913 to 915, inclusive, one step in a counterclockwise direction so that the wiper 915 will now be in engagement with the contact 3 in the associated contact bank terminating the number 2 marking conductor in the cable 870. As soon as this operation is completed, the channel number comparator 900 preregisters the number 002 of the next message to be received.

From the foregoing description of the mode of operation of the incoming line circuit 400 and the channel number comparator 900, it will be appreciated that the channel number indicator of each message is detected and checked against the number preregistered in the channel number comparator. As each number is successfully checked in the manner described above, the units digit register 910 is advanced an additional step in order to preregister the next units digit in the three digit number.

*Automatic registration of a channel number by the channel number comparator 900*

In view of the foregoing, it will be appreciated that the units digit register 910 will be automatically controlled after each check is made of a received channel number indicator, until the wipers 913 to 915, inclusive, are advanced into engagement with the contacts 10 in the associated contact bank to preregister the units digit 9. After a comparison has been made of the message having the channel number indicator 009, the relay R810 is operated and completes the above traced circuit, including the conductor C881, for operating the units digit register magnet M911. The operating ground potential is also extended by way of the wiper 914, in engagement with the contact 10, and the winding of the magnet M921 of the tens digit register 920, to battery. Shortly after these circuits are completed, the relay R810 restores to normal thereby interrupting, at its contacts 811, the above traced circuits for the magnet M911 and the magnet M921. At this moment the magnet M911 will restore and advance its wipers 913 to 915, inclusive, into engagement with the contacts 11 and the magnet M921 will restore and advance its wipers 923 to 925, inclusive, into engagement with the contacts 2. It should be noted, however, that when the wiper 913 engages its contacts 11, the self-interrupting circuit, including the contacts 912, is again completed for the magnet M911 thereby to cause the magnet to again advance its wipers one step into engagement with the contacts 1 in the associated contacts banks. Consequently, the hundreds, tens and units digit registers of the channel number comparator 900 will now preregister the channel number 010.

In view of the foregoing, it will be appreciated that upon every tenth operation of the magnet M911, a cercuit including its wiper 914 is also completed for operating the magnet M921 of the tens digit register. After the magnet M921 of the tens digit register has been operated ten times to advance its wiper 924 into engagement with the contact 10, the three magnets M911, M921 and M931 will be operated in multiple so that the hundreds digit register 930 will register the hundreds digit 1, the tens digit register 920 will register the tens digit 0 and the units digits register 910 will register the units digit 0. Thus, the registers in the channel number comparator 900 will be automatically controlled to successively register the numbers 001 to 999, inclusive, and it should be understood that after the registration of the number 999, the receipt of another message will cause the comparator to register number 000 to indicate that one thousand messages have been received by the incoming line circuit 400 illustrated in Figs. 3 to 8, inclusive. It will be apparent, however, that if the traffic over the incoming line exceeds 999 messages in a twenty-four hour period, a fourth or thousands register, wired and connected in substantially the same manner as the hundreds digit register 930, may be supplied so that the numbers of the messages received may include four digits, for example, 0001 to 9999.

In order to provide facilities for the attendant to separately control the three registers 910 to 930, inclusive, in the channel number comparator 900, three manual keys, K916, K926 and K936 are individually associated with the units, tens and hundreds registers. Consequently, if any one of the keys are momentarily actuated, a momentary circuit will be completed for the magnet of the corresponding register whereby the associated wipers will be advanced one step. Thus the wipers of the units, tens and hundreds registers may be selectively set to register any number by manually controlling the keys K916, K26 and K36. It will also be noted that if the wipers of 914 and 924 are in engagement with the contacts 10 in the associated banks at the time the key K916 is operated, the units, tens and hundreds registers will be operated in the manner previously explained. Also, if the key K926 is momentarily operated at this time the tens and hundreds registers will be operated.

*Calling for a director*

Referring again to the channel number complete relay

R810 which was operated at the conclusion of a successful check of the channel number indicator 001, it should be noted that upon operating the relay R810, at its contacts 815, interrupts a point in the circuit including the conductors C775 and C776, in order to restore the magnet M344 of the tape reader 340. This operation is performed at this time in order temporarily to prevent the tape reader 340 from sensing additional perforations on the tape 333 until after a director has been associated with the calling incoming line 400 illustrated in Figs. 3 to 9, inclusive. In order to initiate operations whereby a director is associated with the incoming line, the relay R810, at its contacts 816, connects the director seize relay R660, to the TG conductor C826 extending to Fig. 10, and, at its contacts 814', it connects ground potential to the CON conductor C825 extending to Fig. 10.

Figure 11:
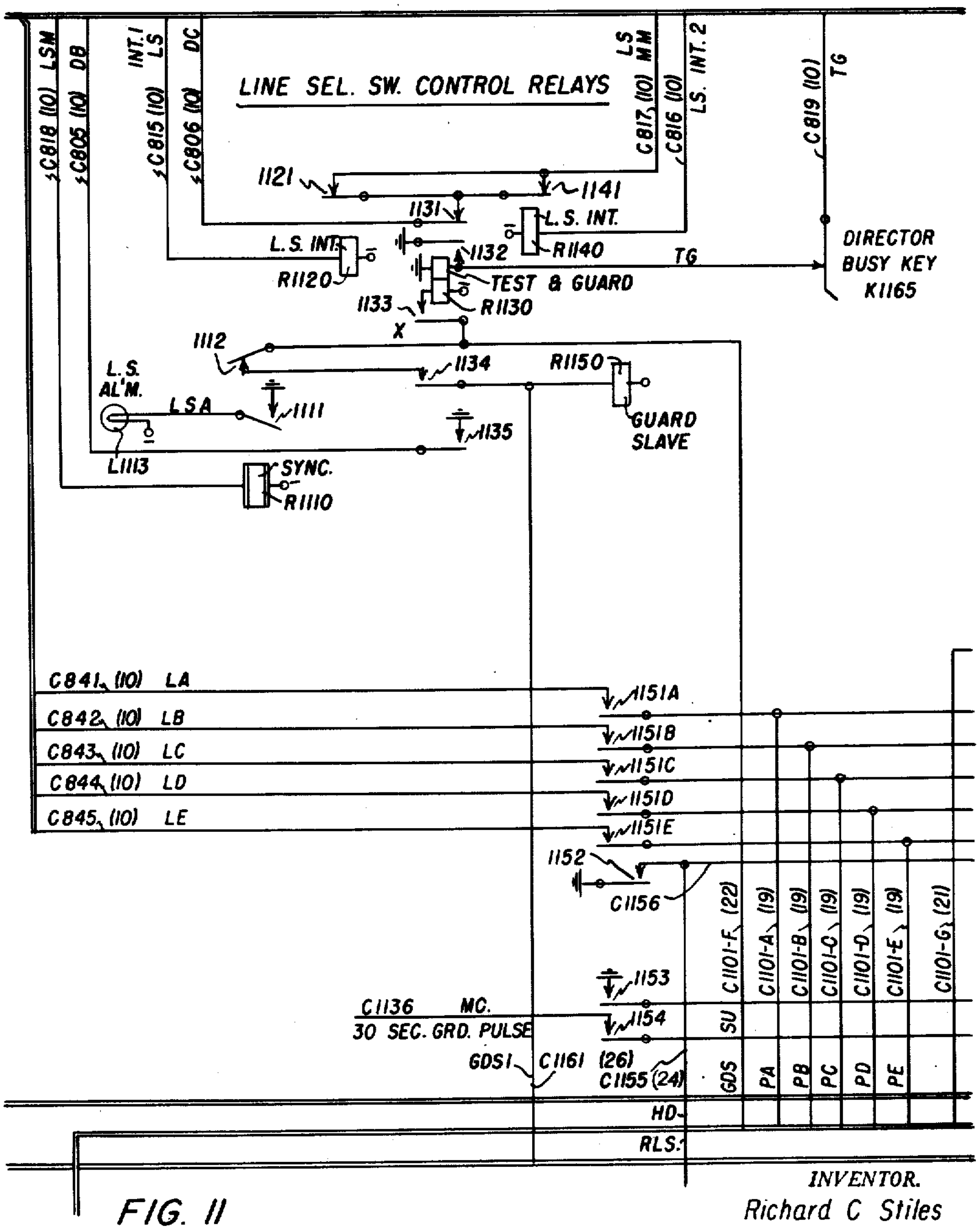
Figure 12:
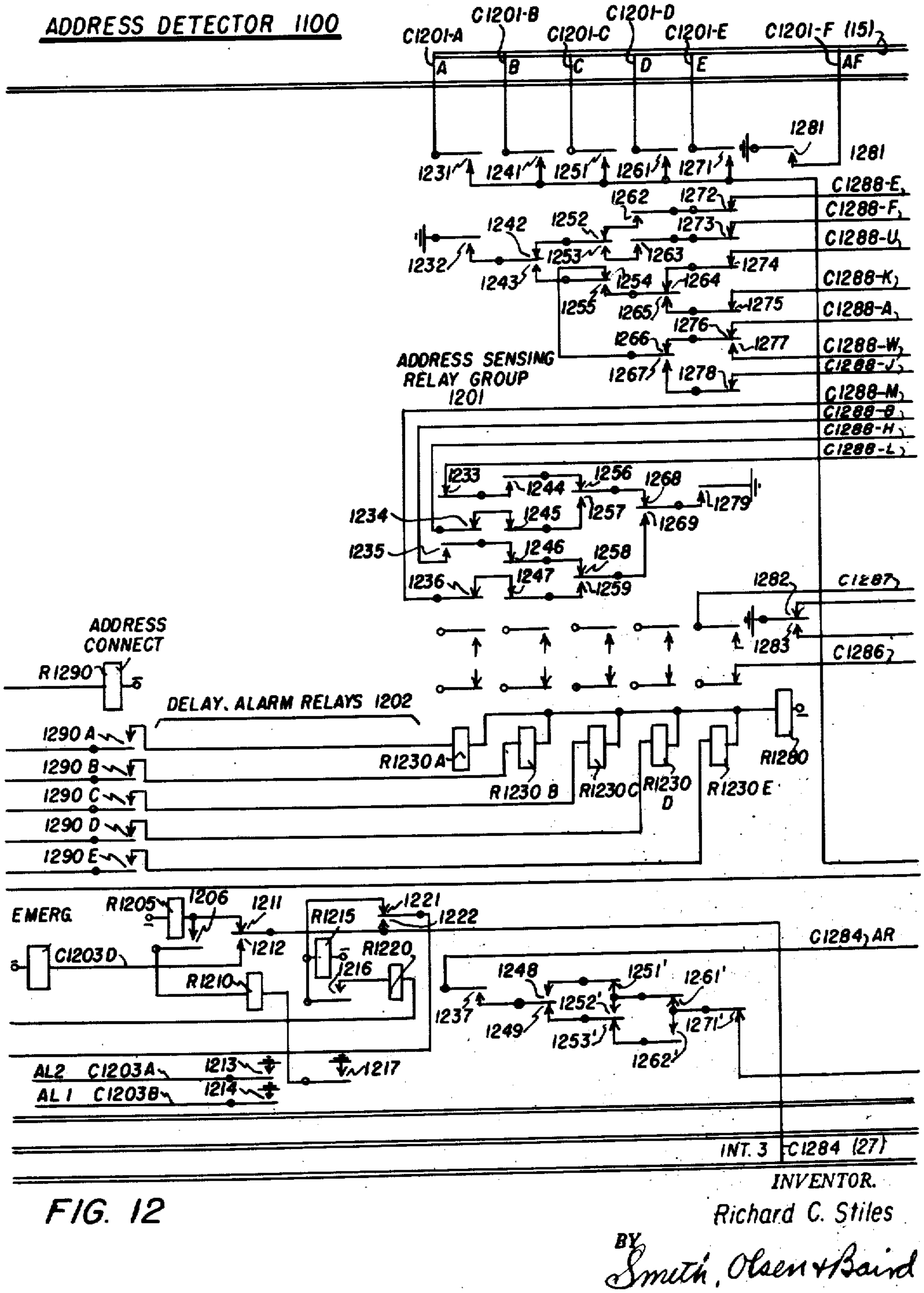
Figure 13:
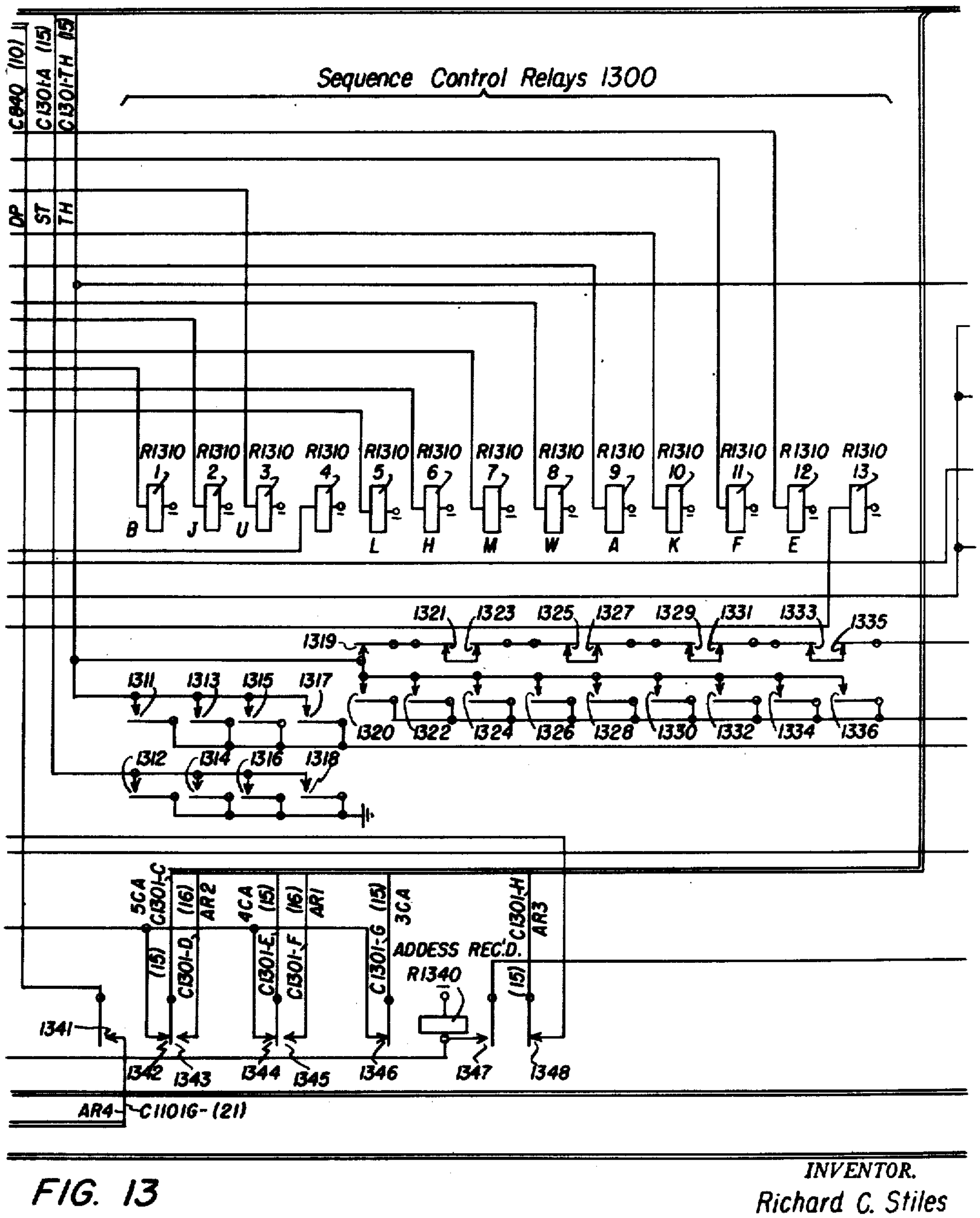
Figure 14:
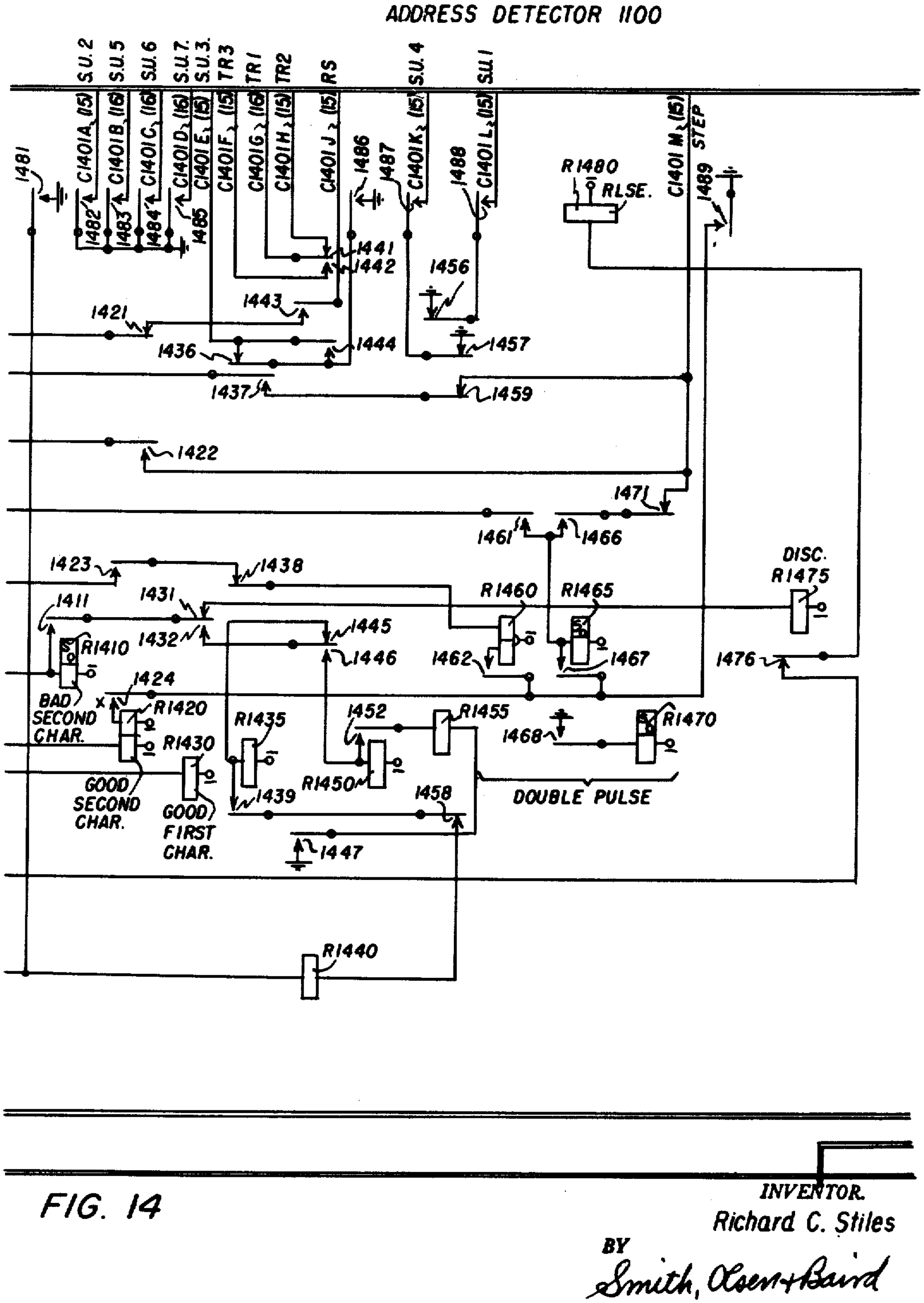

Referring now to Fig. 10, it will be seen that the ground potential applied to the CON conductor C825, is extended by way of the wiper 804 of the director assigner 800 in engagement with its contact 1, conductor C806 extending to Fig. 11, contacts 1131, contacts 1121 and 1141 in multiple, conductor C817 extending to Fig. 10 and the windings of the multiply connected magnets M820 and M830, to battery. The magnets M820 and M830, of the line selector 810 control the stepping of the wipers 821 to 829, inclusive, and 831 to 838, inclusive. It will be appreciated by those skilled in the art, that one magnet having all of the illustrated wipers may also be utilized as the line selector 810. As soon as the above traced circuit is completed for the magnets M820 and M830, they operate and close their contacts 813 and 814 in order to apply ground potential to the conductors C815 and C816 extending to Fig. 11.

In Fig. 11 it will be seen that the ground potential applied to C815 completes the operating circuit for the line selector interrupter relay R1120 and that the ground potential applied to the conductor C816 completes the operating circuit for the line selector interrupter relay R1140. At their contacts 1121 and 1141, the relays R1120 and R1140 interrupt the respective circuits for the magnets M820 and M830. The magnets now restore to normal and advance their wipers one step to the next set of bank contacts. When the magnets restore, they again interrupt the circuits for the relay R1120 and R1140, and the latter relays, at their contacts 1121 and 1141, recomplete the operating circuits for the magnets M820 and M830. In this manner, the magnets M820 and M830 interact with the relays R1120 and R1140 to advance the wipers of the line selector 810, step-by-step to search for the calling incoming line circuit 400 illustrated in Figs. 3 to 9, inclusive.

*Director 200A seizes the incoming line 400*

The calling incoming line 400 is marked as calling by battery potential applied to the TG conductor C826 accessible to the wiper 832 and when this conductor is engaged by the wiper 832, a circuit is completed for operating the test and guard relay R1130 (Fig. 11) in order to terminate further stepping of the wipers of the line selector 810. This circuit may be traced from ground by way of the upper windings of the relay R1130, the contacts of the director busy key K1165, conductor C819 extending to Fig. 10, wiper 832 in engagement with the contact 1, the TG conductor C826 extending to Fig. 8, contacts 816 and 664 and the winding of the director seize relay R660, to battery.

The relay R1130 operates over the above traced circuit in series with the marginal relay R660 but due to the high resistance of the upper winding of the relay R1130, the relay R660 does not operate at this instant. As soon as relay R1130 operates, it closes its "X" contact 1133, thereby completing an operating circuit for its lower winding by way of the GDS–SU conductor C1101F extending to Fig. 22 and ground at contacts 2251. As soon the lower winding of the relay R1130 is operated over the last-mentioned circuit, it actuates its remaining contacts whereby, at its contacts 1131, it interrupts the previously traced circuit including the conductors C806 and C817 in order to terminate further stepping of the line selector 810. Thus, the step-by-step advancement of the wipers of the line selector 810 is stopped as soon as they engage the contacts terminating the calling incoming line circuit 400.

As a further result of the operation of relay R1130, at its contacts 1134, it connects the grounded GDS–SU conductor C1101F by way of the contacts 1112 and the winding of the guard slave relay R1115 to battery. This operating ground potential is also extended by way of the GDS–1 conductor C1161 extending to Fig. 26, and the winding of the seizure relay R2620, to battery, in order to operate the latter relay in multiple with the guard slave relay R1150.

Also, at its contacts 1135, the relay R1130 applies ground potential by way of the conductor C805 and the winding of the magnet M801 of the director assigner 800, to battery. As soon as this circuit is completed, the magnet M801 operates and interrupts its operating circuit at its contacts 802. The magnet now restores to normal and in a conventional manner advances its wipers 803 and 804 one step in a clockwise direction to the next set of contacts terminating the conductors extending to a second director. Consequently, if another incoming line circuit is calling for a director, the CON conductor C825 of the calling incoming line circuit will be grounded and will initiate operation of the second director, whereby the second director is connected by way of its line selector to the second calling incoming line circuit.

Finally, the relay R1130, at its contacts 1132, applies a ground potential to the TG conductor C819 in order to shunt its high resistance upper winding from the previously traced circuit for the marginal director seize relay R660 in order to operate the last-mentioned relay.

Before describing the circuit operations controlled by the guard slave relay R1150 and the director seize relay R660, it should be noted that in the line selector 810, each of the contacts engaged by the wiper 821 are directly connected to corresponding contacts accessible to the wiper 831. As long as the wipers 821 and 831 engage corresponding contacts in the associated contact banks, the ground potential applied to the wiper 821 is extended by way of the wiper 831, conductor C818 extending to Fig. 11, and the winding of the synchronizing relay R1110, to battery. As long as the wipers 821 and 831 are in synchronism and engage corresponding bank contacts the slow-to-release relay R1110 is retained in its operated position. If the wipers of the two switches controlled respectively by the magnets M820 and M830 of the line selector 810 should get out of step, the circuit for retaining the relay R1110 operated will be interrupted and the relay will restore to normal. If the relay R1110 should restore, it completes, at its contacts 1111, an obvious circuit for illuminating the line selector alarm lamp L1113 in order to indicate to the attendant that the rotary switches of the line selector 810 are out of step and should be synchronized. Also, at its contacts 1112, the relay R1110 will prevent operation of the guard slave relay R1150 should the relay R1130 be inadvertently operated.

When the guard slave relay R1150 operates, as previously described, at its contacts 1151A to 1151E, inclusive, it prepares circuits for connecting the windings of the address sensing relay group 1201 to the conductors C841 to C845, respectively, extending to Fig. 10. In other words, the address sensing relay group 1201 in the address detector 1100 are prepared for connection over circuits including the conductor C841 to C845, inclusive, wipers 823 to 827, inclusive, of the line selector 810, conductors C601 to C605, inclusive, contacts 667A to 667E, inclusive of the director seize relay R660 and the contacts 419, 429, 439, 449, and 459 of the sensing relays R410, R420, R430, R440 and R450 in the incoming line circuit 440 so that the characters of the routing indicator or address portion of the message sensed by the tape reader 340 will be registered in the address detector 1100.

As a further result of the operation of the guard slave relay R1150, at its contacts 1152, it applies ground potential over a circuit including the conductor C1156 and the contacts 1476 for operating the release relay R1480. The last-mentioned relay upon operating provides, at its various contacts, holding ground potentials for certain of the switching units included in the director 200A. The various conductors over which the locking ground potentials are extended are referred to in the present description as locking conductors. These locking conductors all extend to the routing register circuit 1500, illustrated in Figs. 15 and 16, and will be described in conjunction with the locking circuits for the relays disclosed therein.

Returning again to the contacts 1152 on the operated relay R1150, it will be seen that the ground potential thereat is also extended over the RLS–HD conductor C1155 extending to Figs. 24 in order to operate the release relay R2500 in the precedence detector 2300 (Figs. 23 to 25, inclusive). The relay R2500 will remain operated until the director 200A is disconnected or released from the incoming line circuit 400.

Figure 19:
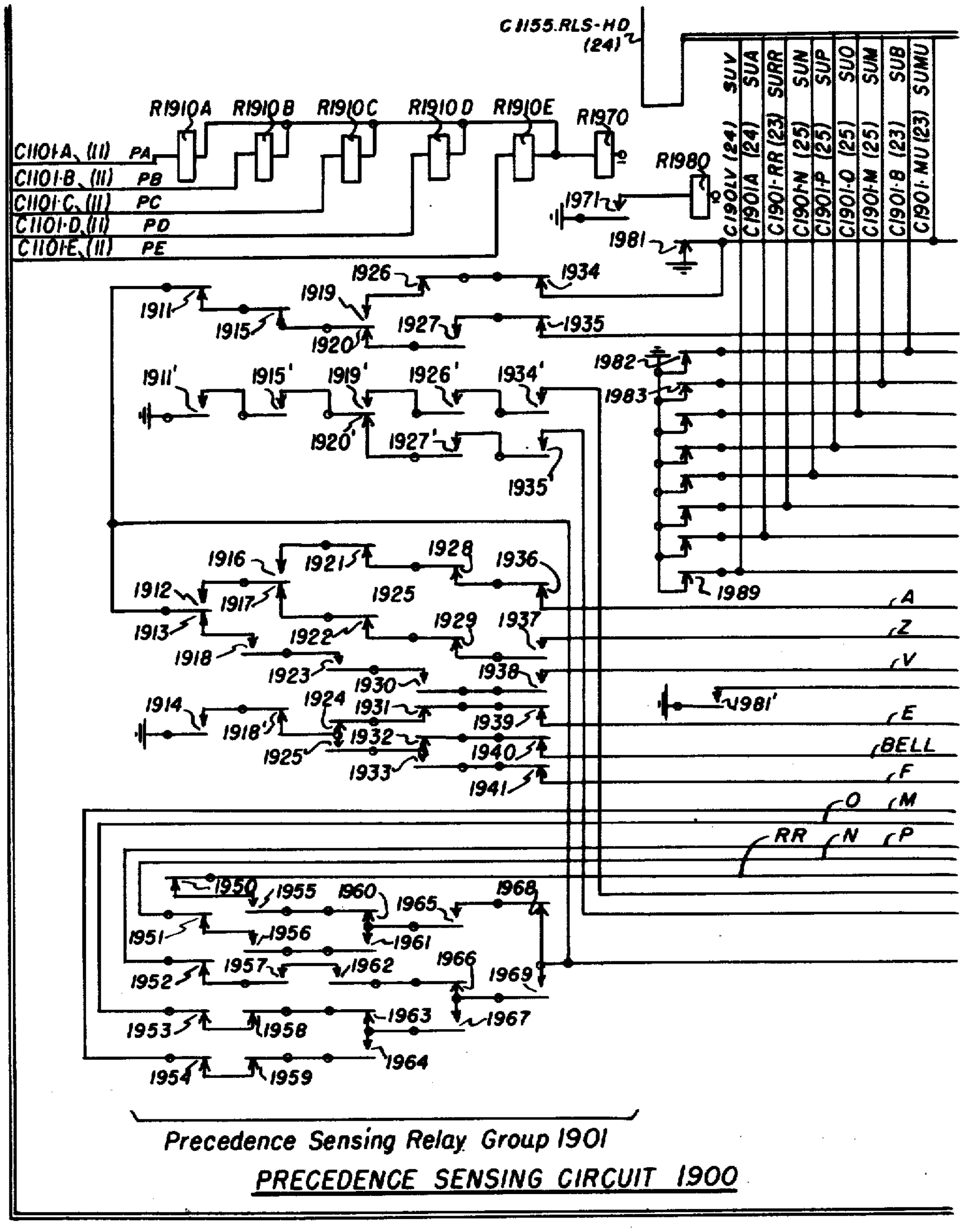
Figure 20:
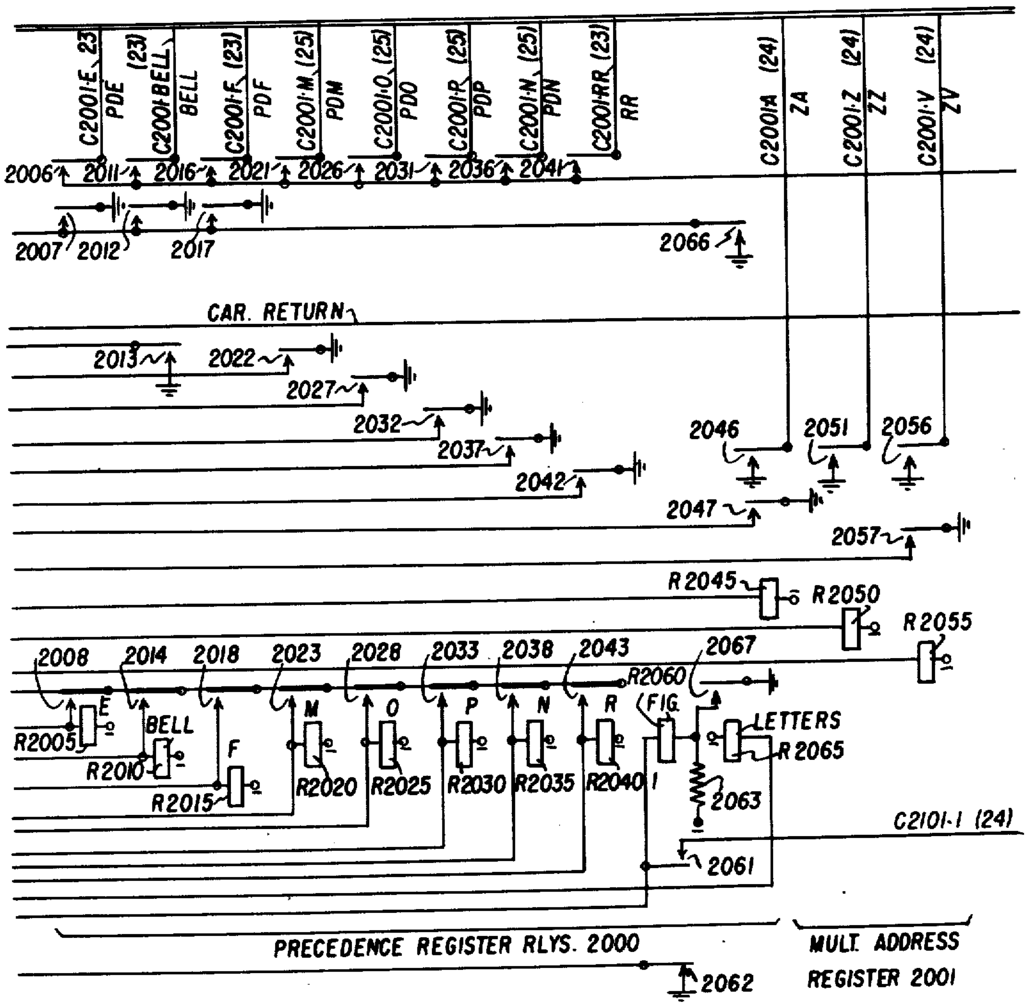

Before concluding the description of the circuit connections resulting from the operation of the guard slave relay R1150, it should be noted that at the contacts 1151A to 1151E, the relay also connects the conductor C841 to C845, inclusive, to the conductors C1101A to C1101E, respectively, extending to Fig. 19 where they respectively connect to the individual relays of the precedence sensing relay group 1901. During the sensing of the routing indicator or address portion of a received message by the tape reader 340, the relays in the address sensing relay group 1201 and the relays in the precedence sensing relay group 1901 will be operated in multiple. The latter relays register in the precedence sensing circuit 1900, the precedence indicator of the received message and the former relays register in the address detector circuit 1100, the routing indicator of the called destination of the message. However, at the time the precedence sensing relay group 1901 is operated in accordance with the precedence indicator of the received message the address sensing relays 1201 are disconnected so they will not respond to the characters of the precedence indicator.

Returning now to the incoming line circuit 400, it will be recalled that the marginal director seize relay R660 was operated under control of the test and guard relay R1130 in the address detector 1100. As soon as the relay R660 operates, it completes at its contacts 665, an obvious circuit for locking the relay to ground at contacts 674 and, at its contacts 664, it interrupts its initial operating circuit. As a further result of the operation of relay R660, at its contacts 666, it removes ground potential from the CON conductor C885, thereby to prevent seizure of the second director, by the incoming line circuit 400, which will be assigned for use by the director assigner 800 in the manner noted above. At its contacts 667A to 667E, inclusive, the relay R660 connects the various sensing leads C601 to C605, inclusive, to contacts of the sensing relays R410 to R450, inclusive. Finally, at its contacts 661, the relay R660 connects the conductor C776 by way of the contacts 652, 642, 612 and 714 to the conductor C775 in order to reoperate the magnet M344 in the tape reader 340. The last-mentioned circuit, however, is completed only in the event that the contacts 342 of the slack tape switch 341 are closed to indicate that the tape 333 is slack and may be sensed by the tape reader 340.

*Operation of the precedence sensing circuit 1900*

The next item of information appearing on the received message and sensed by the tape reader 340 is the precedence indicator which indicates the priority of the message being received. This item of information appears on the perforated tape following the channel number indicator (Figure shift-001) and is preceded by two "carriage return" functions and one "line feed" function. The code perforations of the "carriage return" and "line feed" functions operate the various sensing relays, in the manner described hereinbefore, but these functions are not registered at the present time. As previously noted, the "carriage return" and "line feed" functions are inserted between the various items of information on the message for the purpose of controlling a conventional automatic typewriter mechanism.

The precedence indicator indicates to the director 200A the importance of the message being received and as previously explained six degrees of precedence may be used in indicating the importance of a message. The different degrees of precedence are identified by the following symbols:

A. "Flash" is indicated by five "Bell" characters followed by the characters of the letters FL.

B. "Emergency" is indicated by five "Bell" characters followed by the characters of the letters EM.

C. "Operational immediate" is indicated by the characters of the letters OPOP.

D. "Priority" is indicated by the characters of the letters PP.

E. "Routine" is indicated by the characters of the letters RR.

F. "Deferred" is indicated by the characters NMNM.

The above precedence indicators are listed in their order of importance with the "flash" precedence having priority over all lower precedences, "emergency" having precedence over all precedences lower than "flash," and "operational immediate" having precedence over the remaining three lower classes of precedence. The three above named high precedences, when sensed by the precedence sensing circuit 1900, control the director so that it will interrupt or "bust" all messages of lower precedence when any of the lower precedence messages are blocking the immediate transmission of a higher class precedence message. The three low classes of precedence, when sensed by the precedence sensing circuit 1900, must wait for the completion of any lower class precedence message being transmitted but will then be transmitted even though other low precedence messages are awaiting transmission.

In order to detect the different degrees of precedence, the precedence detector 2300 illustrated in Figs. 23 to 25, inclusive, is provided with an individual detector circuit for each degree of precedence except for "flash" and "emergency" which are detected by a single detector circuit. As is illustrated in the precedence detector 2300, the flash and emergency detector 2300–FE is provided to detect and register the "flash" and "emergency" precedence indicators; the operational immediate detector 2300–OP is provided to detect and register the "operational immediate" precedence indicator; the priority detector 2300–PP is provided to detect and register the "priority" precedence indicator; the routine detector 2300–RR is provided to detect and register the "routine" precedence and the deferred detector 2300–NM is provided to detect and register the "deferred" precedence indicator. The precedence detector 2300 is also provided with a multiple address detector 2300–MA for detecting and registering a multiple call indicator and which is brought into use to determine whether or not a received message is to be retransmitted to more than one called destination.

In the previous description it was pointed out that the various sensing leads controlled by the contacts 419, 429, 439, 449 and 459 of the relays in the sensing relay group 401 in the incoming line circuit 400 are now connected by way of the contacts 667A to 667E, inclusive, conductors C601 to C605, inclusive, wipers 823 to 827, inclusive, of the line selector 810, conductors C841 to C845, inclusive, contacts 1151A to 1151E, inclusive, conductors C1101A to C1101E, inclusive, to the windings of the relays R1910A to R1910E, inclusive, in the precedence sensing circuit 1900 so that the latter relays will be controlled in accordance with the characters sensed by the tape reader 340.

The operation of the precedence sensing circuit 1900 and the precedence detector 2300 to detect the characters of the different precedence indicators will now be described.

*Detecting a "deferred" precedence indicator (NMNM)*

It will now be assumed that the tape reader 340 has sensed the first character "N" of a "deferred" precedence indicator (NMNM), and as a result thereof, the contacts 353 and 354 will be closed during the sensing cycle. The contacts 350 are also closed during the sensing cycle to operate the relay R470 in the incoming line circuit 400 in order to provide the usual locking circuit for the operated ones of the relays R410 to R450 and to operate the relay R460. The contacts 353 and 354 complete circuits for operating the sensing relays R430 and R440 whereby the latter relays, at their contacts 439 and 449, complete circuits over the previously traced sensing conductors for operating respectively the sensing relays R1910C and R1910D in series with the relay R1970 included in the precedence sensing relay group 1901.

As soon as the relay R1970 operates, it completes an obvious circuit for operating the slave relay R1980 and the latter relay, at its contacts 1981 to 1989, inclusive, removes ground potential from each of the conductors C1901–A, B, M, N, O, P, V, RR, and MU extending to the precedence detector 2300. Also, at its contacts 1981′, the relay R1980 provides a locking ground potential for the precedence register relays 2000.

The sensing relays R1910C and R1910D, at their contacts 1961 and 1965, complete a circuit including the contacts 1968, 1956 and 1951 for operating the N relay R2035 in the precedence register relays 2000. As soon as the relay R2035 operates, it locks itself, by way of its contacts 2038, to ground at contacts 1981′. Also, at its contacts 2036, the relay R2035 connects the ground at contacts 2112 by way of the conductor C2001N extending to Fig. 25, contacts 2566 and the winding of the NM1 relay R2560, to battery. The relay R2560 operates and, at its contacts 2561, prepares a point in a circuit for operating the NM2 relay R2565, in series therewith, as soon as ground potential is removed from the conductor C2001–N. Finally, at its contacts 2037, the relay R2035 applies ground potential to the conductor C1901–N extending to Fig. 25 but at the present time this performs no operating control.

At the completion of the testing cycle by the tape reader 340 of the first precedence indicator "N" the contacts 353, 354 and 350 are opened in order to restore the relays R430, R440, R460 and R470 to normal. At the contacts 439 and 449, the relays R430 and R440 interrupt the previously traced circuits for the relays R1910C, R1910D and R1970 in the precedence sensing relay group 1901. As soon as the relays R1910C and R1910D restore, they interrupt, at their contacts 1961 and 1965, the initial operating circuit for the relay R2035 but the latter relay remains in its operated position until its locking circuit is opened at the contacts 1981′ by restoration of the relay R1980. As soon as the relay R1970 restores to normal, it interrupts, at its contacts 1971, the circuit for the relay R1980 and the latter relay, at its contacts 1983, applies ground potential by way of the conductor C1901–M extending to Fig. 25, contacts 2591, 2577, winding of the NM2 relay R2565, contacts 2561 and the winding of the NM1 relay R2560, to battery. The last-mentioned circuit is completed in order to operate the relay R2565 and to lock the relay R2560 in series therewith as soon as the N relay R2535 restores to normal. Thus, the relay R1980, at its contacts 1981′, opens the locking circuit for the relay R2035 and the latter relay, upon restoring, opens its contacts 2036 in order to interrupt the initial energizing circuit for the relay R2560. As soon as the relays R2560 and R2565 operate in series, a circuit is prepared at the contacts 2568 for controlling the NM3 relay R2570 over the conductor C2001–M. At its contacts 2567, the relay R2565 prepares a point in a circuit for subsequently operating the NM5 relay R2580 over the conductor C2001–N.

The tape reader 340 now senses the next or second character M of the precedence indicator (NMNM), whereby the contacts 353, 354, 355 and 350 are controlled in the manner previously described. The sensing relays 401 operate in the manner previously described and at the contacts 439, 449 and 459 now cause the operation of the relays R1910C, D and E, in series with the relay R1970. The relays R1910C, D and E upon operating, at their contacts 1964, 1967 and 1969, complete a circuit including the contacts 1954 and 1959 for operating the M relay R2020. The latter relay, at its contacts 2022, applies ground potential to the conductor C1901–M in order to retain the relays R2560 and R2565 operated in series. The relay R1970 again operates the slave relay R1980 and the latter relay, at its contacts 1981′, locks the M relay R2020 in its operated position. At the contacts 1981 to 1989, inclusive, the relay R1980 removes the holding ground potentials from the previously noted C1901 conductors, except from the conductor C1901–M which is now grounded at the contacts 2022. As a further result of the operation of the M relay R2020, at its contacts 2021, it now applies ground potential at the contacts 2112 by way of the conductor C2001–M, contacts 2568, 2579, and the winding of the NM3 relay R2570, to battery. The relay R2570 operates over this circuit.

At the end of the sensing cycle of the tape reader 340, the various operated sensing relays are restored to normal in substantially the same manner as has been described above and, as a result thereof, the NM3 relay R2570 now locks itself over a series circuit including its contacts 2572, winding of the NM4 relay R2575, contacts 2586, conductor C1901–N extending to Fig. 19, and ground at the contacts 1986 of the now restored relay R1980. It should be noted, however, that the conductor C1901–M is also grounded at the contacts 1983. Consequently, the relays R2560 and R2565 are locked to the grounded conductor C1901–M and the relays R2570 and R2575 are locked to the grounded conductor C1901–N.

The third character N of the "deferred" precedence indicator (NMNM), is now sensed by the tape reader 340 and as a result thereof, the N relay R2035 is reoperated in the manner previously described to apply ground potential by way of the conductor C2001–N, extending to Fig. 25, the contacts 2567, 2571 and 2588 and the winding of the NM5 relay R2580, to battery, in order to operate the relay R2580.

At the end of the sensing of the third character N, the various sensing relays are again restored to normal whereupon a locking circuit is completed for the relay R2580, which circuit includes the contacts 2581, right-hand winding of the NM6 relay R2585 and the grounded conductor C1901–M. As soon as the relay R2585 operates, it provides an additional locking circuit for itself which includes, in series, the winding of the relay R2580, contacts 2581, left-hand winding of the relay R2585, contacts 2589 and ground at contacts 2578 of the operated relay R2575. Finally, at its contacts 2586 and 2587, the relay R2585 transfers the locking circuit for the relays R2560, R2565 and R2570, R2575 from the grounded conductor C1901–N to the grounded conductor C1901–M.

The tape reader 340 now senses the last or fourth M character of the "deferred" precedence indicator (NMNM) whereupon the sensing relays 401 and the relays in the precedence sensing relay group 1901 operate in the manner previously described. The M relay R2020 in the precedence register relays 2000 operates and applies ground, at the contacts 2112, by way of the contacts 2021, conductor C2001–M, contacts 2568, 2579' and 2599 and 2582 and the winding of the NM7 relay R2590, to battery. The relay R2590 now operates and, at its contacts 2592, prepares a locking circuit for itself which includes the contacts 2592, the winding of the NM8 relay R2595 and ground at contacts 2509' of the operated release relay R2500. It will be recalled that the relay R2500 operated in response to the operation of the guard slave relay R1150 in the address detector 1100 when the director 200A was connected to the incoming line circuit 400.

At the end of the sensing cycle of the fourth M character of the precedence indicator (NMNM) by the tape reader 340, the operated sensing relays 401, the operated relays in the precedence sensing relays group 1901, the slave relay R1980 and the M relay R2020 of the precedence register relays 2000 all restore to normal in substantially the same manner as has been previously described. As a result of the restoration of the M relay R2020, at its contacts 2021, it interrupts the initial operating circuit for the NM7 relay R2590 thereby to complete its locking circuit by way of its contacts 2592, the winding of the NM8 relay R2595 and ground at contacts 2509'. As soon as the relay R2595 operates over the last-mentioned circuit, at its contacts 2597, it applies ground potential by way of the conductor C2101–DC extending to Fig. 21, and the winding of the disconnect relay R2110, to battery. The relay R2110 now operates and, at its contacts 2112, it disconnects ground potential from the upper contacts of all of the relays in the precedence register relays 2000 so that if any of the precedence register relays are operated incident to the sensing of succeeding characters by the tape reader 340, no operations will be performed by the relays included in the different detectors of the precedence detector 2300. At its contacts 2113, the relay R2110 prepares a point in the circuit to be described hereinafter, which is effective only in the event a "carriage return" character function is sensed by the tape reader 340 following the deferred precedence indicator (NMNM). Also, at its contacts 2115, the relay R2110 completes a circuit including conductor C1101–G extending to Fig. 11 for operating the address connect relay R1290.

Figure 22:
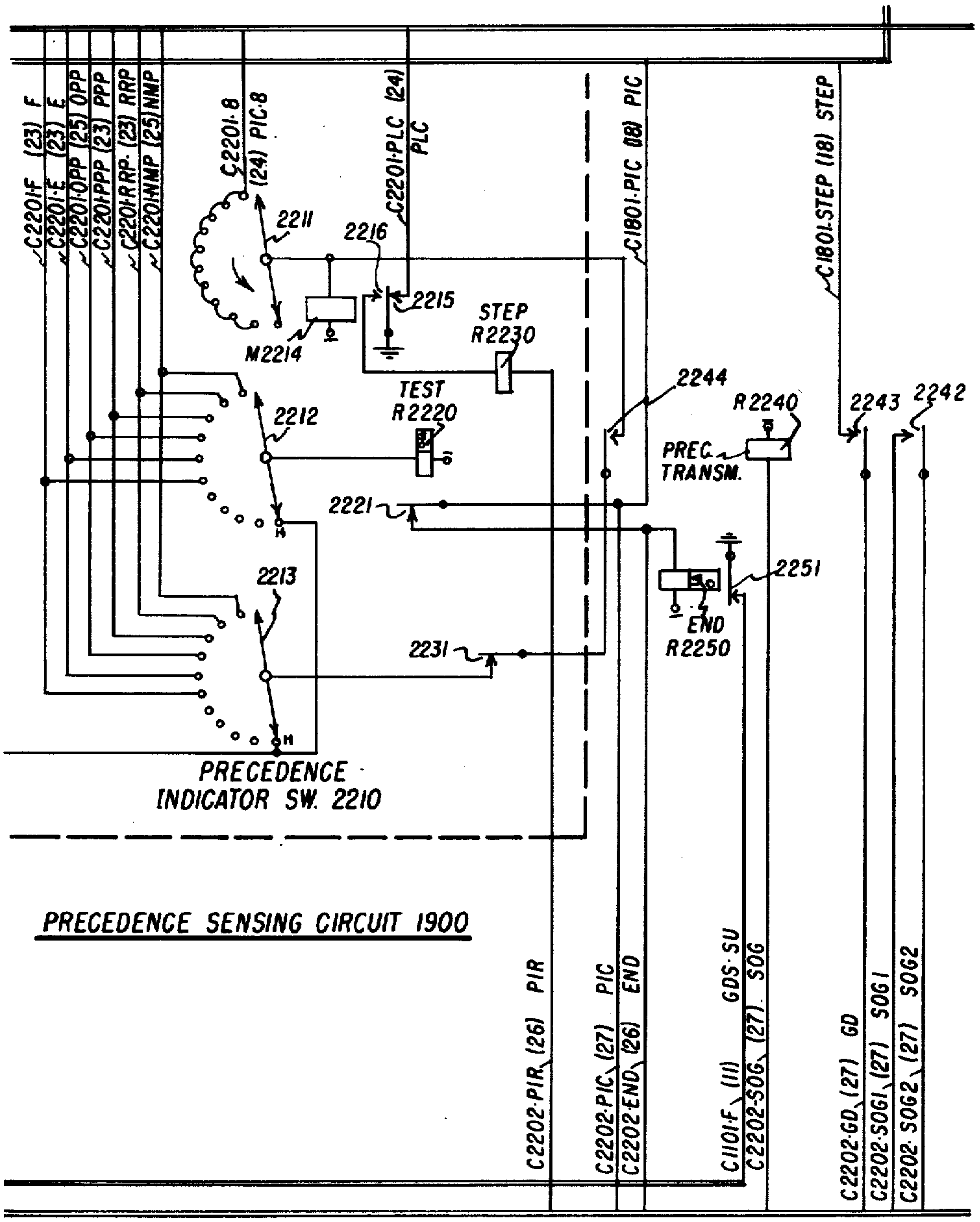

Finally, at its contacts 2599', the relay R2595 removes ground potential from the conductor C2201-NMP extending to Fig. 22 and terminating in the contacts 1 accessible respectively to the wiper 2212 and 2213 of the precedence indicator switch 2210. The precedence indicator switch 2210 terminates six conductors each of which is indicative of one of the six degrees of precedence previously described. When the precedence indicator of a call is detected by the precedence detector 2300, the particular precedence is indicated in the bank of the switch 2210 by removal of ground potential from the conductor individually corresponding to the detected precedence. The remaining precedence indicating conductors are all grounded to indicate that the corresponding precedence detectors are in their normal unoperated positions.

In the above description of the operation of the deferred detector 2300NM to register the characters NMNM of a "deferred" precedence indicator, the relays R2560 and R2565 operated under control of the first character N; the relays R2570 and R2575 operated under control of the second character M; the relays R2580 and R2585 operated under control of the third character N; and the relays R2590 and R2595 operated under control of the fourth character M. It will also be noted that all of these relays are held in their operated positions after all four characters have been detected. If the NMNM characters are not received in the sequence indicated or if some other character is detected at any point during the sensing of the deferred precedence indicator sequence, all of the operated relays R2560 to R2585, inclusive, will automatically restore to normal due to the fact that the locking ground potentials will be removed during a sensing cycle from either or both of the conductors C1901–N and C1901–M. However, if an N character is received out of sequence, for example, at a time when an M character is to be detected by the deferred detector 2300NM, it is essential that all of the operated ones of the relays R2560 to R2585, inclusive, be restored to normal and that the NM1 and NM2 relays R2560 and R2565 be reoperated to anticipate that the N character being sensed may be the first character of a new sequence of proper NMNM characters of a deferred precedence indicator.

In order to describe the above mentioned condition, it will be assumed that the deferred detector 2300NM has operated in the manner previously described to detect the first three characters NMN of a deferred precedence indicator. Consequently, the NM1 and NM2 relays R2560 and R2565 will be locked over a circuit including the windings of these relays in series with the contacts 2561, 2576 and 2587, the conductor C1901–M extending to Fig. 19 and ground at contacts 1983. Also, the NM3 and NM4 relays R2570 and R2575 will be locked in series over a circuit including the contacts 2572 and 2587 and the grounded conductor C1901–M. Also, the NM5 and NM6 relays R2580 and R2585 will be locked in series over a circuit including the contacts 2581 and the grounded conductor C1901–M. The character that must now be detected by the deferred detector 2300NM to detect and register a deferred precedence is the character M. However, if any other character is received, the ground potential will be removed from the conductor C1901–M as soon as the relay R1980 operates, thereby causing the restoration of all of the operated relays in the deferred detector 2300NM. If an N character is now received, instead of the anticipated M character, the relay R2035 will operate, as previously described, and, at its contacts 2036 and 2037, it will apply ground potential to the conductors C2001–N and C1901–N. Also, the relay R1980, at its contacts 1983 will remove ground potential from the conductor C1901–M thereby causing the restoration of the operated relays R2560 to R2585, inclusive. When these relays restore to normal, the ground potential on the conductor C2001–N will again complete the circuit including the contacts 2566 for reoperating the NM1 relay R2560. At the end of the sensing cycle of the N character, the relay R1980 and the relay R2035 will restore to normal and replace ground on conductor C1901–M, whereupon the relay R2565 will be operated in series with the relay R2560 to register in the deferred detector 2300NM a possible first N character of a new sequence of NMNM characters for a deferred precedence indicator.

Returning again to the description of the operation of the circuits at the conclusion of a successful detection of the four NMNM characters of a deferred precedence indicator, it will be recalled that the disconnect relay R2110 operated and prepared, at its contacts 2113, a circuit for receiving a "carriage return" character function.

Immediately following the deferred precedence indicator (NMNM), the tape reader 340 senses a "space" character function on the perforated tape 333. As a result thereof, the contacts 350 and 353 are closed during the sensing cycle to operate the relays R430, R460 and R470 of the sensing relays 401 in the manner previously described. The relay R430, at its contacts 439, now completes a circuit for operating the relay R1910C in series with the relay R1970 in the precedence sensing relay group 1901. The relay R1910C, at its contacts 1919, connects ground potential over a circuit including the contacts 1911, 1915, 1926 and 1934 to the conductor C1901–MU extending to Fig. 23, but this circuit is without effect at the present time. The relay R1970 reoperates the slave relay R1980, in the manner previously described, and the latter relay, at its contacts 1983, removes ground potential from the conductor C1901–M thereby interrupting the locking circuits for the operated relay R2560, R2565, R2570 and R2575 in the deferred detector 2300NM. These relays all restore to normal and as soon as the relay R2575 restores, it interrupts at its contacts 2578, the remaining locking circuit including the left-hand winding of the relay R2585 and the winding of the relay R2580. The last two mentioned relays now restore to normal. However, since the NM7 and NM8 relays R2590 and R2595 are locked in series to the grounded contacts 2509', the deferred detector 2300NM continues to register a successful detection of a deferred precedence indicator (NMNM).

The next item of information to be sensed by the tape reader 340 is the routing indicator identifying the called destination of the received message. However, before continuing with the operations whereby a routing indicator is detected and registered, the operation of the precedence sensing circuit 1900 and the precedence detector 2300 to detect additional precedence indicators will be continued.

*Detecting a "routine" precedence indicator (RR)*

It will now be assumed that the tape reader 340 senses the first character R of a "routine" procedence indicator (RR). As a result thereof, the contacts 350, 352 and 354 are closed in order to operate the relays R420, R440, R460 and R470 of the sensing relays 401 in the manner previously described. Operation of the relays R420 and R440, at their contacts 429 and 449, causes the operation of relays R1910B and R1910D in series with the relay R1970 in the precedence sensing relay group 1901 over the previously traced circuits. At the contacts 1955 and 1965, the relays R1910B and R1910D complete a circuit, including the contacts 1968, 1960 and 1950, for operating the R relay R2040 in the precedence register relays 2000. At its contacts 2041, the relay R2040 connects ground at the contacts 2112 to the conductor C2001–RR extending to Fig. 23, and then by way of the contacts 2386 and the winding of the RR1 relay R2380 in the routine detector 2300RR, to battery. The relay R2380 upon operating, at its contacts 2381, prepares a locking circuit for itself including, in series, the winding of the RR2 relay R2385 and the conductor C1901–RR extending to Fig. 19. This conductor at the present time is grounded at the contacts 2042 thereby shunting the winding of the RR2 relay R2385.

At the end of the sensing cycle of the first character R of the routing precedence indicator, the contacts 350, 352 and 354 of the tape reader 340 are opened thereby restoring to normal the operated relays of the sensing relays 401 and the latter relays upon restoring, restore the operated relays in the precedence sensing relay group 1901. The restoration of the relay R1970 again restores the relay R1980 and the latter relay, at its contacts 1987, retains ground potential on the conductor C1901–RR, thereby to operate and lock the relay R2385 in series with the relay R2380. It being understood of course that the R relay R2040 has now restored and removed, at its contacts 2041, the initial operating ground from the circuit for the relay R2380.

As soon as the tape reader 340 senses a second character R of the routine precedence indicator (RR), the various sensing relays, together with the R relay R2040 in the precedence register relays 2000 will reoperate and complete at this time, a circuit, including its contacts 2041, conductor C2001–RR, and contacts 2387 and 2399, for operating the RR3 relay R2390 in the routine detector 2300RR. At the conclusion of the sensing of the second R character, the relay R2390 will lock in series with the RR4 relay R2395 to ground, at the contacts 2502 of the operated release relay R2500. It being understood of course that the operated sensing relays 401, the operated relays in the precedence sensing relay group 1901, the relays R1980 and R2040 restore to normal at the end of the sensing cycle for the second R character.

Since the RR characters are now respectively registered by the operation of the relays R2380–R2385 and the relays R2390–R2395, the routine detector 2300RR has successfully detected and registered the routine precedence indicator RR. At the contacts 2396, the relay R2395 removes ground potential from the conductor C2201–RRP extending to Fig. 22 thereby to indicate in the banks of the precedence indicator switch 2210 that the routine indicator RR has been successfully registered. The remaining contacts in the banks accessible to the wipers 2212 and 2213 of the switch 2210 are marked with ground potential by the other precedence detectors in the precedence detector 2300.

The routine detector 2300RR is similar in many respects to the deferred detector 2300NM in that the operated relays R2380–R2385 will be restored to normal in the event that the sensing relay group 1901 fails to sense two successive R characters indicative of a routine indicator. In other words, if any character other than R is sensed as a second character by the relay group 1901, the locking circuit for the operated relays R2380–R2385 will be interrupted in order to restore these relays to normal. Consequently, in order to detect the routine indicator RR, it is necessary to receive two R characters in sequence. Finally, at its contacts 2397, the relay R2395 upon operating as a result of a successful detection of the routine indicator RR, applies ground potential to the conductor C2101–DC, in order to operate the disconnect relay R2110 in the same manner as has been described hereinbefore in connection with the operation of the deferred detector 2300NM. The relay R2100, at its contacts 2112, prevents subsequent operation of the precedence register relays 2000 from controlling any of the detectors in the precedence detector 2300. At its contacts 2113, the relay R2110 prepares a point in a circuit which becomes effective when a "carriage return" character function is subsequently sensed by the tape reader 340; and at its contacts 2115 it completes the circuit for operating the address connect relay R1290.

Immediately following the routine precedence indicator (RR), the tape reader 340 senses a "space" character function on the perforated tape 333. As a result thereof, the contacts 350 and 353 are closed during the sensing cycle to operate the sensing relays 401 and the precedence sensing relay group 1901 in the manner previously described. The relay R1910C operates in series with the relay R1970 in the precedence sensing relay group 1901 and the relay R1910C, at its contacts 1919, connects ground potential to the conductor C1901–MU extending to Fig. 23 but this circuit is without effect at the present time. The relay R1970 reoperates the relay R1980, as previously noted, and the latter relay, at its contacts 1987, removes ground potential from the conductor C1901–RR, thereby interrupting the locking circuit for the operated relays R2380–R2385 in the routine detector 2300RR. These relays now restore to normal, but the relays R2390–R2395 remain locked to ground at contacts 2502 of the operated release relay R2500. Sonsequently, the routine detector 2300RR continues to register a successful detection of a routine precedence indicator (RR).

The next item of information to be sensed by the tape reader 340 is the routing indicator identifying the called destination of the received message. However, before continuing with the operations whereby a routing indicator is detected and registered, the operation of the precedence sensing circuit 1900 and the precedence detector 2300 to detect additional precedence indicators will be continued.

*Detecting a "priority" precedence indicator (PP)*

It will now be assumed that the tape reader 340 senses the first character "P" of a "priority" precedence indicator (PP). As a result thereof, the contacts 350, 352, 353 and 355 are closed in order to operate the relays R420, R430, R450, R460 and R470 of the sensing relays 401 in the manner previously described. Operation of the relays R420, R430 and R450, at their contacts 429, 439 and 459, causes the operation of relays R1910B, R1910C and R1910E in series with the relay R1970 in the precedence sensing relay group 1901 over the previously traced circuits. At the contacts 1957, 1962 and 1969, the relays R1910B, R1910C and R1910E complete a circuit, including the contacts 1966 and 1952, for operating the P relay R2030 and the precedence register relays 2000. At its contacts 2031, the relay R2030 connects ground at contacts 2112 to the conductor C2001–P extending to Fig. 25, the terminal A jumpered to terminal B, contacts 2366 and the winding of the PP1 relay R2360 in the priority detector 2300PP, to battery. The relay R2360 operates and, at its contacts 2361, it prepares a locking circuit for itself including, in series, the winding of the PP2 relay R2365, terminal D jumpered to terminal C and the conductor C1901–P extending to Fig. 19. This conductor at the present time is grounded at the contacts 2032, thereby shunting the winding of the relay R2365.

At the end of the sensing cycle of the first character P of the priority precedence indicator (PP), the contacts 350, 352, 353 and 355 of the tape reader 340 are opened, thereby restoring to normal the operated relays of the sensing relays 401 and the latter relays upon restoring, restore the operating relays in the precedence sensing group 1901. The restoration of the relay R1970 again restores the relay R1980 and the latter relay, at its contacts 1985, retains ground potential on the conductor C1901–P, thereby to operate and lock the PP2 relay R2365 in series with the PP1 relay R2360. It being understood, of course, that the P relay R2030 has now restored and has removed, at its contacts 2031, the intial operating ground from the circuit for the relay R2360.

As soon as the tape reader 340 senses the next character or second character P of the priority precedence indicator (PP), the various sensing relays, together with the P relay R2030 in the precedence register relays 2000 will reoperate and complete a circuit including the contacts 2031, conductor C2001–P, contacts 2367 and 2379 for operating the PP3 relay R2370 in the priority detector 2300PP. At the conclusion of the sensing of the second P character, the relay R2370 locks, in series with the PP4 relay R2475, to ground at the contacts 2502 of the operated release relay R2500. It being understood, of course, that the operated sensing relays 401 and the operated relays in the precedence sensing relay group 1901, the relays R1980 and R2030 restore to normal at the end of the sensing cycle for the second P character.

Since the PP characters are now respectively registered by the operation of the relays R2360–R2365, and the relays R2370–R2375, the priority detector 2300PP has successfully detected and registered the priority precedence indicator PP. At the contacts 2376, the operated relay R2375 removes ground potential from the conductor C2201–PPP, extending to Fig. 22, thereby to indicate in the banks of the precedence indicator switch 2210 that the priority indicator PP has been successfully registered. The remaining contacts in the banks accessible to the wipers 2212 and 2213 of the switch 2210 are marked with ground potential by the remaining precedence detectors in the precedence detector 2300.

The priority detector 2300PP is similar to the routine detector 2300RR in that the operated relays R2360 and R2365 will be restored to normal in the event that the sensing relays group 1901 fails to sense two successive P characters indicative to a priority indicator. In other words, if any character other than P is sensed as a second character by the relay group 1901, the locking circuit for the operated relays R2360–R2365 will be interrupted in order to restore these relays to normal. Consequently, in order to detect the priority indicator PP, it is necessary to receive two P characters in sequence.

Finally, at its contacts 2377, the operated PP4 relay R2375 applies ground potential to the conductor C2101–DC, in order to operate the disconnect relay R2110 in the same manner as has been described hereinbefore in connection with the operation of the deferred detector 2300NM and the routine detector 2300RR. The relay R2110, at its contacts 2112, prevents subsequent operation of the precedence register relays 2000 from controlling any of the detectors of the precedence detector 2300. At its contacts 2113, the relay 2110 prepares a point in a circuit which becomes effective when a "carriage return" character function is subsequently sensed by the tape reader 340; and, at its contacts 2115, it completes the operating circuit for the address connect relay R1290.

Immediately following the priority precedence indicator (PP), the tape reader 340 senses "space" character function on the perforated tape 333. As a result thereof, the contacts 350 and 353 are closed during the sensing cycle to operate the sensing relays 401 and the precedence sensing relay group 1901 in the manner previously described, whereby the relay R1910C operates in series with the relay R1970. The relay R1910C, at its contacts 1919, applies ground potential to the conductor C1901–MU extending to Fig. 23, but this circuit is without effect at the present time. The relay R1970, however, reoperates the slave relay R1980 and the latter relay, at its contacts 1985, removes the locking ground from the conductor C1901–P, thereby interrupting the locking circuit for the operated relays R2360–R2365, in the priority detector 2300PP. These relays now restore to normal, but since the relays R2370–R2375 are locked to ground at the contacts 2502, the priority detector 2300PP continues to register a successful detection of the priority precedence indicator (PP).

The next item of information to be sensed by the tape reader 340 is the routing indicator identifying the called destination of the received message. However, before continuing with the operations, whereby a routing indicator is detected and registered, the operation of the precedence sensing circuit 1900 and the precedence detector 2300 to detect additional precedence indicators will be continued.

*Detecting an "operational immediate" precedence indicator (OPOP)*

It will be assumed that the tape reader 340 senses the first character O of an "operational immediate" precedence indicator (OPOP). As a result thereof, the contacts 350, 354 and 355 are closed in order to operate the relays R440, R450, R460 and R470 of the sensing relays 401 in the manner previously described. Operation of the relays R440 and R450, at their contacts 449 and 459, causes the operation of the relays R1910D and R1910E in series with the relay R1970 in the precedence sensing relay group 1901 over the previously traced circuits. At the contacts 1967 and 1969, the relays R1910D and R1910E complete a circuit, including the contacts 1953, 1958 and 1963, for operating the O relay R2025 in the precedence register relays 2000. The relay R1970 upon operating, operates the slave relay R1980, in order to remove ground potential at the contacts 1981 to 1989, inclusive, and in order to provide a locking ground for the operated O relay R2025 at the contacts 1981'. At its contacts 2026, the relay R2025 connects ground at the contacts 2112 to the conductor C2001–O extending to Fig. 25 and then by way of the contacts 2516 and the winding of the OP1 relay R2510 in the operational immediate detector 2300–OP, to battery. The relay R2510 operates and, at its contacts 2511, prepares a locking circuit for itself including in series, the winding of the OP2 relay R2515, contacts 2526 and 2541, conductor C1901–P extending to Fig. 19. This conductor is not grounded at the present time due to the fact that the contacts 2032 have not been closed by the operation of relay R2030 and due to the fact that the contacts 1985 have been opened by the operation of the relay R1980.

At the end of the sensing cycle of the first character O of the operational immediate precedence indicator, the contacts 350, 354 and 355 of the tape reader 340 are opened, thereby restoring to normal the operated sensing relays 401 and the operated relays in the precedence sensing relay group 1901 in the manner previously described. The restoration of the relay R1970 again restores the relay R1980 and the latter relay, at its contacts 1985, reapplies ground potential to the conductor C1901–P before the O relay R2025 restores and removes ground potential from the conductor C2001–O. As soon as the latter operation occurs, the OP2 relay R2515 operates in series with the OP1 relay R2510 over the previously described locking circuit. As soon as the relay R2515 operates, it prepares, at its contacts 2518, a point in the circuit for operating the OP3 relay R2520; at its contacts 2516 it interrupts the initial operating circuit for the relay R2510; and at its contacts 2517 it prepares a point in the circuit for subsequently operating the OP5 relay R2530.

As soon as the tape reader 340 senses a second character P of the operational immediate precedence indicator (OPOP), the various sensing relays 401 and 1901 operate in the manner previously described. In response to the sensing of the character P the relays R1910B, R1910C and R1910E operate in series with the relay R1970, whereby, at the contacts 1957, 1962 and 1969, a circuit including the contacts 1952 and 1966 is completed for operating the P relay R2030. Also relay R1970 upon operating, completes a circuit for the relay R1980 so that the operated P relay R2030 locks itself to ground at contacts 1981′. At the contacts 2032, the relay R2030 applies ground potential to the conductor C1901–P in order to retain operated the relays R2510 and R2515 in the operational immediate detector 2300–OP. At its contacts 2031, the relay R2030 applies ground potential to the conductor C2001–P, thereby to complete a circuit, including the contacts 2518 and 2529′, for operating the OP3 relay R2520.

At the conclusion of the sensing of the second character P, the relay R1980 and the relay R1930 restore to normal in the manner previously described. At the contacts 1984, the relay R1980 now applies locking ground potential to the conductor C1901–O in order to lock the relay R2520 in series with the relay R2525 over a circuit including the contacts 2537 and 2527. Also, this locking ground potential is extended by way of the contacts 2527, the winding of the OP2 relay 2515, contacts 2511 and the winding of OP1 relay R2510, to battery. Consequently, the relays R2510–R2515 and the relays R2520–R2525 are now locked to the grounded conductor C1901–O.

As soon as the tape reader 340 senses the third character O of the operational immediate precedence indicator (OPOP), the various sensing relays operate in the manner previously described, whereby the O relay R2025 in the precedence relays 2000 is reoperated and whereby the relay R1980 is reoperated. At its contacts 2026, the relay R2025 reapplies ground potential to the conductor C2001–O in order now to complete a circuit including the contacts 2517, 2521 and 2538 for operating the OP5 relay R2530. At its contacts 2037 the relay R2025 applies ground potential to the conductor C1901–O to provide the locking ground for the relays R2510–R2515 and the relays R2520–R2525 during the period of time that the relay R1980 removes ground from the conductor C1901–O.

At the conclusion of the sensing of the third O character, the sensing relays and the relays R2025 and R1980 restore to normal in the manner previously described. At this time the relay R2530 locks in series with the right-hand winding of the relay R2535 over a circuit including the contacts 2531 and the conductor C1901–P which is now grounded at the contacts 1985 of the restored relay R1980. An additional locking circuit is completed for the relay R2530 which includes the left-hand winding of the relay R2535, contacts 2531, 2539 and ground at contacts 2528. As a further result of the operation of relay R2535, at its contacts 2536 and 2537, it transfers the previously described locking circuits for the relays R2510–R2515 and R2520–R2525 from the conductor C1901–O to the conductor C1901–P.

The tape reader 340 now senses the fourth character P of the operational immediate indicator (OPOP) whereupon the sensing relays, previously noted, are reoperated and cause the reoperation of the P relay R2030 in the precedence register relay 2000 and the relay R1980. At its contacts 2032, the relay R2030 places the locking ground potential on the conductor C1901–P, before the relay R1980 operates and removes ground therefrom, in order to retain the relays in the operational immediate detector 2300–OP in their operated positions. Also, at its contacts 2031, the relay R2030 reapplies ground potential to the conductor C2001–P in order to complete an operating circuit, including the contacts 2518, 2529′, 2554 and 2532, for operating the OP–7 relay R2540.

At the end of the sensing of the final P character of the operational immediate precedence indicator (OPOP), the sensing relays, previously noted, the relay R2030 and the relay R1980 again restores to normal in order to retain the locking ground potential on the conductor C1901–P and in order to remove the operating ground potential from the conductor C2001–P. At this time the OP8 relay R2550 operates in series with the OP7 relay R2540 over a circuit including the contacts 2542 and ground at contacts 2509 of the operated release relay R2500.

Since the OPOP characters are now respectively registered in the relays R2510–R2515, R2520–R2525, R2530–R2535, and R2540–R2550, the operational immediate detector 2300–OP has successfully detected and registered the operational immediate precedence indicator OPOP. As soon as the relay R2550 operates, it removes, at its contacts 2555, ground potential from the conductor C2201–OPP extending to Fig. 22, thereby to indicate in the banks of the precedence indicator switch 2210 that the operational immediate precedence indicator OPOP has been successfully registered. The remaining contacts in the banks accessible to the wipers 2212 and 2213 of the switch 2210 are marked with ground potential by the other precedence detectors in the precedence detector 2300 in order to indicate that said other precedence indicators are in their normal positions.

The operational immediate detector 2300–OP is fundamentally identical with the deferred detector 2300–NM in that the operated relays R2510–R2515, R2520–R2525, and R2530–R2535 will be restored to normal in the event that the sensing relay group 1901 fails to sense the characters OPOP in the proper sequence. In other words, if any character is received to break the sequence OPOP, the operated relays in the operational immediate detector 2300–OP will all restore to their normal position. Furthermore, if an O character is received in the sequence when the relays in the detector 2300–OP are conditioned to receive a P character, the operated relays will all restore to normal and the first two relays R2510 and R2515 will reoperate in the manner previously described to register, in the operational immediate detector 2300–OP, a possible first O character of a new sequence of OPOP characters for an operational immediate precedence indicator. Since the relays in the detector 2300–OP operate in substantially the same manner as the relays in the deferred detector 2300–NM, it is not deemed necessary to repeat the circuit operations thereof.

At the contacts 2553, the relay R2550 upon operating, at the conclusion of a successful detection of the four characters OPOP, applies ground potential to the conductor C2101–DC in order to operate the disconnect relay R2110 in the manner previously described. At its contacts 2112, the latter relay removes ground potential from the various upper contacts of the precedence register relays 2000; at its contacts 2113, it prepares a point in the circuit for receiving a "carriage return" character function; and, at its contacts 2115 it completes the operating circuit for the address connect relay R2190.

Immediately following the operational immediate precedence indicator (OPOP), the tape reader 340 senses a "space" character function on the perforated tape 333 and as a result thereof, the sensing relays 401 and the precedence sensing relay group 1901 reoperate, whereby the relay R1019C, at its contacts 1919, applies ground potential over the previously traced circuit to the conductor C1901–MU extending to Fig. 23. This circuit is without effect at the present time. However, since the relays R1970 and R1980 operate in response to the sensing of the "space" character, the locking ground potential is removed from the conductor C1901–P in order to restore the operated relays R2510 to R2535, inclusive, in the operational immediate detector 2300–OP. However, since the OP7 relay R2540 and the OP8 relay R2550 are locked to ground at the contacts 2509, the operational immediate detector 2300–OP continues to register a successful detection of the operational immediate indicator (OPOP).

It may be well to mention at this time that, at its contacts 2551, the relay R2550 in the detector 2300–OP connects the conductor C2302–COM to the conductor C2302–OUF so that the cross-office selector switch relay control group 2600 (Figs. 26 and 27) will be operated to set-up circuits whereby a cross-office unit having an empty bin is selected and then connected to a desired outgoing line in the manner to be described hereinafter. The same circuit will also be controlled by the contacts 2342 and 2352, respectively, of the flash and emergency detector 2300–FE since the "flash," the "emergency," the "operational immediate" indicators are of the highest precedence and it is desirable to forward such messages without waiting for the completion of the transmission of other messages of any lower precedence by cross-office units already connected to a desired outgoing line.

In view of the foregoing, it will be appreciated that the deferred detector 2300–NM, the routine detector 2300–RR, and the priority detector 2300–PP merely connect the grounded conductor C2302–COM by way of the contacts 2596, 2399′ and 2379′ respectively, to the conductors C2101–D, C2101–RD and C2101–PD respectively, for the purpose of testing for cross-office units already positioned to an outgoing line over which a received message is to be transmitted and having stored in the selected cross-office unit one or more messages having the same precedence as the received message.

The next item of information to be sensed by the tape reader 340 is the routing indicator identifying the called destination of the received message having the operational immediate precedence indicator. However, before continuing with the operations whereby a routing indicator is detected and registered, the operation of the precedence sensing circuit 1900 and the precedence detector 2300 to detect additional precedence indicators will be continued.

*Detecting an "emergency" precedence indicator (bell bell bell bell bell EM)*

It will now be assumed that the tape reader 340 senses a first "bell" character of an "emergency" precedence indicator (bell bell bell bell bell EM). As a result thereof, the contacts 350, 351 and 353 are closed in order to operate the relays R410, R430, R460, and R470 of the sensing relays 401, whereupon, the contacts 419 and 439 are closed to complete circuits for operating the relays R1910A and R1910C in series with the relay R1970 in the precedence sensing relay group 1901. At the contacts 1914 and 1925, the relays R1910A and R1910C complete a circuit, including the contacts 1918′, 1932 and 1940, for operating the "bell" relay R2010 in the precedence register relays 2000. At its contacts 2016, the relay R2010 connects ground at contacts 2112 to the conductor C2001–BELL extending to Fig. 23, contacts 2311 and the winding of the relay R2305 in the flash and emergency detector 2300FE, to battery. At its contacts 2012 and 2013, the relay R2010 retains ground potential at the conductors C1901–MU and C1901–B in order to prevent operation of the relay R2310 until the end of the sensing cycle of the "bell" character.

When the sensing cycle of the first "bell" character is terminated by the tape reader 340, the various operated sensing relays are restored to normal, thereby causing relays R1980 and R2010 to restore in the order named. As soon as the relay R2010 restores, it removes the operating ground, at the contacts 2016, from the circuit including the winding of relay R2305. However, since the conductor C1901–B is now grounded at the contacts 1982, a locking circuit including the contacts 2333, winding of the relay R2310, contacts 2306 and the winding of the relay R2305 is completed, whereby the relays R2305 and R2310 are locked in their operated positions. At the contacts 2312, the relay R2310 now transfers the conductor C2001–BELL to the relay R2315.

In response to the sensing of the second "bell" character, the relays noted above are reoperated whereby ground potential is reapplied to the conductor C2001–BELL in order to operate the relay R2315. At the end of the sensing cycle of the second "bell" character, the relay R2315 locks in series with the relay R2320 to the grounded conductor C1901–B and the latter relay upon operating, at its contacts 2323, now transfers the conductor C2001–BELL to the winding of the relay R2325.

In response to the sensing of the third "bell" character, the relays reoperate whereby the conductor C2001–BELL is again grounded in order this time to complete the operating circuit for the relay R2325. At the end of the sensing cycle of the third "bell" character, the relay R2325 locks itself in series with the relay R2330 to the grounded conductor C1901–MU. It should be noted, however, that at the contacts 2333 and 2332, the relay R2330 also transfers the locking circuit for the relays R2305—R2310 and R2315—R2320 from the grounded conductor C1901–B to the grounded conductor C1901–MU. The last two "bell" characters of the five "bell" characters sensed by the tape reader 340 control the sensing relays 401 and the precedence sensing relay group 1901 in the same manner as has been described above, but these two bell characters, in effect, are absorbed by the flash and emergency detector 2300FE since the two additional sets of two relays for registering the last two "bell" characters are not provided. During this sensing cycle of the last two bell characters ground potential is maintained on the conductor C1901–MU either by the contacts 2012 of the operated bell relay R2010 or by the contacts 1981 of the restored slave relay R1980.

After three "bell" characters have been sensed in sequence by the tape reader 340, the flash and emergency detector 2300FE is conditioned to respond to the E character of the emergency indicator. In response to the sensing E by the tape reader 340, the sensing relay 401 and the precedence sensing relay group 1901 operate in the manner previously described, whereby the relay R1910A operates in series with the R1970. At its contacts 1914, the relay R1910A now completes a circuit including the contacts 1918′, 1924, 1931 and 1939 for operating the E relay R2005 in the precedence register relay 2000. At its contacts 2006, the relay R2005 applies ground potential by way of the conductor C2001–E extending to Fig.

23, and the contacts 2335, in order to complete an operating circuit for the EM relay R2350 in the detector 2300FE. At its contacts 2354, the relay R2350 locks itself to ground at contacts 2501 of the operated release relay R2500.

At the end of the sensing cycle of the E character, the various operated sensing relays and the relays R1980 and R1905 restore to normal in the manner previously described, whereby, at its contacts 1981, the relay R1980 retains the locking ground on the conductor C1901–MU in order to maintain the relays R2305 to R2330 in their operated positions. It should be understood that during the period that the relay R1980 is operated, the relay R2005, at its contacts 2007 retains ground on the conductor C1901–MU.

The flash and emergency detector 2300FE is quite similar to the remaining detectors in the precedence detector 2300 in that the operated relays R2305 to R2330 will be restored to normal in the event the sensing relay group 1901 fails to sense three successive "bell" characters of the five "bell" characters sensed by the tape reader 340. In other words, if any character other than "bell" is sensed as a second or a third character, the relays R2305 to R2320 will be restored to normal due to the fact that ground potential will be removed from the conductor C1901–B during a portion of the sensing cycle. Also, if any character other than "bell," E or F is received after the third "bell" character is detected, ground potential will be removed from the conductor C1901–MU and cause the relays R2305 to R2330 to restore to normal. Consequently, in order to detect either an "emergency" or a "flash" precedence indicator, it is necessary to first receive at least three successive "bell" characters, followed by any number of bell characters, all of which will be absorbed by the detector 2300FE, and then followed by the E or the F character. The E character, as described above, operates and locks the EM relay R2350 to indicate that an "emergency" precedence indicator has been successfully registered in the flash and emergency detector 2300FE.

Figure 21:
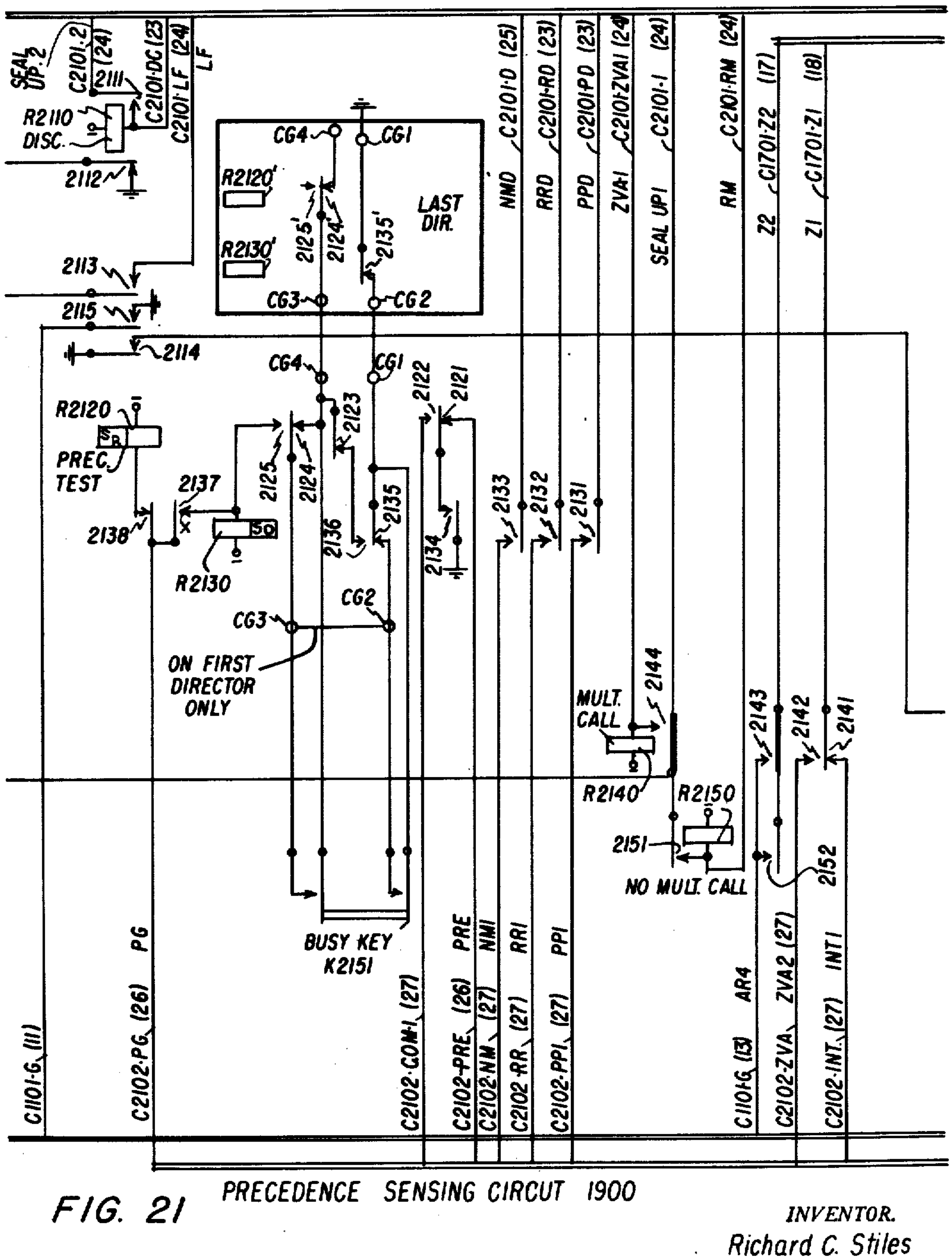

As a further result of the operation of the EM relay R2350, at its contacts 2355, it applies ground potential to the conductor C2301–DC extending to Fig. 21 in order to operate the disconnect relay R2110. The relay R2110 now operates and, at its contacts 2112, disconnects ground potential from the upper contacts of the precedence register relays 2000 so that if any of the precedence register relays are operated under control of the relays in the precedence sensing relay group 1901 by succeeding characters sensed by the tape reader 340, no control will be made of any of the relays included in the various detectors included in the precedence detector 2300. At its contacts 2113, the relay R2110 again prepares a point in the circuit to be described hereinafter, which is effective if a "carriage return" character is subsequently sensed by the tape reader 340 following the registration of the "emergency" precedence indicator. Also, at its contacts 2115, relay R2110 completes a circuit including conductor C1101–G extending to Fig. 11 for operating the address connect relay R1290.

Also, at its contacts 2353, the EM relay R2350 removes ground potential from the conductor C2101–E extending to Fig. 22 and terminating in the contacts 5 accessible respectively to the wipers 2212 and 2213 of the precedence indicator switch 2210. The remaining unoperated detectors in the precedence detector 2300 retain ground potential on the contacts 1 to 4 and 6 accessible to the wipers 2212 and 2213, whereby the ungrounded contacts 5 indicate the precedence of the particular precedence indicator registered in the flash and emergency detector 2300FE.

During the sensing operation of the three "bell" characters, as described above, the relays R2305 and R2310, as well as the relays R2315 and R2320, are locked to the grounded conductor C1901–B and thereafter the third "bell" character, the relays R2325 and R2330, together with the four previously noted relays are locked to the grounded conductor C1901–MU. This arrangement assumes that the three "bell" characters will be received in sequence without the insertion of a "space" character. In order to provide locking circuits for the above noted relays even if a "space" character is interposed between the first and second or the second and third "bell" characters, the dotted "S" strap is provided to interconnect the conductors C1901–MU and C1901–B. With the "S" strap provided in the manner noted above, the receipt of a "space" character will operate the sensing relay R1910C in series with the relay R1970 and the latter relay, at its contacts 1971, will operate the slave relay R1980. Although the relay R1980, at its contacts 1981 and 1982, removes ground potential from both the conductors C1901–B and C1901–MU, the relay R1910C, at its contacts 1919, places ground potential on the conductor C1901–MU before the relay R1980 is operated. Consequently, any one or more of the operated relays R2305 to R2330, inclusive, in the flash and emergency detector 2300FE will remain locked in their operated positions. The next two "bell" characters will be absorbed, as previously noted, and the "E" character will operate the EM relay R2350 to register the successful detection of an emergency precedence indicator. Here again it should be noted that if a "space" character is interposed between the last or fifth "bell" character and the E character, the operated relay R2305 to R2330, inclusive, will be retained in their operated position over the circuit including the locking ground potential applied to the conductor C1901–MU.

Normally, the E character of the emergency precedence indicator will be followed by the M character whereby the tape reader 340, the sensing relays 401, the precedence sensing relay group 1901 and the M register relay R2020 in the precedence register relays 2000 will be operated in the manner previously described. However, due to the fact that the disconnect relay R2110 has been operated as a result the successful registration of the emergency precedence indicator (operation of EM relay R2350), the M character is merely absorbed by the relays in the precedence sensing circuit 1900. However, since the relay R1980 is operated during the sensing of the M character, at its contacts 1981 and 1982, it now removes ground from the conductors C1901–MU and C1901–B, whereupon all of the operated relays R2305 to R2330, inclusive, in the detector 2300FE now restore to normal. However, inasmuch as the EM relay R2350 is locked in its operated position to ground at contacts 2501 of the operated release relay R2500, the emergency precedence indicator is retained registered in the detector 2300FE.

*Detecting a "flash" precedence indicator (bell bell bell bell bell FL)*

The detailed description of the operation of the flash and emergency detector 2300FE to detect and register at least three of the five bell characters of a "flash" precedence indicator is exactly the same as has been described above in detecting an "emergency" precedence indicator. The last two bell characters are absorbed in the manner noted above and thereafter the "F" character sensed by the tape reader 340 controls the sensing relays 401 and the precedence sensing relay group 1901 to operate the F relay R2015 in the precedence register relays 2000. In sensing an F character, the relays R1910A, R1910C and R1910D, at their contacts 1914, 1925 and 1933, complete a circuit, including the contacts 1918' and 1941, for operating the relay R2015. At its contacts 2016, the relay R2015 applies ground potential to the conductor C2001–F extending to Fig. 23, and then by way of the contacts 2334 and the winding of the FL relay R2340, to battery. The latter relay, at its contacts 2344, locks itself in its operated position to ground at contacts 2501. The operation of the FL relay R2340 indicates the successful detection and registration of a "flash" precedence indicator and the various contacts on the relay perform the same functions as previously noted in describing the operation of the EM relay R2340. In this case, however, at its contacts 2343, the relay R2340 removes ground potential from the conductor C2201–F extending to Fig. 22 and terminating in the contacts 6 accessible respectively to the wipers 2212 and 2213 of the precedence indicator switch 2210. The remaining unoperated detectors in the precedence detector 2300 retain ground potential on the contacts 1 to 5, inclusive, accessible to the wipers 2212 and 2213 whereby the ungrounded contacts 6 indicate the "flash" precedence indicator registered in the flash and emergency detector 2300FE.

*Detecting a multiple address indicator (ZVA)*

Since the precedence detector 2300 is also provided with a multiple address detector 2300MA, it is deemed advisable to describe its operation at the present time, although the multiple address indicator (ZVA) is not normally received until after the receipt of the routing indicator indicating the destination of a particular message. It should be understood that a multiple address indicator (ZVA) will not be included in a message unless the particular message is to be transmitted to each of a plurality of different called destinations. In other words, if a message is provided with a plurality of routing indicators to indicate that the same message should be transmitted to several different destinations, the multiple address indicator (ZVA) will appear on the tape immediately following the routing indicator identifying the relay switching center that is to perform the operations to route the message to the different destinations identified by the different routing indicators following the multiple message indicator. The relay switching center UAC is arranged so that it will respond to a ZVA indicator and route the message to the multiple position 2340 only when the ZVA indicator follows the routing indicator UAC.

In view of the foregoing, it will be assumed that the tape reader 340, the sensing relays 401, the precedence sensing relay group 1901 sequentially respond in the manner previously described in accordance with the respective characters "ZVA" of a multiple address indicator. In accordance with the code illustrated in Fig. 46, the character Z sensed by the tape reader 340 causes the operation of the relays R1910A, R1910E and R1970 in the precedence sensing relay group 1901 in the manner previously described. At the contacts 1912 and 1937, the relays R1910A and R1910E complete a circuit, including the contacts 1917, 1922 and 1929, for operating the ZZ relay R2050 in the multiple address register 2001. At its contacts 2051, the relay R2050, applies ground potential to the conductor C2001–Z extending to Fig. 24 in order to operate ZV1 relay R2410 in the multiple address detector 2300MA.

At the end of the sensing cycle of the Z character, the relays R1980 and R2050 restores to normal in the order named. The relay R1980 at its contacts 1989, applies ground potential to the conductor C1901–V so that when the relay R2050 restores to normal a locking circuit is completed for the relay R2410 in series with the ZV2 relay R2415. The relay R2415 upon operating over this locking circuit prepares, at its contacts 2417, a circuit for operating the ZV3 relay R2420 and, at its contacts 2416, it disconnects the previously traced circuits including the conductor C2001–Z.

In response to the second character V of the multiple address indicator (ZVA) sensed by the tape reader 340, the relays R1910B to R1910E, inclusive, and the relay R1970 in the precedence sensing register group 1901 operate whereby, at the contacts 1918, 1923, 1930 and 1938, the relays R1910B to R1910E, inclusive, complete a circuit including the contacts 1913 for operating the ZV relay R2055 in the multiple address register 2001. At its contacts 2057, the relay R2055 applies a locking ground potential to the conductor C1901–V before the contacts 1989 are opened by the operation of the relay R1980. Also at its contacts 2056, the relay R2055 now applies ground potential to the conductor C2001–V extending to Fig. 24 in order to operate the ZV3 relay R2420.

At the end of the sensing cycle of the character V, the relay R1980 restores to normal, together with the relay R2055 and at its contacts 1989, the relay R1980 retains ground potential on the conductor C1901–V. At this time a locking circuit is completed for the relay R2420 which includes the contacts 2421, the winding of the ZV4 relay R2425, the conductor C1901–A extending to Fig. 19 and ground at the contacts 1988 of the restored relay R1980. The relay R2425 operates over the above traced locking circuit and, at its contacts 2426 and 2427, it transfers the locking circuit for the relays R2410—R2415 from the grounded conductor C1901–V to the grounded conductor C1901–A. At its contacts 2448, the relay R2425 interrupts a point in the initial locking circuit for the relay R2420 and, at its contacts 2429, it prepares a point in the circuit for operating the ZV5 relay R2430.

In response to the sensing of the third character A of the multiple address indicator (ZVA) by the tape reader 340, the relays R1910A, R1910B and R1970, in the precedence sensing relay group 1901 now operate, whereby a circuit, including the contacts 1912, 1916, 1921, 1928 and 1936, is completed for operating the ZA relay R2045 in the multiple address register 2001. At its contacts 2047, the relay R2045 retains ground potential on the conductor C1901–A during operated period of the relay R1980 and, at its contacts 2046, the relay R2045 applies ground potential to the conductor C2001–A in order to complete the operating circuit for the ZV5 relay R2430 in the multiple address detector 2300MA. At the end of the sensing cycle of the character A, the operated relays in the relay group 1901, the relay R1980 and the relay R2045 restore to normal. At its contacts 2431, the relay R2430 locks itself in series with the ZV6 relay R2440, to ground at contacts 2503 of the operated release relay R2500 as soon as the initial operating ground is removed from the conductor C2401–A by the restoration of the relay R2045. As soon as the above traced locking circuit is completed, the relay R2440 operates to interrupt, at its contacts 2446, an additional point in the initial locking circuit for the relay R2430; at its contacts 2441, it disconnects the conductor C2101–LF from the conductor C2101–RM; and, at its contacts 2442, it connects ground potential to the conductor C2101–ZVA. Finally, at its contacts 2443 to 2445, inclusive, the relay R2440 completes circuits for controlling the multiple call equipment 2447 schematically illustrated in Fig. 24.

In the above description of the operation of the multiple address register 2001 and the multiple address detector 2300MA, it was assumed that the multiple address indicator (ZVA) characters were received in the sequence noted and that no "space" characters or other characters were interposed therebetween. It will be understood from the previous description of the mode of operation of the various detectors in the precedence detector 2300 that if the ZVA characters are not received in the described sequence or order the operated relays in the multiple address detector 2300MA will automatically restore to normal. It will also be understood that if the first Z character is repeated as a second or a third character, all of the operated relays in the multiple address detector will be restored to normal and the relays R2410 and R2415 therein will be reoperated to register the repeated Z character as the first character of a new sequence of ZVA characters of a multiple address indicator.

Immediately following the registration of the multiple address indicator (ZVA), the tape reader 340 will normally sense a "space" character function on the perforated tape 333 and as a result thereof, the relay R1910C and the relay R1970 in relay group 1901 will be reoperated. The relay R1970 operates the relay R1980 and the latter relay, at its contacts 1989, removes ground potential from the conductor C1901–A in order to interrupt the locking circuit for the relays R2410—R2425 in the multiple address detector 2300MA, which relays now restore to normal. However, since the ZV5 and ZV6 relays R2430 and R2440 are locked to ground at the contacts 2503, the multiple address detector 2300MA continues to register a successful detection of the multiple address indicator (ZVA). The operations which result from the registration of the multiple address indicator (ZVA) will be described hereinafter.

*Preventing false operation of the precedence register relays 2000 and the precedence detector 2300*

Before proceeding with the description of the operation following registration of a precedence indicator in the precedence detector 2300, a description will now be given of the operation of the precedence register relays 2000 to prevent the precedence detector 2300 from responding to signals transmitted thereto corresponding to either two or three letter codes identifying the lines (channels) over which a received message has been transmitted in reaching the relay switching center UAC and the three digit codes identifying the number applied to the message as it is transmitted over each of the identified lines (channels).

In this connection it will be recalled that the message received in the relay switching center UAC from the relay switching center UEP included a start-of-message indicator comprising the characters XZXZXZX followed by a two letter or a three letter code identifying the incoming line from the switching center UEP to the switching center UAC and a three digit channel number 001 indicating the number of the message transmitted over the incoming line from the switching center UEP. This information was utilized in the incoming line circuit 400 to operate the start-of-message detector and to compare the channel number indicator with the number preregistered in the channel number comparator 900. After these items of information have been successfully registered and compared in the manner previously described, the director 200A is associated with the incoming line circuit 400. If the message originated at the relay switching center UEP and was transmitted therefrom directly to the relay switching center UAC, then the item of information perforated on the tape following the channel number indicator will be one of the precedence indicators described above which is followed by the routing indicator identifying the relay switching center or tributary station to which the message must be retransmitted.

However, if the present message originated at some switching center which is remote from the relay switching center UEP, then the message as it is transmitted from the switching center UEP will include the identity of each of the lines (channels) over which the message was transmitted from one switching point to the next and the channel number indicator identifying the number of the message at the time it is retransmitted from each of the switching centers to the next switching center. In other words, the two or three letter codes identifying the different lines and the channel number indicators identifying the number of the message as it is transmitted from each switching point is accumulated and retransmitted with the message so that when the message ultimately reaches its final destination it will include the identity of each line (channel) over which it is transmitted from its originating point to its terminating point and it will include the three digit channel indicators identifying the number of the message as it is transmitted over each of the identified lines.

Thus, if the present message was transmitted from some point remote from the relay switching center UEP, one or more two or three letter line identifying (channel) letters and three digits identifying the number of the message will be perforated on the tape 333 between the channel number indicator 001 and the precedence indicator. In other words, the message will, for example, contain the following items:

1. XZXZXZX Start-of-message indicator.
2. AB001 Line designation of two or three letters and channel number indicator of three digits.
3. CD056 Line designation of two or three letters and channel number indicator of three digits.
4. AK083 Line designation of two or three letters and channel number indicator of three digits.
5. NMNM Deferred precedence indicator.

Items 1 and 2 above are utilized as described above to control the incoming line circuit 400 to register the start-of-message indicator and to control the comparison of the channel number indicator 001 with the number preregistered in the comparator 900. The information contained in items 3 and 4 are accumulated as a result of the message having been transmitted through two switching centers prior to reaching the switching center UEP. Item 5, as previously noted, is the precedence indicator that is sensed by the precedence sensing circuit 1900 and the precedence registers relays 2000 and is registered in the deferred precedence register 2300NM of the precedence detector 2300. Since items 3 and 4 appear on the tape 333 before the precedence indicator of item 5 they may inadvertently cause the precedence sensing circuit 1900 and the precedence register relays 2000 to inadvertently register a false precedence indicator in the precedence detector 2300. In order to avoid this possibility, the precedence register relays 2000 are provided with a figures shift relay R2060 and a letters shift relay R2065. These relays are arranged so that they will block operation of the M relay R2020, the O relay R2025, the P relay R2030, the N relay R2035, the R relay R2040, the ZA relay R2045, the ZZ relay R2050, the ZV relay R2055, whenever the figure shift relay R2060 is in its operated position.

Since the precedence sensing circuit 1900 is associated with the incoming line circuit 400 in response to the successful comparison of item 2 above, the sensing relay group 1901 will normally respond to the perforations on the tape 333 corresponding to items 3, 4 and 5 noted above. However, between the perforations corresponding to item 2 and the perforations corresponding to item 3, the tape will be perforated with a letters shift character to indicate that the following perforations correspond to letters and, in the present case, are the letters CD. When the letters shift character is sensed by the sensing relay group 1901, the five sensing relays R1910A to R1910E all operate in the manner previously described. As a result of the operation of the five sensing relays a circuit is completed which may be traced from ground by way of the contacts 1911′, 1915′, 1919′, 1926′ and 1934′ and the winding of the letters shift relay R2065, to battery.

The relay R2065 operates over this circuit but since it is provided for the purpose of restoring the figures shift relay R2060 it performs no function at the present time. Thereafter, the sensing relay group 1901 is controlled in accordance with the letters C and D of item 3 in the usual manner. Since the letters C and D do not correspond respectively to any of the letters indicated by the precedence register relays 2000 or any of the letters of the various precedence indicators of the precedence detector 2300, the relays of the precedence register relays 2000 and the detectors in the precedence detector 2300 do not operate. It is contemplated in the present system that no line (channel) designation include any letters corresponding to the letters of any precedence indicator. By arranging the incoming lines (channels) so that they are identified by letters other than those employed in a precedence indicator, the precedence detector 2300 will not be falsely operated.

After the letters C and D of item 3 have been sensed by the precedence sensing relay group 1901, the perforations on the tape 333 corresponding to a "figures shift" will be sensed. The "figures shift" function is included in item 3 between the letter D and the digit 0 and indicates that the next perforations in the tape 333 will be digits. When this character is sensed by the sensing relay group 1901, the relays R1910A, R1910B, R1910D and R1910E will operate in order to complete a circuit for the figures shift relay R2060 which includes ground, contacts 1911′, 1915′, 1920′, 1927′, 1935′, the winding of the figures shift relay R2060 and the resistor 2063, to battery. The relay R2060 operates and, at its contacts 2061, locks itself to the now grounded conductor C2101–1 extending to Fig. 24. As a further result of the operation of relay R2060, at its contacts 2062, it removes the marking ground potential from the contacts 1968 and 1969 in order thereby to prevent subsequent operation of any of the relays in the sensing relay group 1901 from operating any of the relays R2020, R2025, R2030, R2035 or R2040. Also, the removal of ground at contacts 2062 renders the circuits including the contacts 1911, etc., and 1912, etc. controlled by the relays R1910A to R1910E, respectively, ineffective. In view of the foregoing description of the operation of the figures shift relay R2060 which now remains in its operated position during the sensing of the digit 056 of item 3, it will be appreciated that the above noted relay R2020 to R2040, inclusive, in the precedence register relays 2000 and the relays R2045, R2050 and R2055 in the multiple address register 2001 will not operate and cause the false registration of a precedence indicator in the precedence detector 2300.

In further explanation of the reason for operating the figures shift relay R2060 during the sensing of a channel number indicator in order to prevent false operation of the precedence detector 2300, attention is directed to the fact that the perforations on the tape 333 corresponding to the various digits 1 to 9 and 0, inclusive, also correspond to predetermined letters as is apparent in Fig. 46. Since it is necessary to utilize three digit numbers to identify the various messages in sequence, it is impossible to avoid the use of certain digits or combinations of certain digits in a three digit channel number indicator which correspond to predetermined precedence indicators. Consequently, by operating the figures shift relay R2060 prior to the sensing of the digits of a channel number indicator, the false operation of the precedence detector 2300 is prevented.

After the three digits of the channel number indicator, which in this case are the digits 056 of item 3, have been sensed by the sensing relay group 1901, perforations corresponding to a letters shift will then be sensed by the sensing relay group 1901. When the letters shift is sensed, the letters shift relay R2065 operates in the manner previously described and, at its contacts 2067, it completes an obvious circuit for short-circuiting the figures shift relay R2060 which now restores to normal in order to render subsequent operation of the sensing relay group 1901 effective to control all of the relays in the precedence register relays 2000. In conclusion it should be noted, that, at its contacts 2066, the letters shift relay R2065 applies ground potential to the conductor C1901–MU in the same manner and for the same purpose as the contacts 2007, 2012 and 2017 on the relays R2005, R2010 and R2015. The latter circuit, however, including the contacts 2066, retains any of the operated relays in the flash and emergency detector 2300FE in their operated positions in the event that a letters shift character function is sensed by the tape reader during the sensing of a flash or an emergency precedence indicator. It will be recalled that the flash indicator includes seven "bell" characters followed by the letters FL and that the emergency precedence indicator includes seven "bell" characters followed by the letters EM. Therefor, between the sensing of a "bell" character and the sensing of either the letter F or the letter E, the usual letters shift character function will be inserted therebetween.

In view of the foregoing, it will be appreciated that the provision of the figures shift relay R2060 and the letters shift relay R2065 will prevent the precedence detector 2300 from falsely responding to any of the digits in the channel number indicator sensed by the tape reader. Thus, items 3 and 4 of the above noted message will not falsely control the precedence indicator 2300, whereas, the sensing of the characters corresponding to item 5 will control the precedence sensing circuit 1900 to register a "deferred" precedence indicator in the precedence detector 2300NM of the precedence detector 2300.

*Detecting a routing indicator*

After one of the previously described precedence indicators has been registered in the precedence detector 2300, the next item of information appearing on the tape 333 and sensed by the tape reader 340 is the routing indicator comprising either 3, 4 or 5 letter characters identifying the called destination of the particular message. The present message being received at the relay switching center UAC is to be transmitted to the tributary station JWPA located in the geographical area served by the relay switching center JWP. Consequently, the routing indicator of the present message is the four letters JWPA which are perforated in the order named on the tape 333 preceded by a "space" character function in order to separate the precedence indicator of the message and the routing indicator. In order to detect and register the letters included in a routing indicator, the director 200 is provided with an address detector 1100 (Figs. 11 to 14, inclusive) and a routing register 1500 (Figs. 15 and 16). These units of equipment cooperate to register each of the three, four or five letters of a routing indicator perforated on the tape 333 and to determine whether the first three letters of a routing indicator correspond to an available relay switching center. Furthermore, the address detector 1100 and the routing register 1500 cooperate to control the routing translator 2900 (Figs. 29 to 32, inclusive), which is common to all of the directors in the relay switching center, in order to identify the particular outgoing line extending in the direction of the proper destination.

Referring now to the address detector 1100 (Figs. 11 to 14, inclusive), it will be seen that the relays in the address sensing relay group 1201 are connected, in multiple with the relays in the precedence sensing relay group 1901, through contacts 1290A to 1290E of the address connect relay R1290 to the various sensing conductors C841 and C845 extending to the contacts controlled by the relays in the sensing relays 401 of the incoming line circuit 400. It will be recalled that the latter relays are controlled directly by the contacts of the tape reader 340 in accordance with the various code perforations appearing on the tape 333.

In view of the foregoing, it will be understood that the relays in the address sensing relay group 1201 normally operated in the same manner as the relays in the precedence sensing relay group 1901 but during the sensing of the precedence indicator the sensing relays 1201 are normally disconnected from the sensing leads due to the fact that the address connect relay R1290 is not operated until a precedence indicator has been sensed and registered by the precedence sensing relay group 1901. It will be appreciated that the precedence sensing relay group 1901 will also operate in the same manner as the address sensing relay group 1201 during the sensing of the routing indicator but the precedence register relays 2000, controlled by the relay group 1901, will not perform any registration in the precedence detector 2300 since the precedence detector has already been operated to register the precedence indicator of the message being received. Consequently, in the following description the multiple operation of the relays in the precedence sensing relay group 1901 will be ignored during the operation of the relays in the address sensing relay group 1201 in accordance with the routing indicator.

At the outset, it is to be noted that the address connect relay R1290 operates under control of the relay R2110 incident to the registration of a precedence indicator in order to connect the address sensing relays 1201 to the sensing conductors C841 to C845 by way of the contacts 1290A to 1290E. The address sensing relay group 1201 includes five relays R1230A to R1230E, inclusive, which may be operated individually or in combinations in series with the relay R1280. These relays are selectively controlled in accordance with the code of the character perforated on the tape 333 and they perform various operations, whereby the address detector 1100 and the routing register 1500 will sense and register the characters forming a three, four or five letter routing indicator. The sequence control relays 1300 included in the address detector 1100 are provided to determine whether the first and the second characters sensed by the relay group 1201 are good first and second characters and are sensed in the proper sequence. As illustrated, the sequence control relays 1300 include the NB relay R1310–1, the NJ relay R1310–2, the NU relay R1310–3 and the N relay R1310–4. The first three relays noted above are connected to pyramid contacts on the relays in the address sensing relay group 1201 and operate only in response to the sensing of the letters B, J and U, respectively. Consequently, in the system illustrated, the first letter of a routing indicator must be any one of the three letters B, J or U. The N relay R1310–4 has been illustrated to represent any one or more of the remaining 23 letters in the alphabet as possible first letters of routing indicators. These 23 relays represent the remaining 23 letters in the alphabet, and if they are required in a switching system they will be connected and arranged with the pyramid contacts of the relays in the address sensing relay group 1201 so that they may be individually operated in accordance with the perforated codes of the corresponding letters. It is believed that the description of the operation of the relays NB, NU and NJ, R1310–1 to R1310–3, inclusive, will be sufficient to readily understand the operations in the event that it is necessary to add other first letters to routing indicators.

The address sensing relay group 1201 is also arranged so that it will control, through the pyramid contact arrangement, any one of the eight sequence control relays R1310–5 to R1310–12, inclusive, in accordance with specific second letters of a routing indicator. In the present arrangement the eight relays are respectively designated ARL, ARH, ARM, ARW, ARA, ARK, ARF and ARE and they respectively indicate the second letter in a routing indicator corresponding to the last letter of the above noted designations. The AR relay R1310–13 is representative of the remaining letters in the alphabet which may be added as a second letter in a routing indicator and it should be understood that this relay and all of the other added relays representing second letters of a routing indicator will also be wired and connected in the substantially same manner as the relays R1310–5 to R1310–12.

Referring now to the routing register 1500 (Figs. 15 and 16), associated with the address detector 1100, it will be seen that it is provided with five registers respectively designated 1501, 1502, 1601, 1602 and 1603. Each of the above registers include five relays, for example, R1500A to R1500E, inclusive, which are operated individually or in combinations to register the letters sensed by the address sensing relay group 1201. As each sensed letter is sequentially registered, the relays R1540, R1550, R1640, R1650, R1660 and R1670 are sequentially operated in a predetermined order to switch the conductors C1201A to C1201E, inclusive, controlled by the sensing relay group 1201, to each of the different registers 1501, 1502, etc. An arrangement is also provided in the routing register 1500 for registering a second letter which is not a "good" second letter but is acceptable as a "good" first letter of a routing indicator in the appropriate register so that the routing register 1500 will be conditioned to receive and register the third letter as a second letter of a routing indicator and will register the fourth, fifth and sixth letters as good third, fourth and fifth letters of a routing indicator. In other words, the routing register 1500 is arranged so that it will always register a sensed second letter of a routing indicator either as a good second letter or as a good first letter in the second register 1502.

The present system is arranged so that the first character (letter) of a routing indicator must be one of the three letters, B, J, or U, it being understood, of course, that this may be increased to 26 letters if necessary. Also, the present system is arranged so that the second character (letter) of a routing indicator must be any one of the eight letters, A, E, F, H, K, L, M or W and if a second letter, sensed by the address sensing relay group 1201, is any other letter than the eight noted above, it will not be acceptable as a good second character. If the second character is one of the three letters B, J or U, it will be accepted and registered as a good first character in the second register 1502.

In the present system each of the relay switching centers, illustrated in Fig. 1, is identified by a three character code and each of the tributary stations served by the relay switching centers are identified by either a four or a five character code.

The message being received at the relay switching center UAC and which has been described thus far, is intended for the tributary station JWPA served by the relay switching center JWP. Consequently, the first letter J of the routing indicator JWPA is sensed by the tape reader 340 in the manner previously described whereupon the sensing relays 401 now control the address sensing relay group 1201 in the same manner as has been described previously. In response to the sensing of the letter J, the relays R1230A, R1230B and R1230D operate in series with the relay R1280. At the contacts 1232, 1243 and 1267, the relays R1230A, R1230B and R1230D complete a circuit, including the contacts 1254 and 1278 and the conductor C1288J, for operating the NJ relay R1310–2. Thus, it is apparent that the first character of the routing indicator is a good first character. However, it should be noted that if the first character of the routing indicator is either the letter B or the letter U the relays in the address sensing group 1201 would operate to complete circuits for operating either the NB or the NU relay R1310–1 or R1310–3. The last mentioned relays are provided with contacts which are in multiple with the contacts on the relay NJ R1310–2 and they perform the same operating functions. In addition to the foregoing, it should be apparent that additional first letters could be provided by adding other relays such as the relay R1310–4 to register any other first character.

As soon as the NJ relay R1310–2 operates, at its contacts 1314, it applies ground potential to the start conductor C1301–A extending to Fig. 15 in order to operate the network relay R1540 over a circuit including its upper winding. The network relay R1540 operates over the above traced circuit only sufficiently to close its "X" contacts 1544′ thereby to provide a locking circuit which will include its upper and lower windings. The operating ground applied to the conductor C1301–A is also extended by way of the contacts 1541′, conductor C1301–H extending to Fig. 13, contacts 1348, contacts 1231, 1241, and 1261 in multiple, conductors C1201–A, C1201–B and C1201–D respectively extending to Fig. 15, contacts 1541, 1543, 1547, respectively, and the windings of the relays R1500A, R1500B and R1500D, respectively, to battery, whereby the latter relays in the register 1501 are operated to register the character J sensed by the address sensing group 1201. As soon as the relays R1500A, R1500B and R1500D operate they immediately lock in their operated positions over a circuit including their inner-upper make contacts, the locking conductor C1401–E extending to Fig. 14, contacts 1436 and 1486, to ground. The last mentioned contacts are closed at this time since the release relay R1480 was operated under control of the guard slave relay R1150 as soon as the director 200 was connected to the incoming line circuit 400. In view of the foregoing, it should be understood that the relays R1500A, R1500B and R1500D in the register 1501 now register the first character J of the routing indicator JWPA. It should be noted, however, that if the relays in the address sensing relay group 1201 were operated in accordance with the letters B or U, the corresponding letters would then be registered in the first register 1501.

At the conclusion of the sensing of the first character J, the tape reader 340 will cause the operated relays in the sensing relays 401, the operated relays in the address sensing group 1501 and the NJ relay R1310–2 to restore to normal. As soon as the relay R1310–2 restores, it removes ground potential from the start conductor C1301–A whereupon the network relay R1540 operates fully over a circuit which includes its upper and lower windings, contacts 1544 and the conductor C1401–A which is grounded at the contacts 1482 of the operated release relay R1480. As soon as the relay R1540 operates fully over the last mentioned locking circuit, at its contacts 1541 to 1549, inclusive, and 1540, it transfers the conductors C1201–A to C1201–E, inclusive, from the register relays in the register 1501 to circuits including the windings of the register relays in the register 1502. Thus, the second register 1502 is connected so that it will register the second character of the routing indicator.

The tape reader 340, now senses the second character W perforated on the tape 333 whereupon the sensing relays 401 and the relays in the address sensing relay group 1201 operate in accordance with the letter W. Accordingly, the relays R1230A, R1230B and R1230E, all operate in series with the relay R1280. At the contacts 1232, 1243 and 1277, the above noted relays complete a circuit including the conductor C1288–W for operating the ARW relay R1310–8. Since the character W is a good second character, a circuit is completed for operating the good second character relay R1420 in order to register the receipt of a good second character. This circuit includes the lower winding of the relay R1420, contacts 1326 of the operated ARW relay R1310–8, conductor C1301–TH extending to Fig. 15, contacts 1559′ and 1549′, conductor C1201–F extending to Fig. 12, and contacts 1281 of the operated relay R1280. It should be noted that the above traced circuit will be completed for operating the good second character relay R1420 if any one of the relays R1310–5 to R1310–13, inclusive, is operated in accordance with a good second character in the routing indicator. However, if any one of the above noted relays fails to operate in response to the second character of a routing indicator sensed by the tape reader 340, the circuit will instead be completed for the bad second character relay R1410. The latter operation, however, will be described hereinafter.

As soon as the above traced circuit is completed for the lower winding of the relay R1420, it immediately closes its "X" contacts 1424 thereby completing the circuit for its upper winding to ground at contacts 1489 of the operated release relay R1480. Thus, the good second character relay R1420 is now locked in its operated position over a circuit which is independent of its initial operating circuit. As a further result of the operation of the relay R1420, at its contacts 1422, it completes a circuit including ground at contacts 1283, step conductor C1401–M extending to Fig. 15, contacts 1551′ and the upper winding of the area relay R1550, to battery. The relay R1550 operates over the above mentioned circuit and closes its "X" contacts 1553′ to prepare a locking circuit for itself. As a further result of the operation of the relay R1420, at its contacts 1423, it completes a circuit including ground at contacts 1283, contacts 1438 and the upper winding of the double pulse relay R1460, to battery. The latter relay now operates and, at its contacts 1462, locks itself in its operated position over a circuit including its lower winding and ground at contacts 1498.

Since the network relay R1540, at its contacts 1542′, has applied ground potential to the conductor C1301–H this ground potential is now connected by way of the contacts 1348 to the contacts 1231, 1241 and 1271 of the operated relays R1230A, R1230B and R1230E. Accordingly, the conductors C1201–A, C1201–B and C1201–E extending to Fig. 15, are grounded in order now to operate the relays R1510A, R1510B and R1510E in the register 1502. These relays upon operating lock in their operated positions over a circuit including their inner-upper contacts and the conductor C1401–K which is grounded over a circuit including the contacts 1487 and 1457. Consequently, the good second character W is now registered in the register 1502 of the routing register 1500.

In view of the foregoing, it should also be apparent that any of the other seven good second characters A, E, F, H, K, L and M may also be registered in the same manner as has been described above. It should also be apparent that other good second characters may be provided by supplying additional relays, such as the relay R1310–13, and corresponding circuit connections.

At the end of the sensing cycle of the second character W, the tape reader 340, the sensing relays 401 and the operated relays in the address sensing relay group 1201 all restore to normal in the manner previously described. The relay R1280 also restores to normal and, at its contacts 1281, removes ground potential from the conductor C1201–F and, at its contacts 1282, it completes a circuit including contacts 1461 for operating the double pulse relay R1465. Finally, at its contacts 1283, the relay R1280 disconnects ground potential from the circuit including the contacts 1422 and the step conductor C1401–M. As soon as the ground potential is removed from conductor C1401–M, the area relay R1550 locks itself in its operated position over a circuit including its upper and lower windings in series, contacts 1553′, conductor C1401–L, contacts 1488 and ground at contacts 1456. The completion of the last mentioned locking circuit causes the relay R1550 to actuate all of its remaining contacts, whereby the conductors C1201–A to C1201–E, inclusive, are transferred to the contacts controlled by the network 2 relay R1640.

As soon as the double pulse relay R1465 operates, as noted above, it locks itself in its operated position over a circuit including the contacts 1467 and 1489. At its contacts 1468, the relay R1465 completes an obvious circuit for operating the slow-to-operate double pulse relay R1470. Finally, at its contacts 1466, the relay R1465 now reapplies ground potential by way of the contacts 1471, conductor C1401–M extending to Fig. 15, contacts 1552′ of the now fully operated area relay R1550, contacts 1641′ and the upper winding of the network 2 relay R1640, to battery. This relay now operates its "X" contacts 1643′ in order to prepare its locking circuit. Shortly following the completion of the circuit for the slow-to-operate relay R1470, it operates and interrupts, at its contacts 1471, the application of ground potential of the step conductor C1401–M. Consequently, the network 2 relay R1640 operates fully over the locking circuit including its upper and lower windings in series, contacts 1643′ and the grounded conductor C1401–L. As soon as the relay R1640 fully operates, at its contacts 1642′, it prepares an operating circuit for the relay R1650 and, at its contacts 1641 to 1649, inclusive, and 1640, it transfers the conductors C1201–A to C1201–E, inclusive, to the circuit including the relays (not shown) of the register 1601.

The tape reader 340 now senses the third character P of the routing indicator JWPA and in the previously described manner, the relays R1230B, R1230C and R1230E and the relay R1280 in the address sensing relay group 1201 are operated. In the present system, the third character of a routing indicator may be any one of the 26 letters of the alphabet. Consequently, if the third character sensed by the address sensing relay group 1201 corresponds to any good first and second characters, such as the characters corresponding to the relays included in the sequence control relays 1300, the corresponding relays in the relay group 1300 will operate but they will perform no operating controls at this time. However, at the contacts 1231, 1241, 1251, 1261 and 1271, the operated relays in the sensing relay group 1201 will register the received third character of the routing indicator in the third register 1601 in the manner previously described. In the present example, the letter P is sensed by the relay group 1201 and, consequently, the conductors C1201–B, C1201–C and C1201–E will be grounded in order to operate the corresponding register relays (not shown) in the register 1601. The latter relays will lock to the conductor C1401–B extending to Fig. 14, where it is grounded at the contacts 1483. As soon as the relay R1280 operates, at its contacts 1283, it reapplies ground potential by way of the contacts 1422 to the step conductor C1401–M, thereby to energize the upper winding of the relay R1650 which operates sufficiently to close only its "X" contacts 1653′. At the contacts 1281, the relay R1280 also applies ground potential to the conductor C1201–F extending to Fig. 15, but since the area relay R1550 is now operated it prevents, at its contacts 1559′, the ground potential from being applied to the conductor C1301–TH.

At the end of the sensing cycle of the third character P the operated relays in the address sensing relay group 1201 restore to normal, whereby the contacts 1283 remove ground potential from the conductor C1401–M in order to permit the relay R1650 to fully operate over a circuit including both its windings in series, contacts 1653′ and the grounded conductor C1401–L. At its contacts 1651 to 1659, inclusive, and 1650, the relay R1650 transfers the conductor C1201–A to C1201–E, inclusive, from the register 1601 to the register 1602. At its contacts 1652′, the relay R1650 prepares a point in the circuit for operating the relay R1660 and, at its contacts 1650′, it prepares a point in the circuit including the conductor C1301–G extending to Fig. 13, for operating the address received relay R1340 in the event a "carriage return" function is now sensed by the tape reader 340.

The tape reader 340 now senses the fourth character A of the routing indicator JWPA whereupon the relays previously described are operated to register the fourth character A in the register relays (not shown) of the register 1602. The operated relays in the register 1602 are also locked in their operated positions to the conductor C1401–C extending to Fig. 14, which is grounded at the contacts 1484. At the beginning of this sensing cycle, the relay R1280, at its contacts 1283, reapplies ground potential to the step conductor C1401–M extending to Fig. 15, in order now to operate the relay R1660 in its first step to close only its "X" contacts 1663′.

At the end of the sensing cycle, the various relays described previously are restored to normal, whereupon ground potential is again removed from the conductor C1401–M at the contacts 1283, in order to permit the relay R1660 to now fully operate over the locking circuit including both of its windings in series, contacts 1663′ and the grounded conductor C1401–L. At its contacts 1661 to 1669, inclusive, and 1660, the relay R1660 now transfers the conductors C1201–A to C1201–E, inclusive, from the register 1602 to the register 1603, thus preparing the register 1603 to receive a fifth character if one is sensed by the tape reader 340. Also at its contacts 1662′, the relay R1660 prepares a circuit for the relay R1670 whereby the latter relay will be operated if a fifth character is sensed by the tape reader 340. Finally, at its contacts 1666′ the relay R1660 prepares a point in the circuit including the conductor C1301–E extending to Fig. 13, for operating the address received relay R1340 in the event a "carriage return" function is now sensed by the tape reader 340.

Although the present routing indicator does not include a fifth character, it will be apparent from the foregoing description of the operation of the address detector 1100 and the routing register 1500 that a fifth character which may be any one of the 26 letters in the alphabet, may be registered in the fifth register 1603. In that event, the relay R1670 is again operated in its first step during the sensing of the fifth character and it fully operates at the conclusion thereof to prepare, at its contacts 1675′, a point in the circuit including the conductor C1301–C extending to Fig. 13, for operating the address received relay R1340 in the event that a "carriage return" function is sensed by the tape reader 340 at the conclusion of the registration of the fifth character. Furthermore, if a fifth character is registered in the register 1603, the operated relays therein will lock in their operated positions to the conductor C1401–D extending to Fig. 14, where it is grounded at the contacts 1485.

In view of the foregoing description of the operation of the address detector 1100 and the routing register 1500, it is apparent that if the first two characters of a routing indicator are "good" first and second characters, respectively, the third, fourth or fifth characters of a routing indicator will be successively registered in the registers, 1601, 1602 and 1603 of the routing register 1500. If only three characters constitute the routing indicator, the operated relay R1650 then prepares the previously described circuit, whereby the address received relay R1340 may be operated. This same circuit is also prepared over another path in the event that four characters constitute the routing indicator; also the same circuit is prepared over still another path in the event that five characters constitute the routing indicator. Thus, following the complete registration of either a three, four or five character routing indicator, the tape reader 340 will normally sense a "line feed," a "space" or a "carriage return" function to indicate the conclusion of the characters constituting the completed routing indicator. However, before describing the operations resulting from the receipt of a "line feed," "space" or "carriage return" function, it is deemed advisable at this time to describe the operation of the address detector 1100 and the routing register 1500 in the event that a "good" first character has been registered and that the second character of the routing indicator is not usable as a second character but is usable as a "good" first character or in the event the first character is a "good" first character and the second character of the routing indicator is neither a "good" second character nor a "good" first character.

*Detecting a routing indicator which includes a "good" first character followed by a second character which is a "good" first character but is not usable as second character*

In the foregoing description of the address detector 1100 and the routing register 1500 it was pointed out that a good first character, either B, J or U, may be registered in the register 1501; that a good second character, either A, E, F, H, K, L, M or W, may be registered in the register 1502; and that the third, fourth and fifth characters, comprising any of the 26 letters of the alphabet, may be successively registered in the registers 1601, 1602 and 1603. One of the special features of the address detector 1100 and the routing register 1500 comprises the arrangement whereby a second character of a routing indicator, which is not one of the above noted eight second characters, will be retained registered if it is usable as a good first character. This feature anticipates the possibility that a routing indicator being sensed by the tape reader 340 may include a usable first character B, J or U followed by a second character which is not usable as a second character but which may be the first character B, J or U beginning a proper routing indicator. Therefore, it is essential that the second character, although not usable as a good second character, be retained registered in the routing register 1500 as a good first character in order to continue with the registration provided the succeeding or third character is a usable second character.

In order to describe this feature it will be assumed that the tape reader 340 has sensed the good first character J in the manner previously described and that it has been registered in the register 1501. At the conclusion of the registration of the good first character J, the network relay R1550 is locked in its operated position in order to transfer the conductors C1201–A to C1201–E, inclusive, to the second register 1502. If the tape reader 340 now senses the letter J as a second character of a routing indicator, the address sensing relay group 1201, will operate in the manner previously described, whereby the NJ relay R1310–2 is reoperated. It will be recalled at this time, however, that a good second character of a routing indicator normally operates one of the relays R1310–5 to R1310–12, inclusive. However, in the assumed example none of these relays operate. Consequently, the NJ relay R1310–2 operating in response to a second character completes the following circuits. At its contacts 1313, the relay R1310–2 completes a circuit for operating the good first character relay R1430, which may be traced from the winding of the relay by way of the contacts 1313, conductor C1301–TH extending to Fig. 15, contacts 1559′ and 1549′, conductor C1201–F extending to Fig. 12, and ground at contacts 1281 of the now operated relay R1280. The ground potential applied to the conductor C1301–TH in the above described circuit, is also extended by way of the contacts 1319, 1321, 1323, 1325, 1327, 1329, 1331, 1333 and 1335 and the winding of the bad second character relay R1410. As soon as the relay R1430 operates, it prepares, at its contacts 1432, a point in the circuit for operating relay R1435. Accordingly, as soon as the slow-to-operate relay R1410 operates, it completes, at its contacts 1411, a circuit for connecting the ground potential applied to the conductor C1301–TH by way of the contacts 1432 and 1445 and the winding of the relay R1435, to battery. Incident to the operation of the relay R1435, at its contacts 1436, it now disconnects the ground at contacts 1486 from the conductor C1401–E extending to Fig. 15 in order to restore the operated relays in the register 1501, thereby to abandon the registration of the good first character J of the received routing indicator. At its contacts 1438, the relay R1435 interrupts a further point in the incomplete circuit for the double pulse relay R1460 and, at its contacts 1437, it now connects ground at the contacts 1283 by way of the contacts 1451, conductor C1401–M extending to Fig. 15, contacts 1551′ and the upper winding of the area relay R1550, to battery. The relay R1550 operates in its first step to close only its "X" contacts 1553′.

Since the relays in the address sensing relay group 1201 are at the present time operated in accordance with the second character J (a good first character but a bad second character) the contacts 1231, 1241 and 1261 are closed in order to operate the relays R1510A, R1510B and R1510D in the register 1502 over previously described circuits including contacts on the operated network relay R1540 and contacts on the partially operated relay R1550. The operated relays in the register 1502 again lock in their operated positions over a circuit including the grounded conductor C1401–K.

At the end of the sensing of the second character J the operated relays in the address sensing relay group 1201 all restore to normal and the NJ relay R1310–2, the relay R1410 and the relay R1430 restore to normal. Incident to the restoration of the relay R1280, at its contacts 1283, it now removes ground potential from the conductor C1401–M, thereby causing the area relay R1550 to operate fully over the previously traced circuit including its upper and lower windings. As soon as the operating ground is removed from the conductor C1301–TH, at the contacts 1281, the relays R1410 and R1430 restore as noted above and the relay R1435 now locks itself in its operated position over a circuit including its contacts 1439, contacts 1458, winding of relay R1440 and ground at contacts 1481. The relay R1440 operates over the above traced locking circuit and, at its contacts 1441, it disconnects the conductor C1401–G from the conductor C1401–H in order to interrupt a further point in an incomplete circuit for the transfer-2 relay R1520 and, at its contacts 1442, it connects the conductor C1401–G to the conductor C1401–F in order to prepare a further point in the incomplete circuit for the transfer-3 relay R1530. At its contacts 1444, the relay R1440 connects the ground potential at the contacts 1486 to the conductor C1401–E extending to Fig. 15, in order to recondition the locking circuit for the relays in the first register 1501.

At the present time, the second received character (J) of a routing indicator is registered in the second register 1502 as a good first character. When the routing translator 2900 (Figs. 29 to 32, inclusive) is subsequently connected to the routing register 1500, the transfer-3 relay R1530 will be operated to connect the markings of the character J registered in the second register 1502 to appropriate conductors so that the good first character (J) registered in the second register 1502 will be properly registered in the first character decoding relays 2901 in the routing translator 2900.

The third character in the sequence of the routing indicator being sensed by the tape reader 340 will now be registered in the first register 1501 instead of in the third register 1601 due to the fact that the network-2 relay R1640 is in its restored position. However, it should be understood that the third character of the sequence must now be a good second character.

Consequently, it will now be assumed that the third character sensed by the tape reader 340 is a good second character, for example the character W, whereupon the relays R1230A, R1230B, R1230E and R1280 in the address sensing relay group 1201 will operate in the manner previously described and cause the operation of the ARW relay R1310–8 in the sequence control relays 1300. At its contacts 1325, the relay R1310–8 interrupts a point in the incomplete circuit for the bad second character relay R1410 and, at its contacts 1326, it prepares a point in the circuit for the good second character relay R1420. Consequently, the relay R1280 upon operating during the sensing cycle, at its contacts 1281, applies ground potential by way of the conductor C1201–F, contacts 1549′, conductor C1401–J extending to Fig. 14 (instead of the conductor C1301–TH, inasmuch as the contacts 1559′ have been opened by the full operation of relay R1550), contacts 1443, 1421 and 1426 and the lower winding of the relay R1420, to battery. The relay R1420 now operates and closes only its "X" contacts 1424 in order to complete the locking circuit including its upper winding and ground at contacts 1489. As a further result of the operation of relay R1420, at its contacts 1421, it interrupts a point in its initial operating circuit and, at its contacts 1422, it reconnects the ground at the contacts 1283 to the step conductor C1401–M in order to operate the network–2 relay R1640 which closes its "X" contacts 1643' first to lock itself. At the contacts 1231, 1241 and 1271, the operated relays in the address sensing relay group 1201 apply ground potential to the conductor C1201–A, C1201–B and C1201–E in order to complete circuits including closed contacts on the operated relay R1540, closed contacts on the operated relay R1550, closed contacts on the restored relay R1640 and the windings of the relays R1500A, R1500B and R1500E in the first register 1501. These relays now operate and lock to the grounded conductor C1401–E.

At the present time the third character in the sequence sensed by the tape reader 340 is now registered in the first register 1501 as a good second character of the routing indicator. As explained above, the transfer relay R1530 will subsequently operate so that the good second character W will be transferred to the second character decoding relays 2902 in the routing translator 2900. Having now registered a good first character in the second register 1502 and a good second character in the first register 1501 in the order named, the remaining characters of a call indicator will now be registered respectively in the registers 1601, 1602 and 1603 in the manner previously described. However, the routing indicator may be completed either after the registration of the character in the third register 1601, the fourth register 1602, or the fifth register 1603 depending upon whether the complete routing indicator comprises three, four or five characters respectively.

In the foregoing description, it was assumed that the second character of the routing indicator is not acceptable as a good second character, but is acceptable as a good first character and as a result thereof, the first character is discarded from the first register 1501 and the second character is registered in the second register 1502 as a good first character. Thereafter, the third character, which is acceptable as a good second character of a routing indicator, is registered in the first register 1501.

It will now be assumed, however, that the first character of a routing indicator sensed by the tape reader 340 is a good first character and that it is registered in the manner previously described in the first register 1501. It will also be assumed that the second character sensed by the tape reader 340 is not usable as a good second character but that it is usable as a good first character. Consequently, the circuits operate in the manner described above, whereby the second character (a good first character) is registered in the second register 1502 and whereby the good first character is removed from the first register 1501. At this stage of the operation of the address detector 1100 and the routing register 1500, the network relay R1540 and the area relay R1550 are fully operated. Also the relays R1435 and R1440 are locked in series to ground at the contacts 1481. It will now be assumed that the third character sensed by the tape reader 340 is also a good first character, for example the character "J," and consequently, the relays R1230A, R1230B, R1230D and R1280 in the address sensing relay group 1201 operate in the manner previously described. As a result thereof, the NJ relay R1310–2 reoperates and, at its contacts 1313, again completes a circuit for operating the good first character relay R1430. This circuit may be traced from the winding of the relay R1430 by way of the contacts 1313, 1421, and 1443, conductor C1401–J extending to Fig. 15, contacts 1549', conductor C1201–F and ground at contacts 1281 of the operated relay R1280. At this time, the slow-to-operate bad second character relay R1410 is reoperated over the previously traced circuit including the normally closed contacts on the unoperated relays R1310–5 to R1310–13, inclusive, contacts 1421 and 1443 and the grounded conductor C1401–J. Relay R1430, at its contacts 1432, now prepares a point in the circuit for operating the relay R1450. As soon as the slow-to-operate relay R1410 closes its contacts 1411, the ground potential on the conductor C1401–J is extended by way of contacts 1437 and 1451 to the step conductor C1401–M extending to Fig. 15, in order to complete the circuit for the upper winding of the relay R1640. The relay R1640 operates in its first step to close only its "X" contacts 1643. Finally, at the contacts 1231, 1241 and 1261, the operated relays in the relay group 1201 complete the previously traced circuits including the conductors C1201–A, C1201–B and C1201–D for again registering the character J in the first register 1501 over circuits which now include closed contacts on the operated relays R1540 and R1550 and closed contacts on the unoperated relay R1640. The relays R1500A, R1500B and R1500D now reoperate to register the received third character (which is a good first character) and they lock to the grounded conductor C1401–E.

At the end of the sensing of this third character, the operated relays in the relay group 1201 again restore to normal, the NJ relay R1310–2 restores to normal and the operated relays R1410 and R1430 restore to normal. At this time, the removal of ground potential from the conductor C1401–J, at the contacts 1281 of the now restored relay R1280, causes the relay R1450 to lock itself in its operated position over a circuit including its contacts 1452, the winding of relay R1455 and ground at contacts 1447. As soon as the relay R1455 operates over the above traced locking circuit, at its contacts 1456, it removes ground potential from the conductor C1401–L extending to Fig. 15, in order to restore the area relay R1550 and the network-2 relay R1640 to normal. At the contacts 1457, the relay R1455 removes ground potential from the conductor C1401–K extending to Fig. 15, thereby causing the operated register relays in the second register 1502 to restore to normal. Attention is directed to the fact that the register 1502 formerly registered a good first character of a call indicator. This first good character is now registered in the first register 1501 even though it is the third received character in a sequence of characters of a routing indicator. Finally, at its contacts 1458, the relay R1455 interrupts the locking circuit for the relays R1435 and R1440, whereupon, these two relays now restore to normal. At its contacts 1441 and 1442, the relay R1440 reconnects the conductor C1401–G to the conductor C1401–H in order to prepare a point in the circuit for subsequently controlling the operation of the transfer-2 relay R1520. At its contacts 1443, the relay R1440 interrupts a point in the previously described circuit including the conductor C1401–J. Although the relay R1440, at its contacts 1444, opens a point in the previously traced circuit for applying ground potential to the conductor C1401–E, a multiple point in this circuit is closed at this time at the contacts 1436 of the restored relay R1435. In view of the latter circuit, the operated relays in the first register 1501 are retained in their locked position to register the third received character J as a good first character J. Finally, at its contacts 1447, the relay R1440 interrupts the locking circuit for the relays R1450 and R1455 which now restore to normal. Attention is directed to the fact that the network relay R1540 is retained locked in its operated position to the grounded conductor C1401–A so that the next character received and sensed by the tape reader 340 will be registered in the second register 1502 provided it is a good second character.

In view of the foregoing it should be understood that in response to the successive sensing of three good first characters, such as the character J, the first J character will be registered in the first register 1501; the second J character will be registered in the second register 1502 and at the same time the first J character registered in the first register 1501 will be discarded; and the third good character J will be reregistered in the first register 1501 and at the same time the second good character J is discarded from the second register 1502. At this time, both the address detector 1100 and the routing register 1500 are conditioned to register the following two, three, or four characters of a three, four or five character routing indicator.

If during the sensing operation of the tape reader 340, after the receipt and registration in the first register 1501 of a good first character, a character is sensed which is not acceptable as either a "good" second character or as a "good" first character of a routing indicator, the first character registered in either the first register 1501 or the second register 1502 will be discarded and all of the registers will be restored to their normal positions to await the receipt of a new sequence of characters for a routing indicator. For example, if the good first character J is registered in the first register 1501 and a second character is sensed by the tape reader 340 which is not acceptable as either a first or a second character, all of the relays in the sequence control relays 1300 will remain in their unoperated positions. Since a character has been sensed, however, one or more of the relays R1230A, R1230B, R1230C, R1230D and R1230E and the relay R1280 will be operated. At the contacts 1281, the relay R1280 applies ground potential by way of the conductor C1201–F, contacts 1549′ and 1559′, conductor C1301–TH, normally closed contacts on the relays R1310–5 to R1310–13 in order to operate the bad second character relay R1410. Since the good first character relay R1430 is not operated, the slow-to-operate relay R1410 extends its operating ground by way of its contacts 1411 and the contacts 1431 in order to operate the disconnect relay R1475. Upon operating, the latter relay, at its contacts 1476, interrupts the circuit for the release relay R1480 and the latter relay upon restoring, at its various contacts, removes ground potential from various holding circuits in order to restore all of the operated relays in the routing register 1500. At the end of the sensing cycle of the character which is not usable as a first or a second character of a routing indicator, the relays in the address sensing relay group 1201 restore to normal, whereupon the relay R1410 and the relay R1475 also restore to normal. At its contacts 1476, the relay R1475 completes the circuit for again operating the release relay R1480 in order to reestablish locking ground potentials for various circuits included in the address detector 1100 and the routing register 1500. As a result of the foregoing operations, the address detector 1100 and the routing register 1500 are reconditioned to detect and register a new sequence of characters of a routing indicator sensed by the tape reader 340.

It should be noted that the same operations will occur in order to release the address detector 1100 and the routing register 1500 to normal if a good first character should be registered in the second register 1502 instead of in the first register 1501. But since this operation for releasing the equipment is substantially identical to those described above, it is not deemed necessary to repeat detailed description of the operation.

*Seizing the routing translator 2900*

In the previous decription of the operation of the address detector 1100 and the routing register 1500, it was pointed out that either a three, four or five character routing indicator is registered in the registers 1501, 1502, 1601, 1602 and 1603. Immediately after the tape reader 340 senses the last character of a routing indicator perforated on the tape 333, it then senses either a "space," "line feed" or a "carriage return" function. In response to the sensing of a "space" character function by the tape reader 340, the relay R1230C and the relay R1280 in the address sensing relay group 1201 will operate in series in the manner previously described. Also, if a "line feed" character is sensed instead of a "space" character, the relay R1230B and the relay R1280, in the address sensing relay group 1201, will operate in series in the manner previously described. Finally, if a "carriage return" character function is sensed by the tape reader 340, the relay R1230D and the relay R1280 in the address sensing relay group 1201 will be operated. Each of the above noted character functions also control corresponding sensing relays in the precedence sensing relay group 1901.

Referring to the address detector 1100 (Figs. 11 to 14, inclusive) it will be seen that if the relays in the address sensing relay group 1201 are operated in response to a "space," "line feed" or "carriage return" function, a circuit will be completed for the address received relay R1340 which will operate to indicate that the full complement of characters for either a three, four or five character routing indicator has been registered in the routing register 1500. Referring now to the routing register (Figs. 15 and 16), it will be recalled that at the end of the registration of a three character routing indicator, the relay R1650 will be fully operated; that at the end of the registration of a four character indicator, the relay R1660 will be fully operated; and that at the end of the registering of a five character routing indicator the relay R1670 will be fully operated. Accordingly, at the contacts 1650′, the relay R1650 will apply the ground potential at the contacts 1676′ to the three character conductor C1301–G; at the contacts 1666′, the relay R1660 will apply ground potential at the contacts 1676′ to the four character conductor C1301–E; and at the contacts 1675′, the relay R1670 will apply ground potential to the five character conductor C1301–C. Each of the three conductors noted above extends to Fig. 13 and then by way of the contacts 1346, 1344 and 1342, respectively, in order to apply ground potential to the conductor C1284–AR. At the contacts 1248 of the relay R1230B, contacts 1252′ of the relay R1230C or contacts 1262′ of the relay R1230D, depending upon whether or not the "line feed," "space" or "carriage return" function is detected, the ground potential on the conductor C1284–AR will be extended to the winding of the address received relay R1340. The relay R1340 operates over one of the above circuits and immediately locks itself, by way of its contacts 1347, to ground at contacts 1481 of the operated release relay R1480. At its contact 1348, the operated address received relay R1340 disconnects the grounded conductor C1301–H from the upper contacts of the relays in the address sensing relay group 1201 and, at its contacts 1342, 1344 and 1346, it interrupts a point in the previously described operating circuit. At its contacts 1343 and 1345, the relay R1340 prepares points in two independent circuits for registering in the routing translator 2900 whether the routing indicator registered in the routing register 1500 is a four character routing indicator or a five character routing indicator. It should be understood, however, that if a three character routing indicator is registered in the routing register 1500 this fact will be registered in the routing translator 2900 by the failure to register therein a four or a five character routing indicator.

In certain messages sensed by the tape reader 340, a multiple address indicator (ZVA) may follow the last character of a routing indicator but separated by a "space" character function in which case the multiple address indicator (ZVA) actually constitutes part of the address information, that is the routing indicator. In the event that the message being sensed by the tape reader 340 is one which does not require the addition of a multiple address indicator, then two "carriage return" functions followed by a "line feed" character function will be sensed by the tape reader 340 immediately following the routing indicator.

In the present message it will be assumed that the "carriage return" function follows the routing indicator. Thus, the relay R1230–D and the relay R1280 in the address sensing relay group 1201 will operate and thereby complete the previously described operating circuit for the address received relay R1340 which immediately locks itself in its operated position. Inasmuch as the relays in the precedence sensing relay group 1901 are connected in multiple with the relays in the relays sensing group 1201, the relays R1910D and R1970 therein will also operate in series in response to the sensing of the above noted "carriage return" function. As soon as the relay R1910D operates, at its contacts 1927, it applies the ground potential by way of the contacts 2062, 1911, 1915, 1920, 1935 and 2113 to the conductor C2101–LF extending to Fig. 24. In this circuit the contacts 2113 were closed by the relay R2110 immediately following the registration of the precedence indicator. Referring now to Fig. 24, it will be seen that the ground on the conductor C2101–LF is further extended by way of the contacts 2441 (multiple address detector 2300MA in its unoperated position) conductor C2101–RM extending to Fig. 21, and the winding of the no multiple call relay R2150, to battery. The relay R2150 operates over the above traced circuit and, at its contacts 2151, it locks itself by way of the conductor C2101–1 extending to Fig. 24, to ground at contacts 2507 of the operated release relay R2500.

At the end of the sensing of the "carriage return" function by the tape reader 340 the operated relays in the address sensing relay group 1201 and the precedence sensing relay group 1901 restore to normal. However, in response to the sensing of the "carriage return" function the address received relay R1340 in the address detector 1100 and the relay R2150 in the precedence sensing circuit 1900 are operated and locked over circuits which are independent of their initial operating circuits.

Figure 17:
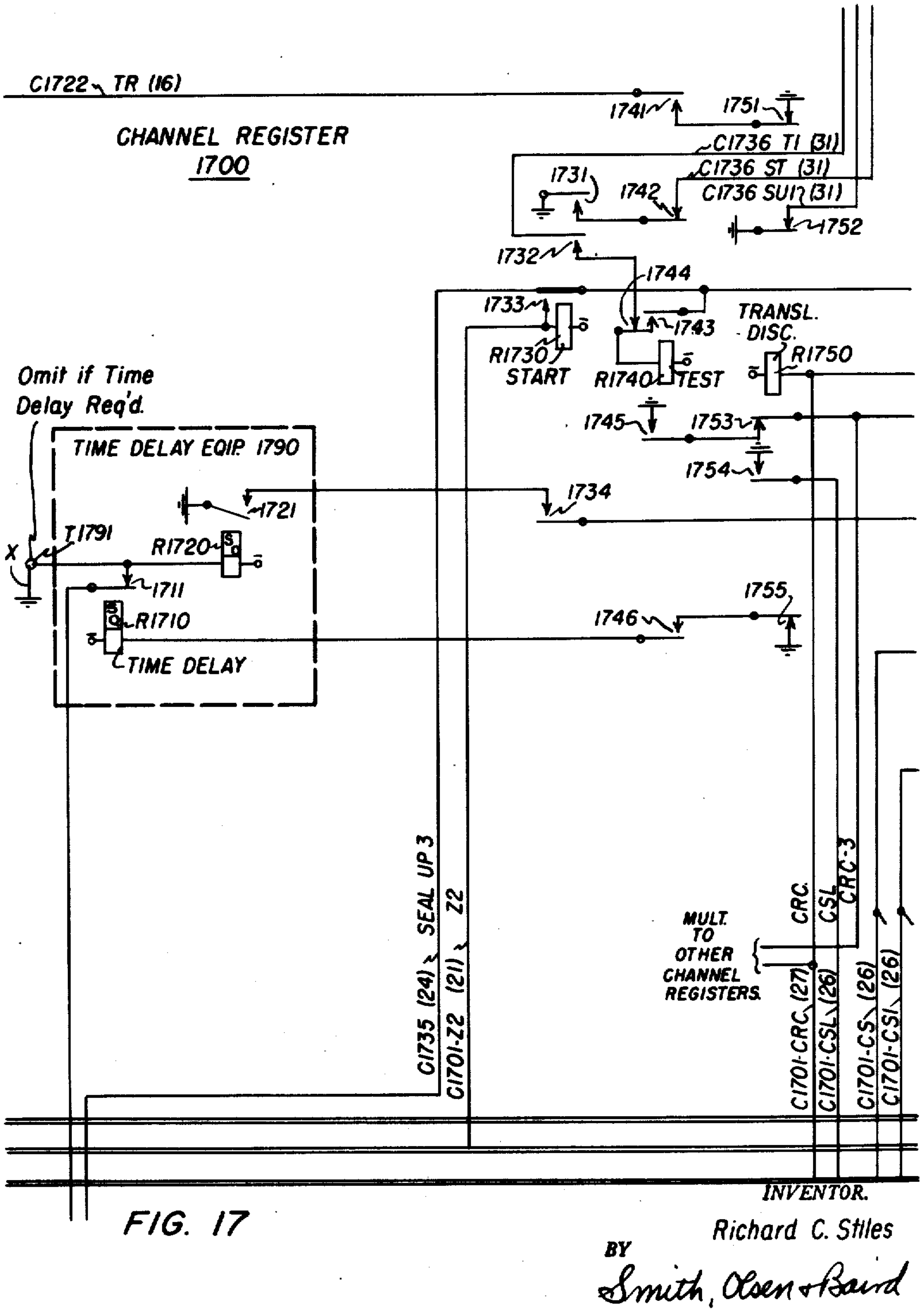
Figure 18:
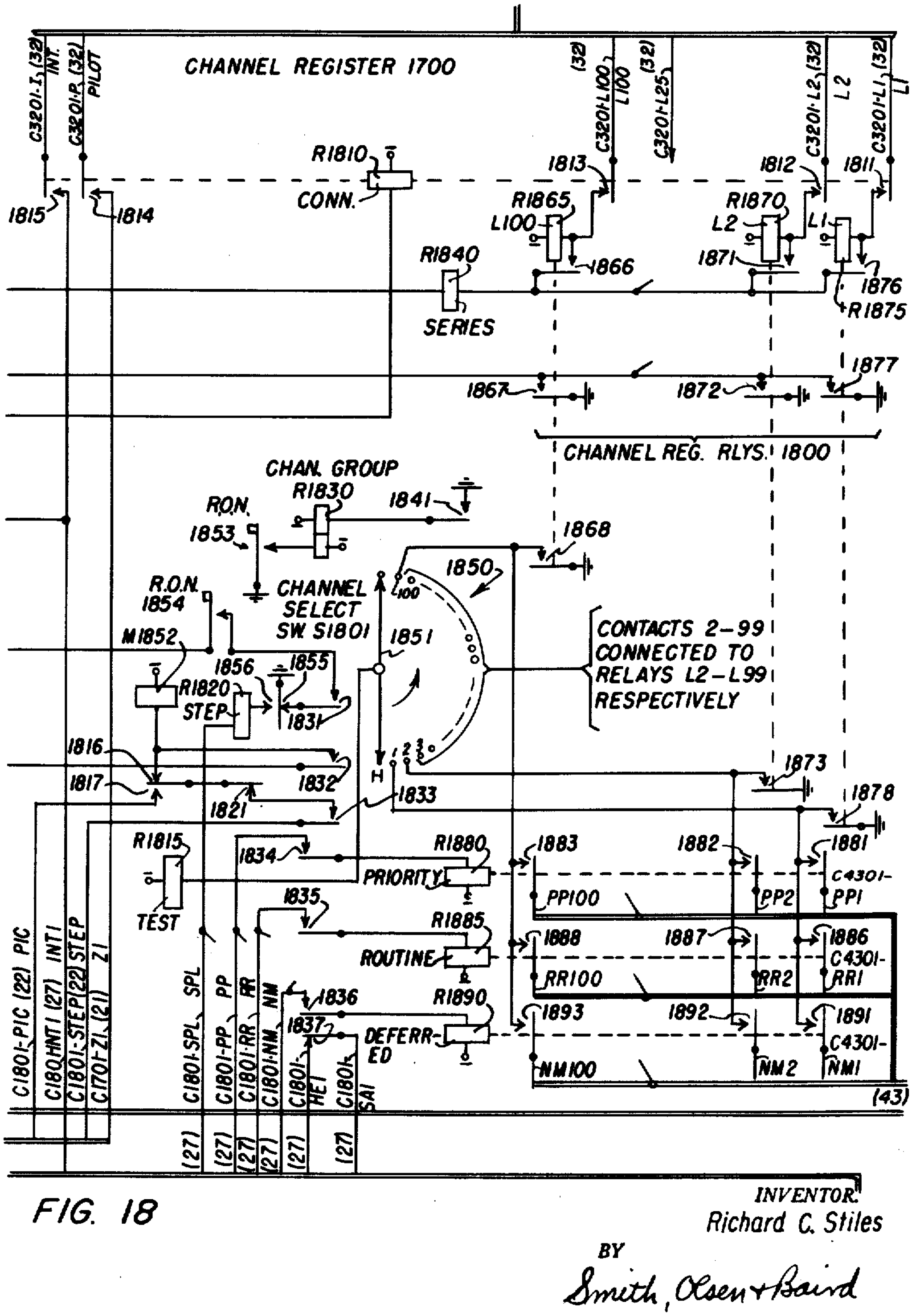

In response to the operatiton of the relay R2150, at its contacts 2152, it now completes a circuit for operating the start relay R1730 in the channel register 1700 (Figs. 17 and 18). Referring now to the start relay R1730 (Fig. 17) it will be seen that battery potential connected through the winding of the relay R1730 is connected by way of the conductor C1701–Z2 extending to Fig. 21, contacts 2152 of the operated relay R2150, conductor C1101–G extending to Fig. 13, contacts 1341 of the operated address received relay R1340, conductor C840 extending to Fig. 10, wiper 822 of the line selector 810 in engagement with the contact terminating the conductor C616 extending to Fig. 6, and ground at contacts 597 of the unoperated end-of-message relay R590 in the incoming line circuit 400.

In response to the completion of the above described circuit, the start relay R1730 in the channel register 1700 portion of the director 200A is operated. Upon operating, the relay R1730, at its contacts 1733, immediately locks itself by way of the conductor C1735 extending to Fig. 24, to ground at contacts 2504 of the operated release relay R2500. As a further result of the operation of relay R1730, at its contacts 1731, it applies ground potential by way of the contacts 1742, conductor C1736–ST, contacts 29 of the manual connect key K2905, contacts 3131 and 3136, and the winding of the magnet M3144 of the director hunting switch S3140, to battery. The magnet M3144 operates over above described circuit in order to condition the wipers 3141 to 3143, inclusive, of the director hunting switch S3140 to search for the director 200A which is connected to the incoming line circuit 400.

Before proceeding with this operation, however, attention is directed to the fact that the routing translator 2900 (Figs. 29 to 31, inclusive) is common to all of the directors provided in the relay switching center UAC. In the present arrangement two directors are provided and, consequently, the director hunting switch S3140 will be controlled to advance its wipers to find the particular director that has registered therein the routing indicator which is to be translated by the common routing translator 2900. Furthermore, since the routing translator 2900 is common to all of the directors provided in the relay switching center, it is advisable to have a standby routing translator which is substantially identical to the routing translator 2900. Accordingly, the connect key K2905 has been provided having individual key contacts 1 to 31, inclusive, for connecting the various leads in the routing translator 2900 to the two directors provided in the present arrangement. The standby routing translator 2900 will also be provided with a connect key identical to the key K2905 which may also be actuated to connect the standby routing translator to all of the directors. Under normal operation, the connect key K2905 will be in its actuated position to close all of its key contacts 1 to 31, inclusive, and the corresponding key in the standby routing translator will be in its unoperated position. If faulty operation occurs in the routing translator 2900 it may be removed from service by restoring the connect key K2905 and the standby routing translator may be placed in service by actuating its corresponding connect key.

Returning to the magnet M3144 of the director hunting switch S3140, it will be seen that upon operating the magnet M3144 completes, at its contacts 3146, an obvious circuit for operating the interrupter relay R3130. The latter relay now operates and, at its contacts 3131, it interrupts the initial operating circuit for the magnet M3144 which now restores to normal and interrupts, at its contacts 3146, the circuit for the interrupter relay R3130. The relay R3130 now restores to normal and again completes, at its contacts 3131, the initial operating circuit for the magnet M3144. Consequently, the magnet M3144 and the relay R3130 interact, in the manner described above, to control the successive operations and restorations of the magnet M3144. Each time the magnet M3144 restores to normal, it controls its wipers 3141 to 3143, inclusive, to advance one step in a clockwise direction. As soon as the wipers noted engage contacts 1 in the associated contact banks, the test relay R3135 is connected to the conductor C1736–T1 by the wiper 3142 and the wiper 3143 is connected to the conductor C1736–SU1. In this manner the director hunting switch S3140 is now connected to the conductors extending to the channel register 1700 portion of the first director 200A. Since the start relay R1730 in the channel register 1700 is operated, the test relay R1740 therein is connected to the conductor C1736–T1 in order to mark the channel register 1700 as the calling channel register in the banks of the director hunting switch S3140. Therefore, when the wiper 3142 engages the contact 1, ground potential at the contacts 30 of the connect key K2905 is extended by way of the upper winding of the test relay R3135, wiper 3142, conductor C1736–T1 extending to Fig. 17, contacts 1732 and 1744 and the winding of the test relay R1740, to battery. In this circuit, the test relay R3135 immediately operates but due to the resistance of the upper winding of relay R3135, the relay R1740 is somewhat delayed in operating. As soon as the relay R3135 operates, it first closes its X contacts 2138 thereby to complete a locking circuit for itself that includes its lower winding contacts 31 of the key K2905, wiper 3143, conductor C1736–SU1 extending to Fig. 17 and ground at contacts 1752. This locking circuit retains the relay R3135 operated after the contacts 3137 thereon are closed to short-circuit the upper winding of the relay. However, as soon as the high resistance upper winding of the relay R3135 is short-circuited by the contacts 3137, the test relay R1740 in the channel register 1700 operates. Finally, at its contacts 3136, the relay R3135 interrupts the initial operating circuit for the magnet M3144 thereby preventing the wipers of the director hunting switch S3141 from being stepped beyond the contacts terminating the calling channel register 1700.

As soon as the test relay R1740 operates, at its contacts 1743 and 1744, it interrupts its initial operating circuit and it locks itself in its operated position to the grounded conductor C1735. Also, at its contacts 1742, the relay R1740 removes ground potential from the start conductor C1736–ST and, at its contacts 1745, it completes a circuit including the contacts 1753 for operating the connect relay R1810 in order to connect the channel register relays 1800 to the routing translator patch panel 3200. At its contacts 1741, the relay R1740 connects ground at the contacts 1751 to the conductor C1722–TR extending to Fig. 16 in order to operate the transfer-1 relay R1620 and the transfer-2 relay R1520 or the transfer-3 relay R1530 in the routing register 1500. Finally, at its contacts 1746, the relay R1740 completes an obvious circuit for operating the time delay relay R1710.

At this time it should be noted that the time delay equipment 1790 is illustrated with the relay R1720 therein normally operated from the grounded terminal T1791. With the circuit connected in this manner the time delay equipment 1790 is rendered ineffective. If it is desired to utilize the time delay equipment 1790 the ground potential will be disconnected from the terminal T1791 so that the relay R1710 will interrupt the circuit for the relay R1720 in the event that the routing translator 2900 fails to translate a routing indicator within a predetermined elapsed time interval.

Before continuing with the circuit operations controlled by the relay R1740, further operations of the director hunting switch S3140 will be described. Thus, if the first director 290A having the channel register 1700 is not calling at the time the start conductor C1736–ST is grounded, the magnet M3144 will advance its wipers into engagement with the contacts 2 in order to make a corresponding test of the channel register provided in the second director. Also, it will be apparent that the remaining contacts 3 to 10, inclusive, accessible to the wipers 3142 and 3143 may terminate other channel registers similar to the channel register 1700. However, if additional channel registers are not provided, the contacts 3 to 10, inclusive, accessible to the wiper 3141 will be grounded at the contacts 3145 each time the magnet M3144 restores to normal. With the wiper 3141 in engagement with the contact 3, the ground at contacts 3145 is connected to the winding of the magnet M3144, whereupon the magnet operates and interrupts its own circuit, at the contacts 3145, independently of whether or not the start conductor C1736–ST is grounded by any calling channel register. Thus, the magnet M3144 will be self-interruptedly controlled to advance its wipers 3141 to 3143, inclusive, step-by-step in a clockwise direction until the wipers advance to the ungrounded contact 11. In this position the magnet M3144 is restored to normal and is conditioned to again start the searching operation for a calling channel register in the event the start conductor is grounded.

Returning again to the operation of the test relay R1740 in the channel register 1700, it will be recalled that, at its contacts 1741, it applied ground potential to the conductor C1722–TR extending to Fig. 16. In Fig. 16 the ground potential applied to the conductor C1722–TR completes an obvious circuit for operating the transfer-1 relay R1620 and ground potential is further extended by way of the conductor C1401–G extending to Fig. 14, and then either over the conductor C1401–H by way of the contacts 1441 in order to operate the transfer-2 relay R1520 in the routing register 1500, or over the conductor C1401–F by way of the contacts 1442 in order to operate the transfer-3 relay R1530 in the routing register 1500. If the first and second characters of a routing indicator are registered respectively in the first register 1501 and the second register 1502, the contacts 1441 will be closed, thereby completing the circuit for operating the transfer-2 relay R1520 in multiple with the transfer-1 relay R1620 over the previously described circuit. If, however, the first and second characters of a routing indicator are registered respectively in the second register 1502 and the first register 1501, the contacts 1441 will be opened and the contacts 1442 will be closed so that the transfer-3 relay R1530 will be operated in multiple with the transfer-1 relay R1620 over the above described circuit.

In the message being described, it has been assumed that the four character routing indicator JWPA is registered respectively in the register 1501, 1502, 1601 and 1602. Consequently, the transfer-2 relay R1520 and the transfer-1 relay R1620 will operate in the manner previously described in order to connect the first to the fifth character decoding relays 2901 to 2905, inclusive, in the routing translator 2900 to the register 1501, 1502, 1601, 1602 and 1603, respectively, in the routing register 1500. The character J stored on the first register 1501 will now be transferred by way of operated contacts of the relays therein to the corresponding register relays R2910A to R2910E, inclusive, in the first character decoding relays 2901. More specifically, the character J is stored in the register 1501 by the operated condition of R1500A, R1500B, and R1500D. At the upper make contact, the relay R1500A applies ground potential by way of the contacts 1529′, contact 1 of the connect key K2905 and the winding of the relay R2900A, to battery. Also, at the upper make contact of the relay R1500B, ground potential is extended by way of the contact 1529, contact 2 of the key K2905 and the winding of the relay R2910B, to battery. Finally, at the upper make contact of the relay R1500D, a corresponding circuit is completed, including the contacts 1527, the contact 4 of the key K2805 and the winding of the relay R2910D, to battery. Thus, the character J, stored in the first register 1501, is transferred to corresponding relays in the first character decoding relays 2901 in the routing translator 2900. Simultaneously, with the above mentioned transfer, the character W, stored in the second register 1502, is transferred over similar circuits to corresponding relays in the second character decoding relays 2902; the third character P, stored in the third register 1601, is transferred to corresponding relays in the third character decoding relays 2903; the fourth character A, stored in the fourth register 1602, is transferred to the fourth character decoding relay 2904. Since no character is stored in the fifth register 1603, no transfer will occur between this register and the fifth character decoding relays 2905. Thus, it is apparent that each of the characters registered in each of the registers in the routing register 1500 will be transferred to corresponding character decoding relays in the routing translator 2900 incident to the operation of the transfer-1 relay R1620 and the transfer-2 relay R1520.

In the previous description, it was pointed out that under certain conditions, the first character J of the routing indicator may be registered in the second register 1502 and the second character W of the routing indicator may be registered in the first register 1501. The remaining characters P and A of the routing indicator being registered, respectively, in the third and fourth register 1601 and 1602. As noted above, when this reversal occurs in the registration of the first and second characters of a routing indicator, the transfer-3 relay R1530 will be operated, instead of the transfer-2 relay R1520, in multiple with the transfer-1 relay R1620. When this condition exists, the first character J of the routing indicator stored in the second register 1502 will be transferred, in the manner described above, by way of certain of the contacts 1531 to 1535 of the operated transfer-3 relay R1530 to corresponding relays in the first character decoding relays 2901 and the second character W registered in the first register 1501 will be transferred by way of certain of the contacts 1536 to 1539′ of the operated transfer-3 relay R1530 to the second character decoding relays 2902. The third and fourth characters P and A of the routing indicator will be transferred, in the manner previously described, from the third and fourth registers 1601 and 1602 to the third and fourth character decoding relays 2903 and 2904. With this arrangement, even though the first character of a routing indicator is registered in the second register 1502 and the second character of the routing indicator is registered in the first register 1501, the operation of the transfer-3 relay R1530 will reverse the connections between these register relays and the character decoding relays 2901 and 2902 so that the first and second characters will be properly registered in the first and second character decoding relays 2901 and 2902.

*The routing translator 2900 and the routing translator patch panel 3200*

In order to fully understand the apparatus included in the routing translator 2900 and the routing translator patch panel 3200, it should be noted that the second, third, fourth and fifth character decoding relays 2902, 2903, 2904 and 2905 are exactly the same as the fully illustrated first character decoding relays 2901. Thus, each set of decoding relays comprises five relays R2910A to R2910E, inclusive, provided with pyramid contact sets whereby circuits may be completed to mark conductors corresponding to each of the 26 letters in the alphabet in accordance with the code perforations illustrated in Fig. 46. In the present system, however, the first character of any routing indicator includes only the three letters B, J and U and, consequently, in the present disclosure the first character translate relays 2981 include only the relays R2950B, R2950J and R2950U corresponding respectively to the first letter characters of a possible routing indicator.

The second character translate relays 2982 include eight possible second letter characters of a routing indicator which, in the present system, have been illustrated to be the letters A, E, F, H, K, L, M and W. When the five relays included in the second character decoding relays 2902 are operated individually or in combinations in accordance with any of the above noted letters, they complete circuits for the corresponding eight relays included in the second character translate relays 2982. Only two of these relays have been illustrated in the drawings and have been designated R3005A and R3005W, corresponding to the first and last letters A and W of the eight different letters of the second character of a possible routing indicator. In order to simplify the illustration including the various contacts on these relays, only the contacts 3006 to 3008 on the relay R3005A and the contacts 3011 to 3013, inclusive, on the relay R3005W have been illustrated. It should be understood, however, that similar contacts are also provided on the remaining six relays (not shown) thus providing facilities for selecting any one of 24 different conductors in the cable C2984 by the selective operation of any one of the three relays in the first character translate relays 2981 and any one of the eight relays in the second character translate relays 2982.

The third character translate relays 2983, include 26 relays A to Z, inclusive, only the first and last of which have been illustrated and designated respectively R3020A and R3020Z. As illustrated, the relay R3020A is provided with the contacts 3021 to 3026, inclusive, which terminate respectively, the conductors 1, 8, 9, 16, 17 and 24 in the cable C2984. It should be understood, however, that the relay R3020A is provided with additional contacts terminating, respectively, each of the remaining conductors included in the cable C2984. In addition to the foregoing, conductor 1 in the cable C2984 is multiply connected to a set of contacts, such as 3021, on each of the remaining 25 relays in the third character translate relays 2983. The contacts 3031, as illustrated on the relay R3020Z represents 25 different sets of contacts through which the conductor 1 in the cable C2984 may also be connected by the selective operations of any one of the 25 relays R3020B to R3020Z. Thus, the conductor 1 in the cable C2984 may be pyramided into 26 separate marking conductors through make contacts on the 26 relays R3020A to R3020Z, inclusive. The same arrangement is provided in each of the conductors 2 to 24, inclusive, in the cable C2984 so that the 24 conductors may be pyramided through the contacts on the 26 relays in the third character translate relays 2983 into 624 separate marking conductors. The 624 separate marking conductors provided in the cable C2983A terminate in 624 separate jacks provided in the three character jack panel 3270 in the routing translator patch panel 3200, whereby any one of the above noted jacks may be individually selected in accordance with the selective operations of any one of the three relays in the first character translate relays 2981, any one of the eight relays provided in the second character translate relays 2982 and any one of the 26 relays provided in the third character translate relays 2983.

Referring now to the fourth character translate relays 2984, it will be seen that only the relays R3040A and R3040Z are illustrated, but it should be understood that 24 additional relays, B to Y, inclusive (not shown) are also provided. Each of the 26 relays is provided with a set of contacts, such as the contacts 3041 and 3047, illustrated respectively, on the relays R3040A and R3040Z. Thus, 26 separate marking conductors are provided in the cables C2986 which are connected respectively through make contacts, such as the contacts 3111 and 3114, on the four character relay R3110 in order to connect the 26 individual conductors in the cable C2986 by way of the cable C2984A to individual jacks on the four character jack panel 3250.

In addition to the foregoing, the 26 marking conductors in the cable C2986 are each connected to make contacts on 26 relays in the fifth character translate relays 2985. The first and last of the 26 relays are illustrated and have been designated respectively as R3050A and R3050Z. The conductor 1 in the cable C2986 is connected to the contacts 3051 on the relay R3050A and it is multiply connected to corresponding make contacts on each of the remaining 25 relays in the fifth character translate relays 2985. Consequently, the marking conductor 1 in the cable C2986 may be pyramided into any one of 26 different marking conductors by the selective operation of any one of the 26 relays in the fifth character translate relays 2985. Since each of the 26 marking conductors in the cable C2986 are connected in a similar manner through make contacts on the different relays in the fifth character translate relay 2985, 676 separate marking conductors are provided which may be selected by the selective operation of one of the relays in the fourth and any one of the relays in the fifth character translate relays 2984 and 2985. The 676 marking conductors are connected by way of the cable C2985A to 676 individual jacks provided on the five character jack panel 3260.

Referring now to the routing translator patch panel 3200, it will be seen that this panel includes the third, fourth and fifth character jack panels 3270, 3250 and 3260, respectively. The patch panel 3200 also includes a line jack panel 3220 which terminates conductors corresponding respectively to 100 separate outgoing lines extending from the relay switching center UAC. Since some of the outgoing lines may be utilized, particularly in tandem connected calls, to handle messages extending to a number of different relay switching centers, such outgoing lines are multiply connected to a plurality of line jacks provided in the jack panel 3220. The L1 outgoing line, for example, has been illustrated as being multiply connected to a plurality of line jacks. However, in the case of the outgoing lines extending to tributary stations, for example, which are local to the present relay switching center UAC, it is only necessary to provide a single jack for such lines inasmuch as the single outgoing line will adequately handle all of the traffic to the associated tributary station. Thus, the L99 and L100 outgoing lines have been terminated in single line jacks in the jack panel 3220. The line jack panel 3220 also includes a plurality of intercept jacks which are multiply connected so that a plurality of the jacks in the three, four and five character jack panels may be connected to intercept by means of the double ended plug and cord assemblies, such as 3231 to 3234, inclusive. Finally, the three character jack panel 3270 is provided with a local jack J3271 which is utilized to interconnect the particular three character jack in the jack panel 3270, which corresponds to the first three characters of a four or five character routing indicator identifying a local tributary station. In conclusion it should be understood that the patch cords, such as the patch cords 3231 to 3234, inclusive, are provided in order to readily interconnect the various jacks in the three, four and five character jack panels with any one of the L1 to L100, inclusive, line jacks provided in the line jack panel 3220 and with the intercept jacks and at least one patch cord 3234 is provided to interconnect one of the 624 jacks in the three character jack panel 3270 to the local jack so that an outgoing line to a local tributary station may be selected.

*Operation of the routing translator 2900 and the routing translator patch panel 3200 to select an outgoing line*

In the previous description it was pointed out that the routing indicator sensed by the tape reader 340 was registered in the routing registers 1500, and that the start relay R1730 in the channel register 1700 caused the director hunting switch S3140 to associate the routing translator 2900 with the channel register 1700. Also it was pointed out that the routing indicator comprising the characters JWPA were transferred from the routing register 1500 to the first, second, third and fourth character decoding relays 2901 to 2904, inclusive, in the routing translator 2900. As soon as the character J is registered in the first character decoding relays 2901, the relays R2910A, R2910B and R2910D are operated as previously noted. As soon as these relays are operated, a circuit is completed which may be traced from ground by way of the contacts 2941, 2912, 2915′, 2925, 2932′ and the winding of relay R2950J, to battery.

The relays in the second character decoding relays 2902 are operated in a similar manner in accordance with the code illustrated in Fig. 46, whereby a circuit (not shown) is completed for operating the relay R3005W in the second character translate relays 2982. The third character decoding relays 2903 are also operated in a similar manner in accordance with the third character P and accordingly, complete a circuit for operating the relay R3020P (not shown) in the third character translate relays 2983. Inasmuch as the first three characters, JWP, registered in the decoding relays 2901, 2902 and 2903 designate a remotely located relay switching center, the particular message may be routed to the relay switching center without utilizing the fourth character A registered in the fourth character decoding relays 2904. If a fifth character is also registered in the fifth character decoding relays 2905, which character together with the fourth character designates a particular tributary station in the geographical area served by the relay switching center JWP, this character will also be absorbed at the present time.

In view of the foregoing, it may be well to note at this time that it is only necessary to utilize the first three characters of a routing indicator to determine the outgoing line over which a message is to be routed provided the first three characters indicate that the relay switching center is located at some remote point from the relay switching center UAC. The only time that the fourth or fourth and fifth characters of a routing indicator are utilized in conjunction with the first three characters of the routing indicator to select an outgoing line is when the first three characters are registered in the same relay switching center that terminates the outgoing lines extending directly to the tributary stations identified by the fourth or the fourth and fifth characters of the routing indicator.

In the present example, the characters JWP have operated the relay R2950J in the first character translate relays 2981, the relay R3005W in the second character translate relays 2982 and the relay R3020P (not shown) in the third character translate relays 2983. With these relays operated, a circuit is completed from ground at contacts 2961, by way of the contacts 3012, on the relay R3005W, conductor 16 in the cable C2984, contacts, such as the contacts 3024 on the relay R3020P (not shown), conductor 406 (not shown) in the cable C2983A to the jack J406 on the three character jack panel 3270.

Since the outgoing lines designated L1 to L100 extend to predetermined switching centers or tributary stations, the patch cords 3231, etc., may be utilized to interconnect the various three, four and five character jacks to the appropriate line jacks in the panel 3220. For the purpose of this description, it will be assumed that the plug P1 of the patch cord 3231 is plugged into the jack J406 and that the plug P2 of this cord is plugged into one of the multiple jacks on the line jack panel 3220 terminating the conductor L1 indicative of the L1 outgoing line. Accordingly, the ground potential on the jack J406 is further extended by way of the cord 3231, the L1 conductor, interconnected terminals 3281A and 3281B, the normally closed contacts 3283 of the gang switch 3280, conductor C3201–L1 extending to Fig. 18, contacts 1811 of the operated connect relay R1810, and the winding of the L1 channel register relay R1875, to battery. The relay R1875 operates over this circuit and prepares, at its contacts 1876, a locking circuit for itself which includes the winding of the series relay R1840 and the grounded conductor C1735. This locking circuit, however, will not be completed to operate the series relay R1840 until the initial operating ground is removed from the winding of the relay R1875. As a further result of the operation of relay R1875, at its contacts 1877, it completes an obvious circuit for operating the translator disconnect relay R1750. Finally, at its contacts 1878, the relay R1875 applies ground potential to the contacts 1 accessible to the wiper 1851 of the channel selecting switch S1801. The last-mentioned ground potential marks the channel selecting switch S1801 to indicate the particular outgoing line (channel) which has been identified by the operation of the translator 2900.

As soon as the translator disconnect relay R1750 has operated in the manner noted above, at its contacts 1752, it removes ground potential from the conductor C1736-SU1 in order to restore the test relay R3135 in the routing translator 2900, to normal. Also, at its contacts 1751, the relay R1750 removes ground potential from the conductor C1722–TR extending to Fig. 16, thereby to release the transfer–1 relay R1620 and the transfer-2 relay R1520 and thereby disconnect the routing register 1500 from the routing translator 2900. All of the operated relays in the routing translator 2900 now restore to normal and, as a result thereof, the initial operating ground potential for the L1 relay R1875 is disconnected therefrom. The relay R1875 now locks itself in series with the series relay R1840, which also operates, to the grounded conductor C1735.

When the locking circuit is interrupted for the lower winding of the test relay R3135 in the manner noted above, the relay restores to normal and, at its contacts 3136, recompletes the operating circuit for the magnet M3134 provided another director requires the assistance of the routing translator 2900. In other words, the director hunting switch S3140 will now advance its wipers to select the second director in order to control the channel register circuit associated therewith.

As a further result of the operation of the translator disconnect relay R1750, at its contacts 1753, it interrupts the circuit of the connect relay R1810 which now restores to normal in order to disconnect the channel register relays 1800 from the line jacks of the line jack panel 3220 in the routing translator patch panel 3200. At its contacts 1754, the translator disconnect relay R1750 applies ground potential to the conductor C1701–CSL extending to Fig. 26, in order to complete the operating circuit for the start relay R2610 in the cross-office selector switch relay control group 2600 illustrated in Figs. 26 and 27. Finally, at its contacts 1755, the relay R1750 opens the circuit for the slow-to-operate time delay relay R1710. Under ordinary conditions, the relay R1710 will not have sufficient time to operate its contacts 1711 before the circuit for the relay R1710 is opened. Before proceeding with the description of the operations resulting from the operation of the start relay R2610 and resulting from the operation of the series relay R1840 in the channel register 1700, a description will be given of the operation of the routing translator 2900 in response to the registration therein of a routing indicator comprising the characters UAC identifying the disclosed relay switching center.

It will now be assumed that the characters UAC are registered in the decoding relays 2901, 2902 and 2903 of the routing translator 2900 instead of the character JWP previously described. When the first mentioned characters are registered in the above noted decoding relays, the relay R2950U, R3005A and R3020C (not shown) in the respective translate relays group 2981, 2982 and 2983 are operated in the manner previously described. As a result thereof, ground potential, at the contacts 2971, is extended by way of the contacts 3008, conductor 17 in the cable C2984, contacts (such as the contacts 3025) on the operated relay R3020C (not shown) to the conductor 419 in the cable C2983A. This conductor terminates in the jack J419 of the three character jack panel 3270 which corresponds to the relay switching center UAC. Since the selection of the jack J419 determines that the received message is to be routed to a tributary station in the geographical area served by the relay switching center UAC, the patch cord 3234 is provided to interconnect the pack J419 and the local jack J3271.

Normally, all of the local messages received at the relay switching center UAC include the routing indicator UAC and they also include a fourth character or a fourth and a fifth character designating the particular tributary station in the area served by the relay switching center UAC. Thus, if a fourth character A, for example, is registered in the fourth character decoding relay group 2904, the relay R3040A in the fourth character translate relays 2984 will be operated and in addition thereto, the fourth character relays R3060 and R3110 will be operated over the previously traced circuit including the conductor C1681–CH4. This conductor is grounded over a circuit including the contacts 1622 of the operated relay R1620, conductor C1301–F extending to Fig. 13, contacts 1345 of the operated relay R1340, conductor C1301–E extending to Fig. 15, contacts 1666′ and 1676′. Thus, if the routing register 1500 initially operated to register four characters of a routing indicator, the relay R3060 and R3110 in the routing translator 2900 are operated.

In view of the foregoing, it will be understood that the ground potential extended to the local jack J3271, by the translation of the characters UAC is now forwarded by way of the contacts 3062 of the operated relay R3060, contacts 3041 of the operated fourth character translate relay R3040A, conductor 1 in the cable C2986, contacts 3111 of the operated relay R3110, conductor 1 in the cable C2984A and the jack J1 of the fourth character jack panel 3250. This jack, of course, may be connected with a local outgoing line, such as the line L100, by means of a patch cord 3231 to operate the L100 channel register relay R1865. The L100 channel register relay R1865 is operated over a circuit similar to that described above for operating the L1 channel register relay R1875. Subsequent operations, controlled by the operated relay R1865, are the same as has been described previously whereby the routing translator 2900 is disconnected from the routing register 1500, the translate disconnect relay R1750 is operated and the series relay R1840 is operated. It should be noted, however, that the L100 channel register relay R1865 now marks the contact 100 in the bank of the channel select switch S1801 to indicate that the particular message is to be routed over the L100 outgoing line (channel) corresponding to the operated L100 channel relay.

If a five character routing indicator, for example, UACZZ identifying a tributary station served by the relay switching center UAC, is registered in the routing translator 2900, the first, second and third character translate relays 2981, 2982 and 2983 will operate in the manner described above to complete the circuit to the jack J419 in the three character jack panel 3270. The registration of the Z character in both the fourth and fifth character decoding relays 2904 and 2905 will operate the relay R3040Z in the fourth character translate relays 2984 and the relay R3050Z in the fifth character translate relays 2985. In addition to the foregoing, the fifth character relay R3070 will also be operated in the manner previously described, instead of the fourth character relays R3060 and R3110.

Consequently, the ground potential extended to the jack J419 incident to the translation to the first three characters UAC of the routing indicator will be further extended by way of the patch cord 3234, the local jack J3271, contacts 3072 of the operated relay R3070, contacts 3047 of the operated fourth character translate relay R3040Z, conductor 26 in the cable C2986, contacts 3057 of the operated fifth character translate relay R3050Z, conductor 676 in the cable C2985A to the jack J676 on the fifth character jack panel 3260. If the outgoing line to the tributary station, having the routing indicator UACZZ is, for example, the L99 outgoing line (channel) then a patch cord, such as the cord 3232, will interconnect the jack J676 on the jack panel 3260 with the jack in the line jack panel 3220 terminating the L99 conductor. As previously described, the ground potential forwarded over this circuit will now cause the operation of the L99 channel register relay (not shown) in the channel register relays 1800 of the channel register 1700. Subsequent operations controlled by the operated L99 channel register relay are the same as has been previously described.

In view of the foregoing description of the operation of the routing register 1500, the routing translator 2900, the routing translator patch panel 3200 and the channel register 1700, it will be appreciated that a three, four or five character routing indicator may be registered and translated to indicate to the channel register 1700 the particular outgoing line (channel) over which the received message is to be transmitted and to immediately disassociate the translator 2900 from both the routing register 1500 and the channel register 1700 of the first director 200A and to render it available for translation of routing indicators registered in other directors of the switching center.

*Operation of the cross-office selector switch relay control group 2600*

The cross-office selector switch relay control group 2600 is included in the director 200A for the purpose of controlling the cross-office selector switch 3300 individually associated with the incoming line circuit 400 whereby the cross-office selector switch 3300 selects a cross-office unit, similar to the cross-office unit 3400 (Figs. 34 to 44, inclusive), which is set to the desired outgoing line (channel) and which has stored or is transmitting a message of the same precedence as the precedence of the message which has been received by the incoming line circuit 400. Various operating conditions of a crossoffice unit, such as an idle unit, a busy unit, etc., will be described hereinafter.

Referring now to the cross-office selector switch relay control group 2600 (Figs. 26 and 27), it will be recalled that the seizure relay R2620 therein initially operated in response to a ground potential applied to the conductor C1161 extending to Fig. 11. This conductor was grounded at the time the address detector 1100 portion and the precedence sensing circuit 1900 portion of the director 200A was associated with the calling incoming line circuit 400 by means of the line selector 810. When the above association was completed, the test and guard relay R1130 (Fig. 11) operated and, at its contacts 1134, connected ground potential to the conductor C1161 in order to operate the seizure relay R2620. At the time the relay R2620 initially operates, it merely prepared various circuits in the director for subsequent operation. Subsequently, the routing register 1500, the routing translator 2900 and the channel register 1700 operate in the manner previously described, whereby the L1 channel register relay R1875 registers the identity of the particular L1 outgoing line (channel) over which the present message is to be retransmitted. Thereafter the translator disconnect relay R1750 operates and, at its contacts 1754, it applies ground potential to the conductor C1701–CSL extending to Fig. 26 in order to complete the operating circuit for the start relay R2610 in the cross-office selector switch relay control group 2600.

Figure 28:
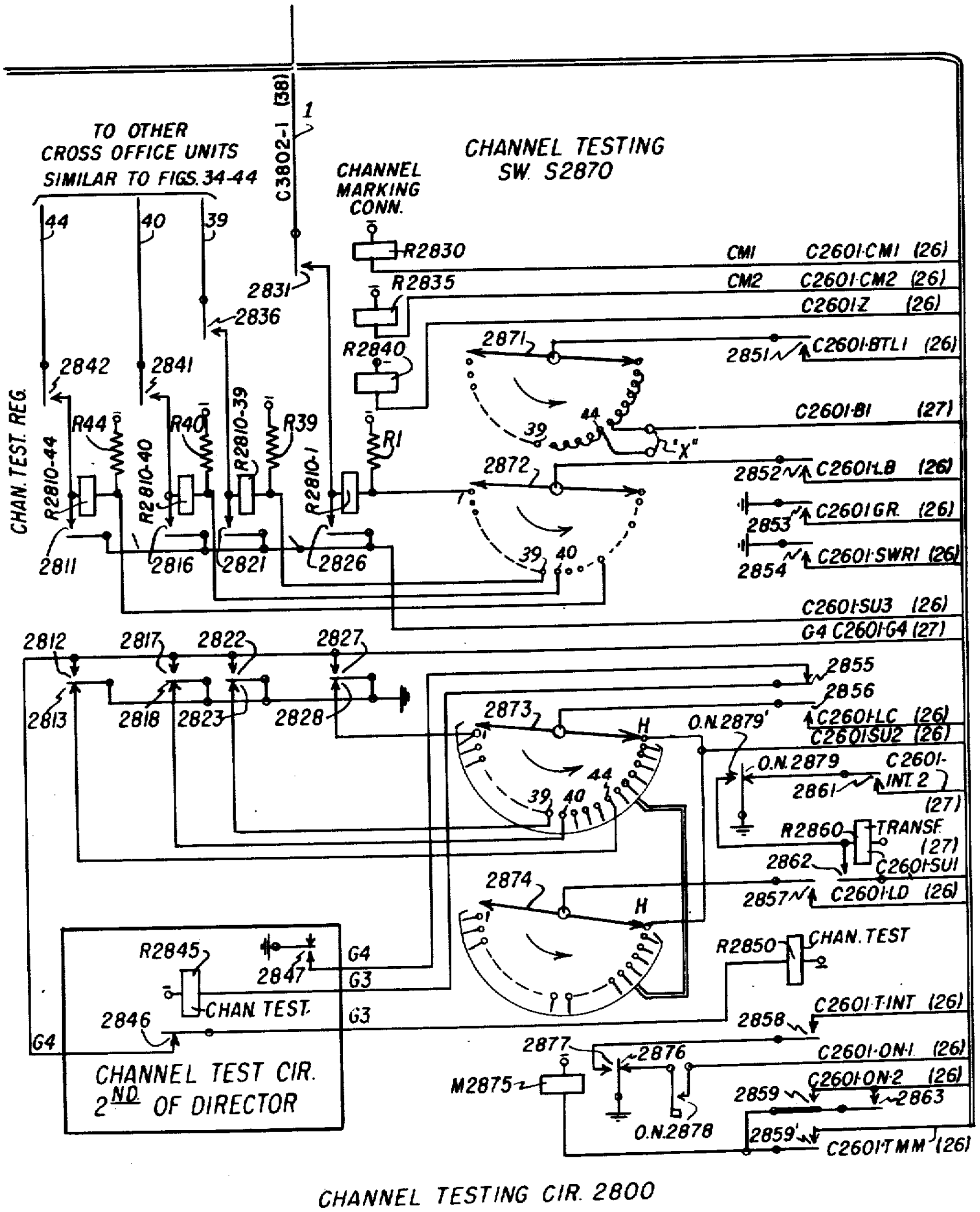
Figure 29:
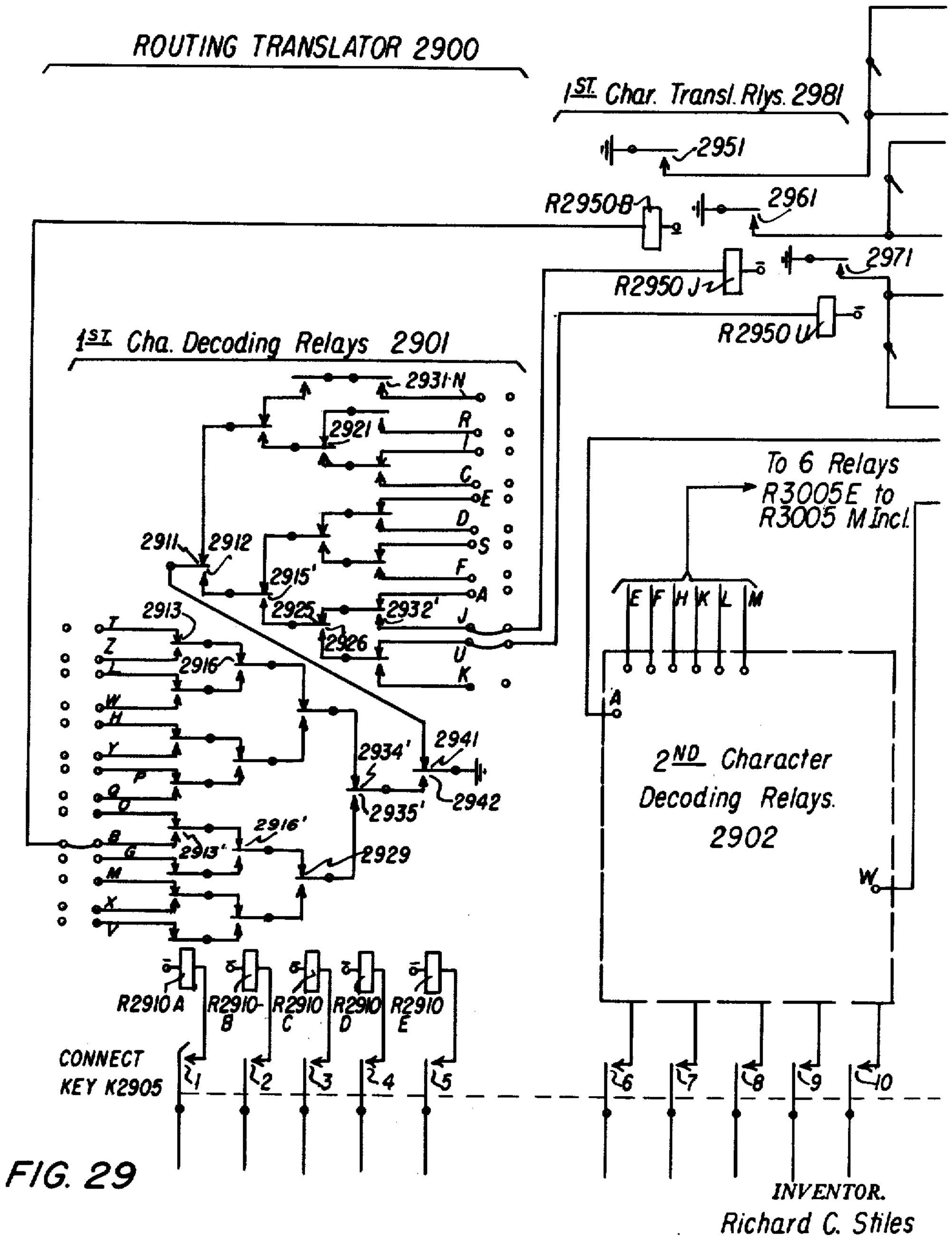
Figure 30:
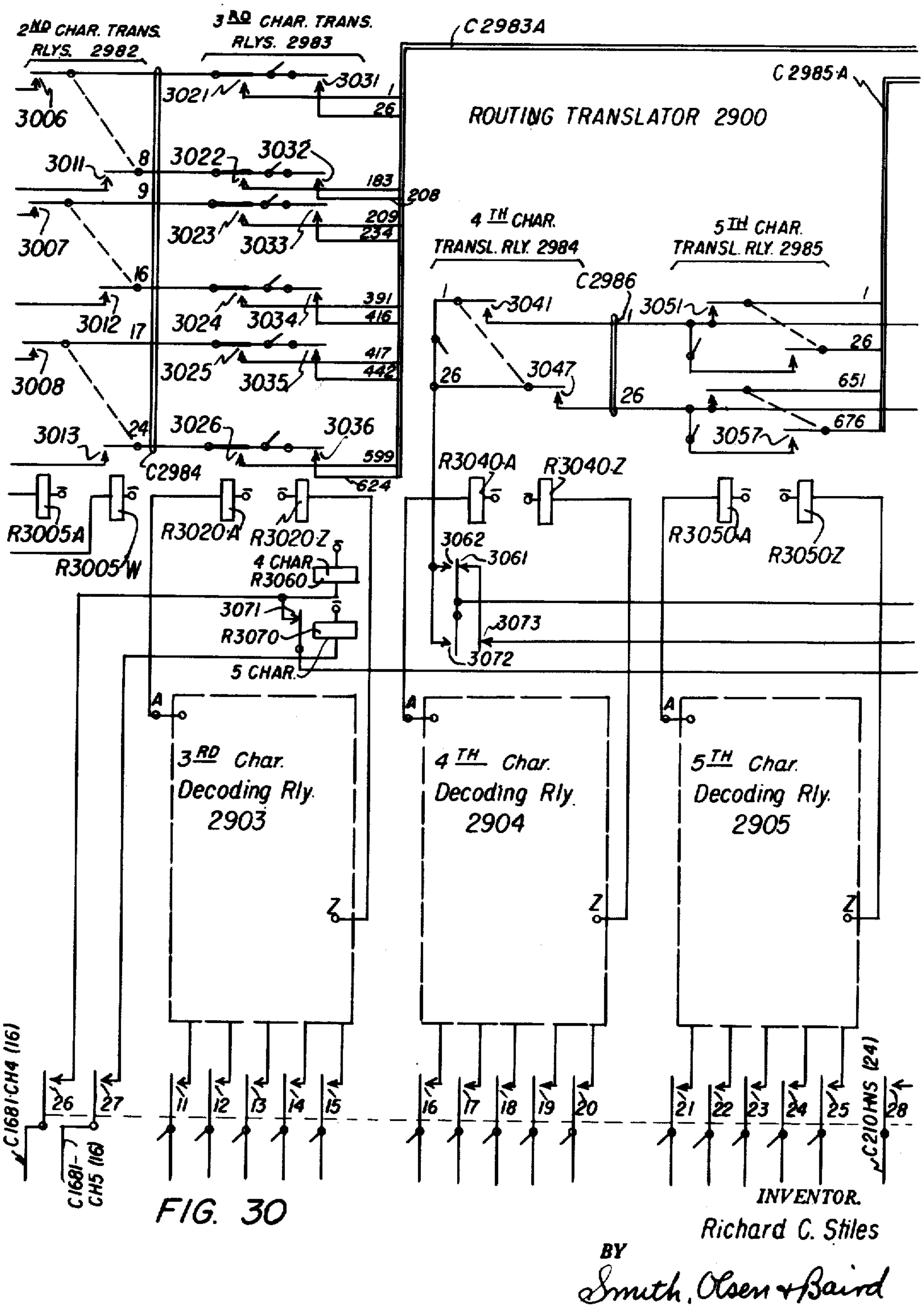
Figure 31:
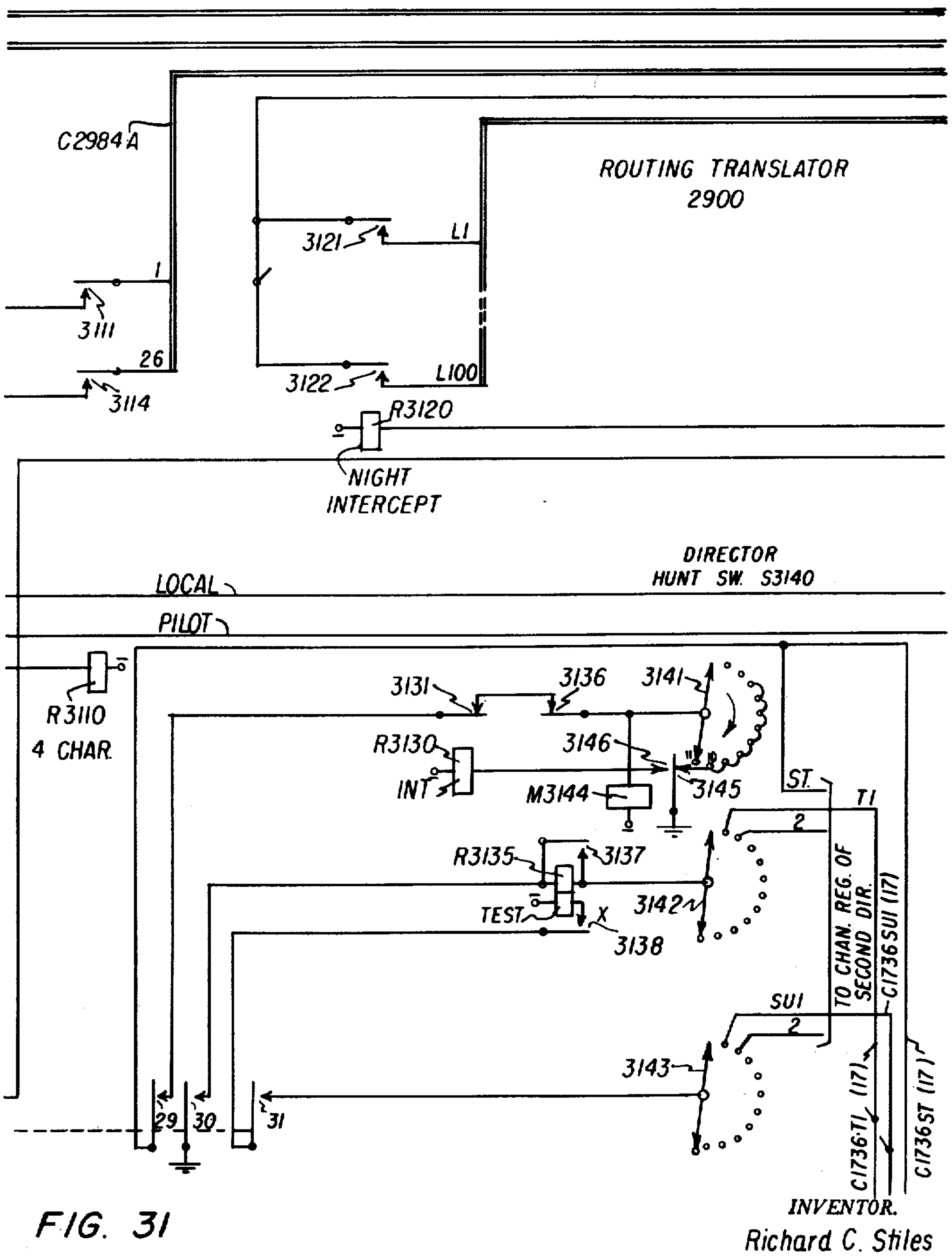

When the start relay R2610 operates in the manner noted above, it interrupts a point in the restoring circuit for the channel register finder 2710, at its contacts 2611; at its contacts 2616, it applies ground potential to the conductor C2601–SUZ extending to Fig. 28, in order to prepare a point in the circuit for stepping the wipers 2871 to 2874 of the channel testing switch S2870 from their off-normal contact positions; and finally, at its contacts 2612, a circuit is completed for operating the slow-to-release precedence test relay R2120 in the precedence sensing circuit 1900. The last mentioned circuit may be traced from ground at the normally closed contacts 2762′ of the hunt empty bin relay R2760, contacts 2758 and 2612, conductor C2102–PG extending to Fig. 21, contacts 2138 and the winding of the precedence test relay R2120, to battery.

In the present system it has been assumed that the relay switching center UAC is provided with two directors and that the director receiving the information regarding the present message is the first director 200A. Consequently, as soon as the relay R2120 operates, as noted above, at its contacts 2125 it connects the precedence test relay R2130 to a chain circuit including contacts of similar precedence test relays (R2120′ and R2130′) of the second or last director. The circuit for operating the precedence test realy R2130 may be traced from battery by way of the winding of the relay R2130, contacts 2125, terminal CG3 connected to terminal CG2 in the first director 200A, contacts 2135, terminal CG1 of the first director 200A connected to the terminal CG2 of the second director, contacts 2135′ and the grounded terminal CG1 of the second director. The slow-to-operate relay R2130 now operates its X contacts 2137 thereby to lock the relay in its operated position to the grounded conductor C2102–PG. At its contacts 2138, the relay R2130 interrupts the circuit for the slow-to-release relay R2120; at its contacts 2135, it interrupts a point in its initial operating circuit; at its contacts 2136, it prepares a point in the circuit for operating the precedence test relay R2130′ in the second director; and, at its contacts 2134, it momentarily applies ground potential by way of the contacts 2122 to the conductor C2102–COM1 extending to Fig. 27. The last mentioned conductor is grounded during the slow-to-release period of the relay R2120 and as soon as the latter relay fully restores to normal, it transfers, at its contacts 2121, the ground potential from the conductor C2102–COM1 to the conductor C2102–PRE extending to Fig. 26. Finally, at its contacts 2131, 2132 and 2133, the relay R2130 prepares points in the precedence indicating circuits which will be described hereinafter.

It should be noted, however, that with the precedence test relay R2120 restored and the relay R2130 operated, the ground potential at the terminal CG1 of the second director is now extended by way of the contacts 2135′, 2136 and 2123 back to the second director so that the relay R2130′ thereat may be operated in the event that the associated test relay R2120′ is operated as a result of the completion of a translation by the second director. It should also be noted at this time that each director is provided with a busy key such as the key K2151 which will permit the directors to be withdrawn from service by actuation of the busy key. It should be understood that the contacts on the busy key K2151, in fact, by-passes the contacts 2124 and 2135 of the precedence test relays R2120 and R2130. Consequently, when the test key K2151 is operated, the precedence test relays in the first director will be short-circuited by the contacts of the busy key K2151 and the ground potential at the terminal CG1 of the second director will be effective to control the precedence test relays of only the second director.

Figure 27:
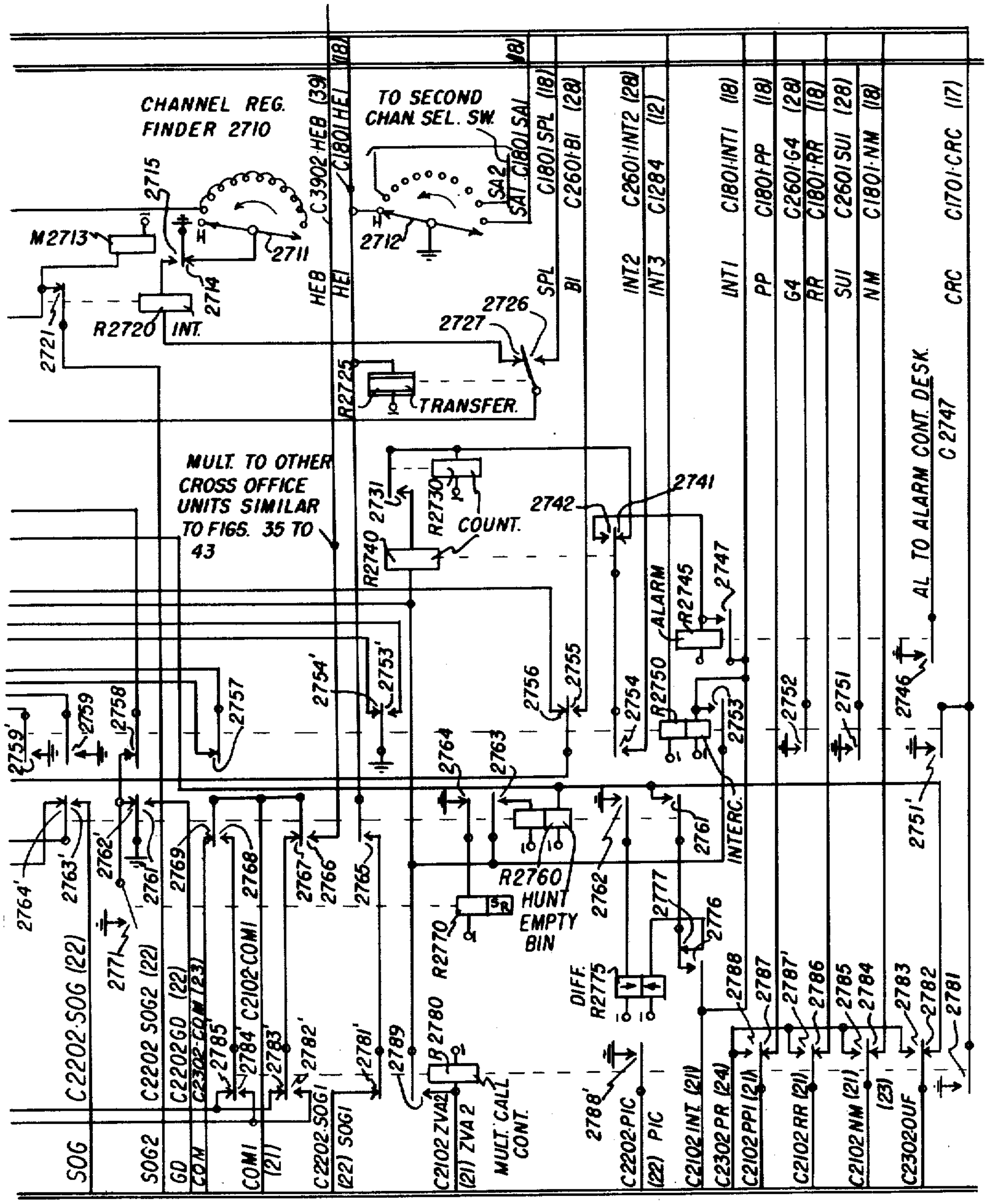

Considering now the circuit including the conductor C2102–COM1 extending to Fig. 27 which was grounded during the interval of time that both of the precedence test relays R2120 and R2130 were in their operated positions. The ground potential applied to the conductor C2102–COM1 extends to Fig. 27, where a first branch circuit including the contacts 2767 and 2783′ is completed for operating the available channel relay R2660. The relay R2660 upon operating applies ground potential, at its contacts 2661 and 2662, to the conductors C2601–CM1 and C2601–CM2 extending to Fig. 28 in order to operate the channel marking connect relays R2830 and R2835 in the channel testing circuit 2800. These relays upon operating at their various contacts, such as the contacts 2831 and 2836 connect the first 39 channel testing register relays R2810–1 to R2810–39 to 39 marking conductors, such as the marking conductor C3802–1, extending to 39 available cross-office units 3400. It being understood, of course, that the number of cross-office units will vary in accordance with the amount of traffic to be handled through the relay switching center. Thus, the channel testing switch S2870 which is shown as a 50-point rotary switch, having facilities for controlling the selection of 50 cross-office selectors, may, for example, be a 100-point rotary switch to provide facilities for controlling the selection of 100 cross-office units if necessary. Consequently the channel testing switch S2870 may be increased from a 50-point rotary switch to either a 100 or 200-point rotary switch if additional cross-office units are required to handle the traffic through the switching center.

The above noted ground potential applied to the conductor C2102–COM1 is also extended over a second branch circuit including contacts 2769, conductor C2302–COM extending to Fig. 23, contacts 2596 of the operated relay R2595 in the deferred detector 2300NM (assuming that the deferred precedence [NMNM] has been registered) conductor C2101–D extending to Fig. 21, contacts 2133 of the operated precedence test relay R2130, conductor C2102–NM extending to Fig. 27, contacts 2784, conductor C1801–NM extending to Fig. 18, contacts 1836 of the operated relay R1830 and the winding of the multi-contact deferred relay R1890, to battery. The deferred relay R1890 is porvided with 100 contacts, such as the contacts 1891, 1892 and 1893, for marking any one of 100 different outgoing lines (channels) in accordance with the particular operated channel register relays 1800. In the present call it is assumed that the L1 channel register relay R1875 is operated and that, at its contacts 1878, it applies ground potential to the contact 1 of the channel selecting switch S1801. This same marking ground is also connected by way of the contact 1891 to the conductor C4301–NM1 extending to Fig. 43 where it marks the L1 outgoing line in the first bank contact accessible to the wiper 4328 of the outgoing selector 4300. This conductor is also multiply connected to the corresponding contacts in the banks of all of the outgoing selectors, such as the selector 4300, provided in the relay switching center UAC. The number of outgoing selectors required in this system, of course, will depend upon the amount of traffic handled through the relay switching center.

Accordingly, a number of outgoing selectors, such as the selector 4300, may have their wipers positioned in engagement with the contacts terminating the L1 outgoing line and the associated cross-office units may have been set to "deferred," "routine" or "priority" precedence positions. Consequently, if the outgoing selector 4300 has its wipers positioned into engagement with the contact 1 terminating the L1 outgoing line, the ground potential applied over the above traced circuit to the conductor C4301–NM1 will now be further extended by way of the wiper 4328, and the conductor C4201–NMC extending to Fig. 42, to the contact 1 accessible to the wiper 4215 of the precedence marking switch 4210. As a result of this marking potential, the precedence of the particular call to be transmitted over the L1 outgoing line is marked in the cross-office unit. Since the conductor C4301–NM1 is also multiply connected to all of the remaining outgoing selectors, a corresponding circuit will also be completed in each of the outgoing selectors having its wipers engaging the contacts terminating the L1 outgoing line. Thus, the "deferred" precedence of the call being described will be marked in the precedence marking switch of each of the cross-office units connected to the L1 outgoing line.

Referring now to Fig. 42, it will be seen that the wipers 4211 to 4216, inclusive, of the precedence marking switch 4210 in the cross-office unit 3400 are normally in engagement with their normal resting positions. However, if the associated cross-office unit 3400 has been set by a previous message to the "deferred" precedence position all of the wipers 4211 to 4216, inclusive, of the precedence marking switch 4210 will be in engagement with the contacts 1 in the associated contact banks. Of course, other cross-office units, similar to 3400, may also have the associated outgoing selectors in engagement with the L1 outgoing line, but their precedence marking switches, such as the switch 4210, may be positioned to register different precedence indicators. However, each cross-office unit that has its precedence marking switch 4210 positioned to the "deferred" precedence position will have ground potential applied to the conductor C4201–NMC in the manner previously described and the wiper 4215 will be in engagement with the contact 1 terminating this conductor.

In Fig. 42 the ground potential applied to the wiper 4215 (in engagement with the contact 1 of the deferred precedence) is extended by way of the contacts 3855 to the conductor C3802–1 extending to Fig. 28. In Fig. 28 the ground potential applied to the conductor C3802–1 is further extended by way of the contacts 2831, the winding of the channel marking relay R2810–1 and the associated resistor, to battery. The relay R2810–1 operates over this circuit and, at its contacts 2826, it locks itself to the grounded conductor C2601–SU3. The same circuit will be completed through each of the cross-office units which have their precedence marking switches set (by a previous message) to the "deferred" precedence position in order to operate the associated channel testing relays in the channel testing circuit 2800. Consequently, a number of channel testing relays, such as the relay R2810–1, may be operated when the inquiry ground potential is applied to the conductor C2102–COM1 by the director 200A.

As soon as the channel marking relay R2810–1 operates in the manner described above, it removes, at its contacts 2828, a marking ground potential from the bank contact accessible to the wiper 2873 of the channel testing switch S2870, and, at its contacts 2827 it completes a circuit for operating the channel test relay R2850, provided the corresponding channel test relay R2845 in the second director is in its restored position. This circuit may be traced from ground by way of the contacts 2827, contacts 2846 of the channel test relay R2845 in the second channel test circuit and the winding of the channel test relay R2850 in the first director 200A, to battery. Each of the other operated channel marking relays, similar to the relay R2810–1, will also complete the above traced circuit and they also remove the marking ground from the corresponding bank contacts accessible to the wiper 2873. When the relay R2850 operates, it completes, at its contacts 2853, a circuit including the conductor C2601–GR extending to Fig. 26 for operating the control relay R2635 in multiple with the slow-to-operate timing relay R2640. As soon as the relay R2635 operates it interrupts, at its contacts 2636, a point in the circuit for operting the hunt empty bin relay R2760. This circuit is interrupted before the slow-to-release precedence test relay R2120 restores to normal.

In other words, if the inquiry ground applied to the conductor C2102–COM1, during the operated period of both relays R2120 and R2130, fails to cause the operation of one of the channel marking relays R2810–1, etc. (due to the fact that no outgoing selector, such as the selector 4300, is positioned into engagement with the L1 outgoing line) then the channel test relay R2850 and the control relay R2635 will remain in their restored positions until after the precedence test relay R2120 restores to normal.

In the event that no channel marking relay, such as the relay R2810–1, is operated at this time, the relays R2850 and R2635 will be in their restored positions. Therefore, when the slow-to-release precedence test relay R2120 restores to normal after a slight delay, at its contacts 2121, it now applies ground potential by way of the conductor C2102–PRE extending to Fig. 26, contacts 2636, and the right-hand winding of the hunt empty bin relay R2760, to battery. This relay now operates and immediately locks itself over a circuit including its left-hand winding, contacts 2763, 2625', and 2613, and ground. Further operations controlled by the hunt empty bin relay R2760 will be described hereinafter.

Returning again to the channel testing circuit 2800, it will be recalled that when the relay R2850 operated it completed, at its contacts 2853, a circuit including the conductor C2601–GR for operating the control relay R2635 in order to indicate to the cross-office selector switch relay control group 2600 that at least one cross-office unit 3400 is connected to the L1 outgoing line and that at least one of the cross-office units so connected has previously been set to handle a message having the same "deferred" precedence as the message being described. As a further result of the operation of the relay AR2850, at its contacts 2859', it completes a circuit for operating the magnet M2875 of the channel testing switch S2870. The last mentioned circuit may be traced from battery by way of the winding of the magnet M2875, contacts 2859', conductor C2601–TMM extending to Fig. 26, contacts 2631 and 2651, conductor C2601–LC extending to Fig. 28, contacts 2856, the wiper 2873 in engagement with its normal home contact position and the grounded conductor C2601–SU2. The magnet M2875 operates over this circuit. Simultaneously therewith, the relay R2850 also connects the grounded conductor C2601–SU2 over a circuit including the normal home contact position engaged by the wiper 2874 of the channel testing switch S2870, contacts 2857, and conductor C2601–LD extending to Fig. 26 in order to complete the operating circuit for the slow-to-release timing relay R2655 in the relay control group 2600. As soon as the relay R2655 operates it interrupts, at its contacts 2656, a point in the previously traced circuit for operating the slow-to-operate timing relay R2640 before the latter relay has had an opportunity to fully operate.

Figure 26:
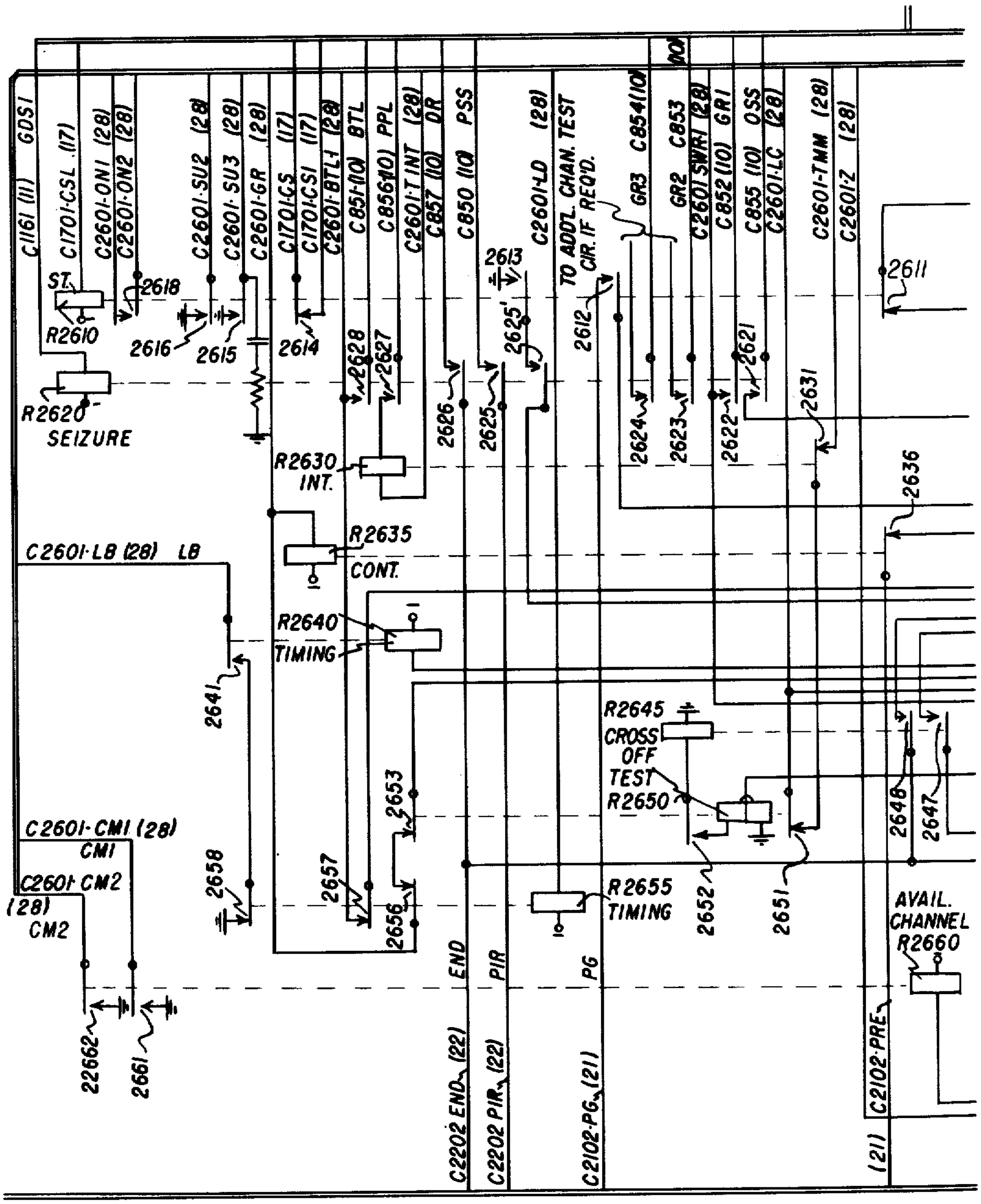

As a further result of the operation of relay R2850, at its contacts 2854, it now applies ground potential over a circuit including the conductor C2601–SWR1 extending to Fig. 26, contacts 2622, conductor C852 extending to Fig. 10, wiper 833 of the line selector 810 in engagement with the contact 1 terminating the conductor C860 extending to the cross-office selector switch 3300 (Fig. 33) individually associated with the incoming line 400. Thus, the ground potential applied over the above traced circuit to the wiper 833 is further extended by way of the conductor C860 extending to Fig. 33 and the winding of the connect relay R3310, to battery. The relay R3310 now operates and connects the cross-office selector switch 3300 individually associated with the incoming line 400 to the cross-office selector switch relay control group 2600 in the director 200A associated with the incoming line 400. It should be noted, however, that as soon as the relay R3310 operates, it prepares a locking circuit for itself which will include the contacts 3316, 3317 and the off-normal contacts ON3329 on the cross-office selector switch 3300. The off-normal contacts ON3329, however, are only closed during the time the wipers 3321 to 3325, inclusive, of the switch 3300 are advanced away from their normal home contact positions.

Referring again to the channel testing circuit 2800, it will be seen that when the magnet M2875 operates, it completes, at its contacts 2877, a circuit including the contacts 2858, conductor C2601T–INT, winding of the interrupter relay R2630, contacts 2627, conductor C856 extending to Fig. 10, wiper 837 of the line selector 810, conductor C862 extending to Fig. 33, contacts 3319 and the winding of the magnet M3326 of the cross-office selector switch 3300, to battery. In the last mentioned circuit the interrupter relay R2630 and rotary magnet M3626 of the cross-office selector switch 3300 operate in series. The relay R2630, at its contacts 2631, interrupts a point in the previously traced circuit for the magnet M2875 of the channel testing switch 2870. The magnet M2875 restores to normal and advances its wipers 2871 to 2874, inclusive, one step in a counterclockwise direction from the normal home contact positions into engagement with the contacts 1. As a further result of the restoration of the magnet M2875, at its contacts 2877, it also interrupts a point in the above traced series circuit for the interrupter relay R2630 and the rotary magnet M3326 of the cross-office selector switch 3300. Consequently, the interrupter relay R2630 restores to normal to again complete, at its contacts 2631, the circuit for the magnet M2875. The rotary magnet M3326 upon restoring, now advances its wipers 3321 to 3325, inclusive, one step in a clockwise direction from the normal home contact positions into engagement with the first contacts. The cycle of operation including the magnet M2875, the interrupter relay R2630 and the rotary magnet M3326 will now be determined by the ground potentials encountered by the wipers 2873 and 2874 as they are advanced step-by-step over the associated contact banks. In any event, the first step of the wipers of the channel testing switch S2870 and the first step of the wipers of the cross-office selector switch 3300 positions the various wipers into engagement with the contacts 1.

At this point it should be noted that as soon as the wipers of the channel testing switch S2870 are moved from the normal home contact position into the contacts 1, the off-normal contacts ON2879 are opened and the off-normal contacts ON2878 and ON2879′ are closed. These contacts remain in this position until the wipers are again returned to their normal home contact position. Consequently, as soon as the wipers of the channel testing switch S2870 are advanced one step, the off-normal contacts ON2879′ complete an obvious circuit for operating the transfer relay R2860. Finally, when the wiper 2874 of the switch S2870 advances from its normal home contact position it interrupts a point in the previous traced circuit for the slow-to-release timing relay R2655.

It will be remembered that the channel testing register relay R2810–1 was operated because the cross-office unit 3400 was associated with the L1 outgoing line. This relay, at its contacts 2828, removes ground potential from the contacts 1 accessible to the wiper 2873 and it should be noted that since all of the contacts accessible to the wiper 2873 are multipled to the corresponding contacts accessible to the wiper 2874, the contact 1 accessible to the latter wiper is also ungrounded at this time. The ungrounded condition of the bank contacts 1 now engaged by the wipers 2873 and 2874 indicate to the channel testing switch S2870 that the first cross-office unit 3400, is connected to the L1 outgoing line and that the first cross-office unit 3400 has its precedence marking switch 4200 positioned to register the "deferred" precedence indicator, as previously noted. Since the cross-office selector switch 3300 has also advanced its wipers one step they now engage the first contacts in the associated contact bank terminating the conductors extending to the same cross-office unit 3400 that has caused the operation of the channel testing register relay R2810–1.

The channel testing circuit 2800 and the cross-office selector switch relay control group 2600 are now in condition to test the idle or busy condition of the first cross-office unit 3400. Thus, when the wiper 2874 interrupted the circuit for the timing relay R2655, the relay upon restoring to normal, at its contacts 2657, connects the right-hand winding of the test relay R2650 to the cross-office unit 3400 to determine whether this unit is idle in the sense that it can be utilized to store another message that has been received over the incoming line 400 even though it may be, at the present time, transmitting a previously stored message over the L1 outgoing line.

It will first be assumed that the associated cross-office unit 3400 illustrated in Figs. 34 to 44, inclusive, is idle at the time the above test is made. When this condition exists in the cross-office unit 3400 a circuit will be completed from ground, by way of the right-hand winding of the cross-office test relay R2650, contacts 2756, 2657 and 2628, conductor C851 extending to Fig. 10, wiper 825, conductor C864 extending to Fig. 33, contacts 3313, wiper 3323 in engagement with the contact 1, conductor C3301–BTL extending to Fig. 39 and the winding of the seizure relay R3870, to battery. In this circuit the relay R3870 does not operate due to the high resistance of the right-hand winding of relay R2650. However, relay R2650 operates and, at its contacts 2652, connects the low resistance winding of the relay R2645 in series with the left-hand low resistance winding of the relay R2650 to the previously traced circuit including the winding of the seizure relay R3870. As soon as the last mentioned circuit is completed the relays R2645 and R3870 operate in series with the relay R2650. Thus, all three relays now remain in their operated positions.

If it is now assumed that the cross-office unit 3400 is busy, a direct ground potential will be connected to conductor C3301–BTL in order to short-circuit the test relay R2650 and prevent its operation. The cross-office unit 3400 may be marked busy in the event the unit is being returned to the pool of cross-office units; or in the event the associated tape storage bin is full of tape; or in the event the associated reperforator 3410 is being controlled to automatically feed out "blank" tape; or in the event another incoming line circuit is transmitting signals to the cross-office unit 3400. Consequently, the previously noted slow-to-operate timing relay R2640 will subsequently reoperate and, at its contacts 2641, it will now complete a short-circuit which includes ground at the contacts 2658 of the now restored timing relay R2655, conductor C2601–LB extending to Fig. 28, contacts 2852, wiper 2872 and the winding of the relay R2810–1 to ground. The last-mentioned circuit short-circuits the winding of the relay R2810–1 in order to restore the latter relay to normal.

As soon as the relay R2810–1 restores to normal, it reconnects, at its contacts 2828, ground potential by way of the contacts 1 engaged by the wipers 2873 and 2874 in order to complete the circuit including the conductor C2601–LC in order to reoperate the magnet M2875 of the channel testing switch S2870 and to again complete the circuit including the conductor C2601–LD for reoperating the timing relay R2655. The relay R2655 interrupting the circuit of the relay R2640, at its contact 2656, and, at its contacts 2658, it disconnects the ground potential from the wiper 2872 of the channel testing switch S2870. It should be noted, however, at this time that when the relay R2810–1 is restored to normal it will not be reoperated inasmuch as the inquiry ground potential applied to the conductor C2102–COM1 has been removed by the restoration of the precedence test relay R2120. However, the magnet M2875 upon reoperating, now recompletes, at its contacts 2877, the previously traced circuit for operating the interrupter relay R2630 in series with the rotary magnet M3326 of the cross-office selector switch 3300. Accordingly, the wipers of the channel testing switch S2870 and the wipers of the cross-office selector switch 3300 are advanced an additional step, the former to test to determine whether or not the channel testing relay R2810–2 is operated and the latter to select the next cross-office unit, such as the unit 3400. Thus, the channel testing switch S2870 and the cross-office selector switch 3300 advance step-by-step to search for another cross-office unit, which is also connected to the outgoing line L1 and which has registered therein the same deferred precedence as the precedence of the message being handled by the director 200A. These switches will be stepped in synchronism until another channel testing relay, such as the relay R2810–1, is encountered and is in its operated position to indicate that the corresponding cross-office unit is connected to the L1 outgoing line and has the proper deferred precedence registered therein. If the selected cross-office unit is idle, as previously noted, the test relays R2650 and R2645 are operated in the manner previously described to associate the idle cross-office unit with the director 200A.

For the purpose of this description, it will be assumed that the cross-office unit 3400 was idle at the time the channel testing switch S2870 tested its first contact and that the relays R2650 and R2645 operated. As soon as the relay R2645 operates, it completes, at its contacts 2647, a circuit including the contacts 2754′ and 2764′ for grounding the conductor C857 extending to Fig. 10 and for grounding the conductor C2202–END extending to Fig. 22. The ground potential applied to conductor C2202–END completes an obvious circuit for operating the slow-to-operate end relay R2250. The ground potential applied to the conductor C857 extending to Fig 10, is further extended by way of the wiper 838 of the line selector 810, conductor C688 extending to Fig. 6 and the lower winding of the open line relay R605 to battery. The relay R605 now operates and at its contacts 608 it completes a circuit including ground at contacts 681 for operating the director release relay R670. Relay R670 upon operating, locks itself by way of its contacts 675 to ground at contacts 681. Further operations of the director, as a result of the operation of the director release relay R670, will be described hereinafter.

As soon as the end relay R2250 operates, at its contacts 2251, it removes the holding ground potential from the conductor C1101–F extending to Fig. 11. In Fig. 11 it will be seen that the removal of ground potential from the conductor C1101–F interrupts the holding circuit for the test and guard relay R1130 which now restores to normal and it also interrupts the circuit for the guard slave relay R1150 which also restores to normal. As a further result of the removal of ground potential from the conductor C1101–F, the holding ground potential is also removed from the conductor C1161 extending to Fig. 26 in order to restore the seizure relay R2620 in the cross-office selector switch relay control group 2600.

As soon as the test and guard relay R1130 restores to normal, it interrupts, at its contacts 1135, the busy marking ground potential applied to the conductor C805 extending to Fig. 10 in order to mark the director 200A available for use by another calling incoming line circuit such as the line circuit 400. At its remaining contacts, the relay R1130 conditions the circuits including the conductors C806, C817 and C819 for further operation whereby the director 200A may be reoperated under control of another incoming line circuit.

When the guard slave relay R1150 restores to normal, as noted above, it disconnects the five conductors C841 to C845, inclusive, from the address sensing relay group 1201 (Fig. 12) and from the precedence sensing relay group 1901 (Fig. 19). Consequently, the restoration of the guard slave relay R1150 prevents the address sensing relay group 1201 and the precedence sensing relay group 1901 in the director 200A from responding to any other code perforations sensed by the tape reader 340. As a further result of the restoration of the guard slave relay R1150, at its contacts 1152, it removes ground potential from the conductor C1156 thereby to restore the release relay R1480 and the latter relay upon restoring disconnects holding ground potential from various circuits in order to release any relays which are held in their operated position over the various contacts on the relay R1480. Also, at its contacts 1152, the relay R1150 removes ground potential from the conductor C1155 extending to Fig. 24 in order to restore the release relay R2500 in the precedence detector 2300.

Incident to the restoration of the relay R2500, ground potential is also removed from a plurality of different holding circuits in order to restore any relays which have been locked in their operated position to the holding ground potentials controlled by the contacts on relay R2500. Thus, at its contacts 2509′ the relay R2500 interrupts the locking circuit for the NM7 and NM8 relays R2590 and R2595 in the deferred detector 2300NM in order to erase the "deferred" precedence indicator registered therein. At its contacts 2504, the relay R2500 removes ground potential from the conductor C1735 extending to Fig. 17 thereby to restore the start relay R1730, the test relay R1740, the series relay R1840 and the L1 relay R1875 in the channel register 1700. These relays all restore to normal at this time in order to again condition the channel register 1700 for further operation in response to the receipt of an additional call by the first director 200A. It should be noted, however, that when the relay R1875 restores to normal, it interrupts, at its contacts 1877, the previously described circuit for the translator disconnect relay R1750 which relay now restores to normal and, at its contacts 1754, removes ground potential from the conductor C1701–CSL extending to Fig. 26. In Fig. 26 the removal of ground potential from the conductor C1701–CSL restores the start relay R2610 to normal.

The start relay R2610, at its contacts 2615, removes ground potential from the conductor C2601–SU3 extending to Fig. 28 in order to restore any of the operated channel testing relays R2810–1, etc., to normal; at its contacts 2616, it removes ground potential from the conductor C2601–SU2 and, at its contacts 2618, it interconnects the conductors C2601–ON1 and C2601–ON2 thereby to complete a self-interrupting homing circuit for the magnet M2875 of the channel testing switch S2870.

The homing circuit for the magnet M2875 may be traced from battery, winding of the magnet M2875, contacts 2863 of the operated transfer relay R2860, conductor C2601–ON2, contacts 2618, conductor C2601–ON1, off-normal contacts ON2878 (closed as long as the wipers of the switch S2870 are in an off-normal position) and contacts 2876, to ground. It should be noted at this time, however, that the channel testing relay R2850 restored to normal incident to the restoration of all of the channel testing relays R2810–1 etc. Consequently, the interrupting circuit for the magnet M2875 includes contacts 2863 of the transfer relay R2860, which is normally held in its operated position over a circuit including the off-normal contacts ON2879′. Each time the magnet M2875 operates over the above traced self-interrupting circuit it interrupts its own circuit at its contacts 2876. The magnet then restores to normal to advance the wipers 2871 to 2874, inclusive, one step in a counterclockwise direction. The restoration of the magnet M2875 again completes the self-interrupting circuit at its contacts 2876, whereupon the magnet reoperates and then restores to advance the wipers an additional step. Consequently, the magnet M2875 continues to operate and restore until the wipers engage the normal home contact position. When this position is reached by the wipers, the off-normal contact ON2878 are opened in order to terminate the operating circuit for the magnet M2875. Also the off-normal contacts ON2879′ are opened to interrupt the circuit for the relay R2860 which also restores to normal.

At the present time the incoming line circuit 400 is connected by way of its individually associated cross-office selector switch 3300 to the cross-office unit 3400 (Figs. 34 to 44, inclusive). The cross-office unit 3400 is connected to the L1 outgoing line and has also been previously set in accordance with the "deferred" precedence indicator of the message that has been sensed by the tape reader 340 in the incoming line circuit 400. Consequently, the entire message, as perforated on the tape 333 may now be fed through the incoming line transmitter 360 included in the incoming line circuit 400 and transmitted directly to the cross-office reperforator 3410 included in the cross-office unit 3400. In other words the entire message that has been perforated on the tape 333 by the typing reperforator 330 included in the incoming line circuit 400 may now be retransmitted to and stored in the cross-office unit 3400 where it will be subsequently retransmitted over the L1 outgoing line toward the destination determined by the routing indicator of the received message. The manner in which the latter operations are performed will be described hereinafter.

From the foregoing description of the operation of the director 200A, it will be appreciated that certain of the information perforated on the tape 333 is utilized in controlling the director so that it will register the identity of the outgoing line over which the message should be repeated, it will determine the precedence of the received message and make certain that it will use a cross-office unit having the same precedence, and it will control the cross-office selector switch 3300, associated with the particular incoming line circuit 400, to connect with the particular selected cross-office unit 3400 and it will disconnect itself from the incoming line circuit as soon as these operations have been performed.

*Operation of the director to select a cross-office unit which is not connected to an outgoing line*

In the foregoing description of the operation of the channel register 1700, the cross-office selector switch relay control group 2600 and the channel testing circuit 2800, it was assumed that the cross-office unit 3400 was connected to the L1 outgoing line and that the precedence indicator previously registered in the cross-office unit corresponded to the "deferred" precedence of a received message which is to be transmitted to the next relay switching center of the L1 outgoing line. Consequently, the channel register 1700, the cross-office selector switch relay control group 2600 and the channel testing circuit 2800 operated in a particular manner to connect the cross-office selector switch 3300, associated with the incoming line circuit 400, with the particular cross-office unit 3400 which, on a previous call, was connected to the desired L1 outgoing line and which has registered in it the "deferred" precedence of the present message.

If, at the time the test is made of the various cross-office units, no cross-office unit is connected to the L1 outgoing line, all of the channel testing register relays R2810–1 to R2810–44, inclusive, will be in their restored positions and as a result thereof, an idle cross-office unit, which has no previous message stored therein, will be selected from a pool of empty bin cross-office units for use in connection with the present message.

In order to understand the operations involved in the selection of an idle cross-office unit from the pool of empty bin cross-office units, it will be assumed that the director 200A in conjunction with the routing translator 2900 has caused the operation of the L1 relay R1875 in the channel register 1700. This relay, as previously noted, applies ground potential, at its contacts 1878, to the first contact in the bank accessible to the wiper 1851 of the channel selecting switch S1801; it operates the translator disconnect relay R1750; and, it operates the start relay R2610 in the cross-office selector switch relay control group 2600 in the manner previously described. The relay R2610, at its contacts 2612, applies ground potential to the conductor C2102–PG in order to operate the precedence test relay R2120 and the latter relay completes a circuit for operating the precedence test relay R2130. The relay R2130 now applies ground potential, at its contacts 2134, to the conductor C2102–COM1 extending to Fig. 27 in order to operate the available channel relay R2660 and in order further to extend the ground potential on the conductor C2102–COM1 to the conductor C2302–COM extending to Fig. 23. This ground potential on the conductor C2302–COM is further extended by way of the contacts 2596 (assuming that the deferred precedence indicator is registered in the deferred detector 2300NM) conductor C2101–D extending to Fig. 21, contacts 2133, conductor C2102–NM extending to Fig. 27, contacts 2784, conductor C1801–NM extending to Fig. 18, contacts 1836 of the operated relay R1830 and the winding of the deferred relay R1890, to battery. As previously noted, the relay R1890 closes all of its contacts. Consequently, at its contacts 1891, it connects ground at the contacts 1878 of the operated L1 relay R1875 to the conductor C4301–NM1 extending to Fig. 43. If the outgoing selector 4300 of the cross-office unit 3400 or any other outgoing selector having access to the L1 outgoing line is not connected thereto, all of the channel testing register relays R2810–1, etc., will remain in their normal positions. Also, if any one of the outgoing selectors, such as the selector 4300, has its wipers in engagement with the contacts terminating the L1 outgoing line but the associated precedence marking switch 4210 has its wipers positioned to indicate some precedence indicator other than the "deferred" precedence, the channel testing register relays R2810–1 etc., will also remain in their restored positions. Thus, after the inquiry ground test is made of all of the cross-office units and their individual outgoing selector switches and no channel testing register relay R2810–1, etc., is operated, then all of the bank contacts accessible to the wipers 2873 and 2874 of the channel testing switch S2870 will be grounded. Also the channel test relay R2850 will remain in its normal position and prevent the completion of the previously traced operating circuit for the control relay R2635 in the cross-office selector switch relay control group 2600. Since the latter relay remains in its restored position, a circuit will subsequently be completed by the restoration of the slow-to-release precedence test relay R2120 for operating the hunt empty bin relay R2760.

When the relay R2120 restores, a circuit will now be completed including the contacts 2134, 2121, conductor C2102–PRE extending to Fig. 26, contacts 2636 on the unoperated relay R2635 and the right-hand winding of the hunt empty bin relay R2760, to battery. However, during the releasing period of the precedence test relay R2120 and before it closes its contacts 2121 to ground the conductor C2102–PRE, the channel testing switch S2870 will remain in its normal home contact position unless at least one of the channel testing relays R2810–1, etc., has been operated.

Should one of the channel testing relays R2810–1 be operated in the manner previously described, the channel testing switch S2870 under control of the channel testing relay R2850 will advance its wipers step-by-step until the wiper 2873 engages the contact marked by an absence of ground is encountered. The switch will then be brought to rest with its wipers in engagement with this contact and test will be made of the cross-office unit corresponding to the operated channel testing relay. If this cross-office unit is busy, the channel testing switch S2870 will continue to rotate its wipers to the home contact position. However, if no cross-office unit is connected to the L1 outgoing line, or if the cross-office unit connected to the L1 outgoing line is set to a different precedence, then the hunt empty bin relay R2760 will be operated in the manner described above.

As soon as the relay R2760 operates, it immediately locks itself over a circuit including its left-hand winding, contacts 2763 and 2625′ and ground at contacts 2613. Also, at its contacts 2762′ the relay R2760 removes ground potential from the conductor C2102–PG, extending to Fig. 21, in order now to release the precedence test relay R2130. As a further result of the operation of the relay R2760, at its contacts 2764, it opens the circuit for the normally operated slow-to-release relay R2770 whereupon this relay slowly restores to normal. At its contacts 2761 and 2762, the relay R2760 simultaneously completes separate energizing circuits for the left and right-hand windings of the differential relay R2775. Since the windings of the relay R2775 are wound in opposition to each other, this relay does not operate at this time. At its contacts 2766, the relay R2760 connects the conductor C2102–COM1 to the conductor C3902–HEB extending to Fig. 39. The last-mentioned conductor is multiply connected to all of the cross-office units, such as the cross-office unit 3400 illustrated in Figs. 34 to 44, inclusive, in order to prepare a point in a circuit for selecting one of the cross-office units that has an "empty bin" with no messages stored therein. Finally, at its contacts 2768, the relay R2760 reconnects the available channel relay R2660 to the conductor C2102–COM1.

When the relay R2760 removes ground potential from the conductor C2102–PG, as noted above, the precedence test relay R2130 restores to normal in order to prepare, at its contacts 2138, a point in the circuit for reoperating the precedence test relay R2120 and to interrupt, at its contacts 2134, a point in the previously traced circuit including the conductor C2102–PRE for energizing the right-hand winding of the hunt empty bin relay R2760. The relay R2760, however, is now locked in its operated position over a circuit including its left-hand winding and, consequently, does not restore to normal. However, the removal of the initial operating ground potential for the right-hand winding of relay R2760 also interrupts the energizing circuit for the right-hand winding of the differential relay R2775. The latter relay is now energized over a circuit including only its left-hand winding and, consequently, the relay now operates. In the present call, however, the operation of the differential relay R2775 merely prepares, at its contacts 2776, a point in the circuit for subsequently controlling the operation of the intercepting relay R2750.

When the slow-to-release relay R2770 restores to normal, incident to the operation of the relay R2760, at its contacts 2771, it now completes another circuit including the conductor C2102–PG in order to reoperate the precedence test relay R2120. The relay R2120 again completes the circuit for reoperating the precedence test relay R2130 in the manner previously described so that the latter relay, at its contacts 2134, now reapplies ground potential to the conductor C2102–COM1 extending to Fig. 27. Since the hunt empty bin relay R2760 is now in its operated position, the ground potential now applied to the conductor C2102–COM1 is extended by way of the contacts 2768 and 2785′ to reoperate the available channel relay R2660 and to apply ground potential to the conductor C3902–HEB extending to Fig. 39 and to all other cross-office units provided in the switching center. As previously noted, the relay R2660, at its contacts 2661 and 2662, completes the operating circuits for the channel marking connecting relays R2830 and R2835 whereby 39 cross-office units, such as the unit 3400, are connected to the 39 channel testing register relays R2810–1 to R2810–39. The remaining five cross-office units 40 to 44, inclusive, are provided for multiple call purposes as will be described hereinafter.

Figure 39:
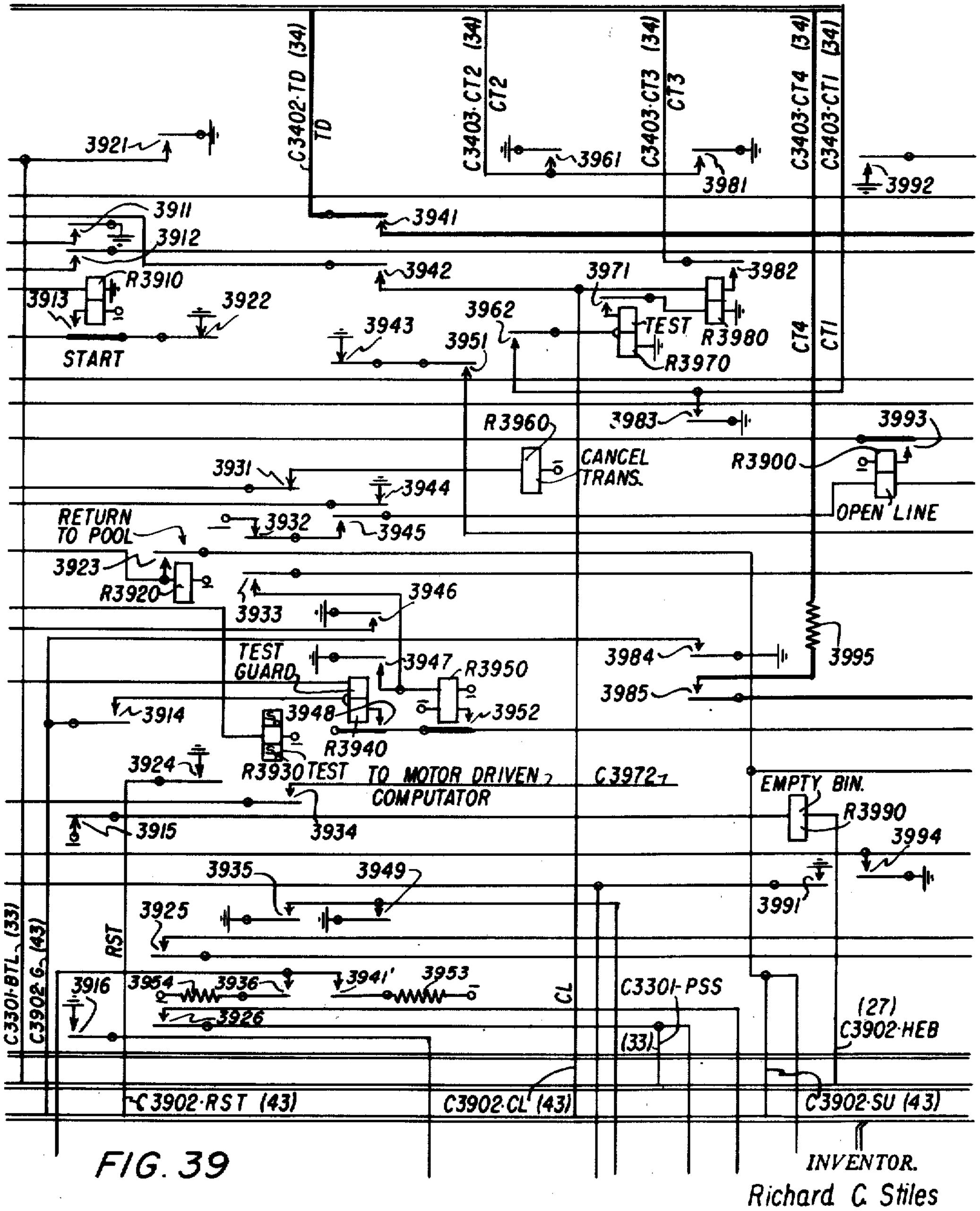

Referring now to Fig. 39, it will be seen that the ground potential applied to the conductor C3902–HEB is extended by way of the winding of the empty bin relay R3990 and the contacts 2915, to battery. If the start relay R3910 in the cross-office unit 3400 is in its restored position, the empty bin relay R3990 will now operate. The corresponding relay, in each of the remaining cross-office units in the pool of empty bin cross-office units, will also operate at this time providing the associated start relay is in its restored position. It will be apparent from the foregoing that if any cross-office unit is either connected to an outgoing line, such as the line L1, or is being operated under control of its start relay, the empty bin relay in such cross-office units can not be operated.

For the purpose of this description it will now be assumed that the cross-office unit 3400 shown in Figs. 34 to 44, inclusive, is available and that its storage bin is empty at the present time. Accordingly, the empty bin relay R3990 operates over the above described circuit, and at its contacts 3991, it applies ground potential by way of the contacts 3855 to the conductor C3802–1, extending to Fig. 28, in order now to operate the channel testing register relay R2810–1. All other relays, similar to relay R2810–1, which are connected to cross-office units having empty bins, will also operate at this time.

When the relay R2810–1 operates it immediately locks itself by way of its contacts 2826 to the grounded conductor C2601–SU3. Also, at its contacts 2827, the relay R2810–1 completes the previously described operating circuit for the channel test relay R2850 and, at its contacts 2828, it removes the ground potential from the contact 1 accessible to both the wipers 2873 and 2874 in order to mark the cross-office unit 3400 available for use in handling the received message.

When the channel test relay R2850 operates, it completes, at its contacts 2856, the previously traced circuit including the grounded conductor C2601–SU2, the wiper 2873 in its normal position, conductor C2601–LC, contacts 2651 and 2631, the conductor C2601–TMM and contacts 2859′, for operating the magnet M2875. At its contacts 2854, the relay R2850 completes a circuit including conductor C2601–SWR–1, contacts 2622, conductor C852 extending to Fig. 10, wiper 833, conductor C860 extending to Fig. 33, for operating the connect relay R3310 of the cross-office selector 3300. Also, at its contacts 2857, the relay R2850 completes the previously traced circuit, including the conductor C2601–SU2, wiper 2874 in its normal position and conductor C2601–LD, for operating the timing relay R2655. The magnet M2875 now advances its wipers 2871 to 2874, inclusive, one step in a counterclockwise direction into engagement with the contacts 1, and the magnet M3326 of the cross-office selector 3300 advances its wipers one step in the clockwise direction to select the cross-office unit 3400 in the manner previously described. Since the first set of contacts of the channel testing switch S2870 have been marked to indicate that the corresponding cross-office unit 3400 is available, the stepping circuit for the magnet M2875 is interrupted as soon as the wiper 2873 engages its associated ungrounded first contact. Also when the wiper 2874 engages its ungrounded first contact the previously traced circuit for the relay R2655 is interrupted. The latter relay now slowly restores to normal and, at its contacts 2656, completes a circuit including the conductor C2601–GR, contacts 2653 and 2757, for operating the timing relay R2640. As soon as the latter relay operates, it completes, at its contacts 2641, a circuit including the conductor C2601–LB and the wiper 2872 for short-circuiting the channel testing register relay R2801–1 which now restores to normal.

As a further result of the restoration of the relay R2655, at its contacts 2657, it connects the right-hand winding of the cross-office test relay R2650 to a circuit including the contacts 2756, 2657 and 2628, conductor C851 extending to Fig. 10, wiper 829, conductor C864 extending to Fig. 33, contacts 3313 of the operated connect relay R3310, wiper 3323, conductor C3301–BTL extending to Fig. 39 and the winding of the seizure relay R3870 in the cross-office unit 3400, to battery. The relay R3870, of course, operates over this circuit to seize the cross-office unit 3400 and the relay R2650 in the cross-office selector switch relay control group 2600 also operates in the manner previously explained to include the relay R2645 in the series circuit with the seizure relay R3870.

In the above traced circuit for operating the seizure relay R3870 in the cross-office unit 3400 having an associated empty storage bin the contacts 3313 on the connect relay R3310 were included. It will be recalled that the stepping of the wipers of the channel testing switch S2870 under control of its magnet M2875 also controlled the rotary magnet M3326 of the cross-office selector switch 3300 to select the cross-office unit 3400. Consequently, all of the wipers of the cross-office selector switch 3300 have been connected to conductors extending to the cross-office unit 3400.

As a further result of the operation of relay R2645, in series with the seizure relay R3870, at its contacts 2647, it completes a circuit including the contacts 2754′ and 2763′, conductor C2202–SOG extending to Fig. 22 for operating the precedence transmission relay R2240. When the relay R2240 is operated, it completes, at its contacts 2244, a circuit including ground at contacts 2114, wiper 2213 of the precedence indicator switch 2210 in engagement with its contact 11, contacts 2231 and 2244 and the winding of the magnet M2214, to battery. The magnet M2214 of the precedence indicator switch 2210 operates over this circuit and, at its contacts 2216, it completes a circuit for operating the magnet M4217 of the precedence marking switch 4210 in the associated cross-office unit 3400 in series with the stepping relay R2230. In other words, the precedence indicator switch 2210 and the precedence marking switch 4210 are conditioned to simultaneously advance their respective wipers, the former to find the precedence indicator registered in the precedence detector 2300 and the latter to register the indicated precedence in the now selected cross-office unit 3400. This operation is accomplished over a circuit including contacts 2216 of the magnet M2214, relay R2230, conductor C2202–PIR extending to Fig. 26, contacts 2625, conductor C850 extending to Fig. 10, wiper 828, conductor C863 extending to Fig. 33, contacts 3314, wiper 3324, conductor C3301–PSS extending to Fig. 39, and the winding of the magnet M4217, to battery. The magnet M4217 and the step relay R2230 operate in series over this circuit, whereupon, at its contacts 2231, the relay R2230 interrupts the circuit for the magnet M2214. The magnet M2214 now restores to normal and advances its wipers one step in a counterclockwise direction into engagement with the contacts 1 in the associated contact banks. As soon as the wipers 2211 to 2213, inclusive, are advanced from the home contact positions the circuit for the test relay R2220 is transferred to the contact 1 in the associated contact bank and the initial operating circuit for the magnet M2214 is also transferred to a circuit including the first contact in the associated contact bank accessible to the wiper 2213. As a further result of the restoration of the magnet M2214, it interrupts, at its contacts 2216, the circuit for the relay R2230 and the magnet M4217 in the cross-office unit 3400. The magnet M4217 upon restoring advances its wipers 4211 to 4216, inclusive, one step in a clockwise direction from the home contact positions into engagement with the first contacts to register the "deferred" precedence.

At this time it may be well to recall the fact that the precedence detector 2300 may register any one of six different precedence indicators and that the particular registered indicator of the six noted above, marks the bank contacts accessible to the wipers 2212 and 2213 by removing the ground potential from the bank contact corresponding to the registered precedence indicator. Consequently, the further stepping action of the magnet M2214 of the precedence switch 2210 is governed in accordance with the potential encountered by the wiper 2213 as it advances step-by-step over the associated bank contacts. Also, the magnet M2214, at its contacts 2216, will control the magnet M4217 of the precedence marking switch 4210 in the cross-office unit 3400 a corresponding number of times so that the wipers thereof will also advance in synchronism to transfer the particular precedence indicator to the selected cross-office unit 3400. When an ungrounded contact is encountered by the wipers 2212 and 2213, the circuit for operating the magnet M2214 is terminated and the test relay R2220 restores to normal.

In the present call, the message received registered the deferred precedence indicator in the deferred detector 2300NM and as a result thereof the first contact accessible to the wipers 2212 and 2213 is ungrounded. Accordingly, the precedence indicator switch 2210 advanced its wipers one step from the home contact position into engagement with the contact 1 and the precedence marking switch 4210 in the cross-office unit 3400 also advanced its wipers one step to register the "deferred" precedence indicator.

As a further result of the operation of the precedence transmission relay R2240, at its contacts 2243, it connects the grounded conductor C2202–GD to the conductor C1801–STEP extending to Fig. 18, and finally, at its contacts 2242 it interconnects the conductors C2201–SOG1 and C2202–SOG2 in order to complete a circuit for operating the magnet M2713 of the channel register finder 2710.

Before describing the circuits controlled by the contacts 2243 and 2242, it should be understood that the channel selector switch S1801 (Fig. 18) has been illustrated as a 100 point rotary switch having each of its contacts connected to contacts controlled by the 100 channel register relays 1800. Thus, the channel selecting switch S1801 is provided with facilities for finding any one of the one-hundred channel register relays that has been operated by the translator 2900 to indicate the outgoing line over which a message must be transmitted. When the channel selecting switch S1801 is operated to find the contact in its bank that has been marked by an operated channel register relay, it will also control the outgoing selector, such as the outgoing selector 4300, associated with the selected cross-office unit. The selector 4300 also has access to one-hundred outgoing lines corresponding respectively to the one-hundred L relays in the channel register relay group 1800. Consequently, the channel selecting switch S1801 and the outgoing selector 4300 are stepped in synchronism in order to select the outgoing line corresponding to the operated L relay in the channel register relays 1800.

If it is necessary to have additional groups of one-hundred outgoing lines, each director may be provided with additional channel selecting switches, such as the switch S1801, and the additional switches will be marked by the operation of the L relays in either the first, second or third, etc., 100 groups of L relays. If more than one channel selecting switch S1801 is required a corresponding number of additional outgoing selectors, such as the selector 4300, will also be provided for each of the cross-office units 3400. Since it is necessary in this case to select the particular first, second, etc., channel selecting switch, such as the switch S1801, the cross-office relay control group 2600 is provided with a channel register finder 2710 which will select the particular channel selecting switch that is marked by an operated L relay and that is to be used in controlling the selective operation of the corresponding outgoing selector, such as the selector 4300.

For the purpose of determining the particular channel selecting switch S1801 that is to be operated to find the group of L relays including the particular L relay identifying a particular outgoing line marked by the translator 2900, the channel register finder 2710 is provided with a chain circuit through each of the channel selecting switches. Thus, ground potential at the wiper 2712 is normally connected to retain the transfer relay R2725 in its operated position and the conductor C1801–HE1 is connected to a contact corresponding to contacts 1837 on each channel group relay, such as the relay R1830, individual to the different channel selecting switches. However, when one of the L relays in the channel register relays, such as the channel register relays R1800, operates in series with the series relay, such as the relay R1840, the latter relay, at its contacts 1841, operates the channel group relay R1830 to disconnect the conductor C1801–HE1 from the conductor C1801–SA1. Thus, if there are two channel selecting switches similar to the switch S1801 one or the other associated channel group relay R1830 will be operated, depending upon the group of channel register relays including an operated L relay.

In view of the foregoing, it will be appreciated that when the precedence transmission relay R2240 closes its contacts 2242 in the manner previously described, the magnet M2713 of the channel register finder 2710 will be operated over a circuit which may be traced from battery by way of the winding of the magnet M2713, contacts 2721, conductor C2202–SOG2, contacts 2242, conductor C2201–SOG1, contacts 2781′ and 2765, the home contact position engaged by the wiper 2712 of the channel register finder 2710, to ground. The magnet M2713 now operates and, at its contacts 2715, completes a circuit including the interrupter relay R2720, contacts 2727 and 2621, conductor C855 extending to Fig. 10, wiper 836 of the line selector 810, conductor C861 extending to Fig. 33, contacts 3315, wiper 3325, conductor C3301–OSS extending to Fig. 40, contacts 4022 and the winding of the magnet M4053 of the selecting switch 4050, to battery. The magnet M4053 operates in series with the interrupter relay R2720 thereby to condition the selector switch 4050 to advance its wipers one step in a clockwise direction from the home contact position into engagement with the contact 1. The interrupter relay R2720 upon operating interrupts at its contacts 2721 the initial operating circuit for the magnet M2713. As soon as the magnet M2713 restores, it advances its wipers 2711 and 2712 one step in a counterclockwise direction from the home contact position into engagement with the contacts 1. As a further result of the restoration of the magnet M2713, it interrupts, at its contacts 2715, the series circuit for the relay R2720 and the magnet M4053. Consequently, the magnet M4053 restores and advances its wipers to select the contact terminating the conductor C4002–GR1 extending to Fig. 43, in order to prepare the circuit for operating the connect relay R4310 associated with the first outgoing selector 4300. Also, the relay R2720, upon restoring, again prepares, at its contacts 2721, the circuit for reoperating the magnet M2713. Reoperation of the magnet M2713 depends upon whether or not its wiper 2712 has now been connected to the channel selecting switch S1801 that is associated with the group of channel register relays, including the particular L1 channel register relay selected by the translator 2900. Thus, the wiper 2712 now applies ground potential to the conductor C1801–SA1 extending to Fig. 18 to determine whether the first channel selecting switch S1801 has been conditioned for operation by the operation of its associated channel group relay R1830. If the relay R1830 is in its restored position the ground potential applied to the conductor C1801–SA1 is returned by way of the contacts 1837 and the conductor C1801–HE1 to reoperate the magnet M2713 and to retain the transfer relay R2725 operated. In other words, the channel register finder 2710 will be controlled to advance its wipers an additional step to select the second channel selecting switch, similar to S1801, and it will control the selecting switch 4050 to advance its wipers an additional step to select the connect relay, similar to R4310, associated with the second outgoing selector, such as 4300, having access to the 100 outgoing lines corresponding to the L relays accessible to the second channel selecting switch.

If it is assumed that the first channel selecting switch S1801 has its channel group relay R1830 operated, the contacts 1837 will be opened to prevent the reoperation of the magnet M2713. In addition to the foregoing, the holding circuit for the transfer relay R2725 is interrupted whereupon the latter relay slowly restores to normal to disconnect, at its contacts 2727, the previoulsy described circuit for the interrupter relay R2720 and to now connect, at its contacts 2726, the conductor C1801–SPL to the previously traced circuit including the conductor C855.

*Controlling the outgoing selector 4300 in the cross-office unit 3400*

In the previous description it was pointed out at the cross-office unit 3400 having an empty bin is selected from the pool of cross-office units by the cross-office selector 3300. The cross-office selector 3300 is individually associated with the incoming line circuit 400 and is controlled by the channel testing switch S2870 in the director 200A to select one of a plurality of cross-office units having empty bins. As soon as the cross-office unit 3400 is selected by the cross office selector 3300, the precedence indicator switch 2210, in the director 200A, controls the setting of the precedence marking switch 4210 in the cross-office unit 3400 to register therein the particular precedence indicator of the message received over the incoming line circuit 400 and stored in the precedence detector 2300. Acordingly, the channel selecting switch S1801 in the director must now control the outgoing selector 4300 individually associated with the cross-office unit 3400, in order to select the particular outgoing line which has been identified as the outgoing line to be used in retransmitting the received message.

It will be recalled that the routing translator 2900 has registered the identity of the outgoing line in the channel register relays 1800 by operating one of the channel register relays 1800. It will also be recalled that in the present example, it was assumed that the L1 relay R1875 is operated and locked in series with the relay R1840 and that, at its contacts 1841, the relay R1840 has completed the operating circuit for the channel group relay R1830. In its operated position, the relay R1830 prepares points in various circuits for the relays R1880, R1885 and R1890; whereby, a first test, previously described, is made to determine whether or not an outgoing selector of a cross-office unit, such as the selector 4300, is connected to the L1 outgoing line and whether or not the associated cross-office unit, such as the unit 3400, is set to the same precedence as the received message. In addition to the foregoing, the relay R1830 prepares other circuits, to be described hereinafter, whereby the cross-office unit having an empty bin is selectively controlled to connect with the particular L1 outgoing line.

In view of the foregoing, it should be understood that when the hunt empty bin relay R2760 operates to indicate that one of the cross-office units is to be selected from the pool, it completes a circuit including ground at contacts 2761′, conductor C2201–GD extending to Fig. 22, contacts 2243 of the operated precedence transmission relay R2240, conductor C1801–STEP extending to Fig. 18, contacts 1833, 1821 and 1816, and the winding of the magnet M1852, to battery. Thus, the channel selecting switch S1801 is conditioned to control the outgoing selector 4300 associated with the selected empty bin cross-office unit 3400 immediately after the latter unit has also been controlled to select the outgoing selector switch 4300 having access to the L1 outgoing line.

Figure 40:
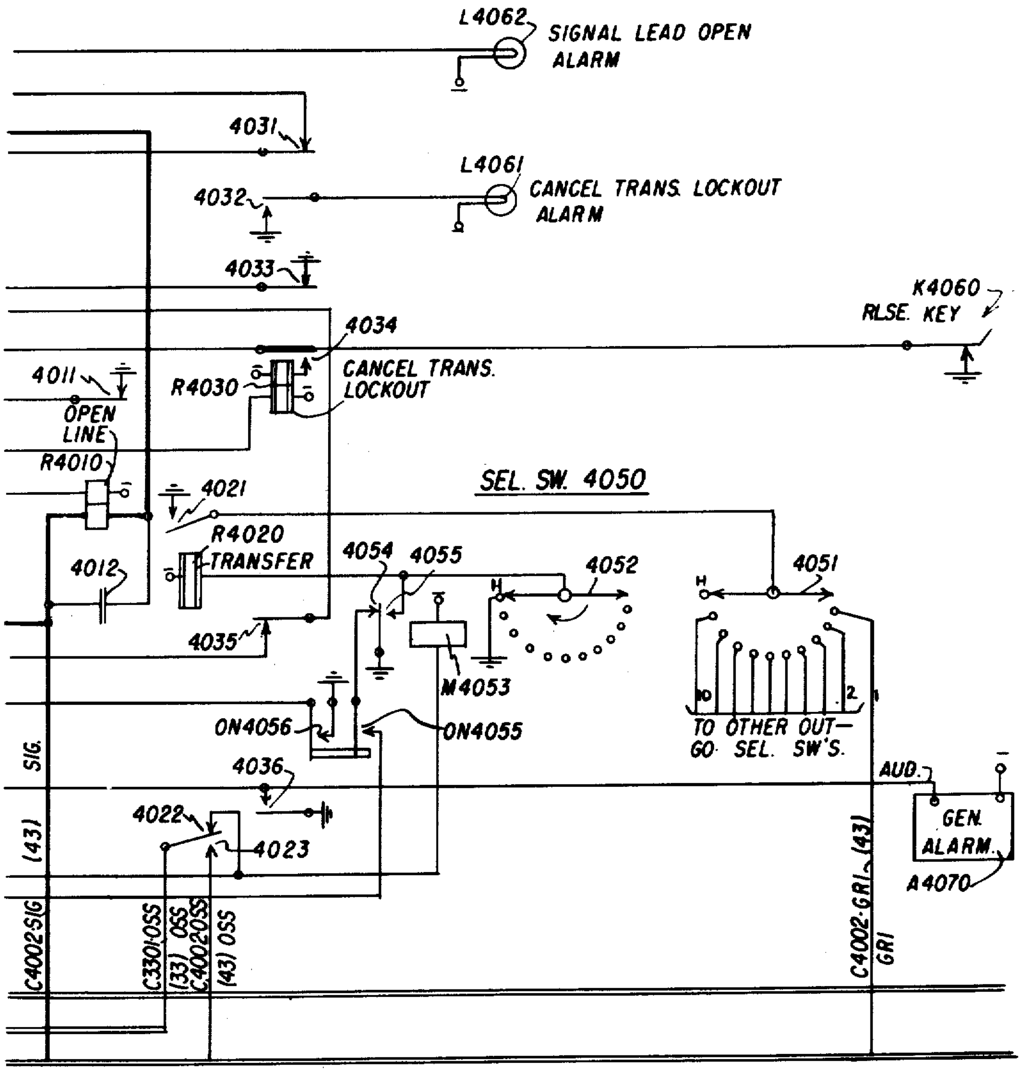
Figure 41:
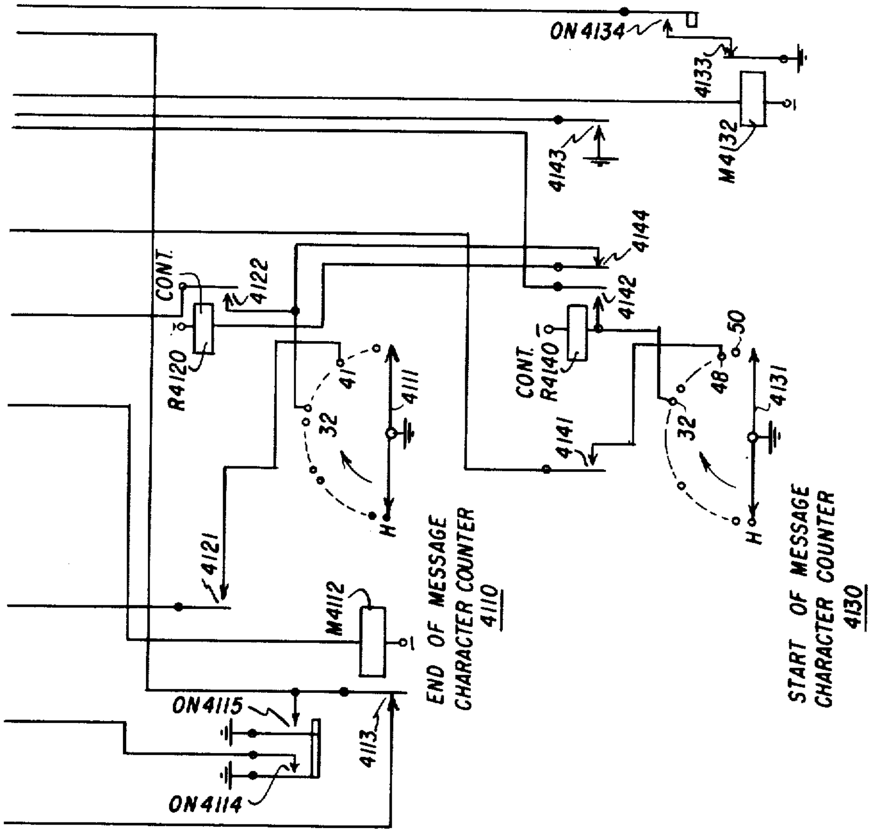

Referring now to the point in the circuit operations that caused the restoration of the transfer relay R2725, it will be seen that a circuit is now completed which may be traced from ground at the contacts 1856 of the operated magnet M1852 by way of the step relay R1820, conductor C1801–SPL extending to Fig. 27, contacts 2726 of the now restored transfer relay R2725, contacts 2621, conductor C855 extending to Fig. 10, wiper 836 of the line selector 810, conductor C861 extending to Fig. 33, contacts 3315, wiper 3325 of the cross-office selector switch 3300, conductor C3301–OSS extending to Fig. 40, contacts 4023 of the now restored transfer relay R4020, conductor C4002–OSS extending to Fig. 43, contacts 4311′ of the now operated connect relay R4310 and the winding of the magnet M4320, to battery. In this circuit both the step relay R1820 associated with the channel selecting switch S1801 and the magnet M4320 of the outgoing selector switch 4300 operate in series. Before describing the interaction between the channel selecting switch S1801 and the outgoing selector 4300, a description will be given of the manner in which the connect relay R4310 was operated to connect the outgoing selector 4300 to the cross-office unit 3400.

Referring now to the selector 4050 (Fig. 40) included in the cross-office unit 3400, it will be recalled that this switch was operated in synchronism with the channel register finder 2710 (Fig. 27) to select a particular one of a plurality of outgoing selectors, such as the selector 4300, which may be provided if more than 100 outgoing lines are provided to handle the traffic through the relay switching center. In the present example, it was assumed that the magnet M4053 was controlled to advance its wipers one step in a clockwise direction to select the conductor C4002–GR1 individual to the outgoing selector 4300. When this operation was completed the transfer relay R4020 restored to normal. Under normal conditions with the selector switch 4050 in its home contact position the transfer relay R4020 is held in its operated position. During the stepping of the wipers 4051 and 4052, the magnet M4053, at its contacts 4054, retains the transfer relay R4020 operated. Accordingly, when the transfer relay R4020 restores to normal it interrupts, at its contacts 4022, the previously described circuit including the conductor C3301–OSS and the magnet M4053 and, at its contacts 4023, it connects the conductor C3301–OSS to the conductor C4002–OSS extending to all of the outgoing selectors including the outgoing selector 4300 that has been selected by the wiper 4051 of the selector switch 4050. As a further result of the restoration of the relay R4020, at its contacts 4021, it now completes a circuit including the wiper 4051, conductor C4002–GR1 extending to Fig. 43 and the winding of the connect relay R4310, to battery. Consequently, the connect relay R4310 now operates and interconnects the various conductors from the cross-office unit 3400 to the various wipers of the associated outgoing selector switch 4300. As a further result of the operation of the connect relay R4310, it now locks itself in its operated position over a circuit including its contacts 4318 and 4319, conductor C3902–SU extending to Fig. 39 and the off-normal contacts 4056 which were closed as soon as the selector switch 4050 advanced its wipers from the home contact positions into engagement with the contacts 1. A branch circuit for holding the relay R4310 in its locked position also includes ground at the off-normal contacts ON4219′ which are closed as soon as the magnet M4217 advances the wipers of the precedence marking switch 4210 from the home contact position into engagement with the contacts 1.

Returning again to the previously described series circuit for operating the magnet M4320 of the outgoing selector 4300 in series with the step relay R1820 in the channel selecting switch S1801. The magnet M4320 operates over this circuit and conditions the outgoing selector 4300 to advance its wipers from the home contact position into engagement with the first contacts terminating the conductors extending to the relay switching center apparatus that is individually associated with the L1 outgoing line. As soon as the step relay R1820 operates in the above described series circuit, at its contacts 1821, it interrupts the initial operating circuit for the magnet M1852. This magnet now restores to normal and advances its wiper 1851 one step in a counterclockwise direction from the home contact position into engagement with the contact 1. As soon as the magnet M1852 restores to normal, as noted above, at its contacts 1856, it interrupts the above described series circuit so that the step relay R1820 and the magnet M4320 of the outgoing selector 4300 now restore to normal. The magnet M4320 upon restoring advances its wipers from the home contact position into engagement with the contacts 1. As soon as the magnet M4320 advances its wipers from the home contact position the off-normal contacts RON4303 are closed to complete an additional locking circuit for the connect relay R4310 and the off-normal contacts RON4302 are closed to prepare a point in a self-interrupting circuit whereby the magnet M4320 may be subsequently controlled to restore all of the wipers of the outgoing selector 4300 to their home contact positions.

As soon as the step relay R1820 restores to normal, as noted above, at its contacts 1821, it recompletes the operating circuit for the magnet M1852. If the test relay R1815 has been operated over the circuit including the wiper 1851 and the engaged contact 1, it interrupts, at its contacts 1816, the circuit for reoperating the magnet M1852. Consequently, the magnet M1852, the step relay R1820 and the magnet M4320 of the outgoing selector 4300 will interact in the manner described above to respectively advance the wiper 1851 of the channel selecting switch S1801 and the wipers of the outgoing selector 4300 step-by-step until the test relay R1815 is operated to terminate the stepping of the wipers.

In the present example it has been assumed that the L1 relay R1875 of the channel register relays 1800 is operated to indicate that the particular message is to be transmitted over the L1 outgoing line. At its contacts 1878, the relay R1875 applies ground potential to the contact 1 accessible to the wiper 1851. Consequently, as soon as the wiper 1851 engages contact 1 the ground potential thereon will complete an obvious circuit for operating the test relay R1815. Upon operating the relay R1815, at its contacts 1816, interrupts the circuit of the magnet M1852 thereby to terminate further stepping of the wipers of both the channel selecting switch S1801 and the outgoing selector 4300. As a further result of the relay R1815, at its contacts 1817, it extends the ground potential on the conductor C1801–STEP by way of the conductor C1801–PIC extending to Fig. 22, the contacts 2221 of the now restored test relay R2220 and the winding of the end relay R2250, to battery.

The end relay R2250 operates over this circuit and, at its contacts 2251, removes ground potential from the conductor C1101–F extending to Fig. 11, thereby to restore the test and guard relay R1130 and the guard slave relay R1150 in the address detector 1100 and to restore the seizure relay R2620 in the cross-office selector switch relay control group 2600 in the manner previously described.

Figure 6:
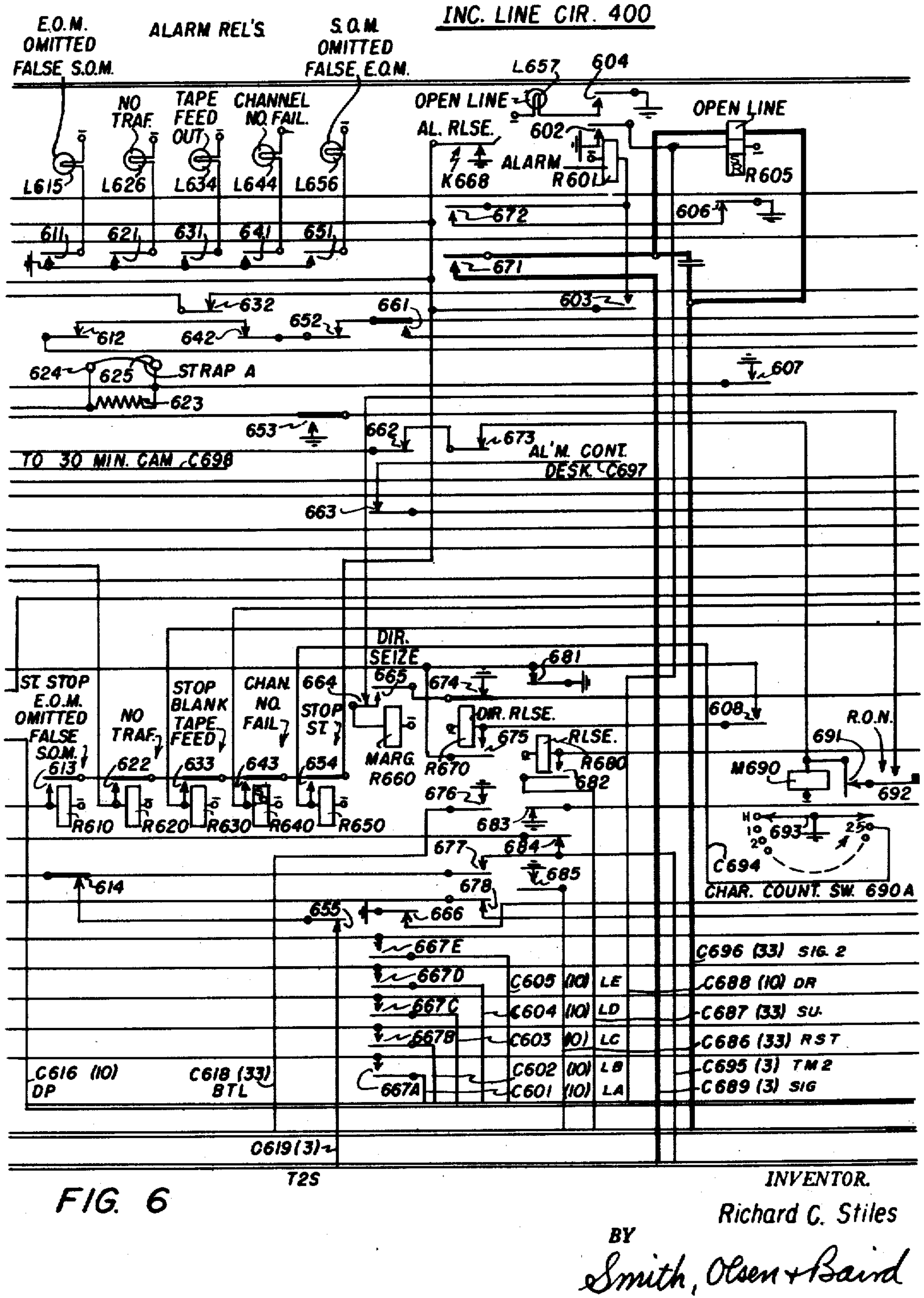

Referring again to Fig. 22 it will be seen that the ground potential applied to the conductor C1801–PIC for completing the operating circuit for the end relay R2250 is also extended by way of the conductor C2202–END extending to Fig. 26, contacts 2626, conductor C857 extending to Fig. 10, wiper 838 of the line selector 810, conductor C688 extending to Fig. 6 and the lower winding of the open line relay R605, to battery. Upon operating, the relay R605, at its contacts 608, completes a circuit including ground at contacts 681 for operating the director release relay R670. Consequently, the director release relay R670 in the incoming line circuit 400 now operates and locks itself to ground at contacts 681 in order to indicate that the director has completed its operation to connect the incoming line circuit 400 to the outgoing line L1 through the cross-office selector 3300, the cross-office unit 3400 and the outgoing selector 4300.

As previously described, the relays R1130 and R1150 in the address detector 1100 restore to normal and the seizure relay R2620 in the cross-office selector switch relay control group 2600 restores to normal when ground potential is removed from conductor C1101–F incident to the operation of the end relay R2250. Restoration of the relay R1130 conditions various circuits so that the director 200A may be reconnected by the selector 810 to another incoming line circuit. The restoration of the guard slave relay R1150 disconnects the address sensing relay group 1201 and the precedence sensing relay group 1901 from the sensing relays 401 in the incoming line circuit 400. At its contacts 1152, the relay R1150 also removes ground potential from the conductor C1156 thereby to restore the release relay R1480 in the address detector 1100. The relay R1480 removes holding ground potentials from various conductors in order to restore all of the operated relays in the routing register 1500 (Figs. 15 and 16) and in order to restore various operated relays in the address detector 1100. Also, at its contacts 1152, the relay R1150 removes ground potential from the conductor C1155 extending to Fig. 24 in order to restore the release relay R2500 in the precedence detector 2300. The operated relays in any one of the six precedence detectors provided in the precedence detector 2300 (Figs. 23 to 25, inclusive) are also restored incident to the resoration of the release relay R2500. As a further result of the restoration of relay R2500, at its contacts 2504, it removes ground potential from the conductor C1735 extending to Fig. 17 in order to restore the start relay R1730, the test relay R1740, the series relay R1840 and any operated relay in the channel register relay R1800. However, due to the fact that the channel group relay R1830 is now locked in its operated position over a circuit including the off-normal contacts RON1853, the last mentioned relay is retained in its operated position until the wiper 1851 of the channel selecting switch S1801 is again restored to normal. Also, at its contacts 2507 and 2508, the relay R2500 removes ground potential from the conductor C2101–1 and C2101–2 extending to Fig. 21 in order now to restore the relays R2150 and R2110. Finally, at its contacts 2506, the relay R2500 now connects the conductor C2201–PLC to the conductor C2201–8 thereby to complete a self-interrupting circuit for the magnet M2214 of the precedence indicator switch 2210.

The circuit for controlling the magnet M2214 includes ground at the contacts 2215, conductor C2201–PLC, contacts 2506, conductor C2201–8 multiply connected to contacts 1 to 10, inclusive, accessible to the wiper 2211 and the winding of the magnet M2214, to battery. The magnet M2214 now operates and interrupts, at its contacts, 2215, its initial energizing circuit, whereupon the magnet now restores to normal and advances its wipers 2211 to 2213, inclusive, one step in a counterclockwise direction. As soon as the magnet M2214 restores to normal it recompletes its energizing circuit at its contacts 2215, whereupon the magnet reoperates and restores in the manner previously described. The above described self-interrupting circuit for the magnet M2214 advances the wipers step-by-step until the wiper 2211 engages the ungrounded contact 11 thereby terminating the self-interrupting circuit. Consequently, the wipers of the precedence indicator switch 2210 are now restored to normal.

Referring now to the channel register (Figs. 17 and 18) it will be recalled that the relays R1730, R1740, R1840 and R1875 restored to normal incident to the removal of ground potential from the conductor C1735 by the restoration of the release relay R2500. The restoration of the relay R1875, at its contacts 1877, interrupts a circuit for the translator disconnect relay R1750 and the latter relay upon restoring removes ground potential from the conductor C1701–CSL in order to restore the start relay R2610 in the cross-office selector switch relay control group 2600. At its contacts 2618, the relay R2610 now interconnects the conductors C2601–ON1 and C2601–ON2 in order to complete the previously described self-interrupting circuit for the magnet M2875 of the channel testing switch S2870 thereby to restore the wipers 2871 to 2874, inclusive, to the home contact positions. Also, at its contacts 2614, the relay R2610 now interconnects the conductors C1701–CS and C1701–CS1 in order to complete the self-interrupting circuit for the magnet M1852 of the channel selecting switch S1801. This circuit may be traced from battery by way of the winding of the magnet M1852, contacts 1832, conductor C1701–CS1, contacts, 2614, conductor C1701–CS, rotary off-normal contacts RON1854, contacts 1831 and 1855 to ground. The magnet M1852 operates over this circuit and, at its contacts 1855, interrupts its own operating circuit and immediately restores to normal. Upon restoring the magnet M1852 advances its wiper 1851 one step in a counterclockwise direction. Also upon restoring, the magnet M1852 recompletes its operating circuit, at its contacts 1855, whereupon the magnet operates and restores in the manner previously described to advance its wiper 1851 step-by-step back to its home contact position. As soon as the wiper 1851 reaches its home contact position, the rotary off-normal contacts RON1854 are opened thereby to terminate the above described self-interrupting circuit for the magnet M1852. As a further result of the return of the wiper 1851 to the home contact position, the rotary off-normal contacts RON1853 are opened thereby to interrupt the locking circuit for the lower winding of the channel group relay R1830, which relay now restores to normal.

As a further result of the restoration of the start relay R2610, at its contacts 2611, it now completes a self-interrupting circuit for the magnet M2713 of the channel register finder 2710. This circuit may be traced from ground by way of the contacts 2714, wiper 2711 in engagement with any one of the multiply connected contacts, contacts 2611 and the winding of the magnet M2713, to battery. The magnet M2713 operates and restores in the manner previously described thereby to advance its wipers 2711 and 2712 step-by-step in a counterclockwise direction until the wiper 2711 reaches the home contact position. In the home contact position the wiper 2711 terminates the self-interrupting circuit for the magnet M2713 so that the channel register finder 2710 is now returned to its normal position. In the home contact position the wiper 2712 recompletes the operating circuit for the transfer relay R2725.

Finally, the relay R2610 removes the locking ground potential for the relay R2760, at its contacts 2613, whereupon the relay R2760 restores to normal and interrupts, at its contacts 2762, the circuit for the differential relay R2775. At its contacts 2764, the relay R2760 recompletes the operating circuit for the relay R2770 thereby to recondition the cross-office selector switch relay control group 2600 for further operation.

In view of the foregoing it will be appreciated that the operation of the end relay R2250 initiates the release of various operated relays and switches in the director 200A and, as previously noted, it completes the operating circuit for the open line relay R605 in order to initiate the final operating controls of the incoming line circuit 400. The end relay R2250, however, is restored to normal incident to the restoration of the test relay R1815 in the channel selecting switch S1801 and the latter relay is restored to normal incident to the previously mentioned restoration of the relay R1875 of the channel register relays 1800.

*Further operation of the director*

In the previous description of the operation of the channel register 1700, the cross-office selector switch relay control group 2600 and the channel testing circuit 2800 of the director 200A, it was first assumed that the cross-office unit 3400 had been previously connected to the desired L1 outgoing line and that the "deferred" precedence, corresponding to the message which is to be transmitted to the next relay switching center over the L1 outgoing line was registered therein. Under this condition the message received over the incoming line circuit 400 will be retransmitted to the cross-office unit 3400 where it will be temporarily stored on a perforated tape with one or more other "deferred" precedence messages which are also to be transmitted over the L1 outgoing line. As an alternative of the foregoing arrangement, the previous description of operation also pointed out the fact that if the cross-office units, such as 3400, associated with the L1 outgoing line, are marked busy and cannot immediately receive and store the message received over the incoming line circuit 400, the director 200A functioned to select an idle cross-office unit 3400, that is a cross-office unit having an empty bin with no messages stored on its associated tape. Under the latter condition the apparatus included in the director 200A first registered the "deferred" precedence of the received message in the precedence marking switch 4210 of the cross-office unit 3400 and it thereafter controlled the associated outgoing selector 4300 to connect with the L1 outgoing line.

The foregoing description assumed that the precedence of the message received over the incoming line circuit 400 was a "deferred" precedence which is of the lowest precedence that is provided in the system. However, the "routine" and "priority" precedence indicators are also considered as low precedence, whereas, the "operational immediate," "emergency" and "flash" are considered to be high precedence messages. Consequently, if either a "routine" or a "priority" precedence is registered in the precedence detector 2300, the relays R1885 or R1880 in the channel register 1700 will be operated (instead of the "deferred" relay R1890) when the inquiring ground test is to be made to determine whether or not a cross-office unit is connected to the L1 outgoing line. In either event, the relay R1880, at its contacts 1881, will ground the conductor C4301–PP1 extending to Fig. 43 or the relay R1885 will ground the conductor C4301–RR1 extending to Fig. 43 in substantially the same manner as the relay R1890 grounds the conductor C4301–NM1 extending to Fig. 43. In Fig. 43 it will be seen that the three conductors, noted above respectively, terminate in the contacts 1 accessible respectively to the wipers 4329′, 4329 and 4328. If the outgoing selector 4300 has been previously connected to the L1 outgoing line, in the manner described hereinbefore, the three conductors noted above are respectively connected to the conductors C4201—PPC, C4201–RRC and C4201–NMC extending to Fig. 42 where they terminate in the first three contacts accessible to the wiper 4215 of the precedence marking switch 4210. If the precedence marking switch 4210 is in engagement with the contact 1, the "deferred" precedence will be registered therein. If the wipers of the precedence marking switch 4210 are in engagement with the contacts 2, the "routine" precedence will be registered therein and if the switch is in position three, the "priority" precedence is registered therein.

In view of the foregoing it should be appreciated that the previous detailed description of operation for determining the precedence registered in the cross-office unit 3400 connected to the L1 outgoing line is substantially identical for the "deferred," "routine" and "priority" precedence indicators.

When it is necessary to select an idle cross-office unit 3400 having an empty bin, from the pool of available cross-office units in the manner previously described, any one of the six above noted precedence indicators may be registered in the selected cross-office unit by the interaction between the stepping magnet M2214 of the precedence indicator switch 2210 in the director 200A and the magnet M2217 of the precedence marking switch 4210 in the selected cross-office unit 3400.

All messages received over the incoming line circuit 400, having a "deferred," "routine" or "priority" indicator, will control the director 200A so that a test will first be made to determine whether or not a cross-office unit 3400 is connected to the outgoing line over which the received message is to be transmitted, and to test a cross-office unit connected to the desired outgoing line to determine whether or not the precedence marking switch 4210 in the cross-office unit is set to the same low precedence marking as the "deferred," "routine" or "priority" precedence of the received message. This test, as previously noted, is made in conjunction with the channel testing switch S2870, and if the cross-office units which are tested in the manner noted above have not registered the precedence of the received message, then the director functions in the manner described hereinbefore to select an idle cross-office unit having an empty bin from the pool of such units and to set the same to the desired outgoing line and to the precedence of the received message. However, in case of a high precedence message of either "operational immediate," "emergency" or "flash" no test is made to determine whether or not a cross-office unit is connected to the desired outgoing line. In other words, the registration in the precedence detector 2300 of either an "operational immediate," "emergency," or "flash" precedence message immediately signals the director 200A that a cross-office unit having an empty bin must be selected from the pool for the purpose of handling the high precedence message. Although the operation of the director 200A in selecting a cross-office unit from the pool is substantially the same as previously described when a low precedence message requires the selection of a cross-office unit from the pool, certain operating features are different in order to prevent the testing operations normally made under the control of the channel testing switch S2870 and the cross-office selector switch relay control group 2600.

In order more clearly to understand the operations involved in the selection of an idle cross-office unit, such as the unit 3400, from the pool of available units, it will be assumed that the director 200A has been seized in the manner previously described to cause the operation of the relay R2620 in the cross-office selector switch relay control group 2600; that a high precedence message of either the "operational immediate," "emergency" or "flash"

precedence has been registered in the precedence detector 2300; that the L1 relay R1875 of the channel register relays R1800 has been operated under control of the routing translator 2900 to indicate that the message is to be transmitted over the L1 outgoing line; that the relays R1750 and R2610 are operated; and that the precedence test relays R2120 and R2130 have been operated to apply ground potential to the conductor C2101–COM1 extending to Fig. 27.

Referring now to Fig. 27, it will be seen that the ground potential applied to the conductor C2102–COM1 completes a first circuit including the contacts 2767 and 2783' for operating the available channel relay R2660 in the normal manner. Also the ground potential applied to the conductor C2102–COM1 is extended by way of the contacts 2769, conductor C2302–COM extending to Fig. 23 where it will be connected to the conductor C2302–OUF extending to Fig. 27 over any one of three separate multiple circuits. The first multiple circuit includes the conductor C2302–COM, the contacts 2551 of the relay R2550, if the operational immediate detector 2300–OP has been operated to register an "operational immediate" precedence, and the conductor C2302–OUF. A second multiple circuit includes the conductor C2302–COM, contacts 2352, if the relay R2350 has been operated to register an "emergency" precedence indicator, and the conductor C2302–OUF. A third multiple circuit includes the conductor C2302–COM, the contacts 2342, if the relay R2340 has been operated to register a "flash" precedence indicator, and the conductor C2302–OUF. In any event the ground potential applied to the conductor C2302–COM is further extended on a high precedence message to the conductor C2302–OUF extending to Fig. 27. It may be well to digress for a moment to point out the fact that when a low precedence message is registered in the precedence detector 2300 the grounded conductor C2302–COM will be connected by way of contacts 2596 to the conductor C2101–D if the relay R2595 is operated to register a "deferred" precedence; it will be connected by way of the contacts 2399' to the conductor C2101–RD if the relay R2395 is operated to register "routine" precedence; and it will be connected by way of the contacts 2379' to the conductor C2101–PD if the relay R2375 is operated to register a "priority" precedence.

Referring now to Fig. 27 it will be seen that the grounded conductor C2302–OUF is further extended by way of the contacts 2782 to complete an operating circuit for the right-hand winding of the hunt empty bin relay R2760. As previously described the relay R2760 may also be operated over a circuit including the conductor C2102–PRE when a test is made of all of the cross-office units 3400 connected to a desired outgoing line and all of the units are busy and can not receive the incoming message of the low precedence. In the present example, however, the hunt empty bin relay R2760 is directly operated inasmuch as it is not necessary in the case of high precedence messages to make the test to determine whether or not a cross-office unit is connected to the desired outgoing line.

The relay R2760 upon operating locks itself by way of its contacts 2763 to ground at contacts 2613; it interrupts the circuit for the relay R2770, at its contacts 2764; and, at its contacts 2762 and 2761, it completes circuits for the left and right hand windings of the differential relay R2775. The relay R2775 does not operate even though its two windings are simultaneously energized, due to the fact that the windings are wound in opposition to one another. At its contacts 2766 to 2769, inclusive, the relay R2760 now transfers the grounded conductor C2102–COM1 from the conductor C2302–COM to the conductor C3902–HEB extending to Fig. 39 in order to operate the empty bin relay R3990 in the cross-office unit 3400 and the corresponding relay in every cross-office unit which is idle and has an empty bin.

It should be noted at this time that the removal of ground potential from the conductor C2302–COM interrupts the initial operating circuit for the right-hand winding of the relay R2760. It also removes the operating ground from the right-hand winding of the differential relay R2775 whereupon the latter relay now operates and prepares, at its contacts 2776, a point in a circuit for operating the intercept relay R2750.

For the purpose of this description it will be assumed that the relay R3990 in the cross-office unit 3400 (Figs. 34 to 44, inclusive) operates over the previously described circuit and, at its contacts 3991, returns ground potential over the conductor C3802–1 in order to operate the channel testing register relay R2810–1 in the manner previously described. All other channel testing register relays, similar to the relay R2810–1, connected to empty bin cross-office units, similar to the cross-office unit 3400, are also operated in order to mark the corresponding bank contacts in the channel testing switch S2870. Any operated relays R2810–1, etc., will complete the operating circuit for the channel testing relay R2850 whereupon the stepping circuit of the channel testing switch S2870 and the cross-office selector 3300 is completed in the manner previously described. The very first operated channel testing register relay R2810–1 encountered by the wipers of the channel testing switch S2870 terminates the stepping operation of the switch S2870 and the selector 3300 and causes the timing relay R2655 to restore to normal in the manner previously described. At its contacts 2657, the relay R2655 now connects the cross-office testing relay R2650 to the conductor C851 extending to Fig. 10 in order to complete the previously described circuit for operating the seizure relay R3870 of the cross-office unit 3400 selected by the cross-office selector 3300. Since the test relay R2650 operates in series with the seizure relay R3870, it immediately connects, at its contacts 2652, the relay R2645 in series with the relay R3870 in order to complete the seizure of the cross-office unit 3400. The relay R2645, at its contacts 2647, now completes a circuit including contacts 2754' and 2763' and conductor C2202–SOG for operating the precedence transmission relay R2240. The relay R2240, at its contacts 2242, 2243 and 2244, completes circuits whereby the precedence indicator is transmitted to the cross-office unit 3400 substantially simultaneously with the setting of the selector switch 4050.

After the seizure of the cross-office unit 3400, the precedence indicator switch 2210 cooperates with the precedence marking switch 4210 in the selected cross-office unit 3400 to transfer the high precedence indicator ("operational immediate," "emergency" or "flash") marked in the banks of the precedence indicator switch 2210 to the precedence marking switch 4210. Also the channel register finder 2710 in the cross-office selector switch relay control group 2600 cooperates with the selector switch 4050 in the cross-office unit 3400 to select the particular outgoing selector, such as the outgoing selector 4300, having access to the group of outgoing lines including the particular L1 outgoing line over which the present message is to be transmitted. Thereafter the channel selecting switch S1801 cooperates with the outgoing selector 4300 in the cross-office unit 3400 to select the L1 outgoing line designated by the operated conditions of the relay R1875 of the channel register relays 1800. Finally, the end relay R2250 is operated to initiate the release of the director 200A and to operate the open line relay R605 in the incoming line circuit 400 to indicate the release of the director. All of the foregoing operations, whereby the precedence of a received message is transferred from the director to the selected cross-office unit 3400; whereby the director controls the selection of one of the outgoing selectors, similar to the selector 4300, associated with the cross-office unit 3400; whereby the selected outgoing selector 4300 is positioned to engage the contacts terminating the desired L1 outgoing line; and whereby certain of the apparatus included in the director is released, has been described previously.

*Routing a received message to the intercept operator position 3330*

In the previous description of the operation of the director, it was pointed out that in the case of a low precedence message ("deferred," "routine" or "priority"), a test is made to determine whether or not one of the cross-office units 3400 is connected to the desired L1 outgoing line and whether or not that cross-office unit is set to the particular precedence ("deferred," "routine" or "priority") of the received message. If such a cross-office unit is found by the director, the incoming line 400 is connected through its cross-office selector 3300 to the particular cross-office unit 3400 so that the received message may be stored in the cross-office unit for transmission over the L1 outgoing line following other messages stored in the selected cross-office unit 3400 which are also to be transmitted over the selected outgoing line and are of the same precedence.

It was also pointed out in the previous description that if the director did not successfully find a cross-office unit which is both connected to the desired outgoing line and previously set to the same precedence as the received message, then the director functioned to automatically select an idle cross-office unit having an empty storage bin. In the latter event the director first controlled the idle cross-office unit with an empty bin, to register therein the precedence of the received message, to substantially simultaneously control the selection of the one outgoing selector having access to the desired outgoing line and, finally, to control the selected outgoing selector to position the same to the contacts terminating the desired outgoing line.

It was also pointed out in the previous description that in the case of a high precedence message ("operational immediate," "emergency" and "flash") and director, due to the high precedence of the received message, omitted the first test for determining whether or not one of the cross-office units was connected to the desired outgoing line and instead, the director immediately functioned to search for an idle cross-office unit 3400 having an empty bin. When such a cross-office unit is found, the director then transfers the precedence of the received message to the idle cross-office unit, it selects the associated outgoing selector having access to the desired outgoing line and it then positions the outgoing selector 4300 to the contacts terminating the desired outgoing line.

In each of the above tests it was assumed that the director was successful in finding a cross-office unit that could be used in handling the received message. However, in the event that no cross-office unit is available for the handling of the message, it is contemplated that such messages will be routed to an intercepting operator position who will be instructed to take whatever steps are necessary for the routing of the message to the desired destination.

In the present system a cross-office unit, such as the cross-office unit 3400, may be considered to be idle even though it may have one or more messages stored therein. In other words, the cross-office unit 3400 may be considered to be idle (1) if no message is being transmitted into the unit; (2) if the associated storage bin in the unit is less than 90% full; (3) if the unit is not being returned to the pool of available units at the particular moment; and (4) if the unit is not being controlled to automatically feed out blank tape. If any of the foregoing operations or conditions exist the cross-office unit is marked busy and cannot be selected.

In order to describe the operation whereby a message is routed to the intercept operator position 3330, it will be assumed that the message received by the director is of low precedence ("deferred," "routine" and "priority") and that as a result thereof, the channel testing switch S2870 has automatically rotated its wipers step-by-step over all of its contact banks to perform the first test to determine whether or not an idle cross-office unit 3400 is connected to the desired outgoing line and is set to the proper precedence. During the above described test, one or more of the channel testing register relays R2810–1 may be operated in the manner previously described, but the associated cross-office unit may be busy at the particular instant that the test thereof is made by the relay R2650. In any event, at the end of the test, the relay R2635 will be in its restored position and it will connect, at its contacts 2636, the right-hand winding of the hunt empty bin relay R2760 to the conductor C2102–PRE extending to Fig. 21. This conductor is grounded, incident to the restoration of the slow-to-release precedence test relay R2120, and completes the operating circuit for the hunt empty bin relay R2760. As previously noted, this relay interrupts the circuit for the relay R2770 and it completes multiple energizing circuits for the two windings of the differential relay R2775, but the last mentioned relay does not operate. In its operated position, the relay R2760, at its contacts 2762′, interrupts the locking circuit for the precedence test relay R2130, whereupon, this relay restores to normal and removes the ground potential from the conductor C2102–PRE. The removal of ground potential from the conductor C2102–PRE deenergizes the right-hand winding of the differential relay R2775, whereupon, the relay R2775 now operates over the circuit including only its left-hand winding and prepares, at its contacts 2776, a point in the circuit for operating the intercept relay R2750. As a further result of the operation of the relay R2760, it prepares, at its contacts 2766, the previously described circuit, including the conductor C3902–HEB, for operating the empty bin relays, such as R3990, of all of the empty bin cross-office units that are in the pool of available cross-office units. As soon as the slow-to-release relay R2770 restores to normal, it again controls the cyclic operation and restoration of the precedence test relays R2120 and R2130 in the manner previously described so that the above mentioned circuit is completed for the hunt empty bin relays, such as R3990.

As a result of the foregoing, the channel testing switch S2870 again advances its wipers step-by-step if at least one of the cross-office units, such as 3400, in the pool is available for use. If, during this second test of the channel testing switch S2870 no cross-office units are found in the pool to receive the present message, the control relay R2635 will restore to normal and reconnect the conductor C2101–PRE to the right-hand winding of the hunt empty bin relay R2760 and to the right-hand winding of the intercept relay R2750. At the end of the cycle of operation of the precedence test relay R2120, it closes its contacts 2121, whereupon the conductor C2102–PRE is grounded to recomplete the energizing circuit for the right-hand winding of the hunt empty bin relay R2760 and in multiple therewith, the ground potential is extended by way of the contacts 2761, 2776 and the right-hand winding of the intercept relay R2750, to battery. Upon operating the intercept relay R2750 locks itself over a circuit including the contacts 2753, 2625′ and 2613.

In view of the foregoing it will be appreciated that in response to a low precedence message, the channel testing switch S2870 in the director 200A makes a first test to determine whether or not a cross-office unit is connected to the desired outgoing line and whether or not the proper precedence has been preset in a cross-office unit connected to the desired outgoing line. If no cross-office unit having the above conditions, is found, then the channel testing switch S2870 in the director makes a second test to determine whether or not a cross-office unit is available in the pool of empty bin cross-office units. If no cross-office unit is found to be available incident to the second test by the channel testing switch S2870, the intercept relay R2750 is operated as noted above. The subsequent operations performed in response to the operation of the intercept relay R2750 will be described after a brief description of the operation of the intercept relay R2750 in response to the failure of the director 200A to find a cross-office unit 3400 with an empty bin for use by a high precedence message.

As previously noted, a high precedence message ("operational immediate," "emergency" and "flash") registered in the director omits the first testing operation by the channel testing switch S2870, described above, to find a cross-office unit that is connected to the desired outgoing line and that has registered in it the same precedence as the message received over the incoming line circuit 400. In other words, the registration of a high precedence message in the precedence detector 2300 causes the cross-office selector switch relay control group 2600 to apply ground potential to the conductor C2102–PG in order to operate the precedence testing relays R2120 and R2130 and the latter relays apply ground potential to the conductor C2102–COM1 in the normal manner. However, due to the fact that a high precedence message has been registered in the precedence detector 2300 the ground potential applied to the conductor C2102–COM1 is first connected by way of the conductor C2302–COM to the precedence detector 2300 and is returned over the conductor C2302–OUF extending to Fig. 27 in order to operate the hunt empty bin relay R2760 over a circuit including its right-hand winding. Simultaneously, both windings of the differential relay R2775 are energized but that relay remains in its unoperated position. Operation of the hunt empty bin relay R2760 now transfers the grounded conductor C2102–COM1 to the conductor C3902–HEB extending to Fig. 39 in order to operate the empty bin relay R3990 in all of the cross-office units, such as 3400, that are included in the pool and are awaiting seizure. As a further result of the operation of relay R2760, at its contacts 2769, it disconnects the grounded conductor C2102–COM1 from the conductor C2302–COM thereby to interrupt the initial operating circuit including the right-hand winding of the relay R2760 and the energizing circuit for the right-hand winding of the differential relay R2775. The differential relay R2775 now operates due to the energizing circuit including the left-hand winding and prepares, at its contacts 2776, the previously described circuit for operating the intercept relay R2750. The hunt empty bin relay R2760 is locked in its operated position over the circuit including its left-hand winding and, consequently, the previously described operations of the director to search for a cross-office unit 3400 having an empty bin now take place. In other words, the channel testing switch S2870 now searches for contacts in its banks which have been marked by the operated empty bin relays, such as the relay R3990, in the available cross-office units. As the wipers of the channel testing switch S2870 advance step-by-step to test the associated bank contacts the cross-office units corresponding to each of the tested contacts may be busy at the instant the tests are made, and, consequently, when no cross-office unit is found to be available in the pool of empty bin cross-office units, the channel testing switch S2870 will complete its testing cycle and return to its normal home contact position. If at any point during the testing cycle of the channel switch S2870, all of the channel testing register relays such as R2810–1 etc., are in their restored positions, the channel testing relay R2850 will restore to normal and, at its contacts 2853, it will interrupt the circuit for the control relay R2635. Thus, when the relay R2635 restores to normal, it prepares, at its contacts 2636, the previously described circuit whereby the precedence testing relays R2120 and R2130 will, after an elapsed time interval, connect ground potential to the conductor C2102–PRE in order to complete a circuit including the contacts 2761 and 2776 for operating the intercept relay R2750.

In view of the foregoing, it will be understood that when a high precedence message is registered in the director 200A it immediately operates to mark all of the available empty bin cross-office units in the pool and it then controls the channel testing switch S2870 and the cross-office selector switch 3300, individually associated with the incoming line circuit 400, to be advanced in synchronism to test the available cross-office units and determine whether or not one of them may be seized for use to store the high precedence message received over the incoming line circuit 400. It will also be understood that if the channel testing switch S2870 fails to find an available cross-office unit in the pool, a circuit will then be completed for operating the intercept relay R2750. Consequently, the intercept relay R2750 will be operated after two tests have performed by the channel testing switch S2870 in the case of a low precedence message, and the intercept relay R2750 will be operated at the end of a single test of the channel testing switch S2870 in the case of a high precedence message.

The circuit operations controlled incident to the operation of the intercept relay R2750 will now be described. As soon as the intercept relay R2750 operates, it closes its contacts 2753 in order to lock itself to ground at contacts 2613. As a further result of the operation of the relay R2750, at its contacts 2752, it applies ground potential by way of the conductor C2601–G4 extending to Fig. 28, contacts 2846 of the channel testing relay in the channel testing circuit of the second director and the winding of the channel testing relay R2850, to battery. The relay R2850 reoperates in order to prepare the channel testing switch S2870 to perform another testing cycle to search for a trunk extending to the intercepting operator position 3330. As a further result of the operation of relay R2750, at its contacts 2759, it completes a circuit including the contacts 2651 and 2631, conductor C2601–TMM extending to Fig. 28, contacts 2859′ and the winding of the magnet M2875, to battery. Also, at its contacts 2755, the intercept relay R2750 connects the right-hand winding of the test relay R2650 by way of the conductor C2601–B1 extending to Fig. 28, where it is multiply connected to the contacts 45 to 49, inclusive, accessible to the wiper 2871 of the channel testing switch S2870. At its contacts 2758, the relay R2750 disconnects ground potential from the conductor C2102–PG extending to Fig. 21 in order to prevent, at this time, reoperation of the precedence testing relays R2120 and R2130. At its contacts 2759′, the relay R2750 connects ground potential by way of the contacts 2622, conductor C852 extending to Fig. 10, wiper 833 of the line selector 810, conductor C860 extending to Fig. 33 and the winding of the connect relay R3310, to battery. The connect relay R3310 operates over this circuit and connects the incoming line circuit 400 to the wipers of the individually associated cross-office selector 3300. At its contacts 2751′, relay R2750 connects ground potential by way of conductor C1701–CRC extending to Fig. 17 in order to operate relay R1750 in the event it is not in its operated position. Finally, at its contacts 2757, the relay R2750 disconnects the timing relay R2640 from the previously described circuit including the multiply connected control relay R2635.

When the magnet M2875 operates, in the manner described above, it completes, at its contacts 2877, a circuit including the contacts 2858, conductor C2601T–INT extending to Fig. 26, winding of the interrupter relay R2630, contacts 2627, conductor C856 extending to Fig. 10, wiper 827 of the line selector 810, conductor C862 extending to Fig. 33, contacts 3319 and the winding of the magnet M3326 of the cross-office selector switch 3300, to battery. The interrupter relay R2630 and the magnet M3326 operate over the above described circuit and the relay R2630 interrupts, at its contacts 2631, the circuit including the conductor C2601–TMM for the magnet M2875. The magnet M2875 now restores to normal and advances its wipers one step in a counterclockwise direction into engagement with the contacts 1. The restoration of the magnet M2875 interrupts, at its contacts 2877, the previously described series circuit for the interrupter relay R2630, which restores to normal, and the magnet M3326, which also restores to normal to advance its wipers one step into engagement with the contacts 1. The self-interrupting stepping circuit for controlling the magnet M2875 and the magnet M3326 is repeated until the channel testing switch S2870 has advanced its wipers step-by-step to the 45th contact position. When this contact position is reached by the channel testing switch S2870, the wipers of the cross-office selector switch 3300 will also be in engagement with the 45th contact position. At this point it should be noted that the contacts 45 to 50, inclusive, accessible to the wiper of the cross-office selector 3300 are connected to six different intercepting trunks extending to the intercepting operator position 3300. Also the contact positions 45 to 50, inclusive, accessible to the wiper 2871 of the channel testing switch S2870 correspond respectively to the six intercepting trunks terminating in the cross-office selector 3300.

As soon as the magnet M3326 of the cross-office selector switch 3300 advances its wipers from its normal home contact positions, the off-normal contacts ON3329 and ON3328 are closed and remain closed until the wipers are again restored to the home contact positions. Thus, at the off-normal contact ON3329 a locking circuit is completed for the connect relay R3310 which includes the contacts 3316 and 3317 and, at the off-normal contacts ON3328, a point in the circuit is prepared for subsequently controlling the magnet M3326 to return the wipers to their normal positions.

In the channel testing switch S2870 the off-normal contacts ON2879′ are closed as soon as the wipers of the switch are advanced from their home contact positions in order to complete the operating circuit for the transfer relay R2860. The relay R2860 operates over this circuit and, at its contacts 2862, locks itself to the grounded conductor C2601–SU1 extending to Fig. 27 under control of the intercept relay R2750. Also, at its contacts 2861, the relay R2860 prepares a point in the circuit including the conductor C2601–INT2 extending to Fig. 27, contacts 2754 of the operated intercept relay R2750, contacts 2741 and the winding of the counting relay R2730, to battery. The last mentioned circuit, however, will not be completed until the wipers of the channel testing switch S2870 are again returned to their normal home contact positions.

When the wipers of the channel testing switch S2870 and the wipers of the cross-office selector switch 3300 engage the 45th contact positions, a test is made to determine whether the intercepting trunk terminating in the 45th contact position of the cross-office selector switch 3300 is busy. This circuit may be traced from ground at the right-hand winding of the cross-office test relay R2650, contacts 2755, conductor C2601–B1 extending to Fig. 28, wiper 2871 in engagement with the contact 45, contacts 2851, conductor C2601–BTL1 extending to Fig. 26, contacts 2628, conductor C851 extending to Fig. 10, wiper 829 of the line selector 810, conductor C864 extending to Fig. 33, contacts 3313, wiper 3323 of the cross-office selector switch 3300 in engagement with contact 45 and the BTL conductor of the trunk extending to the intercept operator position 3330. Each of the trunks in the intercept operator position 3330 are connected and arranged in a manner similar to the cross-office unit 3400 (Figs. 34 to 44, inclusive). Consequently, if the intercepting unit associated with the first intercept trunk is idle, a battery connected seizure relay, similar to the seizure relay R3870 will be connected to the BTL conductor selected by the wiper 3323. However, if the associated intercept unit is busy this conductor will be grounded.

If it is assumed that the intercept unit connected to the contacts 45 engaged by the wipers of the cross-office selector 3300 is busy, the ground potential on the BTL conductor will prevent the operation of the cross-office test relay R2650. Consequently, the channel testing switch S2870 and the cross-office selector 3300 will again be controlled to advance their wipers an additional step to test the idle or busy condition of the next intercepting unit at the intercepting operator position 3330.

However, if the intercept unit is idle when the cross-office test unit R2650 is connected thereto, the relay R2650 will operate and, at its contacts 2652, it will immediately connect the winding of the relay R2645 in series with the seizure relay in the selected intercept unit thereby to seize the intercept unit at the operator position 3330 and to operate the relay R2645. As soon as the cross-office test relay R2650 operates in series with the seizure relay of the selected intercept unit it interrupts, at its contacts 2651, the previously described circuit for controlling the magnet M2875 of the channel testing switch S2870. Consequently, the stepping action of the channel testing switch S2870 and the cross-office selector 3300 is terminated with the wipers in engagement with the contacts 45.

When the relay R2645 operates in series with the cross-office test relay R2650, at its contacts 2648, it now completes a circuit including the contacts 2753′ of the operated intercept relay R2750 and the conductor C2202–END in order to operate the end relay R2250 to initiate the release of the director 200A in the previously described manner. The ground potential applied to the conductor C2202–END is also extended by way of the contacts 2626 and the conductor C857 extending to Fig. 10 in order to operate the open line relay R605 in the incoming line circuit 400 in the previously described manner. At this time the director is restored to normal in the manner previously described.

*All intercepting trunks busy*

In the above description of the operation of the channel testing switch S2870 and the cross-office selector 3300 to search for an idle intercepting trunk at the intercept operator position 3330, it was assumed that the first intercepting trunk terminating in the contacts 45 of the cross-office selector 3300 is idle. However, if the first trunk is busy, the channel testing switch S2870 and the cross-office selector 3300 will be advanced another step to test the idle or busy condition of the next intercepting trunk. If all of the six trunks extending to the intercept operator position 3330 are found busy, the wipers of the channel testing switch S2870 and the wipers of the cross-office selector 3300 will be returned to their normal home contact positions. When this occurs, the off-normal contacts ON2879 of the channel testing switch S2870 will be closed to complete a circuit including the contacts 2861, the conductor C2601–INT2 extending to Fig. 27, contacts 2754 of the operated intercept relay R2750, contacts 2741 and the winding of the counting relay R2730, to battery. Also, when the wipers of the cross-office selector 3300 return to their normal home contact positions, the off-normal contact ON3329 are opened in order to interrupt a point in the locking circuit for the connect relay R3310. But, the connect relay R3310 remains in its operated position over its initial operating circuit including the conductor C860.

Inasmuch as the channel testing switch S2870 is still connected to the cross-office selector switch relay control group 2600 by the operated channel testing relay R2850, the magnet M2875, the interrupter relay R2630 and the magnet M3326 continue to cyclicly operate to advance their wipers step-by-step from the home contact positions to make a second test of the idle or busy condition of the intercepting trunks terminating at the intercepting operator position 3330. However, as soon as the wipers of the channel testing switch S2870 move from the home contact positions at the start of the second testing cycle, the off-normal contacts ON2879 are opened thereby to interrupt the above described circuit for operating the counting relay R2730. As a result thereof, the relay R2730 now locks itself in series with the counting relay R2740 over a circuit which includes the contacts 2731, winding of relay R2740, contacts 2625' and ground at contacts 2613. The counting relay R2740 operates in series with the relay R2730 and, at its contacts 2742, it prepares a point in the circuit for operating the alarm relay R2745.

If during the second testing cycle of the channel testing switch S2870 and the cross-office selector 3300 no idle intercepting trunk unit is encountered, the wipers of the channel testing switch S2870 and the cross-office selector 3300 will again be returned to their home contact positions. The off-normal contacts of the testing switch S2870 and the selector 3300 are again opened as noted above, whereupon the off-normal contacts ON2879 now complete a circuit for operating the alarm relay R2745. Upon operating, the relay R2745 immediately locks itself in an operated position over a circuit, which includes the contacts 2747, 2753, 2625' and 2613. Also, at its contacts 2746, the relay R2745 applies ground potential to the alarm conductor C2747 in order to transmit an alarm signal to the attendant to indicate that all of the intercepting trunks are busy at the present time. The channel testing switch S2870 and the cross-office selector 3300 will repeat the testing cycle until an idle intercepting trunk is encountered to route particular messages to the intercept operator position. The alarm signal which is transmitted by the alarm relay R2745 may be utilized to determine whether or not additional intercepting units are required to handle traffic that is routed to the intercept operator position.

When an available intercepting trunk has been seized in the manner previously described, the director will be disconnected from the incoming line circuit 400 in response to the operation of the end relay R2250 and the incoming line circuit 400 will be connected through its associated cross-office selector 3300 to the intercept operator position 3330. Thereafter, the transmitter provided in the incoming line circuit 400 will operate in the manner to be described hereinafter to transmit the entire received message to the intercept unit provided at the intercept operator position 3330. At the intercept operator position a tape reperforator will perforate and simultaneously print the message received over the incoming line 400 upon a tape which the intercepting operator may utilize in forwarding the intercepted message to its proper destination.

*Failure to release the director within a predetermined elapsed time interval after its seizure*

From the previous description of the operation of the director 200A, it will be understood that the guard slave relay R1150 and the test and guard relay R1130 are operated when the director is connected to the incoming line circuit 400 by means of the line selector 810. It will be recalled that when the end relay R2250 operated to indicate that the director had completed its operating cycle, ground potential was removed from the conductor C1101–F extending to Fig. 11 in order to restore both the test and guard relay R1130 and the guard slave relay R1150 to normal and disconnect the director 200A from the incoming line circuit 400. Thus, the relays R1130 and R1150 are retained in their operated positions during the short interval of time that the director is associated with the incoming line circuit 400. The guard relay R1150, at its contacts 1153, provides a locking circuit for the delay alarm relays 1202 and, at its contacts 1154, it connects the conductor C1136 to the counting relays included in the delay alarm relays 1202. If the director does not clear itself out within a predetermined elapsed time interval, the message that has been received over the incoming line 400 will automatically be routed to the intercept operator position.

In order to describe the intercept condition controlled by the failure of the director to release, it will be assumed that the director has operated sufficiently to translate a received routing indicator to determine the outgoing line over which the message is to be transmitted and has caused the operation of the start relay R2610 in the cross-office selector switch relay control group 2600 in a normal manner. However, due to some fault encountered in the director or in some of the apparatus involved in attempting to find an appropriate cross-office unit, the director has failed to operate the end relay R2250 within a predetermined elapsed time interval.

Incident to the seizure of the address detector 1100 portion of the director, the relay R1150 is operated, as previously noted, and connects, at its contacts 1154, the conductor C1136 to the winding of the alarm relay R1215. Within 30 seconds, a timer (not shown) applies a momentary ground potential to the conductor C1136 thereby to complete an operating circuit for the relay R1215. As soon as the ground potential is removed from the conductor C1136, the relay R1215 locks itself in series with the relay R1220 over a circuit including the contacts 1216 and 1153. After the elapse of another 30 seconds, a second ground potential is applied to the conductor C1136 and now completes a circuit including the contacts 1154, 1222 and 1211 for operating the relay R1205. At the end of the second pulse received over the conductor C1136, the relay R1205 locks itself in series with the relay R1210 over a circuit which includes the contacts 1206 and 1217. The relay R1210 upon operating, at its contacts 1213 and 1214, applies ground potential to the conductors C1203–A and C1203–B in order to transmit alarm signals to the attendant to indicate that the director has not been disconnected from an incoming line circuit within a predetermined elapsed time interval of between 30 seconds and 60 seconds and to indicate that the message received over the incoming line circuit will now be routed to the intercept operator position.

The second ground pulse that is applied to the conductor C1136 in order to operate the relay R1205, is also extended by way of the contacts 1154 and 1222 to the conductor C1284 extending to Fig. 27 in order to complete a circuit for operating the intercept relay R2750 over its left-hand winding. The relay R2750 upon operating locks itself by way of its right-hand winding, contacts 2753 and 2625' to ground at contacts 2613 of the operated start relay R2610.

Incident to the operation of the intercept relay R2750 circuits are now completed by way if its various contacts for controlling the channel testing switch S2870 and the cross-office selector 3300 associated with the incoming line circuit 400 to search for an idle intercepting unit at the intercept operator position 3330 in the same manner as has been described above. However, in this type of interception, the hunt empty bin relay R2760 may be in its restored or operated positions depending upon the stage of the cycle of operation of the director that the delay alarm relays 1202 complete the circuit for operating the intercept relay R2750. However, in either event when the channel testing switch S2870 and the cross-office selector 3300 encouter an idle intercepting unit at the intercept operator position 3300, the cross-office test relay R2650 and the relay R2645 will operate in the manner previously described. At this time a circuit will now be completed from the contacts 2753' of the operated intercept relay R2750 by way of the contacts 2648 of the operated relay R2645 and the conductor C2202–END extending to Fig. 22 in order to operate the end relay R2250 to initiate the release of the director from the incoming line circuit 400. The ground potential applied to the conductor C2202–END is also extended by way of the contacts 2626 over the previously traced circuit including the conductor C857 extending to Fig. 10 in order to operate the open line relay R605 in the incoming line circuit 400.

If the end relay R2250 has been operated to release the director before a third ground pulse is received over the conductor C1136 to control the delay alarm relays 1202, the ground potential will be removed from the conductor C1101–F thereby to restore the test and guard relay R1130 and the guard slave relay R1150. The relay R1150 upon restoring disconnects the conductor C1136 from the delay alarm relays 1202, at its contacts 1154, to prevent the third pulse from being transmitted thereto and, at its contacts 1153, it interrupts the locking circuit for the delay alarm relays 1202 which now restore to normal. Upon restoration of the relay R1210, at its contacts 1213 and 1214, it interrupts the previously noted circuits for controlling the alarm signals (not shown) connected to the conductor C1203–A and C1203–B.

However, if the guard slave relay R1150 is not released before the third ground pulse is received over the conductor C1136, a circuit will be completed by way of the contacts 1154, 1222 and 1212, and the conductor C1203–D for controlling an emergency alarm signal to indicate to the attendant that the message has not as yet been transmitted to the intercept operator position 3330. The emergency signal may be controlled every 30 seconds thereafter until some action is taken by the attendant to restore the director 200A to its normal position.

In view of the foregoing it will be appreciated that the director 200A is automatically controlled to route a message to the intercept operator position 3330 in the event the director fails to dispose of the message within a predetermined elapsed time interval.

*Routing a message to intercept in the event the desired outgoing line is out of service*

In describing the operation of the switching apparatus provided in the switching center UAC, it was assumed that the characters of the routing indicator JWPA are registered in the director and that the routing translator 2900, in conjunction with the patch cords of the patch panel 3200, selects the L1 outgoing line as the line over which the received message is to be retransmitted from the relay switching center UAC. Consequently, one of the patch cords, such as the cord 3231, interconnects the jack J406 on the jack panel 3270 to one of the line jacks on the jack panel 3220 terminating the L1 conductor indicative of the desired L1 outgoing line.

In the event that the outgoing line should be taken out of service for repair or any other reason, steps must be taken to prevent the message which is intended to be transmitted over the L1 outgoing line from being lost.

In the present system it is contemplated that messages which are to be transmitted over outgoing lines taken out of service, should be routed to the intercept operator position 3330. In order to accomplish the interception, the patch cord, such as the cord 3231, interconnecting the jack J406 (indicative of the routing indicator JWP) and the line jack in the line jack panel 3220 terminating the L1 conductor, is removed from the latter jack and plugged into one of the jacks in the line jack panel 3220 terminating the intercept conductor. With the patch cord 3231 connected in this manner, the previously described operation of the director and the routing translator 2900 in response to the registration of the routing indicator JWP will apply ground potential to the jack J406 and then by way of the cord 3231, the intercept conductor, contacts 3282 of the gang switch 3280, conductor C3201–I extending to Fig. 18, contacts 1815 of the operated connect relay R1810 (operated when the channel register 1700 was connected to the routing translator 2900), conductor C1801–INTI extending to Fig. 27 and the right-hand winding of the intercept relay R2750, to battery. In view of the last-mentioned circuit it will be appreciated that the intercept relay R2750 is operated under control of the translator 2900 and that all of the L relays of the channel register relays 1800 will remain in their restored positions.

As soon as the intercept relay R2750 operates, it completes, at its contacts 2751′, a circuit including the conductor C1701–CRC extending to Fig. 17 in order to operate the translator disconnect relay R1750. The relay R1750, upon operating, disconnects the translator 2900 from the director 200A in the manner previously described and, at its contacts 1754, it also applies ground potential by way of the conductor C1701–CSL, extending to Fig. 26, in order to operate the start relay R2610. The latter relay, upon operating, at its contacts 2613, now completes a locking circuit including the contacts 2625′ of the operated seizure relay R2620 (operated when the director 200A was initially seized), contacts 2753 and the right-hand winding of the intercept relay R2750. Consequently, the intercept relay R2750, the translator disconnect relay R1750 and the start relay R2610 are now locked in their operated positions and cannot restore to normal until the seizure relay R2620 is restored to normal upon the release of the director 200A.

Incident to the operation of the intercept relay R2750, the channel testing switch S2870 and the cross-office selector 3300, associated with the incoming line circuit 400, cooperate to search for and select an idle intercepting unit at the operator position 3330 all in the manner previously described. When an idle intercept unit is encountered, the cross-office test relay R2650 and the relay R2645 in the cross-office selector switch relay control group 2600 operate, in the manner previously described, to terminate the stepping action of the channel testing switch S2870 and the cross-office selector 3300. Incident to the operation of the relay R2645, at its contacts 2648, ground potential at the contact 2753′ is now connected to the conductor C2202–END and to the conductor C857 whereby the end relay R2250 is operated to initiate the release of the director 200A and the open line relay R605 in the incoming line circuit 400 is operated to indicate the release of the director.

In view of the foregoing, it will be appreciated that when the L1 line is taken out of service, the patch cords at the patch panel 3200 may be removed from the line jacks terminating the L1 conductor indicative of the L1 outgoing line and inserted into the intercept jacks provided on the jack panel 3220. With this arrangement, all messages which would be normally transmitted over the L1 outgoing line will now be automatically routed to the intercept operator position 3330 by the director 200A.

*Night intercepting facilities*

During the hours, for example, from midnight until 6:00 A. M. certain of the tributary stations may be unattended and consequently, they are not in condition to receive and handle messages transmitted thereto. In order to prevent the delay in the handling of high precedence messages destined for unattended tributary stations, facilities are provided in the relay switching center UAC for routing such calls to the intercept operator position 3330 by merely actuating a night intercept key individually corresponding to the outgoing line extending to the tributary station or relay switching center that is unattended. Referring now to Fig. 32, it will be seen that each of the conductors L1 to L100, inclusive, terminating in the line jack panel 3220 are also connected to contacts, such as contacts 3211, on 100 separate night intercept keys K3291–L1 to K3291–L100, inclusive. These connections are in multiple with the previously noted connections including the conductors L1 to L100, inclusive, terminating in the corresponding relays of the channel register relays 1800.

In order to describe the operation involving the night intercept facilities, it will be assumed that the jack J406 individual to the routing indicator JWP is connected to the jack in the line jack panel 3220 terminating the L1 conductor by means of a patch cord, such as the cord

3231. It will also be assumed that the relay switching center reached over the corresponding L1 outgoing line is unattended at night and that it is necessary to intercept high precedence messages ("operational immediate," "emergency" and "flash") intended for that center during the unattended periods. Night interception of high precedence messages is accomplished by actuating the night intercept key K3291–L1.

If a high precedence message is registered in the operational immediate detector 2300–OP, or the emergency and flash detectors FE the conductor C2101–NS will be grounded at the contacts 2552, 2356 or 2346. The ground potential applied to the conductor C2101–NS is extended by way of the contacts 28 of the connect key K2905 to the routing translator 2900 and then by way of the contacts 3212 of the actuated night intercept key K3291–L1 in order to operate the night intercept relay R3120. This relay is provided with 100 contacts for connecting the 100 conductors L1 to L100 to the "intercept conductor." Consequently, when the routing translator 2900 is operated to translate the routing indicator JWP in the manner previously described, the ground potential applied by way of the jack J406 is further extended by way of the cord 3231, the line jack in the jack panel 3220, terminating the L1 conductor, the contact 3211 of the actuated night intercepter key K3291–L1, the contact 3121 of the night intercepter relay R3120, the "intercept" conductor, contacts 3282 of the gang switch 3280, conductor C3201–I extending to Fig. 18, contacts 1851 of the actuated connect relay R1810, conductor C1801–INT1 extending to Fig. 27 and the right-hand winding of the intercept relay R2750, to battery. Relay R2750 now operates and immediately locks itself by way of the contacts 2753, 2625′ and 2613 to ground. The ground potential applied to the jack J406 is also extended over the previously traced circuit including the L1 conductor, terminals 3281A and 3281B, contacts 3283 of the gang switch 3280, conductor C3201–L1 extending to Fig. 18, contacts 1811 of the operated connect relay R1810 and the winding of the L1 relay R1875 included in the channel register relays 1800.

Due to the fact that the intercept relay R2750 has been operated, the channel testing switch S2870 does not perform its normal test to ascertain whether or not a cross-office unit 3400 having an empty bin is available in the pool. In other words, the operation of the intercept relay R2750 over-rides the condition registered in the director for routing the high precedence message in the normal manner to a cross-office unit 3400 so that the message can be immediately transmitted over the L1 outgoing line to the next switching center. The operaed intercept relay R2750 controls the channel testing switch S2870 so that it cooperates with the cross-office selector 3300 to select an idle intercepting unit at the intercept operator position 3330 in the manner previously described. Thus, a high precedence message which would normally be transmitted over the L1 outgoing line to the next switching center is automatically routed to the intercept operator position when the night intercept key K3291–L1 is actuated.

Low precedence messages ("deferred," "routine" and "priority") will be routed in a normal manner over the L1 outgoing line (assuming that the routing translator 2900 has selected the jack J406) even though the night intercept key K3291–L1 is actuated because a low precedence message does not complete the operating circuit for the night intercept relay R3120. Since the night intercept relay R3120 is not operated on low precedence messages, the intercept relay R2750 remains in its unoperated position and the director 200A functions in its normal manner to route the call over the L1 outgoing line. The complete low precedence message transmitted over the outgoing line will be perforated on the tape in the next relay switching or at the called tributary station so that the attendant upon opening the exchange the next morning may take whatever steps are necessary to handle the messages that have been received at the station during the unattended period.

However, the high precedence messages which are routed to the intercept operator position 3330 are of sufficient importance to indicate to the intercept operator that steps must be taken to make certain that the messages are immediately conveyed to the proper addressee.

*Routing messages having the routing indicator UAC to the intercept operator position 3330*

Normally, the illustrated relay switching center UAC is utilized to receive messages from local tributary stations or tandem switching centers and for rerouting such messages in appropriate directions so that they will reach the ultimate destination. All messages received in the relay switching center UAC that are to be routed to local tributary stations included in the geographical area served by the relay switching center are provided with either four or five character routing indicators having the first three characters UAC. All such messages are routed through the relay switching center UAC to the desired local tributary stations. However, under certain conditions a message received at the relay switching center UAC is intended for that switching center and is not to be rerouted over outgoing trunks to some remote point. In the present system, messages having only the three-character routing indicator UAC, which are received at the relay switching center UAC, are automatically routed to the intercepting operator position 3330.

Referring now to the routing translator 2900 (Figs. 29 to 32, inclusive) it will be recalled that under control of the routing register 1500, the three characters UAC are registered respectively in the first, second and third character decoding relays 2901, 2902 and 2903. As a result of this registration, the first, second and third character translate relays 2981, 2982 and 2983 are also operated in order to apply ground potential to the jack J419 on the three-character jack panel 3270. This jack will be grounded whenever the first three characters UAC of a three-character, four-character or five-character routing indicator are registered in the routing translator 2900. However, since neither a fourth or fifth character is registered in the present example, the four or five-character relays R3060 and R3070 will remain in their normal positions. Consequently, the ground potential extended to the jack J419 is connected by way of the patch cord 3234, the local jack J3271, contacts 3061 and 3073, contacts 3281 of the gang switch 3280, conductor C3201–P extending to Fig. 18, contacts 1840 of the operated connect relay R1810, conductor C1701–Z1 extending to Fig. 21, contacts 2114, conductor C2102–INT extending to Fig. 27 and the right-hand winding of the intercept relay R2750, to battery. The intercept relay immediately locks itself in its operated position over a circuit including the contacts 2753, 2625′ and 2613. Since the start relay R2610 is operated at this time, under control of contacts 2751′ of the intercept relay R2750 and contacts 1754 of the operated translator disconnect relay R1750, it will remain in its locked position until the director restores to normal.

In view of the foregoing, it will be understood that when a three-character routing indicator UAC is received at the switching center UAC, the director 200A in conjunction with the routing translator 2900 controls the operation of the intercept relay R2750. Consequently, no translation is made by the routing translator 2900 to identify a particular outgoing line and the channel testing switch S2870 does not make the first test of the cross-office units to determine whether any cross-office unit is connected to a particular outgoing line and is also set to the same precedence as the precedence of the received message. Also, the channel testing switch S2870 does not make the second test to determine whether or not an idle cross-office unit is available in the pool of empty bin cross-office units.

The immediate operation of the intercept relay R2750 by the routing translator 2900, however, controls the channel testing switch S2870 in the manner previously described to position the cross-office selector 3300 associated with the incoming line circuit 400 to an idle trunk extending to the intercept operator position 3330. Thereafter, the end relay R2250 of the director is operated in the manner previously described to initiate the release of the director and the open line relay R605 in the incoming line circuit 400 is operated to indicate the release of the director. The received message which is now stored on the tape 333 included in the line circuit 400 is now fed through the incoming line retransmitter 360 so that code signals will be transmitted to the intercept operator position 3330 to perforate and print the entire message thereat for special handling.

*Routing a multiple call message to the multiple call position 3340*

A multiple call message received at the relay switching center UAC from the relay switching center UEP is processed in the normal manner by the incoming line circuit 400. A multiple call message is one that is normally routed to a particular relay switching center and includes, as part of the precedence indicator and routing indicator, a multiple call indicator (ZVA). Following the multiple call indicator ZVA, the message contains a plurality of additional routing indicators identifying a plurality of relay switching centers or tributary stations to which the received multiple call message must also be transmitted. In the present system the multiple call message is routed to a multiple call position at the relay switching center that is responsible for the retransmission of the message to each of the plurality of destinations noted on the single received message. Consequently, when the operator at the multiple call position receives such a message she must then arrange to have it separately transmitted to each of the destinations specified on the multiple call message.

A multiple call message received at the relay switching center UAC from the relay switching center UEP may, for example, include the following information:

| | |
|---|---|
| 1. XZXZXZX | The start-of-message indicator. |
| 2. ABC | A two or three letter code identifying the particular incoming line. |
| 3. Figs. Shift 014 Lets Shift | A channel number indicator identifying the number of the message received over the particular incoming line. |
| 4. NMNM | A deferred precedence indicator. |
| 5. UAC | A routing indicator. |
| 6. ZVA | A multiple call message indicator. |
| 7. UACZZ UACAB UACA UWPV | The routing indicators identifying the tributary stations to which the received multiple call message must be retransmitted by the multiple call operator at the relay switching center UAC. |
| 8. | The body of the message. |
| 9. 26 | The day of the month. |
| 10. 0145 | The clock time that the message was transmitted from the relay switching center UEP. |
| 11. Figs SH ,,,,,, | The end-of-message indicator. |

The three character routing indicator UAC, normally control the director 200A to route the received message to the intercepting operator position 3330 but since this routing indicator is followed by the multiple call indicator (ZVA) the director 200A is automatically controlled so that the message will be routed instead to the multiple call operator position 3340. The operator at this position may then see to it that the received message is retransmitted to the plurality of destinations indicated on the received message. In other words, the relay switching center UAC is responsible for the retransmission of the single received multiple call message to each of the plurality of destinations indicated on the message.

The operation of the switching apparatus in the relay switching center UAC in response to the above noted multiple call message is substantially the same as has been previously described under the heading: "Routing messages having the routing indicator UAC to the intercept operator position 3330" except that the registration of the multiple call indicator (ZVA) in the multiple address detector 2300MA of the precedence detector 2300 portion of the director 200A alters the control of the director so that it will instead route the message to the multiple call operator position 3340.

In order to describe the operations resulting from the multiple call message noted above, it will be assumed that the incoming line circuit 400 (Figs. 3 to 8, inclusive) has detected the start-of-message indicator (XZXZXZX); that the number comparator 900 has successfully compared the channel number indicator (014) with the number preregistered in the comparator 900; that the director assigner 800 and the line selector 810 have associated the director 200A (Figs. 11 to 28, inclusive) with the incoming line circuit 400; that the precedence sensing circuit 1900 (Figs. 19 to 22, inclusive) and the precedence detector 2300 (Figs. 23 to 25, inclusive) have been controlled to register the "deferred" precedence indicator (NMNM) in the deferred detector 2300NM; that the address detector 1100 (Figs. 11 to 14, inclusive) and the routing register 1500 (Figs. 16 and 17) have been controlled to register the routing indicator UAC; and that the multiple call detector 2300MA in the precedence detector 2300 has also been operated to register the multiple call indicator (ZVA). The description of the operation of the above noted switching apparatus has been previously described.

In transmitting the above message, certain "carriage return" and "line feed" functions are interposed between different items of information so that the perforated tape, when fed through a typing mechanism will cause the mechanism to operate at proper intervals to restore the carriage to normal and to actuate the line feed mechanism to start new lines of typing. In a normal message, the precedence indicator and the routing indicator are arranged so that they will be typed on one line with two "carriage return" functions and one "line feed" function following the routing indicator. However, in the case of a multiple call message, the precedence indicator, routing indicator and the multiple call message indicator are typed on one line and, consequently, the two "carriage return" and the "line feed" functions follow the multiple call message indicator.

Referring now to the precedence detector 2300 (Figs. 23 to 25, inclusive) it will be noted that when a "deferred" precedence indicator is registered in the deferred detector 2300NM, the relay R2595 will be operated and, at its contacts 2597, it applies ground potential to the conductor C2101–DC extending to Fig. 21 in order to operate and lock the disconnect relay R2110 (Fig. 21). This same circuit will be completed if an "operational immediate" precedence is registered in the detector 2300–OP; if a "routine" precedence indicator is registered in the detector 2300RR; if a "priority" precedence indicator is registered in the detector 2300PP; and if either a "flash" or an "emergency" precedence indicator is registered in the detector 2300FE. Consequently, the relay R2110 will be operated and locked if any one of the above noted precedence indicators are registered in the precedence detector 2300. Thereafter, the routing indicator UAC will be registered in the route register 1500 and the multiple call indicator (ZVA) will be registered in the multiple address detector 2300MA.

Following the above noted operations, the precedence sensing relay group 1901 will then be controlled by the tape reader 340 associated with the incoming line circuit 400 by the first of two "carriage return" functions. As a result thereof, a circuit will be completed which may be traced from ground at contacts 2062, 1911, 1915, 1920, 1927, 1935 and 2113, conductor C2101–LF extending to Fig. 24, contacts 2442 of the now operated relay R2440, conductor C2101–ZVA1 extending to Fig. 21 and the winding of the multiple call relay R2140. At this point it should be noted that in a normal message, the relay R2440 of the multiple address detector 2300MA will be in its restored position and the ground potential will be applied to the conductor C2101–RM extending to Fig. 21 in order to operate the no multiple call relay R2150. In the present example, however, the multiple call relay R2140 operates and, at its contacts 2144, it locks itself by way of the conductor C2101–1 to ground at contacts 2507 of the operated release relay R2500. As a further result of the operation of relay R2140, it prepares, at its contacts 2143, a circuit including the conductors C1101–G and C1701–Z2 for operating the start relay R1730. Finally, at its contacts 2141, the relay R2140 disconnects the conductor C2102–INT from the conductor C1701–Z1 and, at its contacts 2142, it connects the conductor C2102–ZVA thereto.

The "carriage return" function sensed by the tape reader 340 that controlled the precedence sensing relay group 1901 to operate the multiple call reply R2140, also controls the address sensing relay group 1201 (Fig. 12) to complete a circuit for operating the address received relay R1340. This circuit may be traced from battery by way of the winding of the relay R1340, contacts 1271′, 1262′, 1253′, 1249′, 1237′, conductor C1284–AR, contacts 1346, conductor C1301–G extending to Fig. 15, contacts 1650′ of the operated relay R1650 (operated because a three character routing indicator is registered in the routing register 1500), and contacts 1665′ and 1676′, to ground. The relay R1340 operates over this circuit and, at its contacts 1347, it locks itself to ground at contacts 1481 of the operated release relay R1480. As soon as the relay R1340 operates, it also applies the ground potential on the conductor C840 (grounded at the contacts 597 of the restored end-of-message relay R590 in the incoming line circuit 400) by way of the contacts 1341, conductor C1101–G extending to Fig. 21, contacts 2143, conductor C1701–Z2 extending to Fig. 17 and the winding of the start relay R1730, to battery.

Operation of the start relay R1730 in the channel register 1700 controls the director hunting switch S3140 in order to associate the routing translator 2900 with the routing register 1500 so that the routing indicator UAC is transferred to the routing translator 2900 in the manner previously described. As a result of the transfer of the routing indicator UAC to the routing translator 2900 the previously described circuit is completed for grounding the jack J419 on the three character jack panel 3270 and this ground potential is then extended by way of the patch cord 3234, the local jack J3271, contacts 3061 and 3073 of the restored four and five character relays R3060 and R3070, contacts 3281 of the gang switch 3280, conductor C3201–P extending to Fig. 18, contacts 1814 of the operated connect relay R1810, conductor C1701–Z1 extending to Fig. 21, contacts 2142 of the now operated multiple call relay R2140, conductor C2102–ZVA extending to Fig. 27 and the winding of the multiple call control relay R2780 in the cross-office selector switch relay control group 2600, to battery.

The relay R2780 operates over this circuit and, at its contacts 2781, it completes a circuit including the conductor C1701–CRC extending to Fig. 17 in order to operate the translator disconnect relay R1750. The relay R1750 upon operating, performs the previously described controls, whereby the translator 2900 is disconnected from the director 200A and, in addition thereto, at its contacts 1754, it now completes a circuit including the conductor C1701–CSL extending to Fig. 26, in order to operate the start relay R2610. The start relay R2610 operates over this circuit and, at its contacts 2613, it now completes a locking circuit including the contacts 2625′ of the operated seizure relay R2620 (operated when the director 200A was initially seized) and contacts 2789, for locking the multiple call relay R2780 in its operated position.

Incident to the operation of the start relay R2610 a circuit is also completed, at its contacts 2612, which includes ground at contacts 2762′, contacts 2758, conductor C2102–PG extending to Fig. 21 and the winding of the precedence test relay R2120, to battery. The cyclic operation of relays R2120 and R2130 have been previously described and it should be understood that the conductor C2102–COM1 extending to Fig. 27 is momentarily grounded. Referring to Fig. 27, it will be seen that the ground pulse appearing on the conductor C2102–COM1 is extended by way of the contacts 2767 and 2782′, conductor C2601–Z extending to Fig. 28 and the winding of the channel marking connect relay R2840, to battery. The relay R2840 now operates and, at its contacts 2841, 2842, and other contacts not shown, it connects five cross-office units, similar to the cross-office unit 3400 (Figs. 34 to 44, inclusive) to the respective channel testing register relays R2810–40 to R2810–44. The last-mentioned relays are now connected to the corresponding cross-office units over a conductor similar to the conductor C3802–1. These cross-office units, however, are provided at the multiple call position and function in substantially the same manner as the cross-office unit 3400 to record the multiple call message. If the five multiple call cross-office storage units are available for use in handling the multiple call message, the channel testing register relays R2810–40 to R2810–44, inclusive, will operate. As soon as these relays operate, they will immediately lock in their operated positions to the grounded conductor C2601–SU3.

The ground potential applied to the conductor C2202–COM1, as noted above, is also extended by way of the contacts 2769 and the conductor C2302—COM extending to Fig. 23, contacts 2596, conductor C2101–D extending to Fig. 21, contacts 2133, conductor C2102–NM extending to Fig. 27, contacts 2785 of the operated relay R2780, conductor C2302–PR extending to Fig. 24 and the winding of the multiple call connect relay R2450, to battery. The latter relay now operates and, at its various contacts 2451 to 2456, inclusive, controls the multiple call control equipment 2447 (schematically illustrated) whereby the precedence of the call registered in the precedence detector 2300 will be compared with the precedence registered in the multiple call cross-office storage units. The multiple call equipment 2447 is associated with the five multiple call cross-office storage units at the multiple call position 3340 and is arranged to control the multiple call cross-office units to operate only those channel testing register relays R2810–40 to R2810–44 corresponding to the cross-office unit having the same precedence as the precedence of the multiple call message. If no channel testing register relay R2810–40, etc., is operated, indicating that no multiple call cross-office unit having the same precedence as the received multiple call message is available, then the channel testing switch S2870 will operate, in the manner previously described, to thereafter hunt for a multiple call cross-office unit having an empty bin condition.

Before describing the arrangement for searching for a multiple call cross-office unit having an empty bin condition, it should be noted that the above described circuit for operating the multiple call connect relay R2450 included contacts 2596 on the relay R2590 registering the "deferred" precedence indicator. Corresponding contacts are provided on each of the remaining precedence registers in order to complete substantially the same circuit for operating the relay R2450 and when the relay R2450 is operated, the precedence corresponding to the operated detector in the precedence detector 2300 will be compared in the manner previously described.

In the event that the channel testing relays R2810–40 to R2810–44, inclusive, remain in their restored positions, the first testing operation of the channel testing switch S2870 is omitted in the manner previously described and the precedence testing relays R2120 and R2130, in their cyclic operation, will then apply ground potential to the conductor C2102–PRE extending to Fig. 26 in order to operate the hunt empty bin relay R2760. Operation of the hunt empty bin relay R2760 controls the channel testing switch S2870 and the cross-office selector 3300 to be advanced step-by-step until an empty bin multiple call cross-office unit at the multiple call position 3340 is found. The operation involving the channel testing switch S2870, the cross-office selector switch relay control group 2600 and the cross-office selector 3300 to search for an empty bin multiple call cross-office unit at the multiple call position is substantially the same as has been previously described. When an available multiple call cross-office unit is found, the cross-office test relay R2650 and the relay R2645 are operated and the precedence registered on the precedence register switch 2210 is transmitted to the multiple call position 3340.

It should be noted that the outgoing selector 3300 in selecting a multiple call cross-office unit having an empty bin causes the operation of the test relays R2650 and R2645 in the usual manner. However, due to the fact that the hunt empty bin relay R2760 is in its operated position at this time, the previously mentioned circuit for controlling the end relay R2250 is not completed, but instead, a circuit including the contacts 2763′ and the conductor C2202–SOG is completed for operating the precedence transmission relay R2240. The operation of the relay R2240 controls the precedence indicator switch 2210, in the manner previously described, to identify the precedence registered in the precedence detector 2300. Also, the relay R2240 normally completes the operating circuit whereby the channel selecting switch S1801 searches for outgoing line identified by the operated channel register relay. Since the multiple call cross-office unit is not provided with an outgoing selector, of the type illustrated in Fig. 43, it is not necessary to transmit outgoing selector control signals to the multiple call cross-office unit. Therefore, the operation of the multiple call control relay R2780, at its contacts 2781′, prevents the normal operation of the channel selecting switch S1801 and the normal operation of the channel register finder 2710.

The precedence indicator switch 2210 starts its stepping action as soon as the contacts 2244 are closed by the operation of relay R2240. As previously described, as the precedence indicator switch 2210 advances step-by-step, the magnet M2214 thereof transmits pulses over the conductor C2202–PIR to the connected multiple call cross-office unit in order simultaneously to actuate the precedence register switch therein which is similar to the precedence marking switch 4210 in the cross-office unit 3400. As soon as the precedence indicator switch 2210 encounters the marked contacts in the associated contact bank indicative of the registered precedence indicator, the stepping of the switch will be terminated in the manner previously described, and the test relay R2220 restores to normal. It should be noted, however, that at the conclusion of the stepping of the precedence indicator switch 2210 the precedence registered in the precedence detector 2300 will now also be registered in the precedence marking switch of the connected multiple call cross-office unit.

As soon as the test relay R2220 restores to normal, as noted above, at its contacts 2221, it now completes a circuit for operating the end relay R2250 which includes the conductor C2202–PIC extending to Fig. 27 and ground at contacts 2788′ of the operated multiple call control relay R2780.

The end relay R2250 is operated over the above circuit to initiate the disconnection of the director from the incoming line circuit 400 in the manner previously described.

The incoming line circuit 400 is now directly connected through the cross-office selector 3300 to one of the five multiple call cross-office units at the multiple call position 3340 and the multiple call message perforated on the tape 333 will be transmitted by means of the incoming line retransmitter 360. The operator at the multiple call position 3340 may now see to it that the particular multiple call message will be individually retransmitted to each of the separate tributary stations listed in the received message.

*Seizure of the cross-office unit 3400 previously connected to the desired outgoing line and previously set to the same precedence as the received message*

In the previous description it was pointed out that when the director 200A is associated with the incoming line circuit 400, the director operates in accordance with the routing indicator and a low precedence ("deferred," "routine" or "priority") message to control the cross-office selector 3300 to connect with a cross-office unit, such as the cross-office unit 3400, which is connected to a particular outgoing line and which has previously been controlled to register therein the same precedence indicator as the precedence indicator of the received message. When such a cross-office unit is found, which in this case is assumed to be the cross-office unit 3400, the seizure relay R3870 therein is operated in series with the relay R2650 and R2645 in the cross-office selector switch relay control group 2600 portion of the director.

When the seizure relay R3870 operates, it completes at its contacts 3871 a circuit including the conductor C3402–MC extending to Fig. 34 in order to operate the motor start relay R3415 included in the cross-office reperforator 3410. At its contacts 3416, the relay R3415 completes a circuit for starting the operation of the motor (not shown) of the cross-office reperforator 3410. As a further result of the operation of the seizure relay R3870, at its contacts 3872, it interrupts a point in the circuit for the tape feed out relay R3850 and, at its contacts 3873, it disconnects the test relay R3930 from the conductor C3802–IDL. As a result of the above noted seizure of the cross-office unit 3400, the associated cross-office reperforator 3410 is now in condition to respond to signals transmitted thereto from the incoming line retransmitter 360 to perforate the tape 3413.

Returning again to the operation of the relay R2645, it will be recalled that at its contacts 2647 it applies ground potential to the conductor C2202–END in order to operate the end relay R2250 and thus initiate the release of the director 200A in the manner previously described. Also, at its contacts 2647, the relay R2645 applies ground potential to the conductor C857 in order to operate the open line relay R605 which relay in turn, at its contacts 608, operates the director release relay R670 in the incoming line circuit 400 to indicate the release of the director 200A in the manner previously described. Upon operating, the relay R670, at its contacts 675, immediately locks itself to ground at contacts 681. As a further result of the operation of relay R670, at its contacts 671, it connects the conductor C689 extending to Fig. 3 to the conductor C696 extending to Fig. 33 through the upper winding of the open line relay R605 in order to prepare the circuit, whereby the incoming line retransmitter 360 individually associated with the incoming line circuit 400 transmits code signals for controlling the perforating magnet M3411 of the cross-office reperforator 3410 individually associated with the cross-office unit 3400. This circuit, however, is not completed until the reperforator relay R3800 has been operated.

Figure 38:
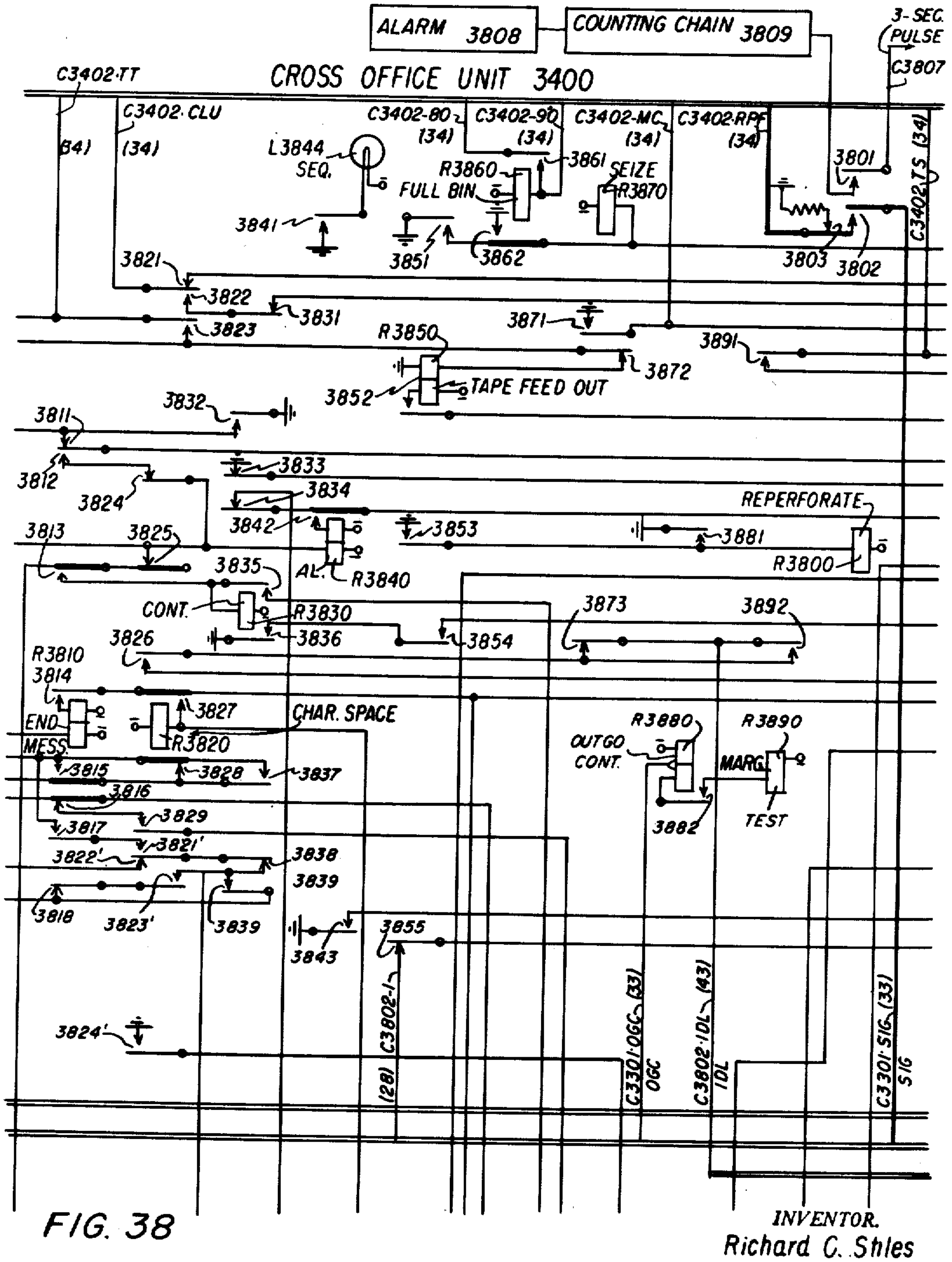

As a further result of the operation of the relay R605 as noted above, at its contacts 607, it now completes a circuit from ground, terminals 624 and 625 interconnected by the strap A (short-circuiting the resistor 623), conductor C551 extending to Fig. 33, contacts 3312, wiper 3322, conductor C3301–OGC extending to Fig. 38 and the upper winding of the outgoing control relay R3880, to battery. The relay R3880 operates over this circuit and connects its lower winding, at its contacts 3882, in series with the test relay R3890, to battery. Since the above noted resistance 623 is short-circuited, the relay R3890 also operated to indicate that the incoming line from the switching center UEP is a first class line. Relay R3890 is of the marginal type and will not operate if the resistor 623 is included in the operating circuit for the outgoing control relay R3880. This resistance is normally in circuit when the incoming is a second class line. A second class incoming line is one from which a message received thereover must not be retransmitted over an outgoing line by a cross-office unit until a complete message has been received and recorded on the tape 333. A first class incoming line is one that permits the cross-office unit to start to restransmit a message over an outgoing line whether or not the entire message has been received and recorded on the tape 333. Consequently, in its unoperated condition the marginal test relay R3890 indicates that the incoming line is of the second class type.

As a further result of the operation of the relay R3880, at its contacts 3881, it completes an obvious circuit for operating the reperforator relay R3800. As soon as the reperforator relay R3800 operates it transfers the conductor C3402–RPF from resistance ground, by way of its contacts 3803, to the conductor C3301–SIG by way of its contacts 3802. Also, at its contacts 3801, the relay R3800 connects the conductor C3807 to the schematically illustrated counting chain 3809 in order to prepare an alarm circuit that will be completed to the alarm 3808 only in the event that the tape 3413 in the cross-office reperforator 3410 fails to feed out of the reperforator 3410 while the reperforator relay R3800 is in its operated position. The counting chain 3809 is controlled by ground pulses transmitted over the conductor C3807 at the rate of one pulse every three seconds and it is also controlled over circuits not shown by the operation of the reperforator 3410. As a result of the above noted operation of the reperforator relay R3800, the circuit for controlling the perforator magnet M3411 of the cross-office reperforator 3410 may now be traced from battery, winding of the magnet M3411, conductor C3402–RPF extending to Fig. 38, contacts 3802, conductor C3301–SIG extending to Fig. 33, wiper 3321, contacts 3311, conductor C696 extending to Fig. 6, the upper winding of the open line relay R605, contacts 671, conductor C689 extending to Fig. 3, normally closed contacts 366 of the incoming line retransmitter 360, to ground. The magnet M3411 operates over this circuit and is now conditioned to control the reperforator 3410 to perforate the tape 3413, in code form, in accordance with the code signals transmitted over the above described circuit under control of the contacts 361 to 365, inclusive, of the incoming line retransmitter 360.

As soon as the marginal test relay R3890 operates, as noted above, it connects the upper winding of the start relay R3910 by way of its contacts 3891 and the conductor C3402–TS extending to Fig. 34, to the contacts 3422 of the tight tape switch 3427. The tight tape switch 3427 is arranged to close its contacts 3422 and operate the start relay R3910 only when sufficient tape has been perforated by the perforator 3410 to release the tape 3413 from its tight tape position. However, before discussing the operation of the start relay R3910 further operations controlled by the director release relay R670 will be discussed.

As a further result of the operation of relay R670, at its contacts 673, it interrupts a further point in the circuit for the magnet M690 in order to prevent the character counting switch 690A from counting the characters sensed by the sensing relays 401. Also, at its contacts 672, the relay R670 prepares a point in the circuit for the open line alarm relay R601. At this point, it may be well to mention that the open line relay R605 will normally be held in its operated position over the signal circuit including its upper winding. If this circuit is interrupted for a predetermined time interval the relay R605 will restore and complete, at the contacts 606, a circuit including contacts 672 for operating the alarm relay R601. This relay, upon operating, at its contacts 604, illuminates the open line alarm lamp L657 to indicate the open line signal circuit; at its contacts 602, it operates relay R605; and at contacts 603, it locks itself to the grounded alarm release key K668.

As a further result of the operation of relay R670, at its contacts 674, it interrupts the locking circuit for the director seize relay R660 and for the channel number completing relay R810. The relay R660 now restores to normal in order to disconnect the conductors C601 to C605, inclusive, extending to the director from the previously described circuits controlled by the sensing relays 401. The relay R810 also restores to normal and, at its contacts 811, it interrupts the previously described circuit including the conductor C881 extending to Fig. 9, in order to control the channel number comparator 900 to advance one step and preregister the channel number of the next message to be received over the incoming line circuit 400. As a further result of the restoration of the relay R810, at its contacts 815, it now connects the conductor C776 by way of the contacts 652, 642, 612 and 714 to the conductor C775 in order to retain the operating circuit for the magnet M344 of the tape reader 340 so that the tape 333 will be sensed by the tape reader as long as the slack appears in the tape 333.

As a further result of the operation of the relay R670, at its contacts 676, it connects ground potential by way of the conductor C618 extending to Fig. 33, contacts 3313′, the wiper 3323 and the conductor C3301–BTL in order to retain the seizure relay R3870 in its operated position and in order to ground the bank contact engaged by the wiper 3323 and thus mark the cross-office unit 3400 busy to all other cross-office selectors, such as the selector 3300, having access thereto. The last mentioned circuit is necessary to busy the cross-office unit 3400 inasmuch as the ground potential will be removed from the conductor C864 incident to the restoration of the start relay R2610 included in the cross-office selector switch relay control group 2600 portion of the director 200A.

As a still further result of the operation of the relay R670, at its contacts 677, it completes a circuit for controlling the incoming line retransmitter 360 to start retransmitting the entire message, which is perforated on the tape 333 and stored in the storage bin 343, to the cross-office reperforator 3410 included in the cross-office unit 3400. This circuit may be traced from battery by way of the winding of the magnet M364, conductor C619 extending to Fig. 6, contacts 655, 614 and 677, conductor C695 extending to Fig. 3, and the contacts 369 to ground of the tight tape switch 368.

Referring now to Fig. 3, it will be recalled that the message received from the relay switching center UEP has controlled the perforator magnet M331 of the typing reperforator 330 to perforate the start-of-message indicator (XZXZXZX) followed by a specific incoming channel or incoming line designation of two or three letters, and then a channel number indicator including a "figures shift" character followed by a three digit number (001) identifying the number of the message received from the relay switching center UEP. The next item of information appearing on the perforated tape 333 is the precedence indicator which may be of any one of six different classes including "deferred," "routine," "priority," "operational immediate," "emergency" and "flash," from the lowest to the highest class in the order named. Following this item of information the tape 333 is perforated in accordance with the routing indicator which, in the present example, is assumed to be the routing indicator JWPA.

The next item of information normally appearing on the tape 333 is the body of the message which is followed by two "carriage return" functions, eight "line feed" functions, the four figures indicative of the time of day that the message was transmitted from the relay switching center UEP. Thereafter, the last item of information of the message appearing on the tape 333 includes the end of message indicator which comprises a "figures shift" character function followed by seven commas and then sixteen "letters" functions.

Normally, the cross-office unit 3400 will be connected to the incoming line circuit 400 by means of the director 200A before the information contained in the body message has been completely perforated on the tape 333 and sensed by the tape reader 340 and, consequently, the portion of the message following the start of message indicator may be retransmitted by the incoming line retransmitter 360 over the conductor C689 to the cross-office reperforator 3410 while the perforator magnet 331 is perforating the tape 333 in accordance with the body of the message and the end of message indicator. Thus, as long as the relay switching center UEP continues to transmit information regarding the present message to the perforator magnet M331, the tape 333 will remain slack between the feed out reel 332 and the take-up reel 366 so that the tight tape switches included in the storage bin 343 will have their contacts 342 and 369 closed.

In view of the foregoing description it will be appreciated that as long as the slack appears in the tape 333, the tight tape switch 368 will be actuated to close its contacts 369 whereby the incoming line retransmitter 360 operates in the manner disclosed and described in the Goetz Patent No. 2,296,845, granted September 29, 1942. Consequently, the incoming line retransmitter 360 senses the tape 333 and controls its contacts 361 to 366, inclusive, whereby coded signals corresponding to the perforations in the tape are repeated over the conductor C689 to the cross-office reperforator 3410. The magnet M3411 of the reperforator 3410 will perforate the tape 3413 thereby to recreate the perforations of all of the items of information perforated on the tape 333. While the incoming line retransmitter 360 is repeating the entire message to the reperforator 3410, the tape reader 340 individual to the incoming line circuit 400 may be sensing the end of message indicator ("figures shift" function followed by seven commas) which will indicate the end of the described message. Consequently, at the present time, it is deemed advisable to describe the operation of the incoming line circuit 400 in responding to the tape reader 340 sensing the end of message indicator.

*Operation of the incoming line circuit 400 to detect and register an end-of-message indicator*

When the "figures shift" character function starting the end-of-message indicator is sensed by the tape reader 340, the contacts 351, 352, 354, 355 and 350 are closed in the manner previously described in order to operate the relays R410, R420, R440, R450 and R460 of the sensing relays 401. In response to the operation of the above noted relays, a circuit is completed including the contacts 467, 414, 424, 434, 444 and 454 for operating the figures shift relay R480. At the end of the sensing of the "figures shift" character, all of the above noted relays except the figures shift relay R480 restore to normal. The relay R480 now locks itself over a circuit including its upper winding, contacts 485 and ground at the contacts 466 and 475. When these sensing relays 401 are successively reoperated in accordance with each of the seven commas (,) sensed by the tape reader 340, the locking circuit including the upper winding of the figure shift relay R480 is transferred to a circuit including its contacts 485, contacts 453, 443, 433, 423, 413 and ground at contacts 438 and 448. Also, a circuit is now completed for operating the first counting relay R490–1 which may be traced from ground at contacts 467 and then by way of the contacts 415, 425, 435, 445, 455, 486 and 494 and the winding of the relay R490–1, to battery. At the end of the sensing of the first comma in the end-of-message indicator, the operated sensing relays 401 restore to normal thereby to recomplete the locking circuit for the upper winding of the figure shift relay R480 and to lock the first counting relay R490–1 in series with the second counting relay R490–2. The last mentioned circuit includes the winding of the relay R490–1, contacts 491, the winding of the relay R490–2, contacts 501 and 511 contacts 540 of the operated counting relay R490–14, contacts 482 and ground at contacts 466 and 475.

The second comma sensed by the tape reader 340 again controls the sensing relays 401, whereby the third counting relay R490–3 is operated at the beginning of the sensing cycle and at the end of the sensing cycle, the relay R490–3 is locked in series with the counting relay R490–4. The third comma sensed by the tape reader 340 causes the operation of the counting relay R490–5 which then locks in series with the counting relay R490–6. The fourth comma sensed by the tape reader 340 causes the operation of the counting relay R490–7 and it is locked in its operated position in series with the counting relay R490–8. The fifth comma sensed by the tape reader 340 operates the counting relay R490–9 which locks itself in series with the counting relay R490–10. The sixth comma sensed by the tape reader 340 operates the counting relay R490–11 which locks itself in series with the counting relay R490–12. The seventh comma sensed by the tape reader 340 completes the operating circuit for the end-of-message relay R590 over a circuit which may be traced from ground at the contacts 467 and then by way of the contacts 415, 425, 435, 445, 455, 488, 495, 503, 508′, 516, 523′ and 532, the upper winding of the relay R590, and contacts 482′, to battery. The relay R590 now operates and, at its contacts 596, completes a locking circuit for itself which includes its lower winding and ground at contacts 681.

In view of the foregoing, it will be understood that when the figures shift relay R480 is operated and seven commas are successively sensed by the sensing relays 401, the counting relays R490–1 to 490–12, inclusive, and the end-of-message relay R590 are operated in sequence to indicate the successful sensing of the end-of-message indicator.

As soon as the relay R590 operates, it interrupts, at its contacts 597, the locking circuit for the counting relays R490–13 and R490–14 which now restore to normal. The last mentioned counting relays were operated as a result of the sensing of the start-of-message indicator and they are only restored incident to the sensing of the end-of-message indicator. At its contacts 599, the relay R590 completes a circuit including the conductor C695, contacts 684, 599, 614, and 655, and the conductor C619 in order to retain the incoming line retransmitter 360 in a transmitting condition after the previously traced circuit including the contacts 677 is opened upon the restoration of the relay R670. At its contacts 591, the relay R590 prepares a point in the circuit for the magnet M760 of the tape reader cycle counter 701 so that the magnet M760 may be controlled each time the relay R470 of the sensing relays 401 is operated by the tape reader 340. Also, at its contacts 592, the relay R590 prepares a point in the circuit for operating the relay R730 of the tape feed out control relays and, at its contacts 595, it prepares a circuit including the conductor C753, whereby ground pulses at the rate of one pulse every three seconds may now be transmitted to control the relay R750 of the tape feed out control relays.

Incident to the restoration of the counting relay R490–13 and R490–14, at the contacts 543, a circuit is prepared for operating the magnet M690 of the character counting switch 690A under control of the contacts 464 on the relay R460 included in the sensing relays 401. Each time the relay R460 now operates in response to a character sensed by the sensing relays 401, the character counting switch 690A will operate to count the number of characters sensed.

Before leaving the discussion regarding the operation of the counting relays R490–1 to R490–12, inclusive, and the operation of the end-of-message relay R590, it should be noted that if any character other than the "comma" is sensed during the sensing of the seven commas included in the end-of-message indicator, all of the operated counting relays as well as the figures shift relay R480 will be restored to normal. These counting relays will only be reoperated in response to the receipt of the proper sequence of a "figures shift" character, followed by seven commas. The release of the figures shift relay R480, as well as any operated counting relays R490–1, etc., is accomplished as a result of the failure to retain the locking circuit for the upper winding of the relay R480. The above noted locking circuit is only completed when a comma is sensed during a sensing cycle and if any other character is sensed after the figures shift relay R480 has been operated it will automatically restore to normal and thereby interrupt the previously traced holding circuits, for the counting relays including the contacts 482 or 484 of the operated figure shift relay R480. Whenever the above circuits are interrupted incident to the figures shift relay R480, then all operated counting relays R490–1 to R490–12, inclusive, automatically restore to normal.

*Transmission delays in a message being received by the incoming line circuit 400*

In the previous description of the incoming line circuit 400 it was pointed out that the counting relays R490–13 and R490–14 were operated as the result of a successful sensing of the start-of-message indicator and that these relays remained in their operated positions until the end-of-message indicator of the received message operates the end-of-message relay R590. During the time interval between the start-of-message indicator and the end-of-message indicator, the transmitting station may stop sending the characters of a message in the middle thereof; it may pause in the transmission between lines, words, etc.; the incoming line over which the message is received may be shorted or opened; the end-of-message indicator may not be fed as far as the tape reader when the sending station stops transmitting at the end of the message; and the end-of-message indicator, perforated on the tape 333, may be stopped between the tape reader 340 and the incoming line retransmitter 360. In order to determine whether any of the foregoing interruptions are maintained for a period of from three to six seconds a timing circuit, including the relays R720, R730, R740 and R750, is provided. These relays are arranged to control the typing reperforator 330 to automatically feed out blank tape.

As a result of the operation of the counting relay R490–14 to indicate the successful sensing of the start-of-message indicator, at its contacts 545, it connects the conductor C753 to a circuit for operating the tape feed out control relay R750. The conductor C753 will be momentarily grounded within three seconds after the operation of relay R490–14 to complete a circuit including the contacts 727, 545, 742 and 733 for operating the relay R750. Upon operating, the relay R750 prepares, at its contacts 751, a circuit for operating the tape feed out control relay R740 and when the momentary ground pulse is removed from the conductor C753, the relay R750 locks itself in series with the relay R740 over a circuit which includes the winding of the relay R750, contacts 733 and 751, winding of relay R740, contacts 731, contacts 539, 461, and 471, and ground. The relay R740 operates over this circuit and, at its contacts 741, connects the conductor C753 to a circuit including the winding of the tape feed out control relay R730.

Normally, the relays R460 and R470 will be operated in accordance with another character sensed by the tape reader 340 before the elapse of the additional three seconds. Thus, if the relay R470 or R460 is operated, they interrupt, at the contacts 461 or 471, the above described locking circuit for the relays R740 and R750. These relays will now restore to normal and the cycle of operation will be repeated after an elapse of another three seconds to cause the reoperation of the relay R750 followed by the operation of relay R740. Consequently, as long as the sensing relays 401 continue to sense characters perforated on the tape 333 under control of the tape reader 340, the relays R460 and R470 will periodically restore the relays R740 and R750 to normal if they have been operated by the three second ground pulses transmitted over the conductor C753.

However, if a character is not read by the tape reader 340 before a second ground pulse is received at the end of an additional three seconds over the conductor C753, the second ground pulse will then be transmitted over a circuit including the contacts 727, 545, 741, 722, 547, 817 and 724 and the winding of the relay R730, to battery. This relay now operates and at the end of the momentary ground pulses, it locks itself over a circuit including the contacts 732, the winding of the tape feed out relay R720, contacts 713, 632 and 462 and ground at the alarm release key K668. As soon as the relay R730 operates, it interrupts, at its contacts 731, the locking circuit for the relays R740 and R750 and these relays now restore to normal. As soon as the relay R720 operates, it completes, at its contacts 728, a circuit including the conductor C729 extending to Fig. 3, the lower winding of the tape feed out relay R320, contacts 313 and 323 and the resistor 314, to battery. Relay R320 operates and, at its contacts 322, it short-circuits the perforator magnet M331 and connects the negative incoming line conductor by way of the contacts 322 and 311 to the positive incoming line conductor. As a further result of the operation of relay R320, at its contacts 323, it interrupts a point in its initial operating circuit and thereby includes the lower winding of the relay R310 in series therewith, through the resistor 314, to battery. The relay R320 remains operated over the latter circuit and the relay R310 now operates. At its contacts 311, the relay R310 removes the short circuit from the upper winding of the relay R320 in order to connect the upper winding of the relay R320 in series with the positive and negative incoming line conductors. Also, at its contacts 312, the relay R310 short-circuits the lower winding of the relay R320. However, the latter relay now remains in its operated position over the circuit including its upper winding, the contacts 322, and the negative and positive conductors extending to the switching center UEP. The perforator magnet M331 is now short-circuited and consequently restored to normal. The relay R310, however, now remains locked in its operated position as long as the ground potential is retained on the conductor C729. As long as the magnet M331 is restored the typing reperforator 330 is controlled to automatically feed out blank tape. When the cross-office unit UEP again starts transmitting, the relay R320 restores to normal and, at its contacts 322, removes the short-circuit from the perforator magnet M331. Thus, the magnet M331 will again be controlled to perforate the tape 333 in accordance with the signals transmitted from the switching center UEP. However, the relay R310 remains in its operated position until the next character (except a "blank" character) is sensed by the tape reader 330.

As a further result of the operation of the tape feed out control relay R720, at its contacts 727, it disconnects the conductor C753 in order to prevent additional three-second pulses from controlling the relay R750 and, at its contacts 726, it connects the three-minute pulse conductor C752 to the circuit for controlling the relay R750. After an elapse of approximately three minutes, following the operation of the relay R720, a momentary ground pulse will be transmitted over the conductor C752, contacts 726, 545, 742 and 725 in order to operate the relay R750. However, if a character is sensed by the tape reader 340 prior to the receipt of the three minute ground pulse, the relay R460 will operate and, at its contacts 462, it will interrupt the previously described locking circuit for the relays R720 and R730 so that these relays restore to normal and again condition the tape feed out control relays to start a new cycle of operation. Restoration of the relay R720, of course, will remove ground, at the contacts 728, from the conductor C729 thereby to cause the restoration of the relay R310 in order to terminate the automatic feed out of blank tape. In other words, the relay R310 upon restoring, at its contacts 311, reconnects the magnet M331 to the negative and positive conductors and it restores the relay R320. As a further result of the restoration of relay R310, at its contacts 312 and 313 it reconditions the circuits for operating relay R320.

If the relays R720 and R730 remain in their operated position, the relay R750 will operate at the end of three minutes, as noted above, and as soon as the momentary ground is removed from the conductor C752, relay R750 locks itself over a circuit including the contacts 725, 751, the winding of the relay R740 and ground at contacts 721. Operation of the relay R740 in series with the relay R750 prepares, at its contacts 741, a circuit for operating the alarm relay R630.

After the elapse of an additional three minutes, the conductor C752 is again momentarily grounded, whereupon a circuit including the contacts 726, 545, 741 and 723 is completed for operating the stop blank tape feed out alarm relay R630. Upon operating, the relay R630 locks itself, over a circuit including its contacts 633, to ground at the alarm release key K668. Also, at its contacts 632, it interrupts the previously described locking circuit for the relays R720 and R730, which relays now restore to normal. Also, at its contacts 631, the relay R630 completes an obvious circuit for illuminating the tape feed out alarm lamp L634 to indicate to the attendant that the tape feed out relays 300 have been automatically controlled to feed out blank tape and that from three to six minutes have elapsed without receiving an additional character over the incoming line from the transmitting station. As soon as the tape feed out control relay R720 restores to normal, it interrupts, at its contacts 721, the locking circuit for the relays R740 and R750 which also restore to normal. Also, at its contacts 728, the relay R720 interrupts the circuit for the tape feed out relays 300 in order to terminate further automatic feed out of blank tape.

When the attendant notices the lighted condition of the tape feed out alarm lamp L634, he checks the typing reperforator 330 and as soon as it starts receiving again, the alarm release key K668 may be actuated in order to restore the relay R630 to normal and thereby extinguish the lamp L634. However, if an appreciable time elapses and the typing reperforator 330 is not controlled, the attendant takes the necessary steps to check with the transmitting station in order to determine the reason for the delay in the receipt of the started message.

In the above description it was pointed out that if the sensing relays 401 are controlled by the tape reader 340 prior to the operation of relay R630, the tape feed out control relays R720, R730, R740 and R750 are automatically restored to normal in order to terminate the automatic feed out of blank tape. In addition to the foregoing, it should be noted that if the transmission of the signals between the transmitting stations UEP and the typing reperforator 330 stops between messages so that the end-of-message indicator perforated on the tape is caught between the reperforator 330 and the tape reader 340, the automatic feed out of the blank tape will extend the end-of-message indicator to the tape reader 340 so that it will be sensed thereby in the manner previously described and control the operation of the end-of-message relay R590.

As soon as the tape reader 340 senses the "figures shift" character indicative of the start of the end-of-message indicator, the relay R460 will be operated in the usual manner and, at its contacts 462, it will automatically restore the operated tape feed out control relays R720, R730, R740 and R750 to normal, to terminate the automatic feed out of blank tape. As soon as the end-of-message relay R590 is operated, it completes at its contacts 599, the previously traced circuit including the conductors C619 and C695 in order to maintain the incoming line retransmitter 360 in the sending condition so that it will retransmit the message to the cross-office reperforator 3410 associated with the cross-office unit 3400. Also, at its contacts 591, the relay R590 connects the magnet M760 of the tape reader cycle counter 701 to the contacts 472 of the relay R470.

With the end-of-message relay R590 operated, the tape reader 340 may continue to sense the tape 333 until the slack therein is removed and controls the slack tape switch 341 to open its contacts 342. Since the tape 333 may only be "blank" tape, the tape reader 340 is controlled to close its contacts 350 and thereby operate the relay R470 for each blank space appearing on the tape 333. The remaining relays included in the sensing relays 401 will remain in their restored positions. Each time a "blank" is sensed by the tape reader 340, the relay R470, at its contacts 472, will transmit a ground potential by way of the contacts 591 and 711 and the winding of the magnet M760, to battery. In addition to the foregoing, a ground pulse will also be transmitted by way of the contacts 472, 592 and 724 for operating the relay R730. At the end of the first "blank" sensed by the tape reader 340, the relay R470 removes the ground potential at the contacts 472 in order to restore the magnet M760 to normal so that it advances its wipers 763 and 764 one step in a clockwise direction. Also, when ground is removed at the contacts 472, the relay R730 locks itself in series with the relay R720 over a circuit including the contacts 732, 713, 632, 462 and ground at the contacts of the alarm release key K668. Operation of the relay R720 at this time again completes, at its contacts 728, the previously described circuit, whereby the tape feed out relays 300 are again controlled to cause the typing reperforator 330 to continue to feed out blank tape. This arrangement makes certain that a predetermined amount of blank tape will be fed from the typing reperforator 330 to permit all of the characters of an end-of-message indicator to be fed through the incoming line retransmitter 360. However, before the predetermined amount blank tape is fed from the typing reperforator 330, a new start-of-message indicator may be received over the incoming line. When this occurs, the tape reader 340 will function, in the manner previously described, to detect and register the new start-of-message indication in the combined start and end-of-message detector in the incoming line circuit 400.

If it is assumed that no new start-of-message indicator immediately follows the end-of-message indicator, the blank tape fed from the typing reperforator 330 will cause the tape reader 340 to operate the relay R470 for each sensing cycle. Each time the relay R470 operates, it transmits a pulse, at its contacts 472, to operate and restore the magnet M760. When the magnet M760 has been controlled ten times, the wiper 763 and 764 engage the contacts 10 in order to prepare a circuit for operating the magnet M770. Consequently, the next ground pulse transmitted by the contact 472 operates the magnet M760 and the ground pulse is further extended by way of the wiper 763, engaged contact 10, contacts 716 and the winding of the magnet M770, to battery. At the end of the pulse, the magnet M760 restores, thereby to advance its wipers into engagement with the home contact positions, and the magnet M770 restores, to advance its wiper 773 one step in a clockwise direction from the home contact into engagement with the contacts 1. Thereafter, the successive pulses transmitted to the magnet M760 controls the wipers 763 and 764 to advance step-by-step until the second cycle of operation is completed and an additional circuit is completed for operating and restoring the magnet M770. With this arrangement, the magnet M770 advances its wipers one step for every ten steps of the magnet M760. When the wiper 773 is advanced into engagement with the contacts 6 and the wiper 764 is advanced into engagement with its contact 5, to indicate the counting of approximately 65 characters by the relay R470, a circuit is completed for operating the stop relay R710.

In the present example, the relay R710 is arranged to be operated after the counting of approximately 65 characters but it will be understood that the circuits connections including the bank contacts accessible to the wipers 773 and 764 may be connected in any other desired manner to count any number of blank spaces or characters on the tape 333. As soon as the relay R710 operates, it locks itself by way of its contacts 718 to ground at contacts 683. Also, at its contacts 715, relay R710 now completes a self-interrupting circuit for controlling the magnet M770. This circuit includes the rotary off-normal contacts RON772 (closed as long as the wiper 773 does not engage its home contact position), contacts 771 and 715, and the winding of the magnet M770, to battery. The magnet M770 operates and, at its contacts 771, interrupts its operating circuit, whereupon the magnet restores to normal to advance the wiper 773 an additional step in a clockwise direction and to recomplete its operating circuit at its contacts 771. The above described cycle of operation is repeated until the wiper 773 again engages its home contact position to open the rotary off-normal contacts RON772. Consequently, the wiper of the magnet M770 is again restored to its home contact position.

As a further result of the operation of relay R710, at its contact 712, it completes a similar circuit including the rotary off-normal contacts RON762, the contacts 761 and 712 for self-interruptedly operating the magnet M760. Each time the magnet M760 operates and restores, it advances its wipers 763 and 764 an additional step in a clockwise direction. As soon as the above noted wipers are advanced into engagement with their home contact positions, the rotary off-normal contacts RON762 are opened thereby to terminate the rotary stepping of the wipers under control of the magnet M760. As a further result of the operation of relay R710, at its contacts 714, it interrupts the previously described circuit including the conductor C775 and C776 thereby to terminate the sensing operation of the tape reader 340 even though the tight tape switch 341 has closed its contacts 342 under the influence of a slack tape 333. Also, at its contacts 713, the relay R710 interrupts the previously described locking circuit for the relays R720 and R730 whereupon these relays restore to normal. At the contacts 728, the relay R720 now interrupts the circuit including the conductor C729 in order to restore the tape feed out relays 300 and thus terminate the automatic feed out of blank tape by the typing reperforator 330. Finally, at its contacts 717, the relay R710 connects the release relay R680 to the conductor C719 in order to prepare a point in the circuit including the tight tape switch 367 associated with the incoming line retransmitter 360.

The incoming line retransmitter 360 conditions to retransmit the information perforated on the tape 333 until the contacts 369 of the tight tape switch 367 are opened. This condition occurs when the tape 333 between the tape reader 340 and the take-up reel 366 of the incoming line retransmitter 360 becomes tight. In other words, as long as the tape 333 remains in a slack condition, the contacts 369 of the tight tape switch 376 complete the previously described circuit including the conductor C695 extending to Fig. 6, contacts 684, 599, 614 and 655, conductor C619 extending to Fig. 3 and the winding of the magnet M364 to battery. As long as the magnet M364 is retained in its operated position the incoming line retransmitter 360 will continue to transmit signals over the conductor C689 in accordance with the perforations appearing on the tape 333. When the tape 333 becomes tight, the contacts 369 are open in order to interrupt the circuit for the magnet M364 which now restores to normal and terminates further retransmission by the retransmitter 360. Also at its contacts 368 the tight tape switch 367 now completes a circuit including the conductor C719 extending to Fig. 7 and the contacts 717 for operating the release relay R680.

As soon as the relay R680 operates, it locks itself in its operated position over a circuit including its contacts 682, conductor C687 extending to Fig. 33, contacts 3317 of the operated connect relay and the off-normal contacts ON3329 on the cross-office selector 3300 to ground. As a further result of the operation of relay R680, at its contacts 683, it now interrupts the circuit for the stop relay R710, whereupon the latter relay restores to normal. Also, at its contacts 684, the relay R680 interrupts a further point in the circuit including the previously noted conductors C619 and C695 for controlling the magnet M364. At its contacts 681, the relay R680 interrupts a locking circuit for the end-of-message relay R590, whereupon the latter relay restores to normal and reconditions the incoming line circuit 400 to control the selection of an idle director incident to the detection of a start-of-message indicator of a new message received from the transmitting station UEP. Also, at its contacts 681, the relay R680 interrupts the circuit for the relay R670, which also restores to normal. Finally, at its contacts 685, the release relay R680 now applies ground potential by way of the conductor C686 extending to Fig. 33, contacts 3318 of the operated connect relay R3310, off-normal contacts ON3328, contacts 3327 and the winding of the magnet M3326 to battery. The magnet M3326 is self-interruptedly operated over the above traced circuit and advances its wipers 3321 to 3325, inclusive, step-by-step in a clockwise direction until the wipers are advanced into engagement with the home contact positions. As soon as the home contact positions are engaged by the wipers of the cross-office selector 3300, the off-normal contacts ON3328 are opened in order to interrupt the self-interrupting circuit for the magnet M3326 and the off-normal contacts ON3329 are opened in order to interrupt the locking circuit including the contacts 3317 and 3316 for the connect relay R3310. The connect relay R3310 now restores to normal and opens points in the various circuits including the various contacts of the now restored relay. Also, the removal of ground potential at the off-normal contacts ON3329 interrupts the previously described locking circuit including the conductor C687 extending to Fig. 6 in order to restore the release relay R680 to normal.

In view of the foregoing, it will be understood that the incoming line circuit 400 and its associated cross-office selector 3300 are restored to normal and are in condition to respond to the next message received from the relay switching center UEP.

It may be well to mention at this time that if no message is received from the relay switching center UEP for 30 minutes a momentary ground potential will be applied to the conductor C689 (Fig. 6) and thereby complete a circuit including the contacts 594, 544, 742 and 733 and the winding of the relay R750, to battery. At the end of the momentary pulse, the relay R750 will lock itself in series with the relay R740 over a circuit which includes the contacts 733, 751, 763, 534 and ground at the alarm release key K668. At the end of an additional 30 minutes period, another ground pulse appearing on the conductor C698 will be transmitted by way of the contacts 594, 544, 741, 722, 595' and 546 for operating the no traffic alarm relay R620. Upon operating, the latter relay, at its contacts 622, locks itself to ground at the alarm release key K668. As a further result of the operation of relay R620, at its contacts 621, it completes an obvious circuit for illuminating the no traffic alarm lamp L626 to indicate to the attendant that no traffic has been received from the relay switching center UEP for approximately one hour. This condition may not be unusual during the particularly low traffic periods and in that event the attendant will merely actuate the release key K668 to restore the relays R620, R740 and R750 to normal. However, if this condition occurs during relatively high traffic periods, then the attendant will take the necessary steps to ascertain whether or not the switching center UEP and the interconnecting line is in operating condition or is out of service.

*Operation of the cross-office unit 3400 after seizure*

In the previous description of the operation of the system it was pointed out that the incoming line retransmitter 360 is controlled in accordance with the perforations appearing on the tape 333 in order to transmit signals over the conductor C689 to control the perforator magnet M3411 of the cross-office reperforator 3410 individually associated with the cross-office unit 3400. In this manner the entire message perforated on the tape 333 is retransmitted to and stored on the tape 3413 following other messages of the same precedence which are being or are to be retransmitted over a L1 outgoing line by the cross-office unit 3400. Accordingly, in the present description it is assumed that the cross-office unit 3400 is connected to the L1 outgoing line by means of its outgoing selector 4300 and that the precedence marking switch 4210 has been previously set in accordance with the "deferred" precedence indicator.

In response to the seizure of the cross-office unit 3400, as previously described, the seizure relay R3870, the outgoing controlling relay R3880, the marginal relay R3890 and the reperforator relay R3800 are operated. When sufficient tape has been perforated by the perforator magnet M3411, the tape 3413 becomes slack and causes the tight tape switch 3427 to close its contacts 3422 and thereby completes a circuit including the conductor C3402–TS extending to Fig. 38 and the contacts 3891 for operating the start relay R3910. As soon as the relay R3910 operates, it completes a locking circuit for itself which includes its lower winding, contacts 3913 and ground at contacts 3922. As a further result of the operation of the relay R3910, at its contacts 3911, it applies ground potential to the conductor C3402–MC in order to maintain the motor start relay R3415 of the reperforator 3410 in its operated position. Also, at its contacts 3912, the relay R3910 connects the battery potential on the conductor C3402–TS by way of the contacts 3912, 4031 and 3821, conductor C3402–CLU extending to Fig. 34 and the winding of the clutch magnet M3425 of the tape reader 3420, to ground. The operation of the clutch magnet M3425 controls the tape reader 3420 to sense the tape 3413 and control its six contacts connected to the conductors C3401–RA to C3401–RF, inclusive, in order to control the sensing relays 3501 in accordance with the code illustrated in Fig. 46 in substantially the same manner as has been previously described. As a further result of the operation of the start relay R3910, at its contacts 3914, it connects the upper winding of the test guard relay R3940 to the conductor C3902–G extending to Fig. 43. At its contacts 3915, the relay R3910 interrupts a point in the circuit for the empty bin relay R3990 in order to remove the battery potential from the conductor C3902–HEB extending to Fig. 27 in order to mark the cross-office unit 3400 unavailable in the event that another director is searching for an available empty bin cross-office unit. Finally, at its contacts 3916, the relay R3910 completes an operating circuit for the start slave relay R4280 which now operates and connects, at its contacts 4281 to 4283, inclusive, the six precedence control relays R4220 to R4270, inclusive, to the bank contacts of the precedence marking switch 4210.

In the previous description of the operation of the cross-office unit 3400, it was pointed out that if the unit is drawn from the pool of empty bin cross-office units, the director 200A controls the magnet M4217 of the precedence marking switch 4210 to register in the cross-office unit 3400 the precedence of the message and it also controls the outgoing selector 4300 to position its wipers into engagement with the desired L1 outgoing line. Consequently, in the situation just mentioned, the operation of the start relay R3910 is delayed until the reperforator 3410 has processed sufficient of the tape 3413 to create a slack therein and to actuate the slack tape switch 3427. However, if the cross-office unit 3400 is seized after it has been set to the L1 outgoing line and after it has been operated to register the precedence of a prior message, the start relay R3910 may be in its operated position at the time the new start-of-message indicator is perforated on the tape 3413 by the incoming line retransmitter 360. In either case, however, the sensing relays 3501 will be controlled by the tape reader 3420 in accordance with the start-of-message indicator (XZXZXZX).

As the message is being transferred from the incoming line circuit 400 to the cross-office unit 3400 the perforate magnet M3411 perforates the tape 3413 in code form in accordance with the various items of information. When sufficient tape has been perforated to permit the tape reader 3420 to sense the first character X of the start-of-message indicator, the conductor C3401–RF will be grounded in order to operate the relay R3560 and the conductors C3401–RA, RC, RD and RE, will be grounded in order to operate the relays R3510, R3530, R3540 and R3550. The sensing relays 3501 are controlled by the tape reader 3420 in substantially the same manner as the sensing relays 401 are controlled by the tape reader 340. Consequently, any one of the operated relays R3510 to R3550, inclusive, will complete at their respective contacts 3518, 3528, 3538, 3548 and 3558 an operating circuit for the relay R3570 and the latter relay, at its contacts 3574, will complete an obvious locking circuit for any one of the operated relays R3510 to R3550, inclusive. At the contacts 3516, 3536, 3546 and 3556, the operated relays R3510, R3530, R3540 and R3550 complete a series circuit including the contacts 3526 and 3587, conductor C3601, and contacts 3621 for operating the first counting relay R3610–1. At the end of the sensing cycle of the first character X, all of the operated sensing relays 3501 restore to normal, whereupon a locking circuit is completed for the relay R3610–1 by way of the contacts 3611, the winding of the second counting relay R3610–2, contacts 3642, 3671 and 3761, conductor C3603, contacts 3581 and ground at contacts 3561 and 3571. The second counting relay R3610–2 now operates and prepares, at its contacts 3623, a point in the circuit for the operating relay R3610–3. Also, at its contacts 3622, it prepares a point in the operating circuit of the fifth counting relay R3610–5.

The second character Z of the start-of-message indicator is now sensed by the tape reader 3420, whereupon the relays R3510, R3550, R3560 and R3570 are reoperated in substantially the same manner as has been described above. A series circuit is now completed, including the contacts 3564, 3517, 3527, 3537, 3547, 3557 and 3581', conductor C3604, and contacts 3623 and 3644, for operating the third counting relay R3610–3. Although the locking ground potential applied to the conductor C3603 at either the contacts 3561 or 3571 is removed incident to the operation of the sensing relays R3560 and R3570, the ground potential is retained on the conductor C3603 by way of the contacts 3581, 3551, 3541, 3531, 3521, 3511 and 3518 or 3558 in order to retain the first and second counting relays R3610–1 and R3610–2 in their operated positions in response to the sensing of the second character Z.

If any other character is sensed as the second character, the locking circuit is not retained and these counting relays restore to normal so that they may be reoperated when a Z character is sensed by the tape reader 3420. At the end of the sensing of the second character Z, the sensing relays 3501 restore to normal in order to retain the holding ground potential on the conductor C3601 and to provide a locking circuit for the third counting relay R3610–3 which includes the contacts 3632, the winding of the fourth counting relay R3610–4, contacts 3662, 3721 and 3762, conductor C3602, contacts 3583 and ground at contacts 3562 and 3572. As soon as this locking circuit is completed, the fourth counting relay R3610–4 operates and, at its contacts 3641 and 3642, it transfers the locking circuit for the first and second counting relays from the grounded conductor C3603 to the grounded conductor C3602. Also, at its contacts 3643, the relay R3610–4 prepares an additional point in the operating circuit for the fifth counting relay R3610–5 and, at its contacts 3645, it prepares a point in the circuit for the seventh counting relay R3610–7.

When the third character X of the start-of-message indicator is sensed by the tape reader 3420, the sensing relays 3501 are reoperated in the manner previously described to reapply ground potential to the conductor C3601, whereupon a circuit, including the contacts 3622, 3643 and 3663, is completed for operating the fifth counting relay R3610–5. During the sensing of the third character X, the locking ground potential is retained on the conductor C3602 over a circuit including the contacts 3583, 3552, 3542, 3532, 3522, 3512 and ground at the contacts 3518, 3583, 3548, and 3558. At the end of the sensing of the third character X, the sixth counting relay R3610–6 is operated in series with the fifth counting relay R3610–5 over a circuit which includes the contacts 3651 and 3631, the relay R3610–6, contacts 3722, 3741 and 3761 and the grounded conductor C3603.

In response to the sensing of the fourth character Z, the conductor C3604 is again grounded in order to operate the seventh counting relay R3610–7 and at the end of the sensing of the fourth Z character, the eighth counting relay R3610–8 is operated and locked in series with the seventh counting relay R3610–7.

The fifth character X sensed by the tape reader 3420 controls the sensing relays 3501 so that ground potential is applied to conductor C3601 in order to operate the ninth counting relay R3610–9 and at the end of the sensing cycle, the tenth counting relay R3610–10 is operated in series with the ninth counting relay.

The sixth character Z of the start-of-message indicator sensed by the tape reader 3420 controls the sensing relays 3501 so that ground potential is applied to the conductor C3604 in order now to operate the eleventh counting relay R3610–11 and at the end of the sensing cycle, the latter relay locks itself in series with the twelfth counting relay R3610–12. The relay R3610–12 completes an additional locking circuit for itself which includes its lower winding, contacts 3755, and ground at contacts 3736.

The seventh character X of the start-of-message indicator sensed by the tape reader 3420 controls the sensing relays 3501 so that ground potential is now applied to the conductor C3601 in order to operate the thirteenth counting relay R3610–13 and at the end of this sensing cycle, a locking circuit is completed which includes the winding of the relay R3610–13, contacts 3764, winding of the relay R3610–13, contacts 3764, winding of the counting relay R3610–14, contacts 3811, and ground at contacts 4033.

In view of the foregoing, it will be appreciated that if the tape reader 3420 senses a complete start-of-message indicator comprising seven characters XZXZXZX, the counting relays R3610–1 to R3610–14, inclusive, will be operated in sequence. It should be noted, however, that as soon as the thirteenth counting relay R3610–13 operates, it interrupts, at its contacts 3761 and 3762, points in the previously described holding circuits for the remaining counting relays which are alternately locked to the conductors C3602 and C3603. All of the remaining counting relays now restore to normal but since the twelfth counting relay R3610–12 is locked over an independent locking circuit including its lower winding, it does not restore to normal until after the tenth counting relay R3610–10 restores. As a further result of the operation of the fourteenth counting relay R3610–14, it now prepares, at its contacts 3777, a point in the circuit for controlling the magnet M4132 of the start-of-message character counter 4130. The character counter 4130 is provided so that it will count characters and "blanks" sensed by the tape reader 3420 after a complete start-of-message indicator has been sensed and registered by the operation of the counting relays R3610–13 and R3610–14.

The first character or "blank" sensed by the tape reader 3420 following the final character X of the start-of-message indicator controls the relay R3560 and perhaps one or more of the other relays of the sensing relays 3501. As previously noted, the relay R3560 operates on every sensing cycle whether a character is sensing or whether a "blank" is sensed. At its contacts 3565, the relay R3560 completes a circuit, including the contacts 3828, 3777 of the new operating counting relay R3610–14 and the winding of the magnet M4132, to battery. At the end of the sensing cycle, the relay R3560 restores to normal and, at its contacts 3565, interrupts the operating circuit for the magnet M4132. The magnet now restores to normal and advances its wiper 4131 in a clockwise direction one step from its home contact position. Each time the relay R3560 operates in response to the sensing of a character or a "blank" by the tape reader 3420, the magnet M4132 operates and restores. Consequently, the wiper 4131 is advanced step-by-step until approximately 32 characters or "blanks" have been counted. When this occurs, the wiper 4131 will engage the contact 32 and complete an obvious circuit for operating the control relay R4140. As soon as the relay R4140 operates, it locks itself over a circuit including its contact 4142 to ground at contacts 3944. Also, at its contacts 4143, the relay R4140 prepares a point in the locking circuits for the end of message relay R3810 and the character space relay R3820. Finally, at its contacts 4141, the relay R4140 prepares a point in the circuit for operating the character space relay R3820.

After the tape reader 3420 senses an additional 16 characters or "blanks" to control the relay R3560 16 additional times, the magnet M4132 will have positioned its wipers 4131 into engagement with its contacts 48. In this position the wiper 4131 completes a circuit including the contacts 4141 for operating the relay R3820. Upon operating, the relay R3820 locks itself by way of its contacts 3827 to ground at contacts 4143.

As a further result of the operation of the relay R3820, at its contacts 3821, it interrupts a point in the previously traced circuit including the conductor C3402–CLU, thereby to interrupt the circuit for the magnet M3425 in order to terminate further sensing of the tape 3413 by the tape reader 3420. The reperforator 3410, however, may continue to perforate the tape 3413 as long as signals are received over the conductor C3402–RPF. The tape that is processed by the reperforator 3410 is accumulated in the tape storage bin 3419 in the same manner as the tape 333 is accumulated in the tape storage bin 343 in the incoming line circuit 400.

At its contacts 3822, the relay R3820 connects the conductor C3402–CLU to an alternate circuit including the contacts 3831, the contacts 3942 (closed by the relay R3940 at the time the terminal equipment 4460 of the L1 outgoing line is in condition to respond to the information appearing on the tape 3413) and the conductor R3902–CL extending to Fig. 43. Also, at its contacts 3823, the relay R3820 prepares a point in the incomplete circuit for the tape feed out relay R3850 which circuit will be completed in the event that the seizure relay R3870 is restored and in the event that the tight tape switch 3427 has encountered a tight tape condition and has closed its contacts 3421.

At its contacts 3828, the relay R3820 interrupts a point in the operating circuit for the magnet M4142 thereby to prevent the character counter 4130 from counting additional characters in the event that the operation of the tape reader 3420 is subsequently restarated.

At its contacts 3829, the relay R3820 now completes a self-interrupting circuit for the magnet M4132 so that the wiper 4131 of the start-of message character counter 4130 may be restored to its home contact position. This circuit includes ground at contacts 4133, off-normal contacts ON4134 (closed when the wiper 4131 is not in its home contact position) contacts 3829 and 3816, and the winding of the magnet M4132, to battery. This self-interrupting circuit is substantially the same as those previously described and it will be understood that the magnet M4132 operates and restores to advance its wiper 4131 step-by-step in a clockwise direction until the wiper engages its home contact position and thereby terminates the stepping action of the magnet M4132 by opening the off-normal contacts ON4134.

As a further result of the operation of relay R3820, at its contacts 3823', it completes a self-interrupting circuit for the magnet M4112 in order to restore the wiper of the end-of-message character counter 4110 to normal. Before considering the self-interrupting circuit for the magnet M4112, attention is directed to the fact that during the operation of the tape reader 3420 and the sensing relay 3501 to sense the start-of-message indicator (XZXZXZX), the relay R3570 operated during the sensing of each character to close its contacts 3575. Each time the contacts 3575 are closed, a ground pulse is transmitted over a circuit including the contacts, 3778, 3822', and 3838 in order to operate the magnet M4112. Consequently, the magnet M4112 is operated and restored the same number of times as the relay R3570. Each time the magnet M4112 operates and restores, it advances its wiper 4111 one step in a clockwise direction. At the end of the sensing of the start-of-message indicator the wiper 4111 will be in engagement with its contact 7. However, when the counting relay R3610–14 is operated to indicate a successful registraton of a start-of-message indicator, it opens its contacts 3878 in order to terminate further stepping of the magnet M4112 during the interval that the start-of-message character counter 4130 counts approximately 48 characters or "blanks."

In view of the foregoing it will be appreciated that the wiper 4111 of the end-of-message character counter 4110 may be in an off-normal position at the time the relay R3820 is operated. Consequently, when the contacts 3823' are closed by the operation of relay R3820, a circuit will be completed from battery by way of the winding of the magnet M4112, contacts 2833', 3818 and 4113 and the off-normal contacts 4115 to ground. The magnet M4112 is now self-interruptedly operated and restored to advance the wiper 4111 advanced step-by-step until it again reaches its home contact position to restore the off-normal contacts ON4114 and ON4115 to the position illustrated in the drawings. When this occurs, the self-interrupting circuit for the magnet M4112 will be terminated.

Finally, at its contacts 3826, the relay R3820 now completes a circuit including the winding of the test relay R3930, contacts 3826 and 3892, conductor C3802–IDL extending to Fig. 43, contacts 4314, the wiper 4324 of the outgoing selector 4300 in engagement with the contact 1, the conductor IDL in the cable 4390, the normally closed contacts of the jack J4332, and contacts 4352 and 4362, to ground. The test relay R3930 operates over this circuit in order to indicate to the cross-office unit 3400 that the L1 outgoing line is idle and in condition to transmit signals thereover to the next switching center.

In the above described circuit it was pointed out that the IDL conductor in the cable C4390 is grounded. This conductor as well as all other conductors terminating in the contacts of the banks of the outgoing selector 4300 are all multiplied to corresponding contacts of the banks of all other outgoing selectors which are individually associated with all of the cross-office units in the relay switching center UAC. Consequently, if other cross-office units, similar to the cross-office unit 3400, have their associated outgoing selectors in engagement with the contacts 1 terminating the conductors of the L1 outgoing line, the ground potential applied to the conductor IDL in the cable C4390 completes a circuit for operating the test relays, such as the relay R3930, in all of the cross-office units which are conditioned to transmit signals over the L1 outgoing line. If one of the cross-office units is connected to the L1 outgoing line and is transmitting a message thereover, the cut-off relay R4360 will be operated to open its contacts 4362 and will thus mark the outgoing line busy by preventing operation of relay R3930.

In the cross-office unit 3400, the test relay R3930, upon operating, applies ground potential, at its contacts 3935, to the wiper 4214 of the precedence marking switch 4210 and, at its contacts 3936, it applies negative 48 volt battery (with grounded positive terminal) potential by way of the resistor 3954 to the wiper 4213 of the precedence marking switch 4210. Corresponding circuits are completed in all of the remaining cross-office units in which the test relays, similar to the relay R3930, have been operated. If the precedence marking switch 4210 has previously positioned its wipers into engagement with the contacts 1 to indicate a "deferred" precedence, the negative battery potential applied to the wiper 4213 completes a circuit including the contacts 4281, the winding of the deferred relay R4270, the rectifier 4206 and the negative terminal of the 24 volt battery, to ground. In this circuit the rectifier 4206 acts as a low resistance and passes sufficient current to permit the deferred relay R4270 to operate. The same circuit will be completed in the other cross-office units if the associated precedence marking switches are positioned in engagement with the contacts 1. A branch of the above described circuit includes the winding of the routine relay R4260 and the rectifier 4205, but the last mentioned rectifier is connected in a reverse manner so that it acts as a high resistance and thus, prevents operation of the routine relay R4260.

In addition to the above described circuit for controlling the operation of the deferred relay R4270, the resistance battery potential applied to the wiper 4213 is also extended by way of the conductor C4201–NMR extending to Fig. 43, contacts 4317, wiper 4327, the NMR conductor which is multiply connected to all other outgoing selectors. In the outgoing selectors connected to the L1 outgoing line, the resistance battery is further extended over similar paths to operate the deferred relays in each of cross-office units connected to the L1 outgoing line. Consequently, regardless of the position of the precedence marking switch in the said other cross-office units, connected to the L1 outgoing line, the deferred relay therein, such as the relay R4270, will be operated under control of the resistance battery applied to the wiper 4213 of the precedence marking switch 4210.

If the wipers of the precedence marking switch 4210 are positioned into engagement with the contacts 2, the routine relay R4260 will be operated over a circuit including the grounded wiper 4214, contacts 4281, the winding of the relay R4260, rectifier 4205 and the negative terminal of the 24 volt battery, to ground. In this circuit the rectifier 4205 acts as a low resistance and passes sufficient current to permit the relay R4260 to operate. The branch circuit including the winding of the deferred relay R4270 includes the oppositely connected rectifier 4206 which acts as a high resistance to the direction of the current flow through the winding of the relay R4270. Consequently, the relay R4260, instead of the relay R4270, operates to indicate the "routine" precedence. The ground potential applied to the wiper 4214 is also extended by way of the conductor C4201–NMR over the previously traced circuits to operate the routine relays, similar to relay R4260, in all other cross-office units connected to the L1 outgoing line.

If the wipers of the precedence marking switch 4210 are in engagement with the contacts 3, the resistance battery applied to the wiper 4213 will complete a circuit including the contacts 4282 in order to operate the priority relay R4250 in the manner described above. This resistance battery potential will also be connected by way of the conductor C4201–POP and the outgoing selector 4300 to the other cross-office units connected to the L1 line in order to operate the corresponding priority relays thereat.

If the wipers of the precedence marking switch 4210 are positioned into engagement with the contacts 4, the wiper 4214 will apply ground potential by way of the contacts 4282 in order to operate the operational immediate relay R4240 and a corresponding circuit will be completed by way of the conductor C4201–POP and the outgoing selector 4300 to the other cross-office units connected to the L1 outgoing line in order to operate the associated operational immediate relays, such as the relay R4240.

If the wipers of the precedence marking switch are positioned into engagement with the contacts 5, the resistance potential battery applied to the wiper 4213 will be extended by way of the contacts 4283 in order to operate the emergency relay R4230 in the manner previously explained. The resistance battery potential is also extended by way of the conductor C4201–FEM and the outgoing selector 4300 to the other cross-office units connected to the L1 outgoing line in order to operate the associated emergency relays, such as the relay R4230.

Finally, if wipers of the precedence marking switch are positioned into engagement with the contacts 6 ground potential applied to the wiper 4214 is extended by way of the contacts 4283 in order to operate the flash relay R4220. This ground potential is also extended by way of the conductor C4201–FEM and the outgoing selector 4300 to all of the other cross-office units connected to the L1 outgoing line in order to operate the associated flash relays, such as the relay R4220.

In view of the foregoing description of the operation whereby the precedence registered on the precedence control relays R4220 to R4270, inclusive, indicative of the precedence of the messages stored in the cross-office unit 3400, it should be understood that the corresponding relays in all other cross-office units connected to the L1 outgoing line will also be operated. Conversely with the precedence registered in all of the said other cross-office units will also control the precedence control relays R4220 to R4270, inclusive, in the cross-office unit 3400. This arrangement is provided in the present system to allot the various crossoffice units connected to the L1 outgoing line in the order of the precedence registered in the associated cross-office units. In other words, when the cross-office unit 3400 is attempting to transmit its message over the L1 outgoing line, it will be prevented from doing so if any other cross-office unit connected to the L1 outgoing line has registered therein a message of higher precedence. In order to accomplish this result, a common motor driven commutator cam arrangement (not shown) is provided to apply a 25 millisecond ground pulse to the conductor C3972 (Fig. 39). This motor driven commutator is also provided with additional cams whereby 25 millisecond pulses are transmitted in sequence to corresponding conductors of all other cross-office units in the system. In other words, only one cross-office unit will have its conductor C3972 grounded at any one time.

Referring now to Fig. 39, it will be seen that the ground pulse applied to the conductor C3972 is extended by way of the contacts 3934 through one or more of the contacts 4222, 4232, 4242, 4252, 4262 or 4271 depending upon the operated condition of the precedence control relays R4220 to R4270, inclusive, the wiper 4211 of the precedence marking switch 4210, the contact 1 engaged by the wiper 4211 (assuming the registration of a "deferred" message in the cross-office unit 3400) and then by way of the contacts 4261, 4251, 4241, 4231 and 4221, the upper winding of the test guard relay R3940, contacts 3914, the conductor C3902–G extending to Fig. 43, contacts 4313, wiper 4323, the G conductor in the cable C4390, normally closed contact of the jack J4333, and the winding of the guard relay R4350, to battery.

The above traced circuit for operating the relays R4350 and R3940 includes the contacts 4221, 4231, 4241, 4251 and 4261 of the flash relay R4220, the emergency relay R4230, the operational immediate relay R4240, the priority relay R4250 and the routine relay R4260. If any of the above noted relays have been operating by other cross-office units to indicate that a higher precedence message is registered in one of the other cross-office units connected to the L1 outgoing line, then the above traced circuit for the test guard relay R3940 and the guard relay R4350 will not be completed for the cross-office unit 3400. However, if the precedence marking switch 4210 of the cross-office unit 3400 is positioned to the contacts 6 to indicate the registration of a "flash" precedence message, then the above traced circuit will by-pass the contacts controlled by all lower precedence control relays. Since the commutator cam only applies ground potential to the conductor C3972 of the cross-office unit 3400 at the present moment, the test guard relay R3940 will now operate in series with the guard relay R4350 to permit the cross-office unit 3400 to have exclusive control of the L1 outgoing line. Operation of the corresponding flash relay in the other cross-office units under control of the cross-office unit 3400 will prevent the other cross-office units from gaining access to the L1 outgoing line for the purpose of transmitting a message thereover until the cross-office unit 3400 has released itself from the L1 outgoing line.

Consequently, the motor driven commutator cam arrangement in applying ground potential to the various cross-office units in succession will permit each cross-office unit connected to the L1 outgoing line to test the remaining cross-office units connected to the same line in order to determine whether or not it has the highest precedence message awaiting transmission over the L1 outgoing line or whether some other cross-office unit connected to the L1 outgoing line has a higher percedence message and should be permitted to transmit the message stored therein before the transmission of any other lower precedence messages.

Before concluding the description of the precedence control relays R4220 to R4270, inclusive, it should be noted that the flash and emergency precedence control relays R4220 and R4230 are connected in parallel to a single control conductor which may have either ground or resistance battery applied thereto, from the contacts of the test relay R3930 and which may also have ground or resistance battery applied thereto by way of the conductor C4201–FEM from some other cross-office unit. For example, if the negative terminal of the 48 volt battery is connected by way of the resistor 3954, contacts 3936, the wiper 4213, contacts 4283 to the mid-point between the windings of the flash relay R4220 and the emergency relay R4230 and if another cross-office unit applies ground potential by way of the conductor C4201–FEM and contacts 4283 to the mid-point between the above noted relays, this mid-point will be at a positive potential with respect to the negative terminal of the 24 volt battery connected to the other terminals of the windings of the above noted relays. Consequently, the current flow through the winding of the emergency relay R4230 will be blocked by the high resistance action of the rectifier 4202 whereas, the current will readily flow through the winding of the flash relay R4220 due to the fact that the rectifier 4201 will act as a low resistance. In other words, of the two relays R4220 and R4230, the relay corresponding to the highest precedence will always operate if circuits are simultaneously completed for operating the two relays. The same condition exists if the ground potential is supplied from the contacts 3935 of the cross-office unit 3400 and a flash precedence is registered in the precedence marking switch 4210 and some other cross-office unit has an emergency precedence registered in its associated precedence marking switch and attempts to operate the emergency relay R4230 of the cross-office unit 3400. In this case the flash relay R4220 would also operate. Identical circuits are also provided for controlling the pair of relays comprising the operational immediate relay R4240 and the priority relay R4250, as well as the pair of relays comprising the routine relay R4260 and the deferred relay R4270. In each pair of relays, the relay of the highest order of precedence will be operated if circuits are simultaneously completed for both relays of each pair.

In conclusion, it should be understood that when the 25 millisecond ground potentials is applied to the conductor C3972, the cross-office unit 3400 will seize the L1 outgoing line by operating the test guard relay R3940 and the guard relay R4350 only if the precedence registered in the cross-office unit 3400 is the highest precedence registered in any other cross-office unit connected to the L1 outgoing line. If it does not have the highest precedence then it will not seize the L1 outgoing line and after the ground pulse is removed from the conductor C3972 it must wait until the ground pulse has been sequentially applied to all of the other cross-office units connected to the L1 outgoing line. The particular cross-office unit having the highest precedence message will then take control of the L1 outgoing line and it will transmit its message thereover. When the outgoing line is again freed, the next ground pulse applied to the conductor C3972 will permit the cross-office unit 3400 to again test the precedence registered in all cross-office units connected to the L1 outgoing line and if it now registers the highest precedence, it will seize the outgoing line for its exclusive use.

In view of the foregoing it will be appreciated that the test guard relay R3940 will operate in series with the guard relay R4350 only when the precedence registered in the cross-office unit 3400 is the highest precedence of all cross-office units connected to the L1 outgoing line. For the purpose of this description it will be assumed, however, that the present message is of a "deferred" precedence, which is the lowest precedence, and that no other cross-office unit connected to the L1 outgoing line registers a higher precedence message. When the relay R3940 operates in series with the relay R4350, at its contacts 3948, it locks itself, by way of the contacts 4035, to ground at contacts 3833. This locking circuit includes the lower winding of the relay R3940 in series with the relay R4350 and thereby renders the circuit including its upper winding and the contacts of the precedence marking switch 4210 ineffective. At its contacts 3936, the relay R3940 completes a locking circuit for the character space relay R3820; at its contacts 3947, it completes an obvious circuit for operating the relay R3950; and, at its contacts 3947, a circuit including the contacts 3933 is completed for preenergizing the open line relay R4010. The relay R3950 operates at this time and locks itself, over a circuit including its lower winding, contacts 3952 and 4035, to ground at contacts 3833.

As a further result of the operation of relay R3940, at its contacts 3942, it connects the control relay R4470 of outgoing line number transmitter 4430 to the magnet M3425 of the tape reader 3420. This circuit may be traced from ground, winding of the magnet M3425, conductor C3402–CLU extending to Fig. 38, contacts 3822, 3831 and 3942, conductor C3902–CL extending to Fig. 43, contacts 4312, wiper 4322 of the outgoing selector 4300, conductor CL in the cable C4390, normally closed contacts on the jack J4331, conductor C4365–CL, the winding of the timer control relay R4496 of the timer T4495, conductor C4365'CL, the upper and lower windings of the control relay R4470, and the resistor 4473, to battery. When this circuit is completed the control relay R4470 operates but due to the high resistance of its upper winding, the magnet M3425 and relay R4496 do not operate. Further operations under control of the relay R4470 will be described hereinafter.

As a further result of the operation of the relay R3940, at its contacts 3941, it completes a circuit including the conductor C3402–TD and the lower winding of the open line relay R4010. This circuit may be traced from ground at the outgoing transmitter 3430 by way of the normally closed contacts 3490, conductor C3402–TD extending to Fig. 39, contacts 3941, the lower winding of the open line relay R4010 in multiple with the condenser 4012, conductor C4002–SIG extending to Fig. 43, contacts 4311, wiper 4321, the SIG conductor in the cable C4390, normally closed contacts of the jack J4330, the contacts 4353, conductor C4366–SIG, contacts 4498 of the timer T4495, contacts 4434 of the number transmitter 3430, the upper winding of the send relay R4440 and the winding of the magnet M4453 in the monitor unit 4450, to battery. The above traced circuit retains the sending relay R4440 and the magnet M4453 in their operated positions, and the open line relay R4010 now operates. However, it should be noted that this circuit includes the contacts 4353 of the guard relay R4350. It will be recalled that the guard relay R4350 operated in series with the test guard relay R3940. Incident to its operation, the guard relay R4350 completes, at its contacts 4351, an obvious circuit for operating the cut-off relay R4360; it transfers the circuits including the contacts 4356 and 4357 as illustrated in Fig. 32; at its contacts 4354, it disconnects the resistor 4355 and the ground potential from the conductor C4366–SIG and transfers the signal conductor C4366–SIG to the conductor SIG in the cable C4390. Finally, at its contacts 4352, the guard relay R4350 removes ground potential from the conductor IDL in the cable C4390 in order to indicate to other cross-office units connected to the L1 outgoing line that it is busy in handling the message stored in the cross-office unit 3400. Also, the removal of ground potential from the IDL conductor in the cable C4390 causes the slow-to-release test relay R3930 in the cross-office unit 3400 to slowly restore to normal.

As a further result of the operation of relay R3940, at its contacts 3944, it removes the locking ground potential from the control relay R4140 to permit the latter relay now to restore to normal. Finally, at its contacts 3949 and 3941', it applies ground and resistance battery potential respectively to the wipers 4214 and 4213 of the precedence marking switch 4210 in order to retain the precedence marking of the cross-office unit 3400 after the test relay R3930 restores to normal. This precedence marking will also be retained in all of the other cross-office units connected to the L1 outgoing line.

When the slow-to-release test relay R3930 restores to normal as a result of the seizure of the L1 outgoing line by the cross-office unit 3400, it connects the cancel transmission relay R3960, at its contacts 3931, to various contacts controlled by the precedence control relays R4230 to R4270, inclusive. This circuit, however, is only effective in the event that the precedence marking switch 4210 has its wiper 4212 in engagement with the fourth, fifth or sixth contact corresponding respectively to the operational immediate, emergency and flash precedence indicators. In the present example, the cancel transmission relay R3960 can not be operated since it has been assumed that the precedence marking switch 4210 is set to register the "deferred" precedence.

*Operation of the number transmitter 4430*

In the above description it was pointed out that the control relay R4470 of the number transmitter 4430 operated in series with the timer control relay R4496 in the timer T4495 and the magnet M3425 of the tape reader 3420. The timer control relay R4496 will operate subsequently when the high resistance upper winding of the relay R4470 is removed from the circuit of relay R4496. Upon operating, the relay R4496 conditions the timer T4495 so that it will open the contacts 4497 when the timer has performed its various operations at the termination of the transmission of the present message over the L1 outgoing line.

When the control relay R4470 operates, as noted above, it completes, at its contacts 4471, a circuit including the contacts 4476 and 4482 for operating the relay R4465. The latter relay upon operating prepares, at its contacts 4467, a locking circuit including the winding of the relay R4461, the contacts 4434', and the winding of the magnet M4433. This last-mentioned locking circuit, however, will not be completed until the initial operating circuit for the relay R4465 is interrupted. As a further result of the operation of relay R4465, at its contacts 4468, it completes a circuit including the contacts 4472 for operating the relay R4480. As soon as the relay R4480 operates, it completes, at its contacts 4483, an additional locking circuit for the relay R4480 and, at its contacts 4482, it interrupts the initial operating circuit for the relay R4465. Consequently, the relay R4465 now locks itself over the above traced circuit including the winding of the relay R4461 and the winding of the magnet M4433 to ground. The magnet M4433 and the relay R4461 both operate in series with the relay R4465. Upon operating the relay R4461, at its contacts 4462, completes an obvious circuit for operating the relay R4475. Operation of the magnet M4433 controls the number transmitter 4430 to automatically transmit a start-of-message indicator, comprising the seven characters XZXZXZX; a two or three letter channel or line identifying indicator; a three digit channel number indicator comprising a "figures shift" character and three digits, for example, the digits 003 indicative of the third message transmitted over the L1 outgoing line during a 24 hour period.

In the number transmitter 4430, the storage reel 4431 contains a preperforated tape which is arranged to transmit the above information in a predetermined sequence when the magnet M4433 operates. This information is sequentially perforated on the tape so that each three digit channel number indicator will successively include three different digits, whereby, the first message will be given the number 001, the second message the number 002, etc., to 999 for any 24 hour period. If it is assumed that the message to be transmitted from the cross-office unit 3400 over the L1 outgoing line is the third message, then the channel number indicator will be the digits 003. Each succeeding message will be given the succeeding channel number indicator. As the information is sensed by the number transmitter 4430, the associated mechanism opens the contacts 4434 so that the remaining unnumbered contacts shown to the right thereof will be controlled in code form to restore and reoperate the send relay R4440 and the magnet M4453 of the monitor unit 4450. Consequently, at its contacts 4441, the send relay R4440 repeats signals in code form over the L1 outgoing line to the next switching center. Since the magnet M4453 in the monitor unit 4450 operates in synchronism with the send relay R4440 it controls the perforation of the associated tape contained on the storage reel 4451 in code form in accordance with all of the items of information transmitted over the L1 outgoing line by the send relay R4440. As the tape of the monitor unit 4450 is perforated, it is wound upon the take-up reel 4452 and this tape may be utilized to check each of the messages transmitted over the L1 outgoing line in the event that any message becomes mutilated or lost at subsequent switching centers. During the above transmission by the number transmitter 4430, the take-up reel 4432 winds the tape thereon as it is fed from the tape storage reel 4431. The last item of information perforated on the tape associated with the number transmitter 4430 is a "letters shift" character which actuates five pins (not shown) and mechanically opens the contacts 4434' included in the circuit of the magnet M4433. In addition thereto, it recloses the contacts 4434 in order to retain the operating circuit for the send relay R4440 and the magnet M4453. At this time the number transmitter 4430 has fed sufficient tape to place another start-of-message indicator, two or three letter channel identity indicator, and the next three digit channel number indicator in position to be transmitted at the beginning of the next message transmitted over the L1 outgoing line.

As soon as the contacts 4434' are opened by the number transmitter 4430, the locking circuit for the relays R4461 and R4465 is interrupted whereupon these relays restore to normal. At the contacts 4463 and 4466, these relays now complete a short-circuit including the contacts 4481 for the upper winding of the relay R4470. Consequently, the high resistance upper winding of the relay R4470 is now removed from the circuit including the conductor C4365'CL thereby to permit the magnet M3425 of the tape reader 3420 and the timer control relay R4496 to now operate. In the number transmitter 4330, the relay R4470 is held in its operated position over the circuit including it slower winding and the magnet M3425, and the relay R4480 is held in its operated position over a circuit including the contacts 4483 and 4472. Thus, the relay R4470 will remain in its operated position in series with the timer control relay R4496 until the circuit including the conductor C4365–CL is interrupted.

*Transmitting the message from the outgoing transmitter 3430*

In the above description of the operation of the number transmitter 4430 to transmit a start-of-message indicator, a two or three letter channel or line identity code, and a three digit channel number indicator, it was pointed out that the high resistance upper winding of the relay R4470 was short-circuited after the above noted items of information have been transmitted. The removal of the high resistance upper winding of the relay R4470 from the previously traced circuit including the conductor C4365'CL permits the magnet M3425 of the tape reader 3420 to operate. It was also pointed out that the tape reader 3420 was initially controlled to sense the tape 3413 in order to detect the start-of-message indicator perforated thereon by the cross-office reperforator 3410. This start-of-message indicator was detected by the sensing relays 3501 in conjunction with the counting relays R3610–1 to R3610–14, inclusive and when a successful start-of-message indicator was detected, the start-of-message character counter 4130 thereafter counted 48 characters or "blanks" sensed by the tape reader 3420.

In the present system the tape reader 3420 and the outgoing transmitter 3430 are physically spaced apart a distance equal to 48 characters spacings on the tape 3413 so that the tape 3413 when stepped 48 character spaces will be advanced beyond the sensing pins (not shown) of the outgoing transmitter 3430. In other words, during the joint operation of the tape reader 3420 and the outgoing transmitter 3430, the seven XZXZXZX characters of a start-of-message indicator sensed by the tape reader 3420 will thereafter be stepped 48 spaces to move the start-of-message indicator beyond the sensing pins of the outgoing transmitter 3430. Although the outgoing transmitter 3430 responds to the characters of the start-of-message indicator on the tape 3413 and retransmits them over the conductor C3402–TD they have no effect due to the fact that the test guard relay R3940 does not close its contacts 3941 until after the 48 characters or "blanks" have been counted. The following items of information which includes the two or three letter channel or line identifying code and the three digit channel number indicator (001) are positioned so that they will now be transmitted by the outgoing transmitter 3430 when the magnet M3425 is reoperated by the control relay R4470.

The magnet M3425 in its operated position completes an obvious circuit at its contacts 3426 for operating the magnet M3427 of the outgoing transmitter 3430. As long as the magnet M3425 is in its operated position, the tape reader 3420 will continue to sense and feed the tape 3413 to the outgoing transmitter 3430 and as long as the magnet M3427 is operated, the outgoing transmitter 3430 will sense the tape feed thereto and transmit coded signals over the conductor C3402–TD in the conventional manner under control of the six contacts shown to the right of the magnet. It will be appreciated, however, that the circuit for controlling the magnet M3427 may be controlled by an additional contact included with the six contacts connected to conductors C3401–RA to C3401–RF so that the magnet M3427 will be operated each time the tape reader performs its cyclic operation in sensing a character. At the start of the sensing of each character by the outgoing transmitter 3430, the normally closed contacts 3490 are first opened and at the end of the sensing of each character, the contacts 3490 are automatically reclosed. The remaining unnumbered normally open contacts multiply connected to the conductor C3402–TD are controlled individually in a predetermined sequence depending upon the code perforations on the tape 3413 to transmit code signals to the send relay R4440.

Under control of the contacts associated with the conductors C3401–RA to C3401–RF, inclusive, the tape reader 3420, as it senses the tape 3413, controls the sensing relays 3501. Actually the function of the tape reader 3420 during this operation is to sense the tape 3413 to search for an end-of-message indicator comprising the "letters shift" character followed by seven "commas." In other words, the sensing relays 3501 in conjunction with the counting relays R3610–1 to R3610–12, inclusive, will complete an operating circuit for the end-of-message relay R3810 in response to the sensing of a complete end-of-message indicator.

The signal circuit over which the outgoing transmitter 3430 repeats the code signals perforated on the tape 3413 includes ground, contacts 3490, conductor C3402–TD extending to Fig. 39, contacts 3941, lower winding of the open line relay R4010, conductor C4002–SIG extending to Fig. 43, contacts 4311, wiper 4321, conductor SIG in the cable C4390, normally closed contacts of the jack J4330, contacts 4353, conductor C4366–SIG, contacts 4498 of the timer T4495, conductor C4466'SIG, contacts 4434, the upper winding of the send relay R4440 and the winding of the magnet M4453, to battery. As the outgoing transmitter 3430 senses the tape 3413, it will transmit in the order named the two or three letter code identifying the incoming line over which the message was received from the switching center UEP; the three digit channel number indicator (001) indicating the number of the message as received at the switching center UAC; the precedence indicator, which in the present case is the "deferred" precedence (NMNM); the routing indicator, which in this case is the routing indicator JWPA, and the body of the message. Included in the above information transmitted by the outgoing transmitter 3430 over the L1 outgoing line are the usual "carriage return," "line feed," "letters shift," "figures shift," "blank," and "space," character functions which are necessary in transmitting telegraph messages. After the body of the message has been retransmitted by the outgoing transmitter 3430, it will retransmit a two digit number indicative of the day of the month, and followed by a four digit number indicative of the time of day that the message was transmitted over the incoming line to the relay switching center UAC from the switching center UEP. All of the foregoing information including the start-of-message indicator and the end-of-message indicator has been transmitted from the incoming line retransmitter 360 to the cross-office reperforator 3410 and stored on the tape 3413.

As the date and time of day information is being retransmitted by the outgoing transmitter 3430, the tape reader 3420 may begin to sense or it may have completed the sensing of the characters comprising the end-of-message indicator ("letters shift" character followed by seven commas) in order to indicate to the cross-office unit 3400 that the end-of-message has been reached by the tape reader 3420.

*Sensing an end-of-message indicator in the cross-office unit 3400*

As the outgoing transmitter 3430 senses and retransmits the message perforated on the tape 3413 over the L1 outgoing line, the tape reader 3420 also senses the tape 3413 and thereby controls the sensing relays 3501. These relays are operated in code combinations in the manner previously described in accordance with the perforations of the various items of information on the tape 3413, but they are effectively controlled only by a start-of-message indicator, as previously described, and an end-of-message indicator. Consequently, the tape reader 3420 periodically applies ground potential to the conductor C3401–RA to C3401–RF, inclusive, in code combinations in accordance with the different characters perforated on the tape. When "figures shift" character function is sensed by the tape reader 3420, the relays R3510, R3520, R3540, R3550, R3560, R3570 of the sensing relays 3501 are operated in the manner previously explained. At the contacts 3518, 3528, 3548 and 3558, the relays R3510, R3520, R3540 and R3550, complete a circuit including the contacts 3565 for operating the relay R3570. It should be understood, that the relay R3560 is operated every time the tape reader 3420 senses any character or "blank" on the tape 3413. The relay R3570, at the contacts 3574, completes the usual locking circuit for the upper windings of the operated relays R3510 to R3550, inclusive, in order to retain the last-mentioned relays in their operated positions until the end of the sensing cycle of each character. As a further result of the operation of the various sensing relays 3501, a circuit is completed which may be traced from ground at contacts 3564 by way of the contacts 3514, 3524, 3534, 3544 and 3554, and the lower winding of the figures shift relay R3580, to battery. At its contacts 3586 and 3589, the operated figures shift relay R3580 prepares points in the circuits including the conductors C3601 and C3604, whereby, the counting relays R3610–1 to R3610–12, inclusive, will respond in pairs to seven successive commas sensed by the tape reader 3420.

At the end of the sensing cycle of the "figures shift" character function of an end-of-message indicator, all of the operated relays of the sensing relays 3501 restore to normal, except the figures shift relay R3580 which now remains in its operated position over a locking circuit including its upper winding, the contacts 3585 and ground at either the contacts 3563 or 3573.

Immediately following the "figures shift" character function, the tape 3413 is perforated, in code form, in accordance with seven successive commas of the end-of-message indicator. At this time it should be noted in the code illustrated on Fig. 46 that the perforations in the tape for a character N are the same as a comma. Normally, if the N is not preceded by a "figures shift" character function, the N character will be printed on the tape. However, the "figures shift" character function preceding the code for the character N will control the reperforator 3410 to print a comma on the tape. In other words, the cross-office reperforator 3410 which is controlled to perforate the tape 3413 in accordance with the signals received over the conductor C3402–RPF also prints the different letters or digits corresponding to the code signals and in response to a "figures shift" character function it will print the corresponding punctuation or numerical designation, instead of the corresponding letter.

The first comma sensed by the tape reader 3420 controls the relays R3530, R3540, R3560 and R3570 in accordance with the code illustrated in Fig. 46. These relays now operate in the manner noted above, but since the figures shift relay R3580 is now in its operated position, the ground potential at the contacts 3548 and 3546 will lock the relay R3580 over a circuit including the contacts 3513, 3523, 3533, 3543, 3553 and 3585, even though the previously traced locking circuit is subsequently interrupted at the contacts 3563 and 3573. As a further result of the operation of the sensing relay 3501, ground potential at the contacts 3564 is now connected by way of the contacts 3515, 3525, 3535, 3545, 3555, and 3586 to the conductor C3601 and also by way of the contacts 3589 to the conductor C3604. Thus, each comma sensed by the tape reader 3420 will control the sensing relays 3501 to simultaneously apply ground potential to the conductor C3601 and C3604. Since the counting relays R3610–1 to R3610–12, inclusive, operate in substantially the same manner as the counting relays R490–1 to R490–12, inclusive, to detect a valid end-of-message indicator, it is not deemed necessary to repeat the description of the operating circuits for the relays R3610–1 to R3610–12, inclusive. Briefly stated, the first ground pulse of the first comma operates the counting relay R3610–1 and at the end of the sensing cycle, the ground is removed from the conductor C3601 in order to permit the second counting relay R3610–2 to operate and lock in series with the first counting relay R3610–1. The second ground pulse corresponding to the second comma sensed by the tape reader 3420 is also simultaneously applied to the conductors C3601 and C3604. This pulse, however, now completes the operating circuit for the third counting relay R3610–3 and at the end of the second comma the relay R3610–3 locks itself in series with the fourth counting relay R3610–4. The third comma sensed by the tape reader 3420 operates the fifth and sixth counting relay R3610–5 and R3610–6; the fourth comma operates the counting relay R3610–7 and R3610–8; the fifth comma operates the counting relays R3610–9 and R3610–10; and the sixth comma operates the counting relays R3610–11 and R3610–12. Normally, the seventh comma applies ground potential to the conductor C3601 in order to operate the counting relays R3610–13 and R3610–14. However, the last-mentioned counting relays are now locked in their operated positions due to the previous successful sensing of a start-of-message indicator. Also since the figures shift relay R3580 is in its locked position, the contacts 3588 thereof are opened in order to interrupt a point in the circuit including the contacts 3775 or 3776 of the counting relay R3610. However, the seventh comma sensed by the tape reader 3420, in applying ground potential to the conductor C3404, now completes a circuit including the contacts 3623, 3635, 3665, 3715, 3735, 3754 and 3582', of the operated relay R3580 in order to complete an operating circuit including the lower winding of the end-of-message relay R3810. The relay R3810 now operates and locks itself by way of a circuit including its upper winding and the contacts 3814 to ground at contacts 3946 of the operated test guard relay R3940.

In view of the foregoing it will be understood that when the tape reader 3420 senses a successful end-of-message indicator comprising a "figures shift" character function followed by seven commas, the end-of-message relay R3810 is operated to indicate to the cross-office unit 3400 that the end of the message has been sensed by the tape reader 3420. Incident to the operation of relay R3810, at its contacts 3811, it interrupts the locking circuit for the counting relays R3610–13 and R3610–14. The relay R3610–14 upon restoring to normal, opens its contacts 3771 and 3772 before the relay R3610–13 recloses its contacts 3761 and 3762. Consequently, all of the remaining operated counting relays R3610–1 to R3610–12, inclusive, restore to normal to prepare the counting relays to respond to the start-of-message indicator of the next message. If one or more additional messages are stored in the storage bin 3419, a new start-of-message indicator may be sensed by the tape reader 3420 while the end-of-message indicator of the present message is being advanced from the tape reader 3420 to the outgoing transmitter 3430. As previously noted, the actual spacing between the sensing pins of the tape reader 3420 and the sensing pins of the outgoing transmitter 3430 is equivalent to the spacing of 48 characters or "blanks" perforated in the tape 3413.

As a further result of the operation of relay R3810, at its contacts 3812, it prepares a point in the incomplete circuit for the alarm relay R3840 and, at its contacts 3813, it prepares a point in the incomplete circuit for the control relay R3830. Also, at its contacts 3817, the relay R3810 now prepares a point in the circuit for controlling the magnet M4112 of the end-of-message character counter 4110. The counter 4110 is connected in the circuit at this time so that it will count 41 character spaces (generally "blanks") and indicate to the cross-office unit 3400 that the end-of-message indicator of the present message is about to be sensed by the sensing pins of the outgoing transmitter 3430.

Since it is assumed in the present example that one or more additional messages are stored in the storage bin 3419 the slack tape switch 3427 will be in its actuated slack tape position to close the contacts 3422 and the tape reader 3420 will continue to read the tape as it is fed therethrough. Each "blank" space sensed by the tape reader 3420 applies ground potential to the conductor C3401–RF in order to operate the relay R3560. Whether or not any of the remaining relays of the sensing relays 3501 operate in accordance with some code, the relay R3560 will complete, at its contacts 3565, a circuit including the contacts 3817, 3821', and 3838 for operating the magnet M4112. Each time a "blank" or any other character function controls the relay R3560 the above traced circuit will be completed for the magnet M4112. Each time the magnet operates and restores it advances its wiper 4111 one step in a clockwise direction and as soon as the wiper is advanced from its home contact position the off-normal contacts ON4114 and ON4115 are closed and they remain closed until the wiper is again returned to its home contact position. After the first step of the wiper 4111, the off-normal contacts ON4114 supply a locking ground potential for the counting relays R3610–13 and R3610–14 in order to lock these relays in their operated position in the event that the next start-of-message indicator is successfully detected during the counting of the 41 character spaces on the tape 3413.

After 32 "blank" or character functions are counted by the character counter 4110 (following an end-of-message indicator) a circuit including the wiper 4111, the engaged contact 32 and the contacts 4144 is completed for operating the control relay R4120. This relay upon operating immediately locks itself by way of its contacts 4122, the contacts 4144 and the contacts 3834 to ground at the release key K4060. Also, at its contacts 4121, the relay R4120 prepares a further point in the operating circuit for the relay R3830.

The magnet M4112 continues to advance its wiper 4111 under control of the contacts 3565 on the relay R3560 in order to count nine additional characters or "blanks" on the tape 3413. When this occurs the wiper 4111 will be in engagement with its contacts 41 and will now complete the circuit including the contacts 4121 and 3813 for operating the control relay R3830. When this point in the stepping in the end-of-message character counter 4110 is reached, the tape 3413 will be advanced far enough toward the outgoing transmitter 3430 so that the entire message except for the end-of-message indicator will have been retransmitted by the outgoing transmitter 3430. In other words, the "figures shift" character function preceding the seven commas of an end-of-message indicator will be approximately one character space away from the sensing pins of the outgoing transmitter 3430.

During the counting of the 41 character spaces or blanks on the tape 3413 by the character counter 3112, the tape reader 3420, the sensing relays 3501 and the counting relays R3610–1 to R3610–4, inclusive, may have been controlled to register a successful start-of-message indicator for the next message. Thus, the counting relays R3610–13 and R3610–14 may now be operated and locked to the ground potential at the off-normal contacts ON4114 of the character counter 4110. When the new start-of-message indicator operates the counting relay R3610–14, a circuit including its contacts 3777 will now be completed for controlling the magnet M4132 of the start-of-message character counter 4130. This counter will then be controlled in parallel with the counter 4110 if the relay R3610–14 operates before 41 characters have been counted by the character counter 4110. This circuit includes ground at the contacts 3565, contacts 3815 and 3777, and the winding of the magnet M4132 and is in parallel with the operating circuit for the magnet M4112, which includes the contacts 3565, 3817, 3821' and 3838 and the winding of the magnet M4112.

As noted above, the relay R3830 will be operated by the end-of-message character counter 4110 prior to the time that the character counter 4130 reaches its contacts 32 and, when the relay R3830 operates, it locks itself by way of its contacts 3835 to ground at the off-normal contacts ON4115. As a further result of the operation of relay R3830, at its contacts 3834, it interrupts the locking circuit for the relay R4120 whereupon the latter relay restores to normal and interrupts at its contacts 4121 a further point in its initial operating circuit for the relay R3830. As a further result of the operation of relay R3830, at its contacts 3831, it interrupts a point in the previously traced circuit including in series the winding of the magnet M3425 of the tape reader 3420, the winding of the timer control relay R4496 of the timer T4495 and the lower winding of the control relay R4470 in the number transmitter 4430. Consequently, the magnet M3425, the relay R4496 and the relay R4470 restore. The magnet M3425 restores to normal in order to prevent further operation of the magnet M3427 associated with the outgoing transmitter 3430. This terminates further transmission by the outgoing transmitter 3430 of signals corresponding to perforations on the tape 3413.

The restoration of the timer control relay R4496 controls the timer T4495 so that it will now transmit over the L1 outgoing line, the day of the month, the clock time that the message is sent over the L1 outgoing line and then an end-of-message indicator. All of this information is preregistered in the timer T4495 and is only transmitted as a result of the restoration of relay R4496.

The restoration of the relay R4470 in the number transmitter 4430 interrupts the circuit for the relay R4480, at its contacts 4472 and the relay R4480, upon restoring, interrupts, at its contacts 4481, the short-circuit around the high resistance upper winding of the relays R4470. The number transmitter 4430 is now fully restored to normal and in condition to be reoperated to retransmit the information permanently recorded therein.

As a further result of the operation of the relay R3830, at its contacts 3832, it provides an alternative locking ground potential for retaining the counting relays R3610–13 and R3610–14 in their operated positions in the event they have been operated in response to a new start-of-message indicator. Also, at its contacts 3833, the relay R3830 interrupts the previously traced circuit including the lower winding of the test guard relay R3940 and the winding of the guard relay R4350 thereby to restore both relays. Also, the removal of ground potential at the contacts 3833, interrupts the locking circuit for the lower winding of the relay R3950. These relays now restore to normal, but before describing the circuits controlled thereby, it should first be noted that the relay R3830, at its contacts 3837, closes a parallel circuit for the magnet M4132 and, at its contacts 3839, it completes a self-interrupting home circuit for the magnet M4112. The last-mentioned circuit includes ground at the off-normal contacts ON4115, contacts 4113 and 3839 and the winding of the magnet M4112, to battery. The magnet M4112 operates and interrupts its operating circuit at its contacts 4113. The magnet now restores to normal and advances its wiper 4111 an additional step in the clockwise direction. This circuit is repeated to advance the wiper 4111 step-by-step until it again reaches its home contact position. When this occurs the off-normal contacts ON4114 are opened to remove the locking ground from the counting relay R3610–14 and the off-normal contacts ON4115 interrupt the circuit for the magnet M4112 in order to terminate further stepping of the wiper 4111. The removal of ground, at the off-normal contacts ON4115, upon the restoration of the wiper 4111 to its home contact position, interrupts the locking circuit for the relay R3830 which also restores to normal.

Referring now to the restoration of the relay R3940, it will be seen that, at its contacts 3941, it disconnects the signalling conductor C3402–TD of the outgoing transmitter 3430 from the circuit including the winding of the open line relay R4010. Thus, the relay R4010 included in the series circuit also restores to normal. At its contacts 3942, the relay R3940 interrupts a further point in the circuit including the conductor C3902–CL. At its contacts 3946, the relay R3940 also interrupts the locking circuits for the end-of-message relay R3810, which now restores to normal, and the character space relay R3820, which also restores to normal. At its contacts 3947, the relay R3940 interrupts the energizing circuit for the upper winding of relay R3950 so that this relay restores to normal when the locking circuit including its lower winding is interrupted by the relay R3830. Finally, at its contacts 3949 and 3941', the relay R3940 removes the ground and resistance battery potentials from the wipers 4214 and 4213 respectively of the precedence marking switch 4210.

At the present time the cross-office unit 3400 is now in condition to respond to the next message stored in the storage bin 3419 in the same manner as has been described previously. It should be noted, however, that the outgoing selector 4300, the selector switch 4050 and the precedence marking switch 4210 remain in their present operated positions inasmuch as the next message stored in the storage bin 3419 is the same precedence of the message described above and it is also to be transmitted over the same L1 outgoing line.

Before the L1 outgoing line is released so that it may be utilized to transmit a subsequent message, the timer T4495 must be operated through a predetermined cycle of operation before it controls the restoration of the cut-off relay R4360 associated with the L1 outgoing line. It will be recalled that the guard relay R4350 restored to normal at the same time that the test guard relay R3940 restored. The relay R4350, at its contacts 4353 and 4354, reconnects the ground potential by way of the resistor 4355 to the conductor C4366–SIG in order to retain the send relay R4440 and the magnet M4453 in their operated positions. Consequently, when the timer control relay R4496 restores in the manner previously described, the timer T4495 is automatically controlled to open its contacts 4498 and it controls the five unnumbered contacts to the right thereof in the conventional manner to transmit predetermined signals to the send relaly R4440 and the monitor unit magnet M4453. The predetermined signals transmitted under control of the timer T4495 comprise a two-digit number indicative of the day of the month, followed by a four-digit number indicative of the time of day that the message is transmitted over the L1 outgoing line, and then followed by an end-of-message indicator ("figures shift" function followed by seven commas).

When the above noted predetermined items of information have been transmitted by the timer T4495, it automatically recloses its contacts 4498 and it momentarily interrupts its contacts 4497. The former contacts retain the send relay R4440 in its operated position in order to retain control over the L1 outgoing line and the latter contacts momentarily interrupt the locking circuit for the lower winding of the cut-off relay R4360 so that the relay R4360 restores to normal. Restoration of the cut-off relay R4360 applies ground potential, at its contacts 4362 to the IDL conductor in the cable C4390 in order to indicate to all of the cross-office units connected to the L1 outgoing line that this line is now idle and may be utilized to transmit another message thereover. One of the cross-office units connected to the L1 outgoing line may now be controlled by a ground pulse applied to a conductor, such as the conductor C3972 (Fig. 39), by the motor driven commutator cam so that the highest precedence message may be transmitted over the L1 outgoing line.

The above described restoration of the relays R3940 and R4350 occured as a result of the operation of the control relay R3830 which relay operated when the end-of-message character counter 4110 counted 41 characters or "blank" spaces after the end-of-message indicator. Consequently, the signal circuit from the outgoing transmitter 3430, including the conductor C3402–TD, is opened when the end-of-message indicator on the tape 3413 has been advanced to within at least one step of the tape sensing pins (not shown) of the outgoing transmitter 3430. Further advancement of the tape 3413 through the tape reader 3420 is under control of the start-of-message indicator of a succeeding message stored in the storage bin 3419. Normally, the start-of-message indicator on the succeeding message will feed the end-of-message indicator of the preceding message through the outgoing transmitter 3430 without control of the transmitter to retransmit the end-of-message indicator over the L1 outgoing line. Thus, the end-of-message indicator on the tape 3413 is absorbed and a new substitute end-of-message indicator is instead transmitted over the L1 outgoing line by the timer T4495, which also transmits two-digits indicative of the day of the month and four-digits indicative of the time of the day that the message is retransmitted over the L1 outgoing line. It should be understood, however, that the timer T4495 may also be arranged to transmit additional information preregistered therein, such as the digits indicative of the month and year or any other desired information.

When the start-of-message indicator of the new succeeding message is successfully detected and registered in the cross-office unit 3400, the counting relays R3610–13 and R3610–14 operate and thereby control the cross-office unit 3400 to make the previously described precedence test in order to determine which one of the cross-office units connected to the L1 outgoing line has a highest precedence registered therein. The particular cross-office unit with the highest registered precedence and which is also connected to the L1 outgoing line will be automatically controlled to transmit its stored message in the manner previously described. As each cross-office unit connected to the L1 outgoing line clears out all of the messages stored in its tape storage bin, in the order of the highest precedence to the lowest precedence, it is returned to the pool of cross-office units and rendered available for use in storing one or more messages of like precedence to be transmitted over a particular outgoing line or in storing a single message if the message is of one of the three highest precedences.

*Operation of the cross-office unit 3400 in the event additional messages are not stored therein*

In the foregoing description of the operation of the cross-office unit 3400 it was assumed that one or more messages of the same precedence are stored in the storage bin 3419 at the time that the described message is being processed and transmitted over the L1 outgoing line. As long as additional messages are stored in the storage bin 3419 of a cross-office unit, no problem arises in connection with the feeding out of blank tape so that the end-of-message indicator of the described message will reach the tape reader 3420. In other words, the storage of additional messages provides sufficient slack in the tape 3413 to retain the tight tape switch 3427 in the slack tape position with its contacts 3425 closed. As long as this condition exists the tape reader 3420 continues to sense the tape 3413 and feed it a predetermined number of steps after the end-of-message indicator of the message being transmitted is detected and registered.

If the message being transmitted by the cross-office unit 3400 is not immediately followed by a second stored message, a condition that exists whenever the message being transmitted is any one of the three highest precedences, the tight tape switch 3427 will be controlled by the tape 3413 to move from its slack tape position and open its contacts 3422, into its tight tape position and close its contacts 3421 before the end-of-message indicator reaches the tape reader 3420. As soon as the contacts 3421 are closed, battery potential is connected by way of the conductor C3402–TT extending to Fig. 38, contacts 3823 and 3773 in multiple, contacts 3872, and the upper winding of the tape feed-out relay R3850, to ground. Relay R3850 now operates and, at its contacts 3852, completes an independent locking circuit for itself including its lower winding, contacts 3852 and 3922. As a further result of the operation of relay R3850, at its contacts 3851, it completes a circuit for reoperating the seizure relay R3870 and for applying ground potential to the conductor C3301–BTL extending to Fig. 33 in order to mark the cross-office unit 3400 busy and thus prevent from being seized by cross-office selectors, such as the selector 3300, individual to incoming lines. At its contacts 3853, the relay R3850 completes an obvious circuit for reoperating the reperforator relay R3800 and, at its contacts 3854, it prepares a point in an incomplete circuit for operating the return to pool relay R3920.

The seizure relay R3870 upon operating applies an additional ground potential at its contacts 3871, to the conductor C3402–MC to retain the motor start relay R3415 operated; at its contacts 3872, it interrupts a point in the initial operating circuit for the tape feed out relay R3850; and, at its contacts 3873, it interrupts an additional point in the incomplete circuit for the test relay R3930.

It will be recalled that the reperforator relay R3800 was originally operated when the incoming line circuit 400 repeated its stored message to the cross-office reperforator 3410 and that it was restored to normal when the incoming line circuit 400 disconnected itself from the cross-office unit 3400 to restore the relays R3880 and R3890. Reoperation of the reperforator relay R3800 at this time disconnects the resistance ground potential at the contacts 3803 from the conductor C3402–RPF thereby to restore the perforator magnet M3411 of the cross-office reperforator 3410. When this occurs the cross-office reperforator unit 3410 automatically feeds out "blank" tape. The connection of the conductor C3402–RPF to the conductor C3301–SIG by the closing of the contacts 3802 is of no importance at this time inasmuch as the conductor C3301–SIG is disconnected from the incoming line circuit 400.

The cross-office reperforator 3410 will continue to feed out "blank" tape until the reperforator relay R3800 restores to normal and reconnects resistance ground to the conductor C3402–RPF or until ground potential is removed from the conductor C3402–MC by the restoration of the seizure relay R3870 and the start relay R3910.

As the "blank" tape is fed under control of the reperforator 3410, the tight tape switch 3427 will again be moved from its tight tape position to its slack tape position but this performs no control at the present time. The end-of-message indicator on the tape 3413, however, will be fed through the tape reader 3420 in the manner previously described. Also the tape reader 3420 will sense the end-of-message indicator on the tape 3413 as it is advanced therethrough and the outgoing transmitter 3430 will also sense the tape 3413 and transmit the remaining portion of the message over the L1 outgoing line during the automatic advancement of the tape 3413.

Incident to the sensing of a complete end-of-message indicator, the end-of-message relay R3810 operates, in the manner previously described, and locks itself to ground at contacts 3946. As a further result of the operation of relay R3810, at its contacts 3811, it opens the locking circuit for the counting relays R3610–13 and R3610–14. These counting relays now restore to normal and, in turn, interrupt the locking circuits for the remaining counting relays R3610–1 to R3610–12, inclusive, which also restore to normal. As a further result of the operation of relay R3810, at its contacts 3817, it connects the magnet M4112 of the end-of-message character counter 4110 to the contacts 3565 of relay R3560 so that the switch 4110 may now be controlled to count 41 "blank" spaces appearing on the tape 3413 as it is fed through the tape reader 3420. After 41 "blanks" have been counted by the character counter 4110, the first character of the end-of-message indicator appearing on the tape 3413 will be advanced so that it is just short of the sensing pins (not shown) of the outgoing transmitter 3430. Also, the wiper 4111 of the character counter switch 4110 will complete a circuit, including the contacts 4121, for operating the control relay R3830. Upon operating the relay R3830, at its contacts 3835, locks itself to ground at the off-normal contacts ON4115 on the character counter 4110.

As a further result of the operation of relay R3830, at its contacts 3833, it opens a point in the previously traced series circuit for the relays R3940 and R4350. The latter relay, at its contacts 4353 and 4354, now completes an independent circuit for retaining operated the send relay R4440 and the magnet M4453 associated with the L1 outgoing line in order to retain the L1 outgoing line loop closed. Restoration of the relay R3940 interrupts various circuits in order to restore the relay R3950, the end-of-message relay R3810 and the character space relay R3820.

As a further result of the operation of relay R3830, at its contacts 3829, it completes a self-interrupting circuit for the magnet M4112 which includes the contacts 4113 and ground at the off-normal contacts ON4115. Consequently, the magnet M4112 is self-interruptedly operated and restored to advance its wiper 4111 step-by-step in a clockwise direction back to its home contact position. Also, at its contacts 3836, the relay R3830 completes a circuit including the contacts 3854 for operating the return to pool relay R3920. At its contacts 3834, the relay R3830 interrupts the locking circuit for the control relay R4120 which now restores to normal and, at its contacts 3831, it disconnects the conductor C3402–CLU, which is connected to the magnet M3425 of the tape reader 3420, from the conductor C3902–CL, which is connected to the timer control relay R4496 and the control relay R4470.

The interruption of the last-mentioned circuit restores the magnet M3425 in order to terminate further sensing of the tape by the tape reader 3420 and it also causes the restoration of the timer control relay R4496 so that the timer T4495 will now automatically transmit over the L1 outgoing line the two digits indicative of the day of the month, the four digits indicative of the time of day and the end-of-message indicator in the same manner as has been previously described. The restoration of the control relay R4470 reconditions the number transmitter 4430 so that it will automatically be controlled the next time a message is to be transmitted over the L1 outgoing line.

When the return-to-pool relay R3920 operates, as noted above, at its contacts 3923, it locks itself to three separate locking ground potentials. The first of the locking ground potentials includes the off-normal contacts ON4056 of the selector switch 4050; the second of the locking ground potentials includes the off-normal contacts ON4919′ of the precedence marking switch 4210; and the third locking ground potential includes the conductor C3902–SU extending to Fig. 43, contacts 4319 and the off-normal contacts ON4303 of the outgoing selector 4300. Consequently, the return-to-pool relay R3920 will not be restored to normal until the selector switch 4050, the precedence marking switch 4210 and the outgoing selector 4300 have been restored to their normal home contact positions. As a further result of the operation of the return-to-pool relay R3920, at its contacts 3921, it grounds the conductor C3301–BTL to indicate the busy condition of the cross-office unit 3400 and it retains the seizure relay R3870 in its operated position. Also, at its contacts 3922, the relay R3920 interrupts the locking circuit for the start relay R3910 and the tape feed out relay R3850 so that these relays now restore to normal. At its contacts 3924, the relay R3920 applies ground potential to the conductor C3902–RTS, extending to Fig. 43, in order to complete a self-interrupting circuit for the magnet M4320 of the outgoing selector 4300; at its contacts 3925, it completes a self-interrupting circuit for the magnet M4053 of the selector switch 4050; and, at its contacts 3926, it completes a self-interrupting circuit for the magnet M4217 of the precedence marking switch 4210.

Referring to the outgoing selector 4300, it will be seen that when the conductor C3902–RST is grounded, a circuit will be completed by way of the off-normal contacts ON4302, contacts 4312′ and 4301 for operating the magnet M4320. Upon operating, the magnet M4320 interrupts its operating circuit at its contacts 4301 whereupon the magnet restores to normal and advances its wipers 4321 to 4329, inclusive, and 4329′ one step in a clockwise direction, and it recompletes its self-interrupting circuit in order to advance the wipers step-by-step an additional step. The above described cycle of operation is repeated until the wipers reach the home contact position. In this position the off-normal contacts ON4302 are opened to prevent further operation of the magnet M4320 and the off-normal contacts ON4303 are opened in order to interrupt the locking circuit for the connect relay R4310 and to remove ground potential from the conductor C3902–SU. Restoration of the relay R4310 disconnects the wipers of the outgoing selector 4300 from the cross-office unit 3400.

Referring to the selector switch 4050 (Fig. 40) it will be seen that as long as the wiper 4052 is away from its home contact position, the transfer relay R4020 will be in its restored position to apply, at its contacts 4021, ground potential to the wiper 4051. This ground potential will be extended, by way of the wiper 4051, to the selector 4300 or any other selector associated with the cross-office unit 3400 and selected by the selector switch 4050. In the present example, the ground potential applied to the wiper 4051 is connected by way of the conductor C4002–GR1 in order to retain the connect relay R4310 of the outgoing selector 4300 in its operated position even though the wipers of the selector 4300 have been restored to their normal contact positions. However, when the self-interrupting circuit is completed for the magnet M4053, as noted above, the magnet is operated and restored a plurality of times in order to advance its wipers 4052 and 4051 step-by-step in a clockwise direction back to the home contact position. Consequently, as soon as the wiper 4051 leaves the contact 1, ground potential will be removed from the conductor C4002–GR1 to permit the connect relay R4310 to restore to normal as previously noted. The circuit for operating the magnet M4053 may be traced from ground by way of the contacts 4054, off-normal contacts ON4055, contacts 3925 and the winding of the magnet M4055, to battery. The magnet M4055 operates over this circuit and, at its contacts 4054, completes an obvious circuit for operating the transfer relay R4020 and, at its contacts 4054, it interrupts its initial energizing circuit. The transfer relay R4020 is of the slow-to-release type and, consequently, remains in its operated position each time the magnet M4053 restores during the self-interrupting stepping action. At its contacts 4021, the relay R4020 removes ground potential from the wiper 4051 in order to prevent accidental operation of the various connect relays of the outgoing selectors as the wiper is stepped over the associated bank contacts. Each time the magnet M4053 restores, its operating circuit is again completed but as soon as the wipers engage the home contact positions, the off-normal contacts ON4055 are opened in order to terminate further stepping of the wipers by the magnet M4053. Also, the off-normal contacts ON4056 are open in order to remove an additional hold ground potential from the locking circuit for the return-to-pool relay R3920. When the wiper 4052 of the selector switch 4050 engages its home contact position, an obvious holding circuit is completed for the transfer relay R4020 in order to retain the relay in its operated position until the selector switch 4050 is again stepped away from its home contact position.

Referring now to the precedence marking switch 4210 (Fig. 42), it will be seen that the stepping circuit for the magnet M4217 includes the winding of the magnet, contacts 3826, off-normal contacts ON4219, and contacts 4218. As soon as the magnet M4217 operates, it interrupts its circuit at its contacts 4218 and thus restores to normal to recomplete its operating circuit. This action of the magnet M4217 advances its wipers 4211 to 4217, inclusive, step-by-step in a clockwise direction until the wipers reach the normal home contact position. When the home contact position is reached, the off-normal contacts ON4219 are opened in order to prevent further stepping of the wipers by the magnet M4217, and the off-normal contacts ON4019′ are opened in order to remove the final holding ground from the locking circuit for the return-to-pool relay R3920. The above noted rotary switches may be returned to their home contact positions in any order and not necessarily in sequential order described above, but when the final ground is removed from the locking circuit for the relay R3920 it restores to normal.

Before describing the restoration of the return-to-pool relay R3920, it should be noted that when the tape feed out relay R3850 restored to normal, as noted above, at its contacts 3853, it restores the reperforated relay R3800 and that the latter relay, at its contacts 3803, reconnects resistance ground to the conductor C3402–RPF in order to reoperate the magnet M3411 and terminate the feed out of "blank" tape by the reperforator 3410. Also, at its contacts 3851, the relay R3850 removes the holding ground from the seizure relay R3870 but this relay is still retained in its operated position from ground at contacts 3921 of the return-to-pool relay R3920.

When the start relay R3910 restores to normal, as noted above, at its contacts 3911, it interrupts a point in the circuit for applying ground potential to the conductor C3402–MC; at its contacts 3915, it prepares a point in the test circuit for the empty bin relay R3990 so that the cross-office unit 3400 may again be selected from the pool of empty bin cross-office units; and, at its contacts 3916, it restores the start-slave relay R4280 in order to disconnect the precedence control relays R4220 to R4270, inclusive, from the multipled conductors C4201–FEM, C4201–POP and C4201–NMR.

Finally, the restoration of the return-to-pool relay R3920, as noted above, interrupts, at its contacts 3921, the final holding circuit for the seizure relay R3870, which now restores to normal, and it removes ground potential from the conductor C3301–BTL to indicate that the cross-office unit 3400 may now be selected by any cross-office selector, such as the selector 3300. Finally, at its contacts 3924, 3925 and 3926, the relay R3920 interrupts further points in the previously described self-interrupting circuits for the magnets of the outgoing selector 4300, the selector switch 4050 and the precedence marking switch 4210.

In view of the foregoing description of the operation of the cross-office unit 3400, it will be understood that when all of the messages stored in the storage bin 3419 have been retransmitted over an outgoing line, such as the L1 outgoing line, the cross-office unit 3400 will be restored to normal and then returned to the pool of cross-office units so that it may again be selected for the storage of another message.

*Cross-office unit 3400 tape storage bin*

The storage bin 3419 provided in the cross-office unit 3400 to store the tape 3413 that is perforated by the cross-office reperforator 3410 is arranged to store 100 feet of perforated tape. However, the capacity of the storage bin may be varied to accommodate any number of feet of perforated tape. In order to determine the amount of tape stored in the storage pin 3419, contacts 3417 have been provided which will be closed when the storage bin 3419 is 90% full of perforated tape and the contacts 3418 have been provided which will be closed when the bin is 80% full of perforated tape.

Normally, the cross-office unit 3400 can be selected any number of times to store messages of the same precedence for transmission over a particular connected outgoing line even though the unit is busy transmitting a message over the outgoing line. In other words, the cross-office reperforator 3410 may be controlled to store an additional message on the tape 3413 during the time that the tape reader 3420 and the outgoing transmitter 3430 are sensing and retransmitting a prior message over the outgoing line. However, certain conditions in the cross-office unit 3400 will prevent it from being seized by an incoming line circuit, such as the incoming line circuit 400, while it is transmitting a message over the outgoing line. One condition for preventing seizure of the cross-office unit 3400 by an incoming line circuit occurs when the tape feed out relay R3850 is operated. This relay, at its contacts 3851, applies ground potential to the conductor C3301–BTL extending to Fig. 33 so that any cross-office selector, such as the selector 3300, will encounter the busy marking ground potential in searching for the cross-office unit 3400. Also during the time that the return-to-pool relay R3920 is in its operated position, ground potential at the contacts 3921 marks conductor C3201–BTL to prevent the cross-office selectors, such as the selector 3300 from seizing the cross-office unit 3400.

Another condition for marking the cross-office unit busy occurs when the storage bin 3419 is 90% full of perforated tape. When this condition occurs, the contacts 3417 in the storage bin 3419 are closed in order to extend ground potential by way of the conductor C3402–90 extending to Fig. 38 and complete a circuit for operating the full bin relay R3860. Upon operating, this relay applies ground potential, at its contacts 3862, to the conductor C3301–BTL to mark the cross-office unit 3400 busy to all cross-office selectors, such as the selector 3300, and to operate the seizure relay R3870 in the usual manner. As a further result of the operation of relay R3860, at its contacts 3861, it locks itself in its operated position over a circuit including the conductor C3402–80 extending to Fig. 34 and the contacts 3418 of the storage bin 3419. The last-mentioned contacts are closed when the bin is 80% full of perforated tape and will remain closed until less than 80% of tape remains in the storage bin 3419.

In view of the foregoing, it will be understood that the full bin relay R3860 operates when the storage bin 3419 is 90% full of perforated tape in order to mark the cross-office unit 3400 busy and thus prevent additional messages from being transmitted to the cross-office reperforator 3410. However, it will not interfere with a message being received at the time the relay R3860 operates. It will also be understood that the cross-office unit 3400 will continue to process and retransmit the messages perforated on the tape 3413 and stored in the storage bin 3419. As soon as sufficient tape has been processed and retransmitted by the outgoing transmitter 3430 of the cross-office unit 3400 to reduce the amount of tape stored in the storage bin 3419 to less than 90%, the contacts 3417 will be opened, and when the amount of tape in the bin 3419 is reduced to less than 80%, the contacts 3418 will be opened. As a result of the opening of contacts 3418, the full bin relay R3860 will restore to normal and disconnect, at its contacts 3862, the busy marking ground potential from the conductor C3301–BTL. The removal of ground potential from this conductor again renders the cross-office unit 3400 available to store additional messages of the same precedence as the messages stored on the tape 3413 and which are to be transmitted over the L1 outgoing line.

*Canceling the transmission of a low precedence message when a new high precedence message is received*

In view of the foregoing description of the operation of the cross-office unit 3400 it should be understood that a plurality of messages of the "deferred" precedence may be stored therein and transmitted in sequence over the L1 outgoing line provided some message of higher precedence is not connected to the L1 outgoing line and awaiting the idle condition whereby it can seize the line to transmit its stored message of higher precedence. If another cross-office unit with a "routine" precedence registered therein desires to transmit its message over the L1 outgoing line, it will gain access to the line as soon as the "deferred" message being transmitted by cross-office unit 3400 has been fully transmitted. Also if a "priority" precedence is registered in still another cross-office unit, it will gain access to the outgoing line in preference to either the "routine" or the "deferred" classes of messages registered in the cross-office units. In each of the cases noted above, however, the cross-office units having the "routine" or "priority" preference registered therein can not gain access to the L1 outgoing line until the "deferred" message being transmitted thereover by the cross-office unit 3400 is fully transmitted and the cross-office unit 3400 has restored to again make the precedence test. But, any of the three high precedence messages, such as "operational immediate," "emergency" and "flash," are of sufficient importance to break in the middle of any low precedence message being transmitted by a cross-office unit. These three high precedences are arranged so that the "operational immediate" precedence can "bust-in" or break the transmission of any of the three low precedence messages; the emergency precedence can "bust-in" or break the transmission of any message of "operational immediate" precedence and any of the three low precedence messages; and the "flash" precedence can bust-in or break the transmission of any message having an "emergency," "operational immediate" or any of the three low precedences. The manner in which the three highest precedences "bust-in" or break the transmission of any of the lower classes of precedences will now be described.

For the purpose of illustrating this arrangement, it will be assumed that a cross-office unit, referred to hereinafter as cross-office unit No. 2 and which is identical with the cross-office unit 3400 illustrated in Figs. 34 to 44, inclusive, has registered therein a "deferred" precedence message and that this message is being transmitted by way of its associated outgoing selector over the L1 outgoing line. It will also be assumed that the cross-office unit 3400 has been drawn from the pool, that its cross-office selector 4300 has been positioned so that its wipers engage the terminals connected to the L1 outgoing line, that the precedence marking switch 4210 has been positioned to contacts 6 to register a "flash" precedence; that the start-of-message indicator of the "flash" message has been registered on the counting relays R3610–13 and R3610–14; and that the start-of-message character counter 4130 has been operated 48 steps to cause the operation of the character space relay R3820.

In the cross-office unit No. 2 the test guard relay (corresponding to relay R3940) is locked in its operated position in series with the guard relay R4350 individual to the L1 outgoing line. The latter relay, at its contact 4352, has removed ground potential from the IDL conductor in the cable C4390 and, consequently, prevents operation of the test relay R3930 in the cross-office unit 3400. In addition to the foregoing, the test guard relay in the cross-office unit No. 2, connects resistance battery potential to the wiper (corresponding to wiper 4213) of its associated precedence marking switch in order to operate the "deferred" relay (corresponding to the relay R4270) and this resistance battery potential is connected by way of a conductor (corresponding to the conductor C4201–NMR) to a wiper (corresponding to the wiper 4327) of its outgoing selector. The contact engaged by this wiper is multiply connected to the corresponding contact accessible to the wiper 4327 of the outgoing selector 4300 individually associated with the cross-office unit 3400. Consequently, the resistance battery potential is connected by way of the conductor C4201–NMR, to the contacts 4281 of the start-slave relay R4280 in order to operate the "deferred" relay R4270 in the cross-office unit 3400.

In view of the foregoing it will be understood that the cross-office unit No. 2 which is transmitting the message over the L1 outgoing line has operated its "deferred" precedence control relay (corresponding to relay R4270) and over the above traced feed-back circuit has also operated the "deferred" precedence control relay R4270 in the cross-office unit 3400 which has the "flash" precedence message registered therein. Consequently, when the character space relay R3820 in the cross-office unit 3400 operates, its attempts to complete, at its contacts 3826, a circuit for operating the test relay R3930. But, since the ground potential has been removed from the conductor C3802–IDL, as noted above, the test relay R3930 cannot operate. However, at its contacts 3824', the relay R3820 completes a circuit including the wiper 4212 of the precedence marking switch 4210 in engagement with contacts 6 (flash precedence), contacts 4274, of the operated deferred relay R4270 (operated from the cross-office unit No. 2), and contacts 3931 of the restored test relay R3930, for operating the cancel transmission relay R3960. Upon operating the relay R3960, at its contacts 3961, connects ground potential by way of the conductor C3403–CT2 extending to Fig. 34 in order to operate the motor start relay R3460 in the cancel transmission transmitter 3450. This transmitter is similar to the outgoing transmitter 3430 and it is common to all of the cross-office units provided in the relay switching center. Also, the cancel transmission transmitter 3450 is arranged so that it will control its contacts 3480 to transmit the code signals corresponding to the words "CAN–TRAN." In other words, when the cancel transmission transmitter is controlled, it will automatically "bust-in" or break in the middle of a low precedence message being transmitted and immediately transmit the above mentioned information over the L1 outgoing line so that the receiving station will be informed that the interrupted message has been canceled and that it will be transmitted subsequently as a complete new message.

Operation of the motor start relay R3460 closes its contacts 3461 to complete a circuit for the motor 3455 in order to prepare the transmitter 3450 for further operation. At this point it may be well to mention the fact that the tape storage reel 3470 carries an endless perforated tape having the above noted information.

As a further result of the operation of the cancel transmission relay R3960, at its contacts 3962, it connects ground potential by way of the lower winding of the test relay R3970 and the conductor C3403–CT1 extending to Fig. 34, to battery potential by way of the resistor 3456. If the cancel transmission transmitter 3450 is being used by some other cross-office unit in the switching center, this conductor will be grounded in order to short-circuit the lower winding of the relay R3970. Also, if two cross-office units simultaneously connect to the conductor C3403–CT1, one of the relays will operate and lock in series with its associated relay R3980, but the other relay will remain in its restored position. It will be assumed that the relay R3970 operates over the circuit including its high resistance lower winding in series with resistance battery applied to the conductor C3403–CT1 in the transmitter 3450. Upon operating, the relay R3970, at its contacts 3971, connects ground by way of the low resistance lower winding of the relay R3980, contacts 3971, the low resistance upper winding of the test relay R3970, contacts 3962 and the resistance battery potential applied to the conductor C3403–CT1. The relay R3980 now operates over the above traced circuit and, at its contacts 3982, it completes a circuit which may be traced from ground by way of the clutch magnet M3471, contacts 3472 (mechanically opened when a "blank" is transmitted by the transmitter 3450 after the transmission of CAN–TRAN), conductor C3403–CT3 extending to Fig. 39, contacts 3982, the upper winding of relay R3980, conductor C3902–CL extending to Fig. 43, contacts 4312, wiper 4322, conductor CL in the cable C4390, normally closed contacts of the jack J4331, conductor C4365–CL, the winding of the timer control relay R4496, conductor C4365'CL, contacts 4463, 4466 and 4481 (R4480 operated), lower winding of the control relay R4470, and the resistor 4473, to battery. The portion of the above traced circuit up to the CL conductor in the cable C4390, etc., is in multiple with the corresponding circuit controlled by the cross-office unit No. 2 which is transmitting the "deferred" message over the L1 outgoing line. When this circuit is completed, the relay R3980 locks itself over the circuit including its upper winding in series with the clutch magnet M3471 which is also operated. As a further result of the operation of relay R3980, at its contacts 3981, it retains ground potential applied to the conductor C3403–CT2 in order to maintain the start relay R3460 operated; at its contacts 3983, it applies direct ground potential to the conductor C3403–CT1 in order to prevent other cross-office units from connecting with the cancel transmission transmitter 3450 and to simultaneously short-circuit the windings of the relay R3970 which now restores to normal. At its contacts 3985, the relay R3980 completes a signal circuit over which the cancel transmission transmitter 3450 will transmit "CAN–TRAN" over the L1 outgoing line. This circuit may be traced from ground by way of the code contacts 3480 of the transmitter 3450, conductor C3403–CT4 extending to Fig. 39, resistor 3995, contacts 3985, conductor C4002–SIG extending to Fig. 43, contacts 4311, wiper 4321, the SIG conductor in the cable 4390, normally closed contacts of the jack J4330, contacts 4354, conductor C4366–SIG, contacts 4498, conductor C4366'SIG, contacts 4434, winding of the send relay R4440, and the magnet M4453, to battery. The last-mentioned circuit retains the signal relay R4440 and the magnet M4453 in their operated position from the cancel transmission transmitter 3450, when the cross-office unit No. 2 is subsequently forcibly disconnected from the L1 outgoing line.

Finally, at its contacts 3984, the relay R3980 applies ground potential by way of the conductor C3902–G extending to Fig. 43, contacts 4313, wiper 4323, conductor G in the cable C4390 in order to retain the guard relay R4350 of the L1 outgoing line in its operated position. The ground potential applied to the wiper 4323 is also fed back to the cross-office unit No. 2 (which is transmitting a message over the L1 outgoing line) by way of the G conductor in the bank multiple of the associated outgoing selector (same as the outgoing selector 4300), the wiper corresponding to the wiper 4323, the contacts corresponding to the contacts 4313, the conductor corresponding to the conductor C3902–G, the contacts corresponding to the contacts 3914, the lower winding of the relay corresponding to the test guard relay R3940, and the locking ground potential connected by way of the contacts corresponding to the contacts 3948. The test guard relay in the cross-office unit No. 2 is short-circuited over the above described circuit and it now restores to normal.

As soon as the relay R3940 in the cross-office unit No. 2 has been forcibly restored to normal, at its contacts 3949 and 3941', it removes the ground and resistance battery potentials from the wipers 4213 and 4214 of the precedence marking switch 4210 thereat, thereby to restore the deferred relay R4270 in both the cross-office unit No. 2 which is transmitting the "deferred" message over the L1 outgoing line, and the cross-office unit 3400 which is attempting to gain access to the L1 outgoing line to transmit the high precedence "flash" message thereover. As a further result of the restoration of the relay R3940 in the sending cross-office unit No. 2, at its contacts 3943, it completes a circuit including the contacts 3951 for operating the canceled transmission lock-out relay R4030. Upon operating the latter relay, at its contacts 4034, locks itself over a circuit including its upper winding to ground at the release key K4060. Also, at its contacts 3941, the relay R3940 in the cross-office unit No. 2 interrupts a circuit including the conductor C3402–TD in order to terminate further transmission of signals by the outgoing transmitter 3430 of the cross-office unit No. 2. Also, at its contacts 3942, the relay R3940 interrupts the previously traced circuit including the conductors C3402–CLU in order to restore the magnet M3425 of the tape reader 3420 in the cross-office unit No. 2. Thus, the transmission of the low precedence "deferred" message registered in the cross-office unit No. 2 over the L1 outgoing line is now terminated.

In response to the operation of the canceled transmission lock-out relay R4030 in the cross-office unit No. 2, at its contacts 4032, it completes an obvious circuit for illuminating the alarm lamp L4061 to give a specific visual signal indicative of the fact that the cross-office unit No. 2 has had the transmission of its message terminated by a cancel transmission control from a cross-office unit having a higher precedence message. Also, at its contacts 4036, the relay R4030 completes a circuit for operating the general alarm A4070 in order to indicate to the attendant that he must immediately take some specific action with regard to the busted message in the cross-office unit No. 2. In this case it is necessary for the attendant to pull the tape 3413 of the busted message in the cross-office unit No. 2 back through the associated tape reader so that the complete message may again be fed through the tape reader and retransmitted when the cross-office unit No. 2 is again conditioned to connect with the L1 outgoing line.

As a further result of the operation of relay R4030 in the cross-office unit No. 2, at its contacts 4031, it interrupts a point in the circuit including the conductor C3402–TS so that the tight tape switch 3427 in its slack position can not reclose a circuit for the magnet M3425 of the tape reader 3420. At its contacts 4033, the relay R4030 in the cross-office unit No. 2 interrupts the locking circuit for the counting relay R3610–13 and R3610–14 in order to restore these relays and condition the counting relays to again respond to the start-of-message indicator of the "deferred" message when the cross-office unit No. 2 is restarted by the attendant who actuates the release key K4060 for this purpose. Finally, at its contacts 4035, the relay R4030 in the cross-office unit No. 2, interrupts the locking circuit for the relay R3950 and the latter relay, at its contacts 3951, opens the initial operating circuit for the relay R4030.

At the present time, the cross-office unit No. 2 is restored to its original condition so that it can again sense the tape in the usual manner due to the fact that its start relay R3910 is locked in its operated position. However, the actual restarting of the cross-office unit No. 2 to retransmit the canceled message is governed by the release key K4060. When the attendant pulled back the tape 3413 so that the entire busted "deferred" message is in position to again be sensed by the tape reader 3420, the attendant may actuate the key K4060 and thereby interrupt the locking circuit for the canceled transmission lock-out relay R4030. Restoration of this relay controls, at its contacts 4031, 4043 and 4035, previously described circuits whereby the tape reader is restarted to sense the tape. Although the cross-office unit No. 2 may again sense the start-of-message indicator of the canceled "deferred" message, it cannot start retransmitting the message over the L1 outgoing line until it has been reconnected thereto and has received an indication that no message is being transmitted over the L1 outgoing line of a higher precedence. In the present example, the high precedence message which canceled the transmission of the "deferred" message is of a "flash" precedence and maintains the flash relay R4220 in the cross-office unit No. 2 operated and thus prevents, at the contacts 4221, the circuit for reoperating the test guard relay R3940 in the cross-office No. 2 until the "flash" message has been transmitted.

In order to continue with the description of the operation of the cross-office unit 3400 having the "flash" message registered therein and which controlled the canceling of the transmission of the "deferred" message in the cross-office unit No. 2, it will be recalled that the operation of the cancel transmission relay R3960 caused the operation of relay R3980. The relay R3980, at its contacts 3982, connects the clutch magnet M3471 of the canceled transmission transmitter 3450 by way of the winding of the relay R3980, and the conductor C3902–CL, in series with the timer control relay R4496 of the timer T4495, and the control relay R4470 of the number transmitter 4430. Also, the relay R3980, at its contacts 3985, connects the signalling conductor C3403–CT4 from the cancel transmission transmitter 3450, by way of the contacts 3985, and the signalling conductor C4002–SIG over the previously traced circuit to the send relay R4440 and the monitor unit 4450. Finally, at its contacts 3984, the relay R3980 short-circuited the test guard relay, corresponding to the relay R3940, in the cross-office unit No. 2 and thereby forcibly terminated the transmission of the "deferred" message over the L1 outgoing line.

The cancel transmission transmitter 3450 now operates in a conventional manner to control its contact group 3480 in order to transmit coded signals over the signalling conductor C3403–CT4 to the send relay R4440 of the L1 outgoing line in order to transmit the words "CAN–TRAN." The above information is transmitted over the L1 outgoing line, immediately following the "busted" "deferred" message. Thereafter, the cancel transmission transmitter 3450 then senses a "blank" character function on pre-perforated tape on the reel 3470. The sensing of the "blank" character mechanically controls the contacts 3472, and consequently, interrupts the circuit including the clutch magnet M3471. Since this circuit includes, in series, the magnet M3471, the upper winding of the relay R3980, the winding of the timer control relay R4496 and the lower winding of the control relay R4470, all of the relays noted and the magnet M3471 now restore to normal. Restoration of the magnet M3471 terminates further transmission by the cancel transmission transmitter 3450 and the restoration of the relay R3980, at its contacts 3983, removes ground potential from the conductor C3403–CT1 in order to remove the busy marking ground from the cancel transmission transmitter 3450 and render it available to other cross-office units. At its contacts 3985, the relay R3980 interrupts a point in the signalling circuit including the conductor C4002–SIG over which the cancel transmission signals were transmitted. Also, at its contacts 3984, the relay R3980 now removes ground potential from the conductor C3902–G thereby to restore the guard relay R4350 individual to the L1 outgoing line. Restoration of the relay R4350 immediately applies resistance ground potential, at its contacts 4354, to the signalling circuit including the conductor C4366–SIG in order to retain the send relay R4440 and the monitor unit 4450 in their operated positions.

As soon as the timer control relay R4496 in the timer T4495 restores to normal it automatically controls the contact group illustrated above the relay, in the manner previously described, so that the timer T4495 automatically transmits signals over the L1 outgoing line corresponding to the day of the month, and the time of day that the "deferred" message transmitted over the L1 outgoing line was canceled, and then the previously described end-of-message indicator. After the timer T4495 has completed its previously described operation, it momentarily opens its contacts 4497 in order to restore the cut-off relay R4360 to its normal position.

In the number transmitter 4430 the restoration of the control relay R4470, as noted above, reconditions that circuit so that it will be in a position to reoperate, in the manner previously described, to transmit a new start-of-message indicator, two or three letters identifying of the L1 outgoing line, three digit channel number indicator corresponding to the number of the message to be transmitted and the necessary "spaces," "line feeds," etc.

When the cut-off relay R4360 restores to normal, as noted above, at its contacts 4362, it returns ground potential over the IDL conductor in the cable C4390 to indicate that the L1 outgoing line may now be selected to transmit another message thereover. In the present example, the ground potential applied to the IDL conductor is extended by way of the wiper 4324 of the outgoing selector 4300, contacts 4314, conductor C3802–IDL, extending to Fig. 38, contacts 3873, and 3826, and the winding of the test relay R3930, to battery. Relay R3930 now operates and, at its contacts 3931, interrupts the circuit of the cancel transmission relay R3960 which now restores and, at its contacts 3961, it removes ground potential from the conductor C3403–CT2 in order to restore the motor start relay R3460 in the cancel transmission transmitter 3450. The relay R3930 also performs operations previously described, whereby the momentary ground potential applied to the conductor C3972 (Fig. 39) by the motor driven commutator (not shown) completes the circuit for operating the test guard relay R3940 in series with the guard relay R4350 individual to the L1 outgoing line. The remaining operations of the cross-office unit 3400 to transmit the "flash" precedence message stored therein over the L1 outgoing line is the same as has been described previously. Consequently, it will be understood that the number transmitter 4430 will first be controlled to transmit its information over the L1 outgoing line, followed by the transmission of the "flash" precedence message and, finally, the timer T4495 will be controlled in the manner previously described to transmit its information. Thereafter, the cross-office unit 3400 will be returned to the pool of cross-office units so that it may again be utilized in storing another message.

The above explanation of the cancel transmission operation was described in connection with the cancelling of a "deferred" message by a "flash" message. It should be understood, however, that the above described operations are substantially identical as far as the "flash" messages are concerned because it can break any message of lower precedence being transmitted over the L1 outgoing line. Also, the "emergency" and "operational immediate" precedences may cancel messages of lower precedence being transmitted over the outgoing line that is to be used to transmit either the "emergency" or "operational immediate" message. The three low precedences, "priority," "routine" and "deferred," however, can not break in on any message and must await their turn gaining access to the L1 outgoing line.

*Alarm circuits in the cross-office unit 3400*

As previously described, the cross-office reperforator 3410 associated with the cross-office unit 3400 is provided with a storage reel 3412 that carries unperforated tape. Associated with the reel 3412 is an adjustable mechanism 3409 which is tensioned to engage the outer surface of the tape stored on the reel 3412. When the tape on the reel is reduced to an amount that may be insufficient to perforate at least one more message, the adjustable control mechanism 3409 actuates contacts to illuminate the lamp L3412. The illuminated condition of the lamp L3412 indicates to the exchange attendant that an additional supply of tape must be placed on the reel 3412.

In the previous description of the operation of the incoming line circuit 400, it was pointed out that when a start-of-message indicator is omitted, the relay R650 therein would operate and illuminate the lamp L656. The attendant in the exchange may operate the alarm release key K668 and the key K825 associated with the incoming line circuit 400 in the manner previously described and permit the message to be processed without a start-of-message indicator. When this message is processed by the cross-office unit 3400 in the manner described above, the omission of the start-of-message indicator will also be sensed and registered therein. Thus, as the sensing relays 3501 are actuated in attempting to sense a start-of-message indicator, the relay R3570, at the contacts 3575 operates in response to the sensing of each character by the tape reader 3420 and controls the magnet M4112 of the end-of-message character counter 4110. This magnet steps its wiper 4111 one step for each character received, but normally the character space relay R3820 interrupts this circuit, at its contacts 3822', when a valid start-of-message indicator is received. However, since no start-of-message indicator is received in the present message, the wiper 4111 of the character counter 4110 operates the control relay R4120 when it reaches position 32 and when it reaches position 41, it completes a circuit including the contacts 4121 and 3825 for operating the alarm relay R3840. At its contacts 3842, the relay R3840 locks itself to ground at the release key K4060; at its contacts 3841, it completes an obvious circuit for illuminating the lamp L3444 to indicate the omission of a start-of-message indicator in the cross-office unit 3400; and, at its contacts 3843, it operates the general alarm A4070 in order to notify the attendant of the alarm condition.

Another alarm condition in the cross-office unit 3400 occurs if a second start-of-message indicator is registered in the cross-office unit 3400. As previously described, the start-of-message indicator comprising the seven characters XZXZXZX normally control the counting relays R3610–1 to R3610–14, inclusive, in sequence so that the relays R3610–13 and R3610–14 lock in their operated position in response to the last X character. The remaining counting relays, however, are restored to their normal positions. If a second start-of-message indicator is now sensed by the tape reader 3420 before an end-of-message indicator is received, the counting relays will operate in the manner previously explained but when the last X character of the second start-of-message indicator is sensed by the sensing relays 3501, a circuit is completed which may be traced from ground at contacts 3564, contacts 3516, 3526, 3536, 3546, 3556, 3587, conductor 3601, contacts 3622, 3643, 3664, 3713, 3734, 3588 and 3775 in order to operate the alarm relay R3840. This relay upon operating completes the circuits noted above, whereby the lamp L3844 is illuminated and the general alarm A4070 is operated to indicate the receipt of a second start-of-message indicator prior to the receipt of an end-of-message indicator.

Another alarm condition occurs when an end-of-message indicator is received prior to the receipt of a start-of-message indicator. When this condition exists the counting relays R3610–13 and R3610–14 will be in their restored positions and the character space relay R3820 will be in its restored position. When the tape reader 3420 senses an end-of-message indicator (figures shift followed by seven commas) the figures shift relay R3580 will be operated by the sensing relays 3501 and the six succeeding commas sensed by the relays 3501 will control the operation of the counting relays R3610–1 to R3610–12, inclusive, in the manner previously described. The seventh comma sensed by the sensing relays 3501 now completes the circuit for operating the end-of-message relay R3810 in the manner previously explained and the latter relay, at its contacts 3812, will now complete a circuit for operating the alarm relay R3840. This circuit may be traced from ground at contacts 4043 and then by way of the contacts 3812 and 3824 (the relay R3820 being restored due to the failure to receive a start-of-message indicator) and the lower winding of the alarm relay R3840. The relay R3840 locks in its operated position, as previously described, and completes the circuits for illuminating the lamp L3844 and for operating the general alarm A4070. Thus, the exchange attendant will receive a visual and an audible signal indicative of the fact that the cross-office unit 3400 has failed to receive a start-of-message indicator prior to the receipt of an end-of-message indicator.

Another alarm condition provided in the cross-office unit 3400 involves the open line alarm relay R3900. Normally, this relay will not operate as long as the signaling circuit, including the conductor C3402–TD, the lower winding of the open line relay R4010 and the signaling conductor C4002–SIG is retained during the transmission of the signals from the outgoing transmitter 3430 to the sending relay R4440 associated with the L1 outgoing line. As long as this signaling circuit is not opened during the transmission of a message for a period longer than the release time of the slow-to-release relay R4010, then the relay R4010 will remain in its operated position until the test guard relay R3940 restores to normal at the end of the transmission of the message. However, if during the transmission of a message, the signaling lead is opened for a longer period then the slow-to-release time of the relay R4010, then the relay R4010 restores to normal and completes, at its contacts 4011, a circuit including the lower winding of the open line alarm relay R3900, contacts 3945 and 3932. The relay R3900 operates over this circuit and immediately locks itself over a circuit including its upper winding and the contacts 3993, to ground at the release key K4060. As a further result of the operation of the open line alarm relay R3900, at its contacts 3992, it completes an obvious circuit for illuminating the lamp L4062 to indicate that the signal lead in the cross-office unit 3400 over which the message is being transmitted, is in an open condition. Also, at its contacts 3994, the relay R3900 operates the general alarm A4070 to indicate to the attendant that an alarm condition exists in the cross-office unit 3400.

In each of the foregoing alarm conditions, the attendant takes whatever steps are necessary to correct the fault and may then actuate the release key K4060 in order to permit the cross-office unit 3400 to continue processing and transmitting the message being sensed by the tape reader 3420. Operation of the release key K4060 will, of course, restore any operated relay that is locked to the ground potential at the key K4060.

*Alternative routing of messages from the relay switching center UAC*

Referring now to Fig. 1, it will be seen that the previously described message received from the relay switching center UEP, at the relay switching center UAC, and intended for the tributary center JWPA, may be routed from the relay switching center UAC by way of the relay switching center UWP. The relay switching center UWP will process the message in the same manner as the switching center UAC and will retransmit the message to the switching center JWP which will, in turn, retransmit the message to the tributary station JWPA. In describing the retransmission of the message by the relay switching center UAC, it was assumed that the message was transmitted over the L1 outgoing line to the relay switching center UWP. It should be understood, however, that the relay switching center UWP and JWP will process the message in the same manner as the switching apparatus in the relay switching center UAC in order finally to route the message to the tributary station JWPA. As illustrated in Fig. 1, an additional route from the relay switching center UAC interconnects the relay switching center JLX and that the latter relay switching center also may route a message to the relay switching center UWP.

In order to describe an alternative routing arrangement provided at the relay switching center UAC, it will be assumed that the L1 outgoing line illustrated in Fig. 44 of the drawings is the outgoing line extending from the relay switching center UAC to the relay switching center UWP (Fig. 1) and that the L2 outgoing line illustrated in Fig. 44 is the outgoing line extending from the relay switching center UAC directly to the relay switching center JLX. Normally, all messages received in the relay switching center UAC and intended for relay switching centers and tributary stations connected to the relay switching center UWP are routed over the L1 outgoing line. If this line becomes inoperative so that messages cannot be transmitted thereover, the attendant at the relay switching center UAC will be notified. If no messages are stored in any of the cross-office units, such as the cross-office unit 3400, for transmission over the L1 outgoing line, the attendant may rearrange the patching cords (Fig. 32), interconnecting the jacks on the three character jack panel 3270 with the multiply connected L1 line jacks on the jack panel 3220, by removing the plugs of the patching cords from the L1 line jacks and inserting them, for example, into the line jacks (not shown) of the L2 line. When the patching cords on the patch panel 3200 are disconnected from the L1 outgoing line jacks and connected to the L2 outgoing line jacks all messages which would normally be routed over the L1 outgoing line by the routing translator 2900 will now be automatically routed over the L2 outgoing line. Consequently, as is illustrated in Fig. 1, messages thereafter transmitted over the L2 outgoing line from the relay switching center UAC will be received at the relay switching center JLX and will be retransmitted therefrom to the relay switching center UWP. Consequently, the L1 outgoing line, which is out of service, is now by-passed and the messages received at the switching center UWP from the relay switching center JLX will be processed in the regular manner and routed to the desired destination.

The above described control, whereby the attendant rearranges the patching cords on the patch panel 3200 to select the L2 outgoing line, instead of the L1 outgoing line, as the route over which messages are to be transmitted may only be used in the event that no messages have been stored in the cross-office units, such as the cross-office units 3400, having their outgoing selectors, such as the selector 4300, set to the terminals of the L1 outgoing line. If any messages have been processed and stored in the cross-office units connected to the L1 outgoing line, the patch panel 3200 cannot be rearranged to route such messages over the L2 outgoing line instead of the L1 outgoing line. However, in order to take care of the last-mentioned condition, each outgoing line in the relay switching center UAC is provided with a plurality of jacks as is illustrated in Fig. 43. Thus, the conductors SIG, NMR, CL, POP, IDL, FEM and G, in the cable C4390 which are individual to the L1 outgoing line are connected to the jacks J4330 to J4333, inclusive. These conductors are also multiply connected to corresponding jacks J4334 to J4337, inclusive, and multiply connected to one or more other corresponding jacks in the same group. The corresponding conductors in the cable C4390′, corresponding to the L2 outgoing line, are connected in a similar manner to jacks J4330′ to J4333′ and J4334′ to J4337′. The last-mentioned jacks are also multiply connected to corresponding jacks in the same group. The attendant may interconnect all of the conductors in the cable C4390 associated with the L1 outgoing line with the corresponding conductors of the cable C4390′ associated with the L2 outgoing line by means of a patch cord C4391. This patching cord includes four plugs P4330 to P4333, inclusive, at one end of the cord which are mounted as a unit so that they may be simultaneously plugged into the corresponding jacks J4330 to J4333, inclusive. The other end of the patching cord C4391 is also provided with four plugs, P4334′ to P4337′ which are also mounted so that they may be simultaneously plugged into the corresponding jacks J4331′ to J4337′, inclusive. The insertion of the plugs P4330 to P4333, inclusive, into the corresponding jacks automatically controls the normally closed contacts of the jacks J4330 to J4333, inclusive, so that the conductors SIG, CL, IDL and G in the cable C4390 are disconnected from the conductors extending to the terminal equipment 4460 of the L1 outgoing line and connects these conductors by way of the tips of the plugs P4330 to P4333, inclusive, to the corresponding conductors in the cable C4390′ associated with the terminal equipment 4460A of the L2 outgoing line. The remaining NMR, POP and FEM conductors in the cable C4390 will be multiplied to the corresponding conductors in the cable C4390′ by way of the sleeve terminals of the plugs P4330 to P4332, inclusive, and the plugs P4334′ to P4336′, inclusive.

With this arrangement all outgoing selectors, such as the outgoing selector 4300, engaging terminals in the associated bank corresponding to the L1 outgoing line, will now be connected through the cable C4390 and the patching cords C4391 to the L2 outgoing line. Also, all outgoing selectors, such as the outgoing selector 4300, in engagement with the terminals in the associated banks corresponding to the L2 outgoing line will also be connected by way of the cable C4390′ to the L2 outgoing line. Consequently, all cross-office units, such as the cross-office unit 3400, having messages stored therein that are to be transmitted over the L1 outgoing line or the L2 outgoing line will now be grouped together so that the previous described tests for connecting one of the cross-office units to the L1 outgoing line will be made in the usual manner and the cross-office unit with the highest precedence message will gain access and control of the L2 outgoing line in preference to all other cross-office units.

In view of the foregoing, it will be understood that messages that may be blocked from transmission over an L1 outgoing line due to the failure of that line may be transmitted over the L2 outgoing line, with the other messages which would normally be transmitted over the L2 outgoing line, by connecting the patching cord C4391 in the manner described above.

Referring now to Fig. 1 it will be seen that the messages that would normally be transmitted over the L1 outgoing line to the relay switching center UWP will now be transmitted over the L2 outgoing line to the relay switching center JLX. The latter switching center, of course, will process the message in the usual manner and route it to the relay switching center UWP and, consequently, will by-pass the faulty L1 outgoing line.

*Selecting an idle one of a plurality of outgoing lines from the relay switching center UAC to a particular destination*

In the foregoing description of the operation of the switching apparatus provided at the relay switching center UAC, it was assumed that other relay switching centers and tributary stations are interconnected with the relay switching center UAC by individual lines. For example, it was assumed that the L1 outgoing line (Figs. 43 and 44) is provided for routing messages from the relay switching center UAC to the relay switching center UWP and to other centers and tributary stations which are accessible through the relay switching center UWP. Also, it was assumed that the L2 outgoing line is provided for routing messages from the relay switching center UAC to the relay switching center JLX and to other relay switching centers and tributary stations accessible through the relay switching center JLX. If the individual outgoing lines, noted above, are inadequate to handle all of the traffic extended from the relay switching center UAC to each of the above noted destinations, additional outgoing lines must be installed to interconnect each of the relay switching centers. Consequently, two or more outgoing lines, such as the L1 outgoing line, may be necessary to handle the traffic from the relay switching center UAC to the relay switching center UWP and points beyond; and two or more outgoing lines, such as the L2 outgoing line, may be necessary to handle the traffic destined to the relay switching center JLX and points beyond.

In the present system, facilities are provided for determining whether or not one of a plurality of outgoing lines in a particular direction is idle and available for use in transmitting a message. In order to describe this facility, it will be assumed that the L1 and the L2 outgoing lines are grouped together and that they are both available for routing messages from the switching center UAC directly to the relay switching center UWP. It should be understood, however, that any number of outgoing lines may be grouped together, in the manner described hereinafter, in order to provide increase facilities for routing traffic from the relay switching center UAC to the relay switching center UWP.

Referring now to Figs. 43 and 44, it will be seen that the L1 and the L2 outgoing lines are respectively provided with the guard relays R4350 and R4350′. These relays are individual to the lines noted and are in their operated positions only during the time that a message is being transmitted over their respective outgoing lines. During the time the messages are being transmitted, these relays remove ground potential from the IDL conductors and in this manner prevent all cross-office units, except the cross-office unit which is sending its message, from being operated, to transmit the stored messages therein. However, the instant that the outgoing lines are free to transmit additional messages, the guard relays R4350 and R4350′ will be in their restored positions to indicate to the connected cross-office units that the previously described test may be made to permit the cross-office unit having the highest precedence message stored therein to take control of the outgoing line and mark it busy.

The guard relay R4350 individual to the L1 outgoing line is provided with a set of make-break contacts 4356 and 4357 and the guard relay R4350′ individual to the L2 outgoing line is provided with a similar set of make-break contacts 4356′ and 4357′; other outgoing lines may be provided with similar contacts. Inasmuch as the circuits including these contacts involve the routing translator 2900 and the patch panel 3200 common to all of the directors in the system, the circuits through these contacts are shown on Fig. 32 of the drawings. It will be understood, however, that these contacts, as illustrated in Fig. 32, are controlled by the respective guard relays R4350 and R4350′ illustrated in Fig. 43.

With only one outgoing line available for the routing of traffic in a particular direction, no test is made by the director and the routing translator 2900 to determine whether or not the line is busy transmitting a message or is idle and in condition to transmit another message. The director and routing translator 2900, is merely concerned with whether or not a cross-office unit is connected to the outgoing line and the precedence of the messages registered in the cross-office units connected to the outgoing line. If no cross-office unit is connected to the outgoing line or if a connected cross-office unit does not have the precedence of the received message, then the director functions in the manner previously described to select a cross-office unit from the pool of empty bin cross-office units, registers the precedence of the received message therein, and then connects the selected cross-office unit to the outgoing line.

With two or more outgoing lines available for the transmission of messages in a particular direction, a test is made, however, to determine whether or not a message is actually being transmitted at the time the routing translator 2900 marks the director to indicate the outgoing line over which a received message must be transmitted.

Referring to the routing translator 2900 and the patch panel 3200 illustrated in Figs. 29 to 32, inclusive, it will be recalled that when a three, four or five character routing indicator having the first three characters JWP is registered in the routing translator 2900, ground potential is applied to the jack J406 on the three character jack panel 3270. If the jack J406 is connected to the L1 line jack on the line jack panel 3220 by means of one of the patch cords, this ground potential will then be extended by way of the L1 conductor to the terminal 3281A. With the individual L1 outgoing line provided for handling traffic to the relay switching center JWP and points beyond, the terminal 3281A is connected directly to the terminal 3281B so that the ground potential is further extended by way of the contacts 3283 of the gang switch 3280 and the conductor C3201–L1 extending to Fig. 18 in order to operate the L1 relay R1875 in the channel register 1700 portion of the director. In the previously described manner, the director will then make the tests whereby the received message will ultimately be transmitted over the L1 outgoing line. The same operations occur on messages to be transmitted over the L2 outgoing line, if it is the individual line to the relay switching center JLX, in which case the L2 conductor (Fig. 32) will be grounded by the routing translator 2900 and the terminals 3382A and 3382B will be interconnected in order to operate the L2 relay in the channel register 1700.

If the L1 and L2 outgoing lines are arranged to handle all outgoing traffic directly to the relay switching center JWP and points beyond, the straps interconnecting the terminals 3281A and 3281B and the terminals 3282A and 3282B will be removed and the dotted straps will be made in the manner illustrated in Fig. 32. Consequently, when the routing translator 2900 is operated, as previously described, and extends ground potential to the terminal 3282A, the L1 relay R1875 in the channel register 1700 will be operated over the circuit including the strap interconnecting two terminals 3281A and 3281C, the contacts 4357 (if the guard relay R4350 of the L1 outgoing line is restored to indicate that no message is being transmitted) terminal 3281D connected to the terminal 3281B and then over the previously described circuit to operate the L1 relay R1875. If the L1 outgoing line becomes busy in the transmission of a previously stored message immediately after the L1 relay R1875 operates, the director 200A will function in the manner previously described to store the received message in a cross-office unit, whereby the message will be transmitted, in its turn, over the L1 outgoing line. However, if at the time the routing translator 2900 applies ground potential to the terminal 3281A the guard relay R4350 is operated, to indicate that the L1 outgoing line is busy, then the ground potential will be extended by way of the terminal 3281C, contacts 4356, terminal 3281E and 3282C, contacts 4357′ (if the guard relay R4350′ is restored) terminal 3282D and 3282B over the previously described circuit to operate the L2 relay R1870 at the channel register 1700. When the last-mentioned relay operates, the director will then control one of the cross-office units connected to the L2 outgoing line or it will connect a cross-office unit to the L2 outgoing line so that the received message will be transmitted thereover in the usual manner.

Consequently, the arrangement for distributing calls over the L1 and L2 lines extending to the relay switching center JWP is determined by the operated and restored conditions of the guard relay R4350 associated with the L1 outgoing line. If both the L1 and L2 outgoing lines are busy transmitting messages, the guard relays R4350 and R4350′ will be operated. Since the guard relay R4350′ is individual to the last outgoing line in the group, the ground potential on the terminal 3281A will be extended over the previously described circuit including the terminals 3281C, contacts 4356, terminals 3281E and 3282C, contacts 4356′, terminals 3282E, 3282D and 3282B in order to operate the L2 relay R1870 in the channel register 1700. Consequently, if both the L1 and L2 outgoing lines are busy transmitting messages, the director will be controlled by the routing translator 2900 and the operated conditions of the guard relays individual to the respective L1 and L2 outgoing lines to store the received message in one of the cross-office units so that the message will be transmitted over the L2 outgoing line in accordance with the precedence of the received message.

With this arrangement for storing received messages only at the time that no message is being transmitted over an outgoing line, except the last line in the group of lines, it is possible to distribute the messages between the different outgoing lines in the group of lines extending to the next relay switching center. It should be noted, however, that even though all of the outgoing lines in a group are busy at the time the routing translator 2900 operates, the last outgoing line in the group will be marked in the channel register 1700 so that the message will be properly stored and transmitted over the last outgoing line in the group in the same manner as previously described when only a single outgoing line is provided.

While there has been described what is at the present considered to be the preferred embodiment of the invention, it will be understood that various modifications may be made therein which are within the true spirit and scope of the invention.

What is claimed is:

1. In an automatic telegraph system, a switching center, incoming and outgoing lines terminating in said center, a tape perforator and a tape reader and a tape controlled transmitter individually associated with each of said incoming lines, a plurality of outgoing selectors having access to each of said outgoing lines, a director common to said incoming lines, means controlled by signals of a telegraph message received over said incoming line for controlling said tape perforator to record said message and the address thereof on a tape, means for feeding said perforated tape through said tape reader and for connecting said director therewith, means in said director controlled by said tape reader for registering the address portion of said message, means controlled by said registration for operating any one of said selectors to select a particular one of said outgoing lines corresponding to said registered address and for connecting said transmitter to said one selector and for disconnecting said director from said tape reader, means controlled in response to the disconnection of said director from said tape reader for feeding said perforated tape from said tape reader through said transmitter, whereby the transmitter transmits signals corresponding to said message and the address thereof to said one selector, and means in said one selector controlled by said transmitter for transmitting signals over said selected outgoing line corresponding to said message and the address portion thereof as recorded on said perforated tape.

2. In an automatic telegraph system, a recording device, means for operating said recording device to record telegraph signals on a recording medium, said signals including an address portion and a body portion of a particular telegraph message, a sensing device operated to sense said address portion and said body portion of said message recorded on said medium, an address register, means including said sensing device for operating said register to register said address portion of said message recorded on said medium, a plurality of transmission paths, means selectively controlled by said register for selecting a particular one of said transmission paths as determined by said address registered in said register, a telegraph transmitter, means controlled by said selection of said one transmission path for connecting said telegraph transmitter to said transmission path selecting means, means governed by said last-mentioned connection for feeding said recording medium through said transmitter, means in said transmitter controlled by said record medium for transmitting telegraph signals corresponding to said address portion and said body portion of said message recorded on said medium to said transmission path selecting means, and means in said selecting means for recording the telegraph signals transmitted thereto and for retransmitting thereafter said signals over said transmission path.

3. In an automatic telegraph system, a plurality of incoming lines, a like plurality of line circuits terminating said incoming lines, a plurality of outgoing lines extending to different destinations, a plurality of cross-office units, each one of said cross-office units having access to each one of said outgoing lines and accessible to each of said line circuits, a director common to said line circuits, means in each of said line circuits for producing a record of a telegraph message received over the associated lines, means responsive to the production of a record in one of said line circuits for associating said director with said one line circuit, means in said one line circuit for sensing the address portion of said message on said record, means in said director for registering said address, means governed in accordance with said registered address for selecting any one of said cross-office units and for connecting said cross-office unit to the particular outgoing line extending to the destination corresponding to said registered address, means in said one line circuit for transmitting telegraphic signals corresponding to said recorded message to said selected cross-office unit, means for disconnecting said director from said one line circuit and for controlling said transmitter means to transmit said telegraphic signals, and means in said selected cross-office unit for recording said signals transmitted by said one line circuit transmitter and for retransmitting signals corresponding to said last-mentioned recorded signals over said particular outgoing line.

4. In an automatic telegraph system, a plurality of incoming lines, a like plurality of line circuits terminating said incoming lines, a plurality of outgoing lines extending to different destinations, a plurality of cross-office units, each one of said cross-office units having access to each one of said outgoing lines and accessible to each of said line circuits, a director common to said line circuits, a record producing mechanism in each of said line circuits operated to produce a record of a telegraph message including an address portion received over the associated line, means responsive to the production of a record in one of said line circuits for associating said director with said one line circuit, means in said one line circuit for sensing the address portion of said message on said record, an address register in said director, means in said register controlled by said sensing means for operating said address register to register said address portion of said message, means in said director controlled jointly by an available one of any of said cross-office units and said register means for associating said one incoming line circuit with said one cross-office unit, additional means in said director controlled by said register means for directively operating said one cross-office unit to select the particular outgoing line extending to the destination corresponding to said registered address, a record operated transmitter in said one incoming line circuit, means for disconnecting said director from said incoming line circuit and for controlling said transmitter to transmit signals to said one cross-office unit in accordance with said recorded message, and means in said one cross-office unit for producing another record of said message and for transmitting telegraphic signals over said particular outgoing line in accordance with said last-mentioned record.

5. In an automatic telegraph system, a plurality of incoming lines, a like plurality of line circuits terminating said incoming lines, a plurality of outgoing lines extending to different destinations, a plurality of cross-office units, each one of said cross-office units having access to each one of said outgoing lines and accessible to each of said line circuits, a plurality of directors common to said line circuits, a record producing mechanism in each of said line circuits operated to produce a record of a telegraph message having an address portion and a body portion received over the associated incoming line, an assigner for selecting any one of said directors for use by said line circuits, means operated incident to the production of a record in one of said line circuits for seizing the selected one of said directors, a connecting device operated responsive to said seizure of said selected director for connecting said selected director to said one line circuit, sensing means in said line circuit for sensing said record, means operated in response to said connection of said selected director and said one line circuit for operating said sensing means to sense said address portion of said record, an address register in said selected director operated by said sensing means to register therein said address portion of said record, means controlled in accordance with said address registered in said address register for identifying the particular outgoing line over which said telegraph message is to be routed, means in said selected director governed by said outgoing line identification for connecting said one line circuit to any one of said cross-office units and for connecting said one cross-office unit to said identified outgoing line, means in said one line circuit controlled by said selected director for transmitting telegraphic signals to said one cross-office unit in accordance with address portion and said body portion of said produced record and for thereafter disconnecting said line circuit from said one cross-office unit, means in said one cross-office unit controlled by said telegraphic signals for storing said signals, and additional means in said one cross-office unit controlled from said identified outgoing line for operating said cross-office unit to transmit telegraphic signals over said identified outgoing line in accordance with said stored signals.

6. In an automatic telegraph system, a plurality of incoming lines, a like plurality of line circuits terminating said incoming lines, a plurality of outgoing lines extending to different destinations, a plurality of cross-office units, each one of said cross-office units having access to each one of said outgoing lines and accessible to each of said line circuits, a plurality of directors common to said line circuits, a record producing mechanism in each of said line circuits operated to produce a record of a telegraph message having an address portion and a body portion received over the associated incoming line, an assigner for selecting one of said directors for use by said line circuits, means operated incident to the production of a record in one of said line circuits for seizing the selected one of said directors, a connecting device operated responsive to said seizure of said selected director for connecting said selected director to said one line circuit, sensing means in said line circuit for sensing said record, means operated in response to said connection of said selected director and said one line circuit for operating and sensing means to sense said address portion of said record, an address register in said selected director operated by said sensing means to register therein said address portion of said record, means controlled in accordance with said address registered in said address register for identifying the particular outgoing line over which said telegraph message is to be routed, means in said selected director for registering said outgoing line identification and for testing said identified outgoing line to determine the identity of a cross-office unit connected to said identified outgoing line, means in said selected director for registering the identity of a cross-office unit connected to said outgoing line and for connecting said one incoming line to said identified cross-office unit, means in said one line circuit controlled by said selected director for transmitting additional signals to said identified cross-office unit in accordance with both said address portion and said body portion of said message on said record and for thereafter disconnecting said line circuit from said identified cross-office unit, means in said identified cross-office unit controlled by said additional signals for producing a record thereof, and additional means in said identified cross-office unit selectively controllable from said identified outgoing line for transmitting telegraphic signals thereover in accordance with said last-mentioned record.

7. In an automatic telegraph system, a plurality of incoming lines, a like plurality of line circuits terminating said incoming lines, a plurality of outgoing lines extending to different destinations, a plurality of cross-office units, each one of said cross-office units having access to each one of said outgoing lines and accessible to each of said line circuits, a plurality of directors common to said line circuits, a record producing mechanism in each of said line circuits operated to produce a record of a telegraph message having an address portion and a body portion received over the associated incoming line, an assigner for selecting one of said directors for use by said line circuits, means operated incident to the production of a record in one of said line circuits for seizing the selected one of said directors, a connecting device operated responsive to said seizure of said selected director for connecting said selected director to said one line circuit, sensing means in said line circuit for sensing said record, means operated in response to said connection of said selected director and said one line circuit for operating said sensing means to sense said address portion of said record, an address register in said selected director operated by said sensing means to register therein said address portion of said record, a routing translator common to said plurality of directors, means controlled in response to said registration of said address in said address register of said selected director for connecting said routing translator thereto and for transferring said registered address from said address register to said routing translator, means in said routing translator governed in accordance with said address transferred thereto for determining the identity of the particular outgoing line over which said received telegraph message is to be routed and for registering said outgoing line identification in said selected director, means in said selected director governed by said outgoing line identification for connecting said one line circuit to one of said cross-office units and for connecting said one cross-office unit to said identified outgoing line, means in said one line circuit controlled by said selected director for transmitting additional telegraphic signals to said one cross-office unit in accordance with address portion and said body portion of said produced record and for thereafter disconnecting said line circuit from said one cross-office unit, means in said one cross-office unit controlled by said additional telegraphic signals for storing said signals, and additional means in said one cross-office unit controlled from said identified outgoing line for operating said cross-office unit to transmit telegraphic signals over said identified outgoing line in accordance with said stored signals.

8. In an automatic telegraph system, a plurality of incoming lines, a like plurality of line circuits terminating said incoming lines, a plurality of outgoing lines extending to different destinations, a plurality of cross-office units, each one of said cross-office units having access to each one of said outgoing lines and accessible to each of said line circuits, a plurality of directors common to said line circuits, a record producing mechanism in each of said line circuits operated to produce a record of a telegraph message having an address portion and a body portion received over the associated incoming line, an assigner for selecting one of said directors for use by said line circuits, means operated incident to the production of a record in one of said line circuits for seizing selected one of said directors, a connecting device operated responsive to said seizure of said selected director for connecting said selected director to said one line circuit, sensing means in said line circuit for sensing said record, means operated in response to said connection of said selected director and said one line circuit for operating said sensing means to sense said address portion of said record, an address register including a plurality of individual character registers in said selected director, means controlled by said address sensing means for operating said individual character registers in sequence to register the successive characters of said address, a routing translator common to said plurality of directors, means controlled by said registration of said plural character address in said address register of said selected director for connecting said routing translator thereto and for controlling said translator in accordance with at least a portion of said registered characters of said plural character address, means in said routing translator responsive to said control thereof for identifying the particular outgoing line over which said received telegraph message is to be routed and for registering said outgoing line identification in said selected director, means in said selected director governed by said outgoing line identification for connecting said one line circuit to one of said cross-office units and for connecting said one cross-office unit to said identified outgoing line, means in said one line circuit controlled by said selected director for transmitting additional telegraphic signals to said one cross-office unit in accordance with address portion and said body portion of said produced record and for thereafter disconnecting said line circuit from said one cross-office unit, means in said one cross-office unit controlled by said additional telegraphic signals for storing said signals, and additional means in said one cross-office unit controlled from said identified outgoing line for operating said cross-office unit to transmit telegraphic signals over said identified outgoing line in accordance with said stored signals.

9. In an automatic telegraph system, a plurality of incoming lines, a like plurality of line circuits terminating said incoming lines, a plurality of outgoing lines extending to different destinations, a plurality of cross-office units, each one of said cross-office units having access to each one of said outgoing lines and accessible to each of said line circuits, a plurality of directors common to said line circuits, a record producing mechanism in each of said line circuits operated to produce a record of a telegraph message having a plural character address portion and a body portion received over the associated incoming line, an assigner for selecting one of said directors for use by said line circuits, means operated incident to the production of a record in one of said line circuits for seizing the selected one of said directors, a connecting device operated responsive to said seizure of said selected director for connecting said selected director to said one line circuit, sensing means in said line circuit for sensing said record, means operated in response to said connection of said selected director and said one line circuit for operating said sensing means to sense said address portion of said record, an address register including a plurality of individual character registers in said selected director, means controlled by said address sensing means for operating said individual character registers in a predetermined sequence to successively register the successive characters of said plural character address, additional means controlled by said address sensing means for determining whether or not the first and second characters of said plural character address are acceptable as usable first and second characters respectively, means controlled by said additional means responsive to said determination that said first character and said second character are not usable respectively as first and second characters for restoring said individual character registers to normal and controlled by said additional means responsive to said determination that said second character is not usable as a second character but is usable as a first character for restoring the first of said individual character registers to normal and for registering said second character in the second of said individual character registers and for thereafter registering a third character which is usable as a second character in the first of said individual character registers, a routing translator including a plurality of individual registers common to said plurality of directors, means controlled responsive to said registration of said plural character address in said individual address registers of said selected director for connecting said routing translator thereto and for automatically transferring the successive characters of said plural character address to the successive individual registers of said translator in the event said first and second characters of said address are registered in said first and second individual character registers respectively and in the event said first and second characters of said address are registered in said second and first individual character registers respectively, means in said routing translator controlled by said plural character address registered in said individual registers of said translator for identifying the particular outgoing line over which said received telegraph message is to be routed and for registering said outgoing line identification in said selected director, means in said selected director governed by said outgoing line identification for connecting said one line circuit to one of said cross-office units and for connecting said one cross-office unit to said identified outgoing line, means in said one line circuit controlled by said selected director for transmitting additional telegraphic signals to said one cross-office unit in accordance with said address portion and said body portion of said produced record and for thereafter disconnecting said line circuit from said one cross-office unit, means in said one cross-office unit controlled by said additional telegraphic signals for storing said signals, and additional means in said one cross-office unit controlled from said identified outgoing line for operating said cross-office unit to transmit telegraphic signals over said identified outgoing line in accordance with said stored signals.

10. In an automatic telegraph system, an incoming line terminating in a line circuit, a recording mechanism associated with said incoming line operated in accordance with signals of a telegraph message received over said incoming line to produce a record thereof, said message including an address designation, a transmitter included in said line circuit selectively controllable by said record to transmit signals corresponding to said recorded message, sensing means in said line circuit interposed between said recorded mechanism and said transmitter and operated as said record is produced to sense said address designation, an address register, means controlled by said sensing means for operating said address register to register said address designation, a plurality of outgoing lines over which telegraph messages are transmitted to reach a plurality of assigned address destinations, means controlled responsive to the registration of an assigned address designation in said address register for selecting the particular outgoing line over which said message must be transmitted to reach said assigned address destination and for connecting said line circuit thereto, and means controlled responsive to said connection of said line circuit to said particular outgoing line for controlling said transmitter to transmit signals corresponding to said recorded message including said address designation over said particular outgoing line to reach said assigned address destination.

11. In an automatic telegraph system, an incoming line terminating in a line circuit, a plurality of outgoing lines over which telegraph messages are transmitted to reach a plurality of assigned address designations, a cross-office unit having access to any one of said outgoing lines, a recording mechanism operated in accordance with signals of a telegraph message received over said incoming line to produce a record thereof, said message including an address designation, sensing means in said line circuit operated as said record is produced to sense said address designation, means controlled by said operation of said sensing means for detecting said address designation, an address register, means controlled by said sensing means for operating said address register to register said address designation, a plurality of marking conductors corresponding respectively to said plurality of outgoing lines, means controlled responsive to the registration of an assigned address designation in said address register for selecting the particular marking conductor corresponding to the particular outgoing line over which said message must be transmitted to reach said assigned address destination, means controlled responsive to said selection of any one of said marking conductors for selecting said cross-office unit and for connecting said cross-office unit to the particular outgoing line corresponding to said selected marking conductor and for connecting said line circuit to said cross-office unit, means in said line circuit controlled responsive to said connection thereof to said cross-office unit for transmitting said recorded message to said cross-office unit, and means in said cross-office unit for storing said message transmitted thereto and for retransmitting said stored message over said particular outgoing line.

12. In an automatic telegraph system, an incoming line circuit terminating a telegraph line, a plurality of outgoing lines, a plurality of individual switching units having access to said outgoing lines, a recorder included in said incoming line circuit for producing a record of a received telegraph message comprising a start-of-message designation and an address designation and a body, means in said line circuit for sensing said record, control means, means controlled responsive to the sensing of said start-of-message indication for associating said control means with said incoming line circuit, means in said control means responsive to the sensing of said address designation for selecting any one of said switching units and for connecting said incoming line circuit thereto, additional means in said control means for thereafter selectively controlling said selected switching unit to connect with the particular one of said outgoing lines over which said message may be transmitted to the destination identified by said address designation, means in said incoming line circuit controlled by said record for transmitting said message to said selected switching unit and for thereafter disconnecting said incoming line circuit from said selected switching unit, means in said selected switching unit for producing duplicate record of said message, and means in said selected switching unit controlled in accordance with said start-of-message designation for transmitting only said address designation and said body of said message over said particular outgoing line.

13. An automatic telegraph switching system comprising a plurality of switching centers and tributary stations, lines interconnecting said tributary stations and said switching centers, other lines interconnecting said swtching centers, means at a first switching center for recording a telegraph message received thereat over one of said lines, said message including a first line designation identifying the particular line over which the message is received and an address designation identifying the destination of the message, means at said first switching center governed by said recorded address designation for selecting another line over which said message is to be directed to another switching center, means associated with said selected other line and controlled incident to selection thereof for transmitting to said other switching center a second line designation identifying said selected other line, means in said first switching center to thereafter transmit said message including said first line designation and said address designation over said selected other line to said other switching center, and means at said other switching center for recording said second line designation and then said message including said first line designation and said address designation and to use said recorded address designation to further direct said message to further switching centers and ultimately to the tributary station identified by said address designation, whereby said message is ultimately recorded at the particular tributary station identified by said address designation and includes the line designations of each interconnecting lines over which said message has been directed to reach said tributary station identified by said address designation.

14. An automatic telegraph switching system, a switching center, incoming lines terminating at said switching center, outgoing lines terminating at said switching center, means at said switching center for recording a telegraph message received thereat over one of said incoming lines, said message including a first line designation identifying the particular incoming line over which the message is received and an address designation identifying the destination of the message, means at said switching center governed by said recorded address designation for selecting a particular outgoing line over which said recorded message is to be directed to reach said destination, means associated with said selected outgoing line and controlled incident to selection thereof for transmitting a second line designation identifying said selected particular outgoing line, and means in said switching center operated thereafter for transmitting said recorded message including said first line designation and said address designation over said selected outgoing line, and means at said other switching center for recording, whereby said recorded message as transmitted over said selected outgoing line now includes said second line designation identifying said selected outgoing line and said first line designation identifying sad partcular incoming line and said address designation.

15. In an automatic telegraph system, an incoming line over which signals of a telegraph message including a start-of-message designation and a plural digit channel number and a variable address designation and a message body are received, a recording mechanism associated with said incoming line operated by said signals to produce a record thereof, sensing means operated to sense said record, a start-of-message detector for detecting a predetermined start-of-message designation, a channel number comparator having preregistered therein a predetermined plural digit number, an address register, means controlled by said sensing means for operating said start-of-message detector and responsive to the detection in said telegraph message of a start-of-message designation corresponding to said predetermined start-of-message designation for thereafter comparing said recorded plural digit channel number with said predetermined plural digit number preregistered in said channel number comparator and for operating said address register to register said address designation, outgoing lines, a plurality of cross-office selectors having access to said outgoing lines, means controlled in response to operation of said address register for registering the identity of the particular outgoing line over which said recorded message must be transmitted to reach said address, means for selecting one of said cross-office selectors and for operating said one cross-office selector to connect with said identified particular outgoing line, a recording mechanism in said one cross-office selector controlled by said record to produce a duplicate record of said entire message, a start-of-message detector in said one cross-office selector, sensing means in said one cross-office selector operated to sense said duplicate record to detect only said start-of-message designation from said duplicate record, and additional means in said one cross-office selector controlled from said identified particular outgoing line subsequent to said detection of said duplicate start-of-message designation in said one cross-office selector for transmitting signals over said identified particular outgoing line corresponding to said channel number designation and said address designation and said body of said message on said duplicate record.

16. In an automatic telegraph system, an incoming line over which signals of a telegraph message are received, said message including in the order named a start-of-message designation and a channel number designation comprising letters identifying said incoming line and a plural digit number identifying the number of the particular message received over said incoming line and a variable address designation and a message body, a recording mechanism associated with said incoming line signals to produce a record thereof, sensing means operated to sense said record, a start-of-message detector for detecting a predetermined start-of-message designation, a channel number comparator having preregistered therein a predetermined plural digit number, an address register, means controlled by said sensing means for operating said start-of-message detector and responsive to the detection in said telegraph message of a start-of-message designation corresponding to said predetermined start-of-message designation for thereafter comparing the plural digit number of said channel number designation with said predetermined plural digit number preregistered in said channel number comparator responsive to a matched comparison of said recorded and preregistered channel numbers, and for thereafter operating said address register to register said address designation, outgoing lines, a plurality of cross-office selectors having access to said outgoing lines, means controlled in response to operation of said address register for registering the identity of the particular outgoing line over which said recorded message must be transmitted to reach said address, means for selecting one of said cross-office selectors and for operating said one cross-office selector to connect with said identified particular outgoing line, a recording mechanism in said one cross-office selector controlled by said record to produce a duplicate record of said entire message, a start-of-message detector in said one cross-office selector, sensing means in said one cross-office selector operated to sense said duplicate record to detect only said start-of-message designation on said duplicate record, means individual to said identified particular outgoing line controlled responsive to said detection of said duplicate start-of-message designation in said one cross-office selector for automatically transmitting signals over said outgoing line corresponding to a new start-of-message designation and a new channel number designation comprising letters identifying said identified particular outgoing line and a plural digit number identifying the number of the particular message to be transmitted over said outgoing line, and additional means in said one cross-office selector controlled responsive to said transmission of signals of said new start-of-message designation and said new channel number designation over said outgoing line for transmitting signals over said outgoing line corresponding to said channel number designation and said address designation and said body of said message recorded on said duplicate record.

17. In an automatic telegraph system, an incoming line over which signals of a telegraph message are received, said message including a predetermined start-of-message designation and a predetermined plural digit channel number and a precedence designation and a variable address designation and a message body, a recording mechanism associated with said incoming line operated by said signals to produce a record thereof, sensing means operated to sense said record, a start-of-message register, a channel number comparator having preregistered therein a predetermined plural digit number corresponding to the expected channel number included in the message received over said incoming line, a precedence register operative to register any one of a plurality of different high precedence designations or any one of a plurality of different low precedence designations, an address register operative to register any one of a plurality of different address designations identifying the corresponding destination of said message, means controlled by said sensing means for operating said start-of-message register to register only said recorded start-of-message designation and for comparing said recorded predetermined plural digit channel number with said predetermined plural digit number preregistered in said comparator and for operating said precedence register to register said recorded precedence designation only responsive to the successful registration of said start-of-message designation and the successful comparison of said recorded channel number and said number preregistered in said comparator and for operating said address register to register said recorded address designation, outgoing lines, a plurality of cross-office units having access to said outgoing lines, means in said cross-office units for storing and retransmitting messages, means controlled in accordance with said address designation registered in said address register for registering the identity of the particular outgoing line over which said recorded message must be transmitted to reach said address, means operated in accordance with any one of said plurality of different low precedence designations registered in said precedence register for testing said identified outgoing line to determine whether or not one of said cross-office units is connected to said outgoing line, means controlled in response to said test for selecting a cross-office unit connected to said outgoing line only in the event a prior message stored therein and being transmitted therefrom is of the identical low precedence designation as said recorded message, additional means controlled responsive to said test for selecting an available cross-office unit which is disconnected from all of said outgoing lines in the event the precedence designation of the prior message stored in and being transmitted from a cross-office unit connected to said outgoing line and the precedence designation of said recorded message are not identical, means operated in accordance with any one of said plurality of different high precedence designations registered in said precedence register for preventing said test and for selecting an available cross-office unit which is disconnected from all of said outgoing lines, means controlled responsive to said selection of a cross-office unit which is connected to said outgoing line for transferring said recorded message thereto for storage therein and subsequent transmission over said outgoing line, and means controlled responsive to said selection of an available cross-office unit which is disconnected from all outgoing lines for operating said selected cross-office unit to connect with said identified outgoing line and for operating said selected cross-office unit to register therein the particular low or high precedence designation of said recorded message and for transferring said recorded message to said selected cross-office unit for storage therein and subsequent transmission over said identified outgoing line.

18. In an automatic telegraph system, an incoming line over which signals of a telegraph message are received, said message including a predetermined start-of-message designation and a predetermined plural digit channel number and a precedence designation and a variable address designation and a message body, a recording mechanism associated with said incoming line operated by said signals to produce a record thereof, sensing means operated to sense said record, a start-of-message register, a channel number comparator having preregistered therein a predetermined plural digit number corresponding to the expected channel number included in the message received over said incoming line, a precedence register operative to register any one of a plurality of different precedence designations, an address register operative to register any one of a plurality of different address designations identifying the corresponding destination of said message, means controlled by said sensing means for operating said start-of-message register to register only said recorded start-of-message designation and for comparing said recorded predetermined plural digit channel number with said predetermined plural digit number preregistered in said comparator and for operating said precedence to register said recorded precedence designation only responsive to the successful registration of said start-of-message designation and the successful comparison of said recorded channel number and said number preregistered in said comparator and for operating said address register to register said recorded address designation, outgoing lines, a plurality of cross-office units having access to said outgoing lines, means in said cross-office units for storing and retransmitting messages, means controlled in accordance with said address designation registered in said address register for registering the identity of the particular outgoing line over which said recorded message must be transmitted to reach said address, means operated in accordance with any one of said plurality of different precedence designations registered in said precedence register for testing said identified outgoing line to determine whether any of said cross-office units are connected thereto, means controlled in the event said test determines that one of said cross-office units is connected to said outgoing line for selecting said one cross-office unit only if a prior message stored therein is of the identical precedence designation as said recorded message, and means for transferring said recorded message to said storage means in said selected cross-office unit for retransmission over said identified outgoing line.

19. In an automatic telegraph system, an incoming line over which signals of a telegraph message are received, said message including a predetermined start-of-message designation and a predetermined plural digit channel number and a precedence designation and a variable address designation and a message body, a recording mechanism associated with said incoming line operated by said signals to produce a record thereof, sensing means operated to sense said record, a start-of-message register, a channel number comparator having preregistered therein a predetermined plural digit number corresponding to the expected channel number included in the message received over said incoming line, a precedence register operative to register any one of a plurality of different precedence designations, an address register operative to register any one of a plurality of different address designations identifying the corresponding destination of said message, means controlled by said sensing means for operating said start-of-message register to register only said recorded start-of-message designation and for comparing said recorded predetermined plural digit channel number with said predetermined plural digit number preregistered in said comparator and for operating said precedence register to register said recorded precedence designation only responsive to the successful registration of said start-of-message designation and the successful comparison of said recorded channel number and said number preregistered in said comparator and for operating said address register to register said recorded address designation, outgoing lines, a plurality of cross-office units having access to said outgoing lines, means in said cross-office units for storing and retransmitting messages, means controlled in accordance with said address designation registered in said address register for registering the identity of the particular outgoing line over which said recorded message must be transmitted to reach said address, means operated in accordance with any one of said plurality of different precedence designations registered in said precedence register for testing said identified outgoing line to determine whether any of said cross-office units are connected thereto, means controlled in the event said test determines that a pluurality of said cross-office units are connected to said identified outgoing line for selecting only the one of said connected cross-office units having a prior message stored therein of the same precedence designation as said recorded message, and means for transferring said recorded message to said storage means in said selected cross-office unit for retransmission therefrom over said identified outgoing line.

20. In an automatic telegraph system, an incoming line over which signals of a telegraph message are received, said message including a predetermined start-of-message designation and a predetermined plural digit channel number and a precedence designation and a variable address designation and a message body, a recording mechanism associated with said incoming line operated by said signals to produce a record thereof, sensing means operated to sense said record, a start-of-message register, a channel number comparator having preregistered therein a predetermined plural digit number corresponding to the expected channel number included in the message received over said incoming line, a precedence register operative to register any one of a plurality of different precedence designations, an address register operative to register any one of a plurality of different address designations identifying the corresponding destination of said message, means controlled by said sensing means for operating said start-of-message register to register only said recorded start-of-message designation and for comparing said recorded predetermined plural digit channel number with said preedtermined plural digit number preregistered in said comparator and for operating said precedence register to register said recorded precedence designation only responsive to the successful registration of said start-of-message designation and the successful comparison of said recorded channel number and said number preregistered in said comparator and for operating said address register to register said recorded address designation, outgoing lines, a plurality of cross-office units having access to said outgoing lines, means in said cross-office units for storing and retransmitting messages, means controlled in accordance with said address designation registered in said address register for registering the identity of the particular outgoing line over which said recorded mssage must be transmitted to reach said address, means operated in accordance with the particular precedence designation registered in said precedence register for testing said identified outgoing line to determine whether a cross-office unit having a prior message stored therein of the same precedence designation as said recorded message is connected to said identified outgoing line, means controlled responsive to the completion of said test for selecting said connected unit and for transferring said recorded message to the storage means therein for retransmission over said identified outgoing line, means controlled only responsive to the failure of said test for selecting any one of a plurality of cross-office units having access to said identified outgoing line but disconnected therefrom, and means controlled responsive to the selection of one of said disconnected cross-office units for registering therein said recorded precedence designation and for connecting said disconnected unit to said identified outgoing line and for transferring said recorded message to the storage means therein for retransmission over said identified outgoing line.

21. In an automatic telegraph system, an incoming line over which signals of a telegraph message are received, said message including a predetermined start-of-message designation and a predetermined plural digit channel number and a precedence designation and a variable address designation and a message body, a recording mechanism associated with said incoming line operated by said signals to produce a record thereof, sensing means operated to sense said record, a start-of-message register, a channel number comparator having preregistered therein a predetermined plural digit number corresponding to the expected channel number included in the message received over said incoming line, a precedence register operative to register any one of a plurality of different precedence designations, an address register operative to register any one of a plurality of different address designations identifying the corresponding destination of said message, means controlled by said sensing means for operating said start-of-message register to register only said recorded start-of-message designation and for comparing said recorded predetermined plural digit channel number with said predetermined plural digit number preregistered in said comparator and for operating said precedence register to register said recorded precedence designation only responsive to the successful registration of said start-of-message designation and the successful comparison of said recorded channel number and said number preregistered in said comparator and for operating said address register to register said recorded address designation, outgoing lines, a plurality of cross-office units having access to said outgoing lines, means in said cross-office units for storing and retransmitting messages, means controlled in accordance with said address designation registered in said address register for registering the identity of the particular outgoing line over which said recorded message must be transmitted to reach said address, means operated in accordance with any one of said plurality of different precedence designations registered in said precedence register for selecting one of said cross-office units, means operated responsive to said selection for operating said selected cross-office unit to connect with said identified outgoing line and to register in said selected cross-office unit said precedence designation registered in said precedence register, and means for transferring said recorded message to said storage means in said selected cross-office unit for retransmission over said identified outgoing line.

22. In an automatic telegraph system, an incoming line over which signals of a telegraph message are received, said message including a predetermined start-of-message designation and a predetermined plural digit channel number and a precedence designation and a variable address designation and a message body, a recording mechanism associated with said incoming line operated by said signals to produce a record thereof, sensing means operated to sense said record, a start-of-message register, a channel number comparator having preregistered therein a predetermined plural digit number corresponding to the expected channel number included in the message received over said incoming line, a precedence register operative to register any one of a plurality of different precedence designations, an address register operative to register any one of a plurality of different address designations identifying the corresponding destination of said message, means controlled by said sensing means for operating said start-of-message register to register only said recorded start-of-message designation and for comparing said recorded predetermined plural digit channel number with said predetermined plural digit number preregistered in said comparator and for operating said precedence register to register said recorded precedence designation only responsive to the successful registration of said start-of-message designation and the successful comparison of said recorded channel number and said number preregistered in said comparator and for operating said address register to register said recorded address designation, outgoing lines, a plurality of cross-office units having access to said outgoing lines and normally available to store and to retransmit messages over selected ones of said outgoing lines, an intercept position, means controlled in accordance with said address designation registered in said address register for registering the identity of the particular outgoing line over which said recorded message must be transmitted to reach said address, means operated in accordance with any one of said plurality of different precedence designations registered in said precedence register for normally selecting a cross-office unit connected to said identified outgoing line and having a prior message stored therein having the same precedence designation as said recorded message or for selecting an available cross-office unit disconnected from said identified outgoing line if no cross-office unit having a prior message stored therein of the same precedence designation as said recorded message is available or for selecting said intercept position if no cross-office unit is available for selection, means controlled in response to the selection of a cross-office unit having a prior message stored therein of the same precedence as said recorded message for transferring said recorded message thereto for retransmission over said connected identified outgoing line, means controlled in response to the selection of a cross-office unit disconnected from said identified outgoing line for operating said cross-office unit to connect with said identified outgoing line and for registering in said selected cross-office unit said precedence designation registered in said precedence register and for transferring to said selected cross-office unit said recorded message for retransmission over said connected identified outgoing line, and means controlled in response to the selection of said intercept position for transferring thereto said recorded message.

23. In an automatic telegraph system, an incoming line over which signals of a telegraph message are received, said message including a predetermined start-of-message designation and a predetermined plural digit channel number and a precedence designation and a variable address designation and a message body, a recording mechanism associated with said incoming line operated by said signals to produce a record thereof, sensing means operated to sense said record, a start-of-message register, a channel number comparator having preregistered therein a predetermined plural digit number corresponding to the expected channel number included in the message received over said incoming line, a precedence register operative to register any one of a plurality of different precedence designations, an address register operative to register any one of a plurality of different address designations identifying the corresponding destination of said message, means controlled by said sensing means for operating said start-of-message register to register only said recorded start-of-message designation and for comparing said recorded predetermined plural digit channel number with said predetermined plural digit number preregistered in said comparator and for operating said precedence register to register said recorded precedence designation only responsive to the successful registration of said start-of-message designation and the successful comparison of said recorded channel number and said number preregistered in said comparator and for operating said address register to register said recorded address designation, outgoing lines, a plurality of cross-office units having access to said outgoing lines and normally available to store and to retransmit messages over selected ones of said outgoing lines, means controlled in accordance with said address designation registered in said address register for registering the identity of the particular outgoing line over which said recorded message must be transmitted to reach said address, means operated in accordance with any one of said plurality of different precedence designations registered in said precedence register for normally selecting an available one of said cross-office units and for operating said selected cross-office unit to connect with said identified outgoing line and to register therein said precedence designation registered in said precedence register, means for thereafter transferring said recorded message to said one cross-office unit in order to store and retransmit said recorded message over said identified outgoing line, an intercepting position, and means controlled in the event no cross-office unit is available at the time said selecting means is operated for controlling said selecting means to select said intercepting position and for transferring thereto said recorded message.

24. In an automatic telegraph system, an incoming line over which signals of a telegraph message are received, said message including a precedence designation and an address designation, a recording mechanism associated with said incoming line operated by said signals to produce a record thereof, sensing means operated to sense said record, a precedence register operative to register any one of a plurality of different degrees of precedence designations, an address register operative to register any one of a plurality of different address designations, means controlled by said sensing means for operating said precedence register to register said recorded precedence designation and for operating said address register to register said recorded address designation, outgoing lines, a plurality of cross-office units having access to said outgoing lines, means in said cross-office units for storing and retransmitting messages, means controlled in accordance with said address designation registered in said address register for registering the identity of the particular outgoing line over which said recorded message must be transmitted to reach said address, means operated in accordance with any one of said plurality of degrees of precedence designations registered in said precedence register for testing said identified outgoing line to determine whether or not one of said cross-office units is connected to said outgoing line, means controlled in response to said test for selecting the particular office unit connected to said outgoing line only in the event a prior message stored therein and being transmitted therefrom is of the identical degree of precedence designation as said recorded message, additional means controlled responsive to said test for selecting an available cross-office unit which is disconnected from all of said outgoing lines in the event the degree of the precedence designation of the prior message stored in and being transmitted from said particular cross-office unit and the degree of precedence designation of said recorded message are not identical, means controlled responsive to said selection of said particular cross-office unit for transferring said recorded message thereto for storage therein and subsequent transmission over said outgoing line, and means controlled responsive to said selection of an available cross-office unit for operating said selected available cross-office unit to connect with said identified outgoing line and for operating said selected available cross-office unit to register therein the particular degree of the precedence designation of said recorded message and for transferring said recorded message to said selected available cross-office unit for storage therein and subsequent transmission over said identified outgoing line.

25. In an automatic telegraph system, an incoming line over which signals of a telegraph message are received, said message including a precedence designation and an address designation, a recording mechanism associated with said incoming line operated by said signals to produce a record thereof, sensing means operated to sense said record, a precedence register operative to register any one of a plurality of different precedence designations, an address register operative to register any one of a plurality of different address designations identifying the corresponding destination of said message, means controlled by said sensing means for operating said precedence register to register said recorded precedence designation and for operating said address register to register said recorded address designation, outgoing lines, means controlled in accordance with said address designation registered in said address register for registering the identity of the particular outgoing line over which said recorded message must be transmitted to reach said address, a first cross-office unit connected to said identified particular outgoing line, other cross-office units having access to said outgoing lines, means in said cross-office units for storing and retransmitting messages and for registering the particular precedence of stored messages, means operated in accordance with any one of said plurality of different precedence designations registered in said precedence register for testing said identified outgoing line to determine whether any of said cross-office units are connected thereto and to determine the precedence registered in such connected cross-office units, means controlled in the event said test determines that the registered precedence of the message stored in said first cross-office unit is the same as the precedence of said recorded message for selecting said first cross-office unit and transferring said recorded message thereto for storage therein and subsequent retransmission over said particular outgoing line, and means controlled in the event said test determines that the registered precedence of the message stored in said first cross-office unit is not the same as the precedence of said recorded message for selecting one of said other cross-office units and for connecting said selected other cross-office unit to said particular outgoing line and transferring said registered precedence of said recorded message thereto and for transferring said recorded message to said other cross-office unit for storage therein and subsequent retransmission over said particular outgoing line.

26. In an automatic telegraph system, an incoming line over which signals of a telegraph message are received, said message including a precedence designation and a variable address designation, a recording mechanism associated with said incoming line operated by said signals to produce a record thereof, sensing means operated to sense said record, a precedence register operative to register any one of a plurality of different precedence designations, an address register operative to register any one of a plurality of different address designations identifying the corresponding destination of said message, means controlled by said sensing means for operating said precedence register to register said recorded precedence designation and for operating said address register to register said recorded address designation, outgoing lines, a plurality of cross-office units having access to said outgoing lines, means in said cross-office units for storing and retransmitting messages, means controlled in accordance with said address designation registered in said address register for registering the identity of the particular outgoing line over which said recorded message must be transmitted to reach said address, means operated in accordance with any one of said plurality of different precedence designations registered in said precedence register for testing said identified outgoing line to determine whether any of said cross-office units are connected thereto, means controlled in the event said test determines that a plurality of said cross-office units are connected to said identified outgoing line for selecting only the one of said connected cross-office units having a prior message stored therein of the same precedence designation as said recorded message, and means for transferring said recorded message to said storage means in said selected cross-office unit for retransmission over said identified outgoing line.

27. In an automatic telegraph system, an incoming line over which signals of a telegraph message are received, said message including a precedence designation and a variable address designation, a recording mechanism associated with said incoming line operated by said signals to produce a record thereof, sensing means operated to sense said record, a precedence register operative to register any one of a plurality of different precedence designations, an address register operative to register any one of a plurality of different address designations identifying the corresponding destination of said message, means controlled by said sensing means for operating said precedence register to register said recorded precedence designation and for operating said address register to register said recorded address designation, outgoing lines, a plurality of cross-office units having access to said outgoing lines, means in said cross-office units for storing and retransmitting messages, means controlled in accordance with said address designation registered in said address register for registering the identity of the particular outgoing line over which said recorded message must be transmitted to reach said address, means operated in accordance with the particular precedence designation registered in said precedence register for testing said identified outgoing line to determine whether a cross-office unit having a prior message stored therein of the same precedence designation as said recorded message is connected to said identified outgoing line, means controlled responsive to the completion of said test for selecting said connected cross-office unit and for transferring said recorded message to the storage means therein for retransmission over said identified outgoing line, means controlled only responsive to the failure of said test for selecting any one of a plurality of cross-office units having access to said identified outgoing line but disconnected therefrom, and means controlled responsive to the selection of one of said disconnected cross-office units for registering therein said recorded precedence designation and for connecting said disconnected unit to said identified outgoing line and for transferring said recorded message to the storage means therein for retransmission over said identified outgoing line.

28. In an automatic telegraph system, an incoming line over which signals of a telegraph message are received, said message including a precedence designation and a variable address designation, a recording mechanism associated with said incoming line operated by said signals to produce a record thereof, sensing means operated to sense said record, a precedence register operative to register any one of a plurality of different precedence designations, an address register operative to register any one of a plurality of different address designations identifying the corresponding destination of said message, means controlled by said sensing means for operating said precedence register to register said recorded precedence designation and for operating said address register to register said recorded address designations, outgoing lines, a plurality of cross-office units having access to said outgoing lines and normally available to store and to retransmit messages over selected ones of said outgoing lines, an intercept position, means controlled in accordance with said address designation registered in said address register for registering the identity of the particular outgoing line over which said recorded message must be transmitted to reach said address, means operated in accordance with any one of said plurality of different precedence designations registered in said precedence register for normally selecting a cross-office unit connected to said identified outgoing line having a prior message stored therein of the same precedence designation as said recorded message or for selecting an available cross-office unit disconnected from said identified outgoing line if no cross-office unit having a prior message stored therein of the same precedence designation as said recorded message is available or for selecting said intercept position if no cross-office unit is selected, means controlled in response to the selection of a cross-office unit having a prior message stored therein of the same precedence as said recorded message for transferring said recorded message thereto for retransmission over said connected identified outgoing line, means controlled in response to the selection of an available cross-office unit disconnected from said identified outgoing line for operating said available cross-office unit to connect with said identified outgoing line and for registering in said selected available cross-office unit said precedence designation registered in said precedence register and for transferring to said selected available cross-office unit said recorded message for retransmission over said connected identified outgoing line, and means controlled in response to the selection of said intercept position for transferring said recorded message thereto.

29. On an automatic telegraph system, an incoming line over which signals of a telegraph message are received, said message including a precedence designation and a variable address designation, a recording mechanism associated with said incoming line operated by said signals to produce a record thereof, sensing means operated to sense said record, a precedence register operative to register any one of a plurality of different precedence designations, an address register operative to register any one of a plurality of different address designations identifying the corresponding destination of said message, means controlled by said sensing means for operating said precedence register to register said recorded precedence designation and for operating said address register to register said recorded address designation, outgoing lines, a plurality of cross-office units having access to said outgoing lines and normally available to store and to retransmit messages over selected ones of said outgoing lines, means controlled in accordance with said address designation registered in said address register for registering the identity of the particular outgoing line over which said recorded message must be transmitted to reach said address, means operated in accordance with any one of said plurality of different precedence designations registered in said precedence register for normally selecting an available one of said cross-office units and for operating said selected cross-office unit to connect with said identified outgoing line and to register therein said precedence designation registered in said precedence register, means for thereafter transferring said recorded message to said one cross-office unit in order to store and retransmit said recorded message over said identified outgoing line, an intercepting position, and means controlled in the event no cross-office unit is available at the time said selecting means is operated for controlling said selecting means to select said intercepting position and for transferring thereto said recorded message.

30. In an automatic telegraph system, an incoming line over which signals of a telegraph message are received, said message including a precedence designation and an address designation, a primary recording mechanism associated with said incoming line operated by said signals to produce a primary record thereof, sensing means operated to sense said record as it is produced by said mechanism, a primary precedence register operative to register any one of a plurality of different precedence designations, an address register operative to register any one of a plurality of different address designations, means controlled by said sensing means for operating said primary precedence register to register said particular recorded precedence designation and for operating said address register to register said particular recorded address designation, outgoing lines, a plurality of secondary recording mechanisms, each of said secondary recording mechanisms including a selector having access to said outgoing lines and a storage bin for storing a secondary record produced by the associated secondary recording mechanism and a retransmitter for transmitting signals corresponding to said secondary record and a secondary precedence register, means controlled in accordance with said address designation registered in said address register for identifying the particular outgoing line over which said message recorded on said primary record must be transmitted to reach said address, means controlled by the operation of said identifying means for selecting one of said secondary recorders and for operating the associated selector to connect with said identified outgoing line and for operating the associated secondary precedence register to register the particular precedence designation registered in said primary precedence register, means controlled responsive to said slection of said one secondary recorder for transmitting signals corresponding to said primary record to said one secondary recorder to produce a secondary record of said message and for storing said secondary record in the associated storage bin, means controlled by said secondary record for controlling said one secondary recorder transmitter to transmit signals corresponding to said secondary record stored in said storage bin over said particular outgoing line, and means controlled responsive to said registration of said precedence designation in said secondary precedence register for conditioning said one secondary recorder to record additional messages received over incoming lines and recorded on primary records provided such recorded messages have the same precedence designation and must use the same outgoing line as said message recorded on said secondary record.

31. The automatic telegraph system as set forth in claim 30, wherein said conditioning of said one secondary recorder mechanism to record additional messages of the same precedence designation and destined to be transmitted over said identified outgoing line is retained until all of the messages on said secondary record stored in said storage bin have been transmitted over said particular outgoing lines by the transmitter of said one secondary recorder.

32. The automatic telegraph system as set forth in claim 30, wherein said registration of said precedence designation of said message in said secondary precedence register renders said one secondary recorder available to record additional messages of the same precedence designation which are destined to be transmitted over said identified outgoing line, and wherein the availability of said one secondary recorder is automatically withdrawn as soon as all of the messages recorded on said secondary record and stored in said storage bin have been transmitted over said identified outgoing line.

33. In an automatic telegraph system, an incoming line over which signals of a telegraph message are received, said message including an address designation, a primary recording mechanism associated with said incoming line operated by said signals to produce a primary record thereof, sensing means operated to sense said record as it is produced by said mechanism, an address register, means controlled by said sensing means for operating said address register to register said recorded address designation, a plurality of outgoing lines, a plurality of secondary recording mechanisms having access to said outgoing lines, each of said secondary recording mechanisms including a retransmitter for retransmitting signals over said outgoing lines corresponding to recorded messages produced by the associated secondary recording mechanism, means controlled in accordance with said address designation registered in said address register for identifying the particular outgoing line over which said primary recorded message must be retransmitted to reach said address, means controlled responsive to said control of said identifying means for testing said particular outgoing line to determine whether or not any of said secondary recording mechanisms are associated with said particular outgoing line, means controlled by said determining means incident to determining that one of said secondary recording mechanisms is associated with said particular outgoing line for connecting said primary recording mechanism to said one secondary recording mechanism and for operating said one secondary recording mechanism to produce a secondary record corresponding to said primary record, whereby said retransmitter associated with said one secondary recording mechanism is controlled by said secondary record to retransmit said message over said particular outgoing line, and means controlled by said determining means incident to determining that no secondary recording mechanism is associated with said particular outgoing line for selecting a secondary mechanism disconnected therefrom and for operating said selected secondary recording mechanism to connect with said particular outgoing line and for operating said selected secondary recording mechanism to produce a secondary record corresponding to said primary record, whereby said retransmitter associated with said selected secondary recording mechanism is controlled by said secondary record to retransmit said message over said particular outgoing line.

34. In an automatic telegraph system, an incoming line over which signals of a telegraph message are received, said message including an address designation, a primary recording mechanism associated with said incoming line operated by said signals to produce a primary record thereof, sensing means operated to sense said record as it is produced by said mechanism, an address register, means controlled by said sensing means operating said address register to register said recorded address designation, a plurality of outgoing lines, a plurality of secondary recording mechanisms having access to said outgoing lines, each of said secondary recording mechanisms including a record tape storage bin for storing tape recorded by the associated mechanism and a transmitter for transmitting signals corresponding to messages recorded on stored tape, means controlled in accordance with said address designation registered in said address register for identifying the particular outgoing line over which said primary recorded message must be retransmitted to reach said address, means controlled responsive to said control of said identifying means for testing said particular outgoing lines to determine whether or not any of said secondary recording mechanisms are associated with said particular outgoing line, means controlled by said determining means incident to determining that one of said secondary recording mechanisms is associated with said particular outgoing line for connecting said primary recording mechanism therewith and for operating said secondary recording mechanism to record on the associated recording tape said messages recorded on said primary record and for storing said tape in the associated tape storage bin for retransmission over the said particular outgoing line by the associated transmitter, means controlled by said determining means incident to determining that no secondary recording mechanism is associated with said particular outgoing line for selecting a secondary recording mechanism having an empty tape storage bin, and means controlled responsive to said selection of said empty bin secondary recording mechanism for connecting it to said particular outgoing line and for operating said selected mechanism to record on the associated recording tape said message as recorded on said primary record and for storing said tape in the associated tape storage bin for retransmission over said particular outgoing line by said associated transmitter.

35. In an automatic telegraph system, an incoming line terminating in a line circuit, a plurality of outgoing lines over which telegraph messages are transmitted to reach a plurality of assigned address designations, a cross-office unit having access to said outgoing lines, an operator position, a recording mechanism operated in accordance with signals of a telegraph message received over said incoming line to produce a record thereof, said message including an address designation, sensing means in said line circuit operated as said record is produced to sense said address designation, an address register, means controlled by said sensing means for operating said address register to register said address designation, a plurality of marking conductors corresponding respectively to said plurality of outgoing lines, a control conductor corresponding to said operator position, means controlled responsive to the registration of an assigned address designation in said address register for selecting the particular marking conductor corresponding to the particular outgoing line over which said message must be transmitted to reach said assigned address destination, means controlled responsive to the registration of any unassigned address desgination in said address register for selecting said control conductor, means controlled responsive to said selection of any one of said marking conductors for selecting said cross-office unit and for connecting said cross-office unit to the particular outgoing line corresponding to said selected marking conductor and for connecting said line circuit to said cross-office unit, means controlled responsive to said selection of said control conductor for connecting said line circuit to said operator position, means in said line circuit controlled responsive to said connection thereof to said cross-office unit for transmitting said recorded message to said cross-office unit and controlled responsive to said connection thereof to said operator position for transmitting said recorded message to said operator position, whereby messages having assigned address designations are transmitted from said line circuit to said cross-office unit and messages having unassigned address designations are transmitted to said operator position, and means in said cross-office unit for storing said message transmitted thereto and for retransmitting said stored message over said particular outgoing line.

36. In an automatic telegraph system, an incoming line over which signals of a telegraph message are received, said message including a start-of-message designation and an address designation, a recording mechanism associated with said incoming line operated by said signals to produce a record of said message, a plurality of storage devices, a plurality of outgoing lines over which certain messages must be transmitted to reach their destinations, sensing means operated responsive to said operation of said recording mechanism for sensing said record, a start-of-message detector for detecting a predetermined fixed start-of-message designation, means controlled by said sensing means for operating said start-of-message detector only responsive to the sensing of said predetermined start-of-message designation, additional means controlled by said sensing means for selecting any one of said storage devices and for connecting said selected storage device to one of said outgoing lines, a transmitter operative to sense said record, means controlled responsive to said operation of said start-of-message detector and said selection of said one storage device for operating said transmitter to sense said record and to retransmit telegraph signals corresponding to said message on said record to said selected storage device, and means associated with said selected storage device for transmitting said stored message over said selected outgoing line.

37. In an automatic telegraph system, an incoming line over which signals of a telegraph message are received, said message including a start-of-message designation comprising a plurality of characters and an address designation, a recording mechanism associated with said incoming line operated by said signals to produce a record of said message, sensing means operated responsive to said operation of said recording mechanism for sensing said record, a detector operative to detect a predetermined plural character start-of-message designation, means controlled by said sensing means as it senses said record for operating said detector to detect each of said recorded characters of said start-of-message designation and for restoring said detector to normal responsive to the sensing of any character other than the characters comprising said predetermined start-of-message designation, additional means controlled by said sensing means only responsive to said detection of said start-of-message designation by said detector for processing said recorded message for retransmission to its destination, means for counting each character of said recorded message sensed by said sensing means, and means controlled by said counting means only responsive to the failure of said detector to detect said start-of-message designation before a predetermined number of characters have been counted for transmitting a start-of-message failure alarm.

38. In an automatic telegraph system, an incoming line over which signals of a telegraph message are received, said message including a start-of-message designation comprising a plurality of characters and an address designation, a recording mechanism associated with said incoming line operated by said signals to produce a record of said message, sensing means operated responsive to said operation of said recording mechanism for sensing said record, a start-of-message detector operative to detect a predetermined plural character start-of-message designation, a counting mechanism, means controlled by said sensing means for transmitting to said detector only those characters corresponding to said predetermined characters in said start-of-message designation and for transmitting a control signal to said counting mechanism in response to each operation of said sensing means, means in said detector for detecting each of the characters of said designation transmitted thereto, and means controlled by said counting mechanism responsive to the counting of a predetermined number of said control signals before said detector means detects said predetermined start-of-message designation for terminating further operation of said sensing means.

39. In an automatic telegraph system, an incoming line over which signals of a telegraph message are received, said message including a start-of-message designation comprising a plurality of characters and an address designation, a recording mechanism associated with said incoming line operated by said signals to produce a record of said message, sensing means operated responsive to said operation of said recording mechanism for sensing said record, a start-of-message detector operative to detect a predetermined plural character start-of-message designation, a counting mechanism, means controlled by said sensing means for transmitting to said detector only those characters corresponding to said predetermined characters in said start-of-message designation and for transmitting a control signal to said counting mechanism in response to each operation of said sensing means, means in said detector for detecting each of the characters of said designation transmitted thereto, means in said counting mechanism for counting each of the control signals transmitted thereto, means controlled by said detector means responsive to the detection therein of said start-of-message designation for restoring said counting mechanism, and means controlled by said counting means responsive to the counting of a predetermined number of said control signals before said detector means detects said predetermined start-of-message designation for terminating further operation of said sensing means.

40. In an automatic telegraph system, an incoming line over which signals of a telegraph message are received, said message including a start-of-message designation comprising a plurality of characters and an address designation, a recording mechanism associated with said incoming line operated by said signals to produce a record of said message, sensing means operated responsive to said operation of said recording mechanism for sensing said record, a start-of-message detector operative to detect a predetermined plural character start-of-message designation, a counting mechanism, means controlled by said sensing means for transmitting to said detector only those characters corresponding to said predetermined characters in said start-of-message designation and for transmitting a control signal to said counting mechanism in response to each operation of said sensing means, means in said detector for detecting each of the characters of said start-of-message designation transmitted thereto, means in said counting mechanism for counting each of the control signals transmitted thereto, means controlled by said detector means responsive to the detection therein of said start-of-message designation for preventing said control signals from being transmitted to said counting mechanism and for restoring said counting mechanism to normal, and means controlled by said counting means responsive to the counting of a predetermined number of said control signals before said detector means detects said predetermined start-of-message designation for terminating operation of said sensing means and for transmitting a start-of-message failure alarm.

41. In an automatic telegraph system, an incoming line over which signals of a telegraph message are received, said message including a start-of-message designation comprising a plurality of predetermined characters in a predetermined sequence and an address designation, a recording mechanism associated with said incoming line operated by said signals to produce a record of said message, sensing means operated responsive to said operation of said recording mechanism for sensing said record, a start-of-message detector operative to detect the characters of said predetermined start-of-message designation in a predetermined sequence, means controlled by said sensing means for transmitting to said detector only those characters corresponding to the characters in said start-of-message designation, means in said detector for detecting each of the characters of said start-of-message designation only if they are transmitted thereto in said predetermined sequence, and means controlled by said sensing means responsive to the sensing of a character of said start-of-message designation out of said sequence for restoring said detector to normal and for reoperating said detector to detect said sensed character only if it is the first character of said start-of-message designation.

42. In an automatic telegraph system, an incoming line over which signals of a telegraph message are received, said message including a start-of-message designation comprising a plurality of predetermined characters in a predetermined sequence and an address designation, a recording mechanism associated with said incoming line operated by said signals to produce a record of said message, sensing means operated responsive to said operation of said recording mechanism for sensing said record, a start-of-message detector operative to detect in a predetermined sequence each of the characters of said predetermined start-of-message designation, means controlled by said sensing means as it senses said record for transmitting each of the characters of said message to said detector, means in said detector operated responsive to the transmission thereto of the first character of said start-of-message designation to detect said first character and to condition said detecting means to detect the next character of said designation and operated responsive to the transmission thereto of said next character of said designaton to detect said next character and to condition said detecting means to detect the following character of said designation, and means controlled by said transmitting means responsive to the transmission of a character not included in said start-of-message designation for restoring all of the operated detecting means to normal and for conditioning said detecting means to again detect another first character of said start-of-message designation transmitted thereto.

43. In an automatic telegraph system, an incoming line over which signals of a telegraph message are received, said message including a predetermined start-of-message designation and a predetermined end-of-message designation, a recording mechanism associated with said incoming line operated by said signals to produce a record of said message, sensing means operated responsive to said operation of said recording mechanism for sensing said record, a detector operative to detect said start-of-message designation and said end-of-message designation, means controlled responsive to the sensing by said sensing means of said recorded predetermined start-of-message designation for operating said detector a first time to detect and to register said start-of-message designation, a transmitter operated responsive to said first operation of said detector to retransmit signals corresponding to said recorded message, means controlled responsive to the sensing by said sensing means of said recorded predetermined end-of-message designation for operating said detector a second time to detect and register said end-of-message designation, and means operated responsive to said second operation of said detector for controlling said transmitter to terminate retransmission of said signals.

44. In an automatic telegraph system, an incoming line over which signals of a telegraph message are received, said message including a predetermined start-of-message designation and a predetermined end-of-message designation, a recording mechanism associated with said incoming line operated by said signals to produce a record of said message, sensing means operated responsive to said operation of said recording mechanism for sensing said record, a detector operative to detect said start-of-message designation and said end-of-message designation, means controlled responsive to the sensing by said sensing means of said recorded predetermined start-of-message designation for operating said detector a first time to detect and to register said start-of-message designation, a transmitter operated responsive to said first operation of said detector to retransmit signals corresponding to said recorded message, means controlled responsive to the sensing by said sensing means of said recorded predetermined end-of-message designation for operating said detector a second time to detect and register said end-of-message designation, and means operated responsive to said second operation of said detector for controlling said transmitter to terminate retransmission of said signals responsive to retransmission thereby of said recorded end-of-message designation.

45. In an automatic telegraph system, an incoming line over which signals of a telegraph message are received, said message including a start-of-message designation comprising a plurality of predetermined characters in a predetermined sequence and an end-of-message designation comprising a plurality of predetermined characters in a predetermined sequence, a recording mechanism associated with said incoming line operated by said signals to produce a record of said message, sensing means operated responsive to said operation of said recording mechanism for sensing said record, a detector operative to detect said start-of-message designation and said end-of-message designation, means controlled by said sensing means for transmitting to said detector only those characters corresponding to the characters in said start-of-message designation and in said end-of-message designation, means for operating said detector to detect each of the characters of said start-of-message designation only if they are transmitted thereto in said predetermined sequence, a first register means operated responsive to the successful detection by said detector of said start-of-message characters for registering the detection of a start-of-message designation and for releasing said detector, means for reoperating said detector to detect each of the characters of said end-of-message designation only if they are transmitted thereto in said predetermined sequence, and a second register means operated responsive to the successful detection by said detector of said end-of-message characters for registering the detection of an end-of-message designation and for restoring said first register means and said detector to normal, thereby to prepare said detector to detect each of the characters of another start-of-message designation.

46. In an automatic telegraph system, an incoming line over which signals of a telegraph message are received, said message including a start-of-message designation comprising a plurality of predetermined characters in a predetermined sequence and an end-of-message designation comprising a plurality of predetermined characters in a predetermined sequence, a recording mechanism associated with said incoming line operated by said signals to produce a record of said message, sensing means operated responsive to said operation of said recording mechanism for sensing said record, a detector operative to detect said start-of-message designation and said end-of-message designation, means controlled by said sensing means as it senses said record for transmitting each of the characters of said message to said detector, a start-of-message control relay, register means in said detector operated responsive to the transmission thereto of each of the characters of said start-of-message designation in said predetermined sequence for operating said start-of-message control relay, means controlled in response to said operation of said start-of-message control relay for restoring said register means to normal, an end-of-message control relay, said register means also controlled responsive to the transmission to said detector of each of the characters of said end-of-message designation in said predetermined sequence for operating said end-of-message control relay, and means controlled in response to said operation of said end-of-message control relay for restoring said register means and said start-of-message control relay to normal, whereby said register means and said start-of-message control relay are conditioned to respond to the characters of another start-of-message designation transmitted thereto.

47. In an automatic telegraph system, an incoming line over which signals of a telegraph message are received, said message including a start-of-message designation comprising a plurality of predetermined characters in a predetermined sequence and an end-of-message designation comprising a plurality of predetermined characters in a predetermined sequence, a recording mechanism associated with said incoming line operated by said signals to produce a record of said message, sensing means operated responsive to said operation of said recording mechanism for sensing said record, a detector operative to detect said start-of-message designation and said end-of-message designation, means controlled by said sensing means as it senses said record for transmitting each of the characters of said message to said detector, a start-of-message control relay, register means in said detector operated responsive to the transmission thereto of each of the characters of said start-of-message designation in said predetermined sequence for operating said start-of-message control relay, means controlled in response to said operation of said start-of-message control relay for restoring said register means to normal, an end-of-message control relay, an alarm relay, said register means also controlled responsive to the transmission to said detector of each of the characters of said end-of-message designation in said predetermined sequence for operating said end-of-message control relay, means controlled in response to said operation of said end-of-message control relay for restoring said register means and said start-of-message control relay to normal, whereby said register means and said start-of-message control relay are conditioned to respond to the characters of another start-of-message designation transmitted thereto, means including said register means controlled in response to the transmission to said detector of each of the characters of a second start-of-message designation prior to said operation of said end-of-message control relay for operating said alarm relay, and means controlled responsive to said operation of said alarm relay for transmitting a signal indicative of failure of the operation of said end-of-message control relay.

48. In an automatic telegraph system, an incoming line over which signals of a telegraph message are received, each of said messages including a predetermined start-of-message designation and a predetermined end-of-message designation, each of said designations comprising predetermined characters, a recording mechanism associated with said incoming line operated by said signals to produce a record of said messages as they are received, sensing means operated responsive to said operation of said recording mechanism for sensing said record, a register, a start-of-message relay, an end-of-message relay, means controlled by said sensing means for operating said register in accordance with the characters of a first start-of-message designation in order to operate said start-of-message relay and for reoperating said register in accordance with the characters of a first end-of-message designation in order to operate said end-of-message relay and to restore said start-of-message relay so that said register may be reoperated in accordance with the characters of a second start-of-message designation, and means controlled responsive to reoperation of said register in accordance with the characters of a second start-of-message designation prior to operation of said end-of-message relay for transmitting an end-of-message failure alarm.

49. In an automatic telegraph system, an incoming line over which signals of a telegraph message are received, said message including a start-of-message designation comprising a plurality of predetermined characters in a predetermined sequence and an end-of-message designation comprising a plurality of predetermined characters in a predetermined sequence, a recording mechanism associated with said incoming line operated by said signals to produce a record of said message, sensing means operated responsive to said operation of said recording mechanism for sensing said record, a detector operative to detect said start-of-message designation and said end-of-message designation, means controlled by said sensing means as it senses said record for transmitting each of the characters of said message to said detector, a start-of-message control relay, register means in said detector operated responsive to the transmission thereto of each of the characters of said start-of-message designation in said predetermined sequence for operating said start-of-message control relay, means controlled in response to said operation of said start-of-message control relay for restoring said register means to normal, an end-of-message control relay, an alarm relay, said register means also controlled responsive to the transmission to said detector of each of the characters of said end-of-message designation in said predetermined sequence for operating said end-of-message control relay, means controlled in response to said operation of said end-of-message control relay for restoring said register means and said start-of-message control relay to normal, whereby said register means and said start-of-message control relay are conditioned to respond to the characters of another start-of-message designation transmitted thereto, counting means for counting each of the characters transmitted to said detector, and means controlled responsive to the counting of a predetermined number of characters by said counting means following the restoration of said start-of-message control relay and prior to reoperation thereof in response to another start-of-message designation transmitted to said detector for operating said alarm relay.

50. In an automatic telegraph system, an incoming line over which signals of a telegraph message are received, said message including a start-of-message designation comprising a plurality of predetermined characters in a predetermined sequence and an end-of-message designation comprising a plurality of predetermined characters in a predetermined sequence, a recording mechanism associated with said incoming line operated by said signals to produce a record of said message, sensing means operated responsive to said operation of said recording mechanism for sensing said record, a detector operative to detect said start-of-message designation and said end-of-message designation, means controlled by said sensing means as it senses said record for transmitting each of the characters of said message to said detector, a start-of-message control relay, register means in said detector operated responsive to the transmission thereto of each of the characters of said start-of-message designation in said predetermined sequence for operating said start-of-message control relay, means controlled in response to said operation of said start-of-message control relay for restoring said register means to normal, an end-of-message control relay, an alarm relay, said register means also controlled responsive to the transmission to said detector of each of the characters of said end-of-message designation in said predetermined sequence for operating said end-of-message control relay, means controlled in response to said operation of said end-of-message control relay for restoring said register means and said start-of-message control relay to normal, whereby said register means and said start-of-message control relay are conditioned to respond to the characters of another start-of-message designation transmitted thereto, counting means for counting each of the characters transmitted to said detector, means controlled responsive to the counting of a predetermined number of characters by said counting mechanism following the restoration of said start-of-message control relay and prior to reoperation thereof in response to another start-of-message designation transmitted to said detector for operating said alarm relay, a time relay operated in the event said start-of-message control relay and said end-of-message control relay remain in their unoperated positions for a predetermined elapsed time interval, and means controlled incident to operation of said time relay for transmitting a traffic failure alarm signal.

51. In an automatic telegraph system, an incoming line over which signals of a telegraph message are received, said message including a start-of-message designation and an end-of-message designation, a recording mechanism associated with said incoming line operated by said signals to produce a record of said message on a recording medium, sensing means operated to sense said recording medium as said record is produced by said mechanism, means controlled by said sensing means for registering a start-of-message designation, a transmitter controlled responsive to said operation of said start-of-message register means for sensing said record on said medium and for transmitting signals corresponding thereto, additional means controlled by said sensing means for registering an end-of-message designation, and means controlled responsive to said operation to said end-of-message registering means for operating said recording mechanism to automatically feed out said recording medium so that said recorded end-of-message designation will be sensed by said transmitter.

52. In an automatic telegraph system, an incoming line over which signals of a telegraph message are received, said message including a start-of-message designation and an end-of-message designation, a recording mechanism associated with said incoming line operated by said signals to produce a record of said message on a recording medium, sensing means operated to sense said recording medium as said record is produced by said mechanism, means controlled by said sensing means for registering a start-of-message designation, a transmitter controlled responsive to said operation of said start-of-message register means for sensing said record on said medium and for transmitting signals corresponding thereto, additional means controlled by said sensing means for registering an end-of-message designation, means controlled responsive to said operation of said end-of-message registering means for operating said recording mechanism to automatically feed out said recording medium so that said recorded end-of-message designation will be sensed by said transmitter, means for determining the amount of said recording medium automatically fed out by said recording mechanism, and means controlled responsive to the feed out of a predetermined amount of said recording medium for terminating said feed out operation of said recording mechanism.

53. In an automatic telegraph system, an incoming line over which signals of a telegraph message are received, said message including a start-of-message designation and an end-of-message designation, a recording mechanism associated wtih said incoming line operated by said signals to produce a record of said message on a recording medium, sensing means operated to sense said recording medium as said record is produced by said mechanism, means controlled by said sensing means for registering a start-of-message designation, a transmitter controlled responsive to said operation of said start-of-message register means for sensing said record on said medium and for transmitting signals corresponding thereto, additional means controlled by said sensing means for registering an end-of-message designation, means controlled responsive to said operation of said end-of-message registering means for operating said recording mechanism to automatically feed out said recording medium so that said recorded end-of-message designation will be sensed by said transmitter, and means controlled responsive to the failure of said start-of-message register means and said end-of-message register means to register respectively a start-of-message designation or an end-of-message designation within a predetermined elapsed time interval for transmitting an alarm signal indicative of the failure to receive a message over said incoming line within said predetermined time interval.

54. In an automatic telegraph system, an incoming line over which signals of a telegraph message are received, said message including a start-of-message designation and an end-of-message designation, a recording mechanism associated with said incoming line operated by said signals to produce a record of said message on a recording medium, sensing means operated to sense said recording medium as said record is produced by said mechanism, means controlled by said sensing means for registering a start-of-message designation, a transmitter controlled responsive to said operation of said start-of-message register means for sensing said record on said medium and for transmitting signals corresponding thereto, additional means controlled by said sensing means for registering an end-of-message designation, means controlled responsive to said operation of said end-of-message registering means for operating said recording mechanism to automatically feed out said recording medium so that said recorded end-of-message designation will be sensed by said transmitter, means controlled by said recording mechanism responsive to additional signals received over said incoming line for terminating said automatic feed out of said recording medium and for producing a record of said additional signals on said recording medium, and additional means controlled by said sensing means as it senses said record produced in response to said additional signals for determining the amount of said recording medium sensed by said sensing means so that said recording mechanism may be reoperated to automatically feed out said recording medium in the event said recorded end-of-message designation has not been sensed by said transmitter.

55. In an automatic telegraph system, an incoming line, a line circuit terminating said incoming line, a plurality of outgoing lines, a plurality of cross-office units having access to each of said outgoing lines and accessible to said line circuit, a recording mechanism operated in accordance with signals of a telegraph message received over said incoming line to produce a record thereof, said message including a plural character address designation, an address register including a plurality of individual character registers, sensing means in said line circuit operated as said record is produced to sense said plural character address designation, means controlled by said operation of said sensing means for detecting the characters of an address designation in a fixed sequence, means controlled by said detecting means for operating said individual character registers in a predetermined order to register said detected characters in said fixed sequence and for restoring all operated ones of said individual registers in response to the detection of a character not in said fixed sequence in order to condition said address register to again respond to said fixed sequence of characters, means controlled responsive to operation of said address register to register said plural character address designation in said individual character registers in said fixed sequence for identifying the particular one of said outgoing lines over which said recorded message must be retransmitted to reach said address, means operated responsive to said identification of said outgoing line for connecting said line circuit to any one of said cross-office units and for operating said one cross-office unit to connect with said identified outgoing line, means in said line circuit controlled responsive to said connection with said one cross-office unit for transmitting said recorded message to said cross-office unit, and means in said one cross-office unit for storing said transmitted message and for retransmitting said stored message over said identified outgoing line.

56. In an automatic telegraph system, an incoming line, a line circuit terminating said incoming line, a plurality of outgoing lines over which telegraph messages may be transmitted to reach different destinations, a plurality of cross-office units having access to each of said outgoing lines and accessible to said line circuit, a recording mechanism operated in accordance with signals of a telegraph message received over said incoming line to produce a record thereof, said message including a plural character address designation containing X number of characters, Y number of characters, or Z number of characters identifying one of said destinations and wherein the first characters of said plural character address designations are not usable as a second character and the second characters are not usable as a first character, an address register including Z number of individual character registers, sensing means in said line circuit operated as said record is produced to sense said plural character address designation, means controlled by said operation of said sensing means for detecting the characters of an address designation in a fixed sequence, a counting chain for selecting said individual character registers, means controlled by said detecting means and said counting chain for normally registering the successive characters of said address designation in the successive individual character registers, said counting chain operated responsive to the registration of each character for selecting the next one of said individual character registers, means controlled by said detecting means responsive to detecting a second received character of an address designation which is not usable as a second character and is usable as a first character for restoring said first character register to normal and for registering said second received character in said second register as a usable first character and for controlling said counting chain to reselect said first character register, means controlled thereafter by said detecting means responsive to detecting a third received character of an address designation which is usable as a first character for registering said third received character in said first register as a usable first character and for controlling said counting chain to select the third individual character register so that the fourth received character will be registered therein and the remaining characters will be registered in the remaining registers, means controlled by said counting chain for indicating whether X, Y, or Z number of characters are included in said registered address designation, means controlled by certain of the characters of an X number of characters or a Y number of characters or a Z number of characters of a plural character address designation registered in said address register and said indicating means for identifying the particular outgoing line over which said message must be transmitted to reach said plural character address designation, means operated responsive to said identification of said outgoing line for connecting said line circuit to one of said cross-office units and for operating said one cross-office unit to connect with said identified outgoing line, means in said line circuit controlled responsive to said connection with said one cross-office unit for transmitting said recorded message to said cross-office unit, and means in said one cross-office unit for storing said transmitted message and for retransmitting said stored message over said identified outgoing line.

57. In an automatic telegraph system, an incoming line, a line circuit terminating said incoming line, a plurality of outgoing lines over which telegraph messages may be transmitted to reach different destinations, a plurality of cross-office units having access to each of said outgoing lines and accessible to said line circuit, a recording mechanism operated in accordance with signals of a telegraph message received over said incoming line to produce a record thereof, said message including a plural character address designation, an address register including a plurality of individual character registers, sensing means in said line circuit operated as said record is produced to sense said plural character address designation, means controlled by said operation of said sensing means for detecting the characters of an address designation in a fixed sequence, means controlled by said detecting means for operating said individual character registers in a predetermined order to register said detected characters in said fixed sequence, means controlled responsive to the detection of a second character which is not usable as either a first or as a second character of said fixed sequence for restoring operated ones of said individual character registers to normal in order to condition said address register to respond to a new fixed sequence of characters detected by said detecting means, means controlled responsive to operation of said address register to register said plural character address designation in said individual character registers in said fixed sequence for identifying the particular one of said outgoing lines over which said recorded message must be retransmitted to reach said address, means operated responsive to said identification of said outgoing line for connecting said line circuit to any one of said cross-office units and for operating said one cross-office unit to connect with said identified outgoing line, means in said line circuit controlled responsive to said connection with said one cross-office unit for transmitting said recorded message to said cross-office unit, and means in said one cross-office unit for storing said transmitted message and for retransmitting said stored message over said identified outgoing line.

58. In an automatic telegraph system, an incoming line, a line circuit terminating said incoming line, a plurality of outgoing lines, a recording mechanism operated in accordance with signals of a telegraph message received over said incoming line to produce a record thereof, said message including a plural character address designation, an address register including a plurality of individual character registers, sensing means in said line circuit operated as said record is produced to sense said plural character address designation, means controlled by said operation of said sensing means for detecting the characters of an address designation in a fixed sequence, means controlled by said detecting means for operating said individual character registers in a predetermined nonconsecutive order to register said detected characters in said fixed sequence and for restoring all operated ones of said individual registers in response to the detection of a character not in said fixed sequence in order to condition said address register to again respond to said fixed sequence of characters, and means controlled responsive to operation of said address register to register said plural character address designation in said individual character registers in said fixed sequence for identifying the particular one of said outgoing lines over which said recorded message must be retransmitted to reach said address.

59. In an automatic telegraph system, an incoming line, a line circuit terminating said incoming line, a plurality of outgoing lines, a recording mechanism operated in accordance with signals of a telegraph message received over said incoming line to produce a record thereof, said message including a plural character address designation having a variable number of characters, an address regiser including individual character register for each of the characters of an address designation, sensing means in said line circuit operated as said record is produced to sense said plural character address designation, means controlled by said operation of said sensing means for detecting the characters of an address designation in a fixed sequence, means controlled by said detecting means for operating said individual character registers in a predetermined nonconsecutive order to register said detected characters in said fixed sequence and for restoring all operated ones of said individual registers in response to the detection of a character not in said fixed sequence in order to condition said address register to again respond to said fixed sequence of characters, and means controlled in accordance with the certain of the characters of an address designation registered in said individual character registers in said fixed sequence for identifying the particular one of said outgoing lines over which said recorded message must be retransmitted to reach said address.

60. In an automatic telegraph system, an incoming line, a line circuit terminating said incoming line, a plurality of outgoing lines, a recording mechanism operated in accordance with signals of a telegraph message received over said incoming line to produce a record thereof, said message including a plural character address designation having a variable number of characters, an address register including individual character register for each of the characters of an address designation, sensing means in said line circuit operated as said record is produced to sense said plural character address designation, means controlled by said operation of said sensing means for detecting the characters of an address designation in a fixed sequence, a counting chain controlled by said detecting means for selecting said individual registers in a predetermined nonconsecutive order to register said detected characters in said fixed sequence, means controlled responsive to the detection of a character not in said fixed sequence for restoring said counting chain and all operated ones of said individual registers in order to condition said counting chain to again select said individual registers in said predetermined order, and means controlled in accordance with the certain of the characters of an address designation registered in said individual character registers in said fixed sequence for identifying the particular one of said outgoing lines over which said recorded message must be retransmitted to reach said address.

61. In an automatic telegraph system, an incoming line, a line circuit terminating said incoming line, a recording mechanism operated in accordance with signals of a telegraph message received over said incoming line to produce a record thereof, said message including a plural character address designation containing X number of characters, Y number of characters, or Z number of characters identifying the destination of the message and wherein the first characters of said plural character address designations are not usable as a second character and the second characters are not usable as a first character, an address register including Z number of individual character registers, sensing means in said line circuit operated as said record is produced to sense said plural character address designation, means controlled by said operation of said sensing means for detecting the characters of an address designation in a fixed sequence, a counting chain for selecting said individual character registers, means controlled by said detecting means and said counting chain for normally registering the successive characters of said address designation in the successive individual character registers, said counting chain operated responsive to the registration of each character for selecting the next one of said individual character registers, means controlled by said detecting means responsive to detecting a second received character of an address designation which is not usable as a second character and is usable as a first character for restoring said first character register to normal and for registering said second received character in said second register as a usable first character and for controlling said counting chain to reselect said first character register, and means controlled thereafter by said detecting means responsive to detecting a third received character of an address designation which is usable as a first character for registering said third received character in said first register as a usable first character and for controlling said counting chain to select the third individual character register so that the fourth received character will be registered therein and the remaining characters will be registered in the remaining registers.

62. The automatic telegraph system as set forth in claim 61, wherein said counting chain is automatically controlled to advance one step after the registration of each character in each of said individual character registers except after the registration of a usable second character in said second register at which time it is automatically controlled to skip one step to select the third individual character register.

63. An automatic telegraph system as set forth in claim 61, wherein said counting chain is automatically controlled to advance one step after the registration of each character in each of said individual registers except after the registration of a usable second character in said second individual character register at which time it is automatically controlled to advance two steps.

64. An automatic telegraph system as set forth in claim 61, wherein said counting chain is automatically controlled to advance one step after the registration of each character in each of said individual character registers except after the registration of the second character in said second register at which time said counting chain is automatically controlled to advance one step to select said first register or two steps to select said third register depending upon whether said second character is usable as a first or as a second character of said address designation.

65. In an automatic telegraph system, an incoming line, a line circuit terminating said incoming line, a recording mechanism operated in accordance with signals of a telegraph message received over said incoming line to produce a record thereof, said message including a plural character address designation, an address register including a plurality of individual character registers, sensing means in said line circuit operated as said record is produced to sense said plural character address designation, means controlled by said operation of said sensing means for detecting the characters of an address designation in a fixed sequence, means controlled by said detecting means for operating said individual character registers in a predetermined nonconsecutive order to register said detected characters in said fixed sequence, and means controlled responsive to the detection of a second character which is not usable as either a first or as a second character of said fixed sequence for restoring operated ones of said individual character registers to normal in order to condition said address register to respond to a new fixed sequence of characters detected by said detecting means.

66. In an automatic telegraph system, an outgoing line over which telegraph messages are transmitted, a group of cross-office units individually associated with said outgoing line, a recording medium in each of said units having recorded thereon a telegraph message including a precedence designation portion to indicate the degree of priority of the recorded message, a precedence register in each of said units, means in each of said units controlled in response to the recorded precedence designation of said message stored therein for operating the corresponding precedence register to register said precedence therein, means in each cross-office unit operative to transmit signals over said outgoing line corresponding to the message recorded on the associated recording medium, means in each cross-office unit indicating the degree of priority of precedence designations registered in the other cross-office units of said group, means governed by said indicating means for preventing operation of said transmitting means of a cross-office unit in the event another cross-office unit has a precedence designation registered therein of higher priority, means for connecting said transmitting means of said cross-office having the registered precedence designation of highest priority to said outgoing line and for operating said transmitting means, means controlled responsive to the completion of said transmission of said highest priority message for removing said precedence designation indication from said other cross-office units of said group, and means controlled thereafter for connecting and operating said transmitting means of said cross-office unit having the registered precedence designation of the next highest priority to said outgoing line, whereby recorded messages in said group of cross-office units are transmitted one after another over said outgoing line by the associated transmitting means in the descending order of priority.

67. In an automatic telegraph system, an outgoing line, a plurality of cross-office units, a precedence register in each of said cross-office units operative to register any one of a plurality of different degrees of precedence indicative of corresponding different degrees of priority of telegraph messages, said degrees of precedence being divided into a first low precedence group including a plurality of different degrees of low precedence indicative of corresponding different degrees of low priority messages and a second high precedence group including a plurality of different degrees of high precedence indicative of corresponding different degrees of high priority messages, means controlled in response to a plurality of telegraph messages each of which is designated by an address portion thereof as directed to said outgoing line and each of which is designated by a precedence portion thereof as being of a different degree of precedence for selecting different ones of said plurality of cross-office units and for operating the associated precedence registers to register different degrees of precedence indicative of different priority messages and for connecting each of said selected cross-office units to said outgoing line, means in each of said selected cross-office units for producing a record of the message corresponding to the precedence registered in the associated cross-office unit, marking means in each of said selected cross-office units operated to indicate the highest degree of precedence of any message recorded in any one of said cross-office units, a transmitter in each of said cross-office units operative to transmit signals corresponding to the associated recorded message therein over said outgoing line, and means governed by said marking means for operating the transmitter of the cross-office unit having the highest degree precedence message stored therein to transmit said message over said outgoing line and for thereafter operating the transmitters of the remaining cross-office units in sequence so that the messages stored in the corresponding cross-office units are transmitted over said outgoing line one after another in the descending order of precedence.

68. The automatic telegraph system as set forth in claim 67, wherein said marking means in each of said cross-office units connected to said outgoing line controls the marking means in each of the remaining cross-office units connected to said outgoing line to indicate the particular precedence of each message registered in each of the precedence registers of said cross-office units.

69. The automatic telegraph system as set forth in claim 67, wherein said marking means in each of said cross-office units connected to said outgoing line is controlled over a circuit including the outgoing line selecting means of each of the cross-office units in order to indicate in each cross-office unit connected to said outgoing line the highest precedence message stored in said cross-office units, and wherein the next highest precedence message stored in any one of the cross-office units is indicated by all of said marking means after the transmission over said outgoing line of said highest precedence message.

70. The automatic telegraph system, as set forth in claim 69, wherein said control circuit includes a plurality of conductors and each conductor is adapted to be selectively controlled to operate the marking means to indicate the highest of two precedences registered in the precedence registers and is controlled to register the next highest of the two registered precedence messages after the message corresponding to the highest degree of precedence has been transmitted, whereby the precedence marking means in each of said cross-office units is controlled to indicate the different degreees of precedence of messages to be transmitted over the outgoing line in the descending order of different degrees of priority.

71. In an automatic telegraph system, an outgoing line, a plurality of cross-office units, a precedence register in each of said cross-office units operative to register a high precedence indicative of a high priority telegraph message or a low precedence indicative of a low priority telegraph message, means controlled in response to a first low precedence message for selecting an idle one of said cross-office units and for operating the associated precedence register to register a first low precedence message and for connecting said cross-office unit to said outgoing line, a recording mechanism and a storage bin individual to each of said cross-office units, means for operating the recording mechanism of said selected cross-office unit to produce a record of said first low precedence message and for storing said recorded message in said storage bin, means in said selected cross-office unit controlled responsive to said operation of the associated precedence register to register said first low precedence message for controlling said selected cross-office unit to record and store a plurality of additional low precedence messages, means controlled in response to each high precedence message for selecting an idle one of said plurality of cross-office units and for operating the associated precedence register to register the high precedence message and for connecting said selected cross-office unit to said outgoing line and for operating the associated recording mechanism to produce a record of said high precedence message and for storing the message in the associated storage bin, and means in each cross-office unit having a high precedence message stored therein for preventing storage therein of an additional message, whereby a cross-office unit having a low precedence message stored therein may be operated to record and store a plurality of low precedence messages and whereby a cross-office unit having a single high precedence message stored therein is prevented from recording therein an additional high precedence message.

72. The automatic telegraph system set forth in claim 71, wherein each of said cross-office units includes a transmitter operative to transmit telegraph signals over said outgoing line in accordance with the recorded messages stored in the associated storage bin, and means for operating the transmitter of each of said cross-office units having a high precedence message stored therein one after another to transmit each of said high precedence message over said outgoing line and for thereafter operating said transmitter of said cross-office unit having said plurality of low precedence messages stored therein.

73. In an automatic telegraph system, an incoming line over which signals of a telegraph message are received, said message including a start-of-message designation and an end-of-message designation, a primary recording mechanism associated with said incoming line operated by said signals to produce a primary record of said message on a recording medium, sensing means operated to sense said recording medium as said primary record is produced by said primary recording mechanism, an outgoing line over which said message must be retransmitted, a cross-office unit associated to said outgoing line, said cross-office unit including a secondary recording mechanism and a secondary transmitter, means controlled by said recording medium sensing means for registering said start-of-message designation and for selecting said cross-office unit, a primary transmitter controlled responsive to said selection of said cross-office unit for starting transmission of signals corresponding to said message on said recording medium to said secondary recorder, said secondary recorder controlled by said signals transmitted thereto to produce a secondary record of said message preceded by said start-of-message designation, means in said cross-office unit for sensing said secondary record and for connecting said secondary transmitter to said outgoing line responsive to the sensing of said start-of-message designation on said secondary record, means controlled responsive to said connection of said secondary transmitter for controlling said secondary transmitter in accordance with said secondary record to transmit signals corresponding thereto over said outgoing line, additional means controlled by said recording medium sensing means for registering said end-of-message designation, means controlled responsive to said registration of said end-of-message designation for automatically feeding said recording medium so that said primary transmitter will continue transmitting until said end-of-message designation has been transmitted to said secondary recorder, and means in said cross-office unit operated responsive to the sensing of said end-of-message designation on said secondary record for disconnecting said secondary transmitter from said outgoing line prior to transmission thereby of said end-of-message designation and for retaining it disconnected therefrom until another start-of-message designation is sensed on said secondary record, whereby said secondary transmitter is controlled to transmit signals over said outgoing line corresponding to the message recorded on said secondary record between a start-of-message designation and an end-of-message designation and is controlled to absorb signals transmitted by said secondary transmitter between an end-of-message designation of one message and a start-of-message designation of a following message recorded on said secondary record.

74. In an automatic telegraph system, an incoming line over which signals of a telegraph message are received, said message including a start-of-message designation and an end-of-message designation, a primary recording mechanism associated with said incoming line operated by said signals to produce a primary record of said message on a recording medium, sensing means operated to sense said recording medium as said primary record is produced by said primary recording mechanism, an outgoing line over which said message must be retransmitted, a cross-office unit associated to said outgoing line, said cross-office unit including a secondary recording mechanism and a secondary transmitter, means controlled by said recording medium sensing means for registering said start-of-message designation and for selecting said cross-office unit, a primary transmitter controlled responsive to said selection of said cross-office unit for starting transmission of signals corresponding to said message on said recording medium to said secondary recorder, said secondary recorder controlled by said signals transmitted thereto to produce a secondary record of said message preceded by said start-of-message designation, means in said cross-office unit operated to sense said secondary record, means operated by said cross-office unit sensing means in response to the sensing of said start-of-message designation on said secondary record for conditioning said cross-office unit for connection with said associated outgoing line, means operated thereafter for connecting said cross-office unit to said associated outgoing line, means controlled in response to said operation of said connecting means for controlling said secondary transmitter in accordance with said secondary record to transmit signals corresponding thereto over said outgoing line, additional means controlled by said recording medium sensing means for registering said end-of-message designation, means controlled responsive to said registration of said end-of-message designation for automatically feeding said recording medium so that said primary transmitter will continue transmitting until said end-of-message designation has been transmitted to said secondary recorder, and means in said cross-office unit operated responsive to the sensing of said end-of-message designation on said secondary record for disconnecting said cross-office unit from said outgoing line prior to transmission by said secondary transmitter of said end-of-message designation and for retaining said cross-office unit disconnected from said associated outgoing line until another start-of-message designation is sensed on said secondary record, whereby said cross-office unit is effectively connected with said associated outgoing line so that said secondary transmitter is controlled to transmit signals over said outgoing line corresponding to the message recorded on said secondary record between a start-of-message designation and an end-of-message designation and whereby said cross-office unit is effectively disconnected from said associated outgoing line in order to absorb signals transmitted by said secondary transmitter between an end-of-message designation of one message and a start-of-message designation of a following message recorded on said secondary record.

75. In an automatic telegraph system, a first switching center identified by an address designation comprising a predetermined sequence of predetermined characters, other switching centers identified by address designations comprising a predetermined sequence of different predetermined characters, an incoming line terminating in a line circuit in said first center, outgoing lines over which telegraph messages are transmitted to reach said other switching centers, a cross-office unit having access to said outgoing lines, a terminal position in said first switching center, a switch having access to said cross-office unit and to said terminal position, a recording mechanism operated in accordance with signals of a telegraph message received over said incoming line to produce a record thereof, said message including an address designation, sensing means in said line circuit operated as said record is produced to sense said address designation, means controlled by said operation of said sensing means for detecting the characters of said address designation in a fixed sequence, an address register including a plurality of individual character registers, means controlled by said detecting means for operating said individual character registers in a predetermined order to register said detected characters in said fixed sequence, means controlled responsive to the registration of a predetermined sequence of predetermined characters identifying said first switching center for operating said switch to connect said line circuit to said terminal position, additional means controlled responsive to the registration of a predetermined sequence of different characters identifying one of said other switching centers for identifying the particular outgoing line over which said message must be transmitted to reach said identified other switching center, means in said line circuit controlled responsive to said connection of said line circuit to said operator position for transmitting said recorded message to said operator position, means controlled responsive to said identification of said outgoing line for operating said switch to select said cross-office unit and for operating said cross-office unit to select said identified outgoing line and for connecting said line circuit to said cross-office unit, means in said cross-office unit operated responsive to said connection of said line circuit to said cross-office unit for transmitting said recorded message to said cross-office unit, and means in said cross-office unit for storing said message transmitted thereto and for retransmitting said stored message over said identified outgoing line.

76. In an automatic telegraph system, a switching center identified by an address designation comprising a predetermined sequence of predetermined characters, a tributary station served by said switching center identified by an address designation comprising said address designation of said switching center and at least one additional character, an incoming line terminating in a line circuit in said first center, an outgoing line over which telegraph messages are transmitted to said tributary station, a cross-office unit having access to said outgoing line, a terminal position in said switching center, a switch having access to said cross-office unit and to said terminal position, a recording mechanism operated in accordance with signals of a telegraph message received over said incoming line to produce a record thereof, said message including an address designation, sensing means in said line circuit operated as said record is produced to sense said address designation, means controlled by said operation of said sensing means for detecting the characters of said address designation in a fixed sequence, an address register including a plurality of individual character registers, means controlled by said detecting means for operating said individual character registers in a predetermined order to register said detected characters in said fixed sequence, means controlled responsive to the registration of a predetermined sequence of predetermined characters identifying said relay switching center for operating said switch to connect said line circuit to said terminal position, additional means controlled responsive to the registration of said predetermined sequence of predetermined characters identifying said relay switching center followed by the registration of said additional character identifying said tributary station for identifying said outgoing line, means in said line circuit controlled responsive to said connection of said line circuit to said terminal position for transmitting said recorded message to said terminal position, means controlled responsive to said identification of said outgoing line for operating said switch to select said cross-office unit and for operating said cross-office unit to select said identified outgoing line and for connecting said line circuit to said cross-office unit, means in said cross-office unit operated responsive to said connection of said line circuit to said cross-office unit for transmitting said recorded message to said cross-office unit, and means in said cross-office unit for storing said message transmitted thereto and for retransmitting said stored message over said identified outgoing line to said tributary station.

77. In an automatic telegraph system, an outgoing line, a plurality of cross-office units, a precedence register in each of said cross-office units operative to register a high precedence indicative of a high priority telegraph message or a low precedence indicative of a low priority telegraph message, means controlled in response to a telegraph message including address signals corresponding to said outgoing line and low precedence signals for selecting an idle one of said cross-office units and for operating the associated precedence register to register the low precedence of said message and for connecting said cross-office unit to said outgoing line, a recording mechanism and a storage bin individual to each of said cross-office units, means for operating said recording mechanism of said selected cross-office unit to produce a record of said low precedence message and for storing said recorded message in the associated storage bin, a transmitter in said selected cross-office unit operated to transmit telegraph signals over said outgoing line in accordance with said recorded message stored in the associated storage bin, means controlled in response to a telegraph message including address signals corresponding to said outgoing line and high precedence signals for selecting another idle one of said cross-office units and for operating the associated precedence register to register said high precedence message and for connecting said other cross-office unit to said outgoing line, means for operating the recording mechanism of said selected other cross-office unit to produce a record of said high precedence message and for storing said recorded message in the associated storage bin, means in said selected other cross-office unit controlled responsive to the registration therein of said high precedence message for terminating operation of said transmitter in said first-mentioned cross-office unit in order to interrupt the transmission of signals corresponding to said low precedence message stored therein and for initiating the operation of said other cross-office unit transmitter to transmit signals corresponding to said high precedence message stored therein.

78. The automatic telegraph system set forth in claim 77, including means in said first-mentioned cross-office unit controlled in response to said interruption of said transmission of said low precedence message over said outgoing line for transmitting signals over said outgoing line indicative of the failure to complete said transmission of said low precedence message.

79. The automatic telegraph system set forth in claim 77, including a common transmitter controlled responsive to said interruption in said transmission of said low precedence message for transmitting signals over said outgoing line indicative of the cancellation of said interrupted incomplete low precedence message before said other cross-office unit transmitter is controlled to transmit signals corresponding to said high precedence message.

80. The automatic telegraph system as set forth in claim 77, including a transmitter common to all of said cross-office units operative to transmit a predetermined series of signals indicative of the interruption in the transmission of a message, and means for connecting said common transmitter to said cross-office unit having said interrupted low precedence message stored therein and for operating said common transmitter to transmit said predetermined series of signals over said outgoing line following the transmitted signals of said interrupted low precedence message.

81. The automatic telegraph system as set forth in claim 77, including means in said cross-office unit having said interrupted low precedence message stored therein for temporarily locking said cross-office unit out of service, and means for again placing said cross-office unit in service responsive to the return of said record of said interrupted low precedence message to the associated storage bin.

82. The automatic telegraph system set forth in claim 77, including a transmitter common to all of said cross-office units, means in said common transmitter for transmitting signals indicative of the cancellation of the transmission of any interrupted message, and means controlled responsive to the interruption in the transmission of a message from any one of said cross-office units over an outgoing line for connecting said common transmitter to said one-cross-office unit and for initiating the operation of said transmitter to transmit said signals.

83. In an automatic telegraph system, a line over which signals of a telegraph message including a plural digit channel number designation and a message body are transmitted, an incoming line circuit terminating said line, a channel number comparator having preregistered therein a plural digit number, a recording mechanism operated responsive to said signals to produce a record thereof, sensing means operated to sense said record, means controlled by said sensing means for comparing said recorded plural digit channel number designation with said plural digit number preregistered in said comparator, a transmitter operable to transmit telegraph signals corresponding to said entire recorded message, means controlled responsive to the successful comparison of said recorded plural digit channel number designation and said plural digit number preregistered in said comparator for initiating operation of said transmitter, and means operated in response to the unsuccessful comparison of said recorded plural digit channel designation and said plural digit number preregistered in said comparator for terminating said operation of said sensing means.

84. In an automatic telegraph system, a line over which signals of a telegraph message including a start-of-message designation and a plural digit channel number designation and an address designation and a message body are transmitted, an incoming line circuit terminating said line, a channel number comparator having preregistered therein a plural digit number, a recording mechanism operated responsive to said signals to produce a record thereof, sensing means operated to sense said record, a start-of-message detector operated by said sensing means to detect a proper start-of-message designation, means controlled by said start-of-message detector in response to said detection of a proper start-of-message designation for connecting said sensing means to said channel number comparator, means controlled by said sensing means for comparing said plural digit channel number designation with said plural digit number preregistered in said comparator, a transmitter operable to transmit telegraph signals corresponding to said entire recorded message, and means controlled in response to the successful comparison of said plural digit channel designation and said plural digit number preregistered in said comparator and in response to said address designation for initiating operation of said transmitter.

85. In an automatic telegraph system, a line, an incoming line circuit including a channel number comparator terminating said line, means in said comparator registering a predetermined plural digit number, a recording mechanism operated responsive to signals of a telegraph message received over said line to produce a perforated tape record thereof, said tape record of said message including a start-of-message indicator comprising a sequence of predetermined characters and a channel number indicator comprising a plural digit number identifying said message, sensing means for sensing said tape record, detector means in said incoming line circuit controlled by said sensing means for detecting a start-of-message indicator only responsive to the sensing of said predetermined characters in said sequence, means controlled responsive to detection of said start-of-message indicator in said detector means for connecting said sensing means to said comparator, means controlled by said sensing means as said channel number indicator on said tape record is sensed for sequentially comparing successive digits thereof with the successive digits registered in said comparator, and means operated only responsive to the successful comparison of said digits of said channel number indicator and said digits of said number registered in said comparator for initiating transmission of signals in accordance with said perforated tape record.

86. In an automatic telegraph system, a line over which signals of a telegraph message including a start-of-message designation and a plural digit channel number designation and an address designation and a message body and an end-of-message designation are transmitted, an incoming line circuit terminating said line, a channel number comparator having preregistered therein a plural digit number, a recording mechanism operated responsive to said signals to produce a record thereof, sensing means operated to sense said record, a start-of-message detector operated by said sensing means to detect a proper start-of-message designation, means controlled by said start-of-message detector in response to said detection of a proper start-of-message designation for connecting said sensing means to said channel number comparator, means controlled by said sensing means for comparing said plural digit channel number designation with said plural digit number preregistered in said comparator, a transmitter operable to transmit telegraph signals corresponding to said entire recorded message, means controlled in response to the successful comparison of said plural digit channel designation and said plural digit number preregistered in said comparator and in response to said address designation for initiating operation of said transmitter, an end-of-message detector having registered therein a proper end-of-message designation and operated by said sensing means to detect a proper end-of-message designation, means controlled by said end-of-message detector in response to said detection of a proper end-of-message designation for restoring said start-of-message detector to normal in order to condition said start-of-message detector to respond to the start-of-message designation of another recorded message sensed by said sensing means, and additional means controlled by said end-of-message detector in response to said detection of said end-of-message designation for retaining said transmitter operated at least until it has transmitted signals corresponding to said end-of-message designation.

87. In an automatic telegraph system, a first class incoming line and a second class incoming line, a first line circuit terminating said first class incoming line and a second line circuit terminating said second class incoming line, a plurality of outgoing line extending to different destinations, a cross-office unit including a selector having access to each of said outgoing lines, means in each of said incoming line circuits responsive to signals of a telegraph message received over the associated incoming line for producing a record thereof, said message including an address designation, means in said associated incoming line circuit for sensing said address designation of said message on said record as said record is produced, means for registering said address as it is sensed by said sensing means and for selecting said cross-office unit, means controlled in accordance with said registered address for determining the particular outgoing line over which said recorded message must be retransmitted to reach its destination, means governed by said determining means for operating said selector of said cross-office unit to connect with said particular outgoing line, a transmitter in each of said incoming line circuts operative to retransmit signals corresponding to recorded messages, means controlled responsive to said selection of said particular outgoing line for operating said transmitter of the associated incoming line circuit, means in said cross-office unit for producing a record of said signals transmitted from the incoming line circuit transmitter, means in said cross-office unit controlled from said first incoming line circuit for retransmitting signals over said outgoing line corresponding to said last-mentioned record during the time said first incoming line circuit transmitter is operating, and means in said cross-office unit controlled from said second incoming line circuit for preventing said retransmitting means from retransmitting signals over said outgoing line corresponding to said last-mentioned record until all of the signals of said message have been transmitted by said second incoming line transmitter.

88. In an automatic telegraph system, a first class incoming line and a second class incoming line, a first line circuit terminating said first class incoming line and a second line circuit terminating said second class incoming line, a plurality of outgoing line extending to different destinations, a cross-office unit including a selector having access to each of said outgoing lines, means individually associated with said incoming line circuits operated by signals of telegraph messages received over the associated incoming line for producing a record thereof, said messages including an address designation and an end-of-message designation, means in said associated incoming line circuit for sensing said message on said record as said record is produced, means for registering said address designation of said message as it is sensed by said sensing means and for selecting said cross-office unit, means controlled in accordance with said registered address for determining the particular outgoing line over which said recorded message must be retransmitted to reach its destination, means governed by said determining means for operating said selector of said cross-office unit to connect with said particular outgoing line, a transmitter in each of said incoming line circuits operative to retransmit signals corresponding to recorded messages, means for connecting the associated incoming line circuit to said cross-office unit responsive to said selection of said particular outgoing line and for operating said transmitter of said associated incoming line circuit, means in said cross-office unit for producing a record of said signals transmitted from the incoming line circuit transmitter, means in said cross-office unit for retransmitting signals over said outgoing line corresponding to said last-mentioned record, said retransmitting means controlled from said first incoming line circuit so that signals are retransmitted over said outgoing line as said record is produced by said cross-office unit record producing means and controlled from said second incoming line circuit so that signals are not retransmitted over said outgoing line until said end-of-message designation of said message is sensed by said sensing means in said second incoming line circuit.

89. In automatic telegraph system, a first class incoming line and a second class incoming line, a first line circuit terminating said first class incoming line and a second line circuit terminating said second class incoming line, a plurality of outgoing lines extending to different destinations, a cross-office unit including a selector having access to each of said outgoing lines, a director, means in each of said incoming line circuits responsive to signals of a telegraph message received over the associated incoming line for producing a record thereof, said messages including an address designation, means operated as said record is produced in one of said incoming line circuits for associating said director therewith, means in said associated incoming line circuit for sensing said address designation of said message on said record as said record is produced, means in said director for registering said address as it is sensed by said sensing means and for selecting said cross-office unit, means in said director controlled in accordance with said registered address for determining the particular outgoing line over which said recorded message must be retransmitted to reach its destination, means governed by said determining means for operating said selector of said cross-office unit to connect with said particular outgoing line, a transmitter in each of said incoming line circuits operative to retransmit signals corresponding to recorded messages, means for disconnecting said director from the associated incoming line responsive to said selection of said particular outgoing line and for operating the transmitter thereat, means in said cross-office unit for producing a record of said signals retransmitted by said incoming line circuit transmitter, means in said cross-office unit controlled from said first incoming line circuit for retransmitting signals over said outgoing line corresponding to said last-mentioned record during the time said first incoming line circuit transmitter is operating, and means in said cross-office unit controlled from said second incoming line circuit for preventing said retransmitting means from retransmitting signals over said outgoing line corresponding to said last-mentioned record until all of the signals of said message have been retransmitted by said second incoming line transmitter.

90. In an automatic telegraph system, a first class incoming line and a second class incoming line, a first line circuit terminating said first class incoming line and a second line circuit terminating said second class incoming line, a plurality of outgoing lines extending to different destinations, a cross-office unit including a selector having access to each of said outgoing lines, a director, means individually associated with said incoming line circuits operated by signals of telegraph messages received over the associated incoming line for producing a record thereof, said messages including an address designation and an end-of-message designation, means operated as said record is produced in one of said incoming line circuits for associating said director therewith, means in said associated incoming line circuit for sensing said message on said record as said record is produced, means in said director for registering said address designation of said message as it is sensed by said sensing means and for selecting said cross-office unit, means in said director controlled in accordance with said registered address for determining the particular outgoing line over which said recorded message must be retransmitted to reach its desination, means governed by said determining means for operating said selector of said cross-office unit to connect with said particular outgoing line, a transmitter in each of said incoming line circuits operative to retransmit signals corresponding to recorded messages, means for disconnecting said director from the associated incoming line responsive to said selection of said particular outgoing line and for operating the transmitter thereat, means in said cross-office unit for producing a record of said signals retransmitted by said incoming line circuit transmitter, means in said cross-office unit for retransmitting signals over said outgoing line corresponding to said last-mentioned record, said retransmitting means controlled from said first incoming line circuit so that signals are retransmitted over said outgoing line as said record is produced by said cross-office unit record producing means and controlled from said second incoming line circuit to prevent retransmission of signals over said outgoing line until said end-of-message designation of said message is sensed by said sensing means in said second incoming line circuit.

91. In an automatic telegraph system, first and second incoming lines terminating respectively in a first class incoming line circuit and a second class incoming line circuit, a plurality of outgoing lines extending to different destinations, a cross-office unit including a selector having access to each of said outgoing lines, a director, means individually associated with said incoming line circuits operated by signals of telegraph messages received over the associated incoming lines for producing a record thereof, said messages including an address designation and an end-of-message designation, means operated as said record is produced in one of said incoming line circuits for associating said director therewith, means in said associated incoming line circuit for sensing said message on said record as said record is produced, means in said director for registering said address designation of said message as it is sensed by said sensing means and for selecting said cross-office unit, means in said director controlled in accordance with said registered address for determining the particular outgoing line over which said recorded message must be retransmitted to reach its destination, means governed by said determining means for operating said selector of said cross-office unit to connect with said particular outgoing line, a transmitter in each of said incoming line circuits operative to retransmit signals corresponding to recorded messages, means for disconnecting said director from the associated incoming line responsive to said selection of said particular outgoing line and for operating the transmitter thereat, means in said cross-office unit for producing a record of said signals retransmitted by said incoming line circuit transmitter, a retransmitter in said cross-office unit, and means in said cross-office unit controlled from a first class incoming line for controlling said cross-office retransmitter to transmit signals over said outgoing line as said cross-office unit record is produced in order to start the retransmission of said message over said outgoing line whether or not the end-of-message designation of said message has been sensed by said first class incoming line sensing means and controlled from a second class incoming line for controlling said cross-office retransmitter to refrain from transmitting signals over said outgoing line as said cross-office unit record is produced in order to prevent the retransmission of said message over said outgoing line until the end-of-message designation of said message is sensed by said second class incoming line sensing means.

92. In an automatic telegraph system, first and second incoming lines terminating respectively in a first class incoming line circuit and a second class incoming line circuit, a plurality of outgoing lines extending to different destinations, a cross-office unit including a selector having access to each of said outgoing lines, a director, means individually associated with said incoming line circuits operated by signals of telegraph messages received over the associated incoming lines for producing a record thereof, said messages including an address designation and an end-of-message designation, means operated as said record is produced in one of said incoming line circuits for associating said director therewith, means in said associated incoming line circuit for sensing said message on said record as said record is produced, means in said director for registering said address designation of said message as it is sensed by said sensing means and for selecting said cross-office unit, means in said director controlled in accordance with said registered address for determining the particular outgoing line over which said recorded message must be retransmitted to reach its destination, means governed by said determining means for operating said selector of said cross-office unit to connect with said particular outgoing line, a transmitter in each of said incoming line circuits operative to retransmit signals corresponding to recorded messages, means for disconnecting said director from the associated incoming line responsive to said selection of said particular outgoing line and for operating the transmitter thereat, means in said cross-office unit for producing a record of said signals retransmitted by said incoming line circuit transmitter, retransmitter in said cross-office unit, means in said cross-office unit for controlling said cross-office retransmitter to transmit signals over said outgoing line, means controlled from said first class line circuit as said cross-office unit record is produced for operating said transmitter control means to start said retransmitter whether or not said end-of-message designation has been sensed by said first class incoming line sensing means, means controlled from said second class line circuit for controlling said retransmitter control means to start said retransmitter after said end-of-message designation is sensed by said second class incoming line sensing means.

93. In an automatic telegraph system, a first switching center identified by an address designation comprising a predetermined sequence of predetermined characters, other switching centers identified by address designations comprising a predetermined sequence of different predetermined characters, a multiple call designation comprising a predetermined sequence of predetermined characters indicating that a message must be retransmitted to a plurality of said other switching centers, an incoming line terminating in a line circuit in said first center, outgoing lines over which telegraph messages are transmitted to reach said other switching centers, a cross-office unit having access to said outgoing lines, an operator position, a recording mechanism operated in accordance with signals of a telegraph message received over said incoming line to produce a record thereof, said message including an address designation followed by said multiple call designation, sensing means in said line circuit operated as said record is produced to sense said address designation and said multiple call designation, means controlled by said operation of said sensing means for detecting the characters of said address designation in a fixed sequence and for detecting the characters of said multiple call designation in a fixed sequence, an address register including a plurality of individual character registers, a multiple call register including a plurality of individual character registers, means controlled by said detecting means for operating said individual character registers of said address register and said multiple call register in a predetermined order to register said detected characters of said address designation and said multiple call designation in said fixed sequence, means controlled responsive to said registration of a predetermined sequence of predetermined characters identifying said first switching center and responsive to said registration of said predetermined characters of said multiple call designation for connecting said line circuit to said operator position, additional means controlled responsive to said registration of a predetermined sequence of different characters identifying one of said other switching centers in said address register for identifying the particular outgoing line over which said message must be transmitted to reach said identified other switching center and for rendering said multiple call register ineffective to register said multiple call designation, means in said line circuit controlled responsive to said connection of said line circuit to said operator position for retransmitting said recorded message including said address designation and said multiple call designation to said operator position so that the operator at said position may reroute said message to a plurality of said other switching centers, means controlled responsive to said identification of said outgoing line for selecting said cross-office unit and for connecting said cross-office unit to said identified outgoing line and for connecting said line circuit to said cross-office unit, means in said line circuit operated responsive to said connection of said line circuit to said cross-office unit for retransmitting said recorded message including said address designation and said multiple call designation to said cross-office unit, and means in said cross-office unit for storing said message transmitted thereto and for retransmitting said stored message including said address designation and said multiple call designation over said identified outgoing line to said one switching center so that said message may be rerouted therefrom to a plurality of said other switching centers.

94. In an automatic telegraph switching system, a switching center, incoming lines, outgoing lines, a pool of message storage and transmitting units, each of said units including respectively a connecting means having access to each of said outgoing lines, means controlled by a message received over any one of said incoming lines for selecting any one of said message storage and transmitting units from said pool and for operating its associated connecting means to select from said outgoing lines the particular one of said outgoing lines over which said message must be retransmitted to reach a particular called destination, and additional means controlled by said message received over said one incoming line for operating said one selected message storage and transmitting unit to store said message and to retransmit said message stored therein over said particular outgoing line.

95. In an automatic telegraph switching system, a switching center having a plurality of incoming lines and a plurality of outgoing lines, message storage means and message transmitting means individual to each incoming line for storing received message and for transmitting said stored messages, a plurality of cross-office units, switching means individual to each incoming line message storage and transmitting means for selecting one of said cross-office units, additional switching means individual to each cross-office unit for selecting any one of said outgoing lines, means controlled by a message stored in one of said incoming line message storage means for operating said switching means individual to said storage means in which said message is stored to select any one of said cross-office units and for operating said additional switching means individual to said selected cross-office unit to select the particular outgoing line over which said stored message must be retransmitted to reach its called destination, storage means individually included in said selected cross-office unit controlled by said one incoming line transmitting means in accordance with said stored message to transfer said stored message from said one incoming line to said selected cross-office unit storage means, and transmitting means individually included in said selected cross-office unit controlled by said message stored in said cross-office unit storage means for retransmitting said message over said selected outgoing line.

96. In an automatic telephone system, a first switching center identified by an address designation, other switching centers identified by different address designations, a special designation in the telegraph messages of said system indicating that a telegraph message must be retransmitted to a plurality of different switching centers, an incoming line terminating in a line circuit in said first switching center, outgoing lines extending from said first switching center and corresponding to said other switching centers, a first operator position accessible to said line circuit, a second operator position accessible to said line circuit and having access to said outgoing lines, a cross-office unit accessible to said line circuit and having access to said outgoing lines, a recording mechanism in said line circuit operated in accordance with the signals of the telegraph message transmitted thereto over said incoming line for producing a record thereof, any of said telegraph messages including a first address designation or a first address designation followed by said special designation and a plurality of additional address designations, an address designation register, a special designation register, sensing means operated in response to said record to register a first address indication thereon in said address designation register and to register any special designation thereon in said special designation register, means controlled responsive to said registration of a first address designation identifying said first switching center for connecting said line circuit to said first operator position and for retransmitting said recorded message to said first operator position in order to terminate the message at said first switching center, means controlled responsive jointly to said registration of a first address designation identifying said first switching center and to said registration of a special designation for preventing operation of said last mentioned means and for connecting said line circuit to said second operator position and for retransmitting said recorded message to said second operator position in order that said message may be transmitted therefrom to the switching centers identified by said plurality of additional address designations, and means controlled responsive to said registration of a first address designation identifying one of said other switching centers for seizing said cross-office unit and for controlling said cross-office unit to select the one of said outgoing lines corresponding to said one of said other switching centers and for thereafter connecting said line circuit to said cross-office unit and for retransmitting said recorded message including said first address designation and any additional designations included thereon through said cross-office unit and over said one outgoing line to said one of said other switching centers.

97. In an automatic telephone system, a first switching center identified by an address designation, other switching centers identified by different address designations, a special designation in the telegraph messages of said system indicating that a telegraph message must be retransmitted to a plurality of different switching centers, an incoming line terminating in a line circuit in said first switching center, outgoing lines extending from said first switching center and corresponding to said other switching centers, an operator position accessible to said line circuit and having access to said outgoing lines, a cross-office unit accessible to said line circuit and having access to said outgoing lines, a recording mechanism in said line circuit operated in accordance with the signals of the telegraph message transmitted thereto over said incoming line for producing a record thereof, any of said telegraph messages including a first address designation or a first address designation followed by said special designation and a plurality of additional address designations, an address designation register, a special designation register, sensing means operated in response to said record to register the first address indication thereon in said address designation register and to register any special designation thereon in said special designation register, means controlled responsive to said registration of a first address designation identifying said first switching center for conditioning said special designation register to thereafter register said special designation, means controlled responsive to the operation of said special designation register in registering a special designation for connecting said line circuit to said operator position and for retransmitting said recorded message including said first address designation and said special designation of said plurality of additional address designations to said operator position in order that said message may be retransmitted therefrom to the switching centers identified by said plurality of additional address designations, and means controlled responsive to said registration of a first address designation identifying one of said other switching centers for seizing said cross-office unit and for controlling said cross-office unit to select the one of said outgoing lines corresponding to said one of said other switching centers and for thereafter connecting said line circuit to said cross-office unit and for transmitting said recorded message thereon including said first address designation and any special designation and any plurality of other address designations to said cross-office unit for retransmission to said one of said other switching centers.

(References on following page)

References Cited in the file of this patent

UNITED STATES PATENTS

| | | |
|---|---|---|
| 2,222,672 | Large | Nov. 26, 1940 |
| 2,279,295 | Blanton | Apr. 14, 1942 |
| 2,297,365 | Ostline | Sept. 29, 1942 |
| 2,381,871 | Bacon et al. | Aug. 14, 1945 |
| 2,382,128 | Branson | Aug. 14, 1945 |
| 2,392,356 | Bacon | Jan. 8, 1946 |
| 2,406,787 | Bacon | Sept. 3, 1946 |
| 2,437,118 | Ostline | Mar. 2, 1948 |
| 2,454,301 | Bacon | Nov. 23, 1948 |
| 2,477,309 | Maxwell | July 26, 1949 |
| 2,487,186 | Schuler | Nov. 8, 1949 |
| 2,560,266 | Bacon et al. | July 10, 1951 |
| 2,569,443 | Bacon | Oct. 2, 1951 |
| 2,570,505 | Watson | Oct. 9, 1951 |

| | | |
|---|---|---|
| 2,573,718 | Kleinschmidt | Nov. 6, 1951 |
| 2,575,329 | Blanton et al. | Nov. 20, 1951 |
| 2,599,988 | Halvorsen | June 10, 1952 |
| 2,608,615 | Oberman | Aug. 26, 1952 |
| 2,611,026 | Blanton | Sept. 16, 1952 |
| 2,635,139 | Branson | Apr. 14, 1953 |
| 2,667,533 | Zenner | Jan. 26, 1954 |
| 2,676,199 | Bacon | Apr. 20, 1954 |
| 2,766,318 | Bacon | Oct. 9, 1956 |

FOREIGN PATENTS

| | | |
|---|---|---|
| 985,680 | France | July 23, 1951 |

OTHER REFERENCES

"Telephony," by Samuel G. McMeen and Kempster B. Miller, published by American Technical Society; copyright, 1912; pp. 490 to 493.

UNITED STATES PATENT OFFICE

CERTIFICATE OF CORRECTION

Patent No. 2,805,283 September 3, 1957

Richard C. Stiles

It is hereby certified that error appears in the printed specification of the above numbered patent requiring correction and that the said Letters Patent should read as corrected below.

Column 166, line 32, for "and" read -- said --; column 171, line 72, after "comparator" insert -- and --; line 73, after "numbers" strike out ", and"; column 173, lines 50 and 51, after "precedence", first occurrence, insert -- register --; column 180, line 7, for "designations" read -- designation --; line 43, for "On" read -- In --; column 181, line 40, for "slection" read -- selection --; column 190, line 2, for "operation to" read -- operation of --; column 205, line 70, before "retransmitter" insert -- a --; column 207, line 44, and column 208, line 23, for "telephone", in each occurrence, read -- telegraph --.

Signed and sealed this 12th day of November 1957.

(SEAL)

Attest:

KARL H. AXLINE

Attesting Officer

ROBERT C. WATSON

Commissioner of Patents